(12) United States Patent  (10) Patent No.: US 7,044,429 B1
Foreman et al.  (45) Date of Patent: May 16, 2006

(54) METHODS AND SYSTEMS FOR COATING EYEGLASS LENS MOLDS

(75) Inventors: John T. Foreman, Louisville, KY (US);
Galen R. Powers, Louisville, KY (US);
Matthew C. Lattis, Louisville, KY (US)

(73) Assignee: Q2100, Inc., Louisville, KY (US)

( * ) Notice: Subject to any disclaimer, the term of this patent is extended or adjusted under 35 U.S.C. 154(b) by 411 days.

(21) Appl. No.: 10/098,736

(22) Filed: Mar. 15, 2002

(51) Int. Cl.
B29D 11/00 (2006.01)

(52) U.S. Cl. .................. 249/205; 425/162; 425/808

(58) Field of Classification Search ................ 249/205; 425/162, 174.4, 808; 264/1.38
See application file for complete search history.

(56) References Cited

U.S. PATENT DOCUMENTS

| | | | |
|---|---|---|---|
| 2,479,935 A | 8/1949 | Johnson |
| 2,524,862 A | 10/1950 | White |
| 2,525,664 A | 10/1950 | Gadsby et al. |
| 2,542,386 A | 2/1951 | Beattie |
| 3,056,166 A | 10/1962 | Weinberg |
| 3,240,854 A | 3/1966 | Ewers |
| 3,485,765 A | 12/1969 | Newland |
| 3,494,326 A | 2/1970 | Upton |
| 3,530,075 A | 9/1970 | Wiebe |
| 3,555,611 A | 1/1971 | Reiterman |
| 3,851,801 A | 12/1974 | Roth |
| 3,871,803 A | 3/1975 | Beattie |
| 3,942,686 A | 3/1976 | Roth |
| 3,968,306 A | 7/1976 | Yoshihara et al. |
| 4,077,858 A | 3/1978 | Costanza et al. |
| 4,095,772 A | 6/1978 | Weber |
| 4,113,224 A | 9/1978 | Clark et al. |
| 4,118,853 A | 10/1978 | Mignen |
| 4,132,518 A | 1/1979 | Rips |
| 4,138,538 A | 2/1979 | Kaetsu et al. |
| 4,166,088 A | 8/1979 | Neefe |
| 4,190,621 A | 2/1980 | Greshes |
| 4,220,708 A | 9/1980 | Heller |
| 4,246,207 A | 1/1981 | Spycher |
| 4,252,753 A | 2/1981 | Rips |
| 4,257,988 A | 3/1981 | Matos et al. |
| 4,273,809 A | 6/1981 | LaLiberte et al. |
| 4,284,399 A | 8/1981 | Newcomb et al. |

(Continued)

FOREIGN PATENT DOCUMENTS

CA   1 224 182   7/1987

(Continued)

*Primary Examiner*—Donald Heckenberg
(74) *Attorney, Agent, or Firm*—Meyertons, Hood, Kivlin, Kowert & Goetzel, P.C.; Eric B. Meyertons

(57) ABSTRACT

Systems and methods for storing, locating, identifying and coating eyeglass lens mold members for use in the production of eyeglass lenses are disclosed. An embodiment includes storing eyeglass lens mold members in a storage array. A plurality of indicators may be coupled to the storage array and associated with storage locations. A controller may be configured to select mold members, and to identify the locations of the mold members. A user may input mold member identifying information. The controller may activate indicators associated with determined storage location. A mold reader may be used to input the mold member identifying information. The mold reader may detect a light pattern formed by illumination of the identifying information and determine the identity of the mold member based on the light pattern. Additional embodiments relate to separating a cast lens from a lens mold. Such embodiments may include a clamping mechanism for elastically deforming the lens mold. The lens mold and lens may then be separated by applying a separating force.

37 Claims, 67 Drawing Sheets

U.S. PATENT DOCUMENTS

| | | |
|---|---|---|
| 4,287,337 A | 9/1981 | Guglielmetti et al. |
| 4,297,616 A | 10/1981 | Corona |
| 4,298,005 A | 11/1981 | Mutzhas |
| 4,308,400 A | 12/1981 | Felder et al. |
| 4,329,622 A | 5/1982 | Corona et al. |
| 4,355,135 A | 10/1982 | January |
| 4,369,298 A | 1/1983 | Kida et al. |
| 4,390,482 A | 6/1983 | Feurer |
| 4,396,737 A | 8/1983 | Leatherman |
| 4,440,699 A | 4/1984 | Smid et al. |
| 4,441,795 A | 4/1984 | Lobdell |
| 4,511,209 A | 4/1985 | Skutnik |
| 4,512,340 A | 4/1985 | Buck |
| 4,534,915 A | 8/1985 | Neefe |
| 4,542,201 A | 9/1985 | Kanemura et al. |
| 4,544,572 A | 10/1985 | Sandvig et al. |
| 4,557,980 A | 12/1985 | Hodnett, III |
| 4,561,951 A | 12/1985 | Neckers |
| 4,576,766 A | 3/1986 | Baskerville et al. |
| 4,586,996 A | 5/1986 | Shinohara et al. |
| 4,594,288 A | 6/1986 | Dobigny et al. |
| 4,613,656 A | 9/1986 | Tang |
| 4,622,376 A | 11/1986 | Misura et al. |
| 4,623,497 A | 11/1986 | Waters |
| 4,640,489 A | 2/1987 | Larsen |
| 4,666,952 A | 5/1987 | Henne et al. |
| 4,685,783 A | 8/1987 | Heller et al. |
| 4,687,707 A | 8/1987 | Matsuo et al. |
| 4,693,446 A | 9/1987 | Orlosky |
| 4,707,076 A | 11/1987 | Skutnik et al. |
| 4,711,379 A | 12/1987 | Price |
| 4,720,356 A | 1/1988 | Chu |
| 4,728,469 A | 3/1988 | Danner et al. |
| 4,731,264 A | 3/1988 | Lin et al. |
| 4,746,716 A | 5/1988 | Oates |
| 4,758,448 A | 7/1988 | Sandvig et al. |
| 4,774,035 A | 9/1988 | Carmelite et al. |
| 4,780,393 A | 10/1988 | Frommeld |
| 4,784,467 A | 11/1988 | Akatsuka et al. |
| 4,786,444 A | 11/1988 | Hwang |
| 4,800,122 A | 1/1989 | Sallavanti et al. |
| 4,836,960 A | 6/1989 | Spector et al. |
| 4,842,782 A | 6/1989 | Portney et al. |
| 4,851,530 A | 7/1989 | Rickwood |
| 4,852,974 A | 8/1989 | Melzig et al. |
| 4,879,318 A | 11/1989 | Lipscomb et al. |
| 4,889,664 A | 12/1989 | Kindt-Larsen et al. |
| 4,895,102 A | 1/1990 | Kachal et al. |
| 4,902,725 A | 2/1990 | Moore |
| 4,913,544 A | 4/1990 | Rickwood et al. |
| 4,919,850 A | 4/1990 | Blum et al. |
| 4,929,278 A | 5/1990 | Ashley et al. |
| 4,939,354 A | 7/1990 | Priddy et al. |
| 4,939,423 A | 7/1990 | Ruby |
| 4,955,804 A | 9/1990 | Martell et al. |
| 4,959,429 A | 9/1990 | Misura et al. |
| 4,965,294 A | 10/1990 | Ohngemach et al. |
| 4,966,812 A | 10/1990 | Ashley et al. |
| 4,968,454 A | 11/1990 | Crano et al. |
| 4,983,335 A | 1/1991 | Matsuo et al. |
| 4,985,186 A | 1/1991 | Nose et al. |
| 4,988,274 A | 1/1991 | Kenmochi |
| 4,989,316 A | 2/1991 | Logan et al. |
| 5,015,523 A | 5/1991 | Kawashima et al. |
| 5,028,358 A | 7/1991 | Blum |
| 5,049,321 A | 9/1991 | Galic |
| 5,053,609 A | 10/1991 | Priddy et al. |
| 5,061,355 A | 10/1991 | Rose, Jr. |
| 5,061,769 A | 10/1991 | Aharoni |
| 5,104,692 A | 4/1992 | Belmares |
| 5,105,126 A | 4/1992 | Girard, Jr. |
| 5,110,514 A | 5/1992 | Soane |
| 5,116,644 A | 5/1992 | Asai et al. |
| 5,118,142 A | 6/1992 | Bish |
| 5,124,536 A | 6/1992 | Priddy et al. |
| 5,135,685 A | 8/1992 | Masuhara et al. |
| 5,135,686 A | 8/1992 | Masuhara et al. |
| 5,147,585 A | 9/1992 | Blum |
| 5,147,902 A | 9/1992 | Ichikawa et al. |
| 5,153,027 A | 10/1992 | Spagnoli |
| 5,154,861 A | 10/1992 | McBrierty et al. |
| 5,158,718 A | 10/1992 | Thakrar et al. |
| 5,173,368 A | 12/1992 | Belmares |
| 5,178,955 A | 1/1993 | Aharoni et al. |
| 5,219,497 A | 6/1993 | Blum |
| 5,224,957 A | 7/1993 | Gasser et al. |
| 5,225,224 A | 7/1993 | VanNortwick |
| 5,238,981 A | 8/1993 | Knowles |
| 5,257,198 A | 10/1993 | van Schoyck |
| 5,268,196 A | 12/1993 | Boulos |
| 5,274,132 A | 12/1993 | VanGemert |
| 5,292,457 A | 3/1994 | Arai et al. |
| 5,316,791 A | 5/1994 | Farber et al. |
| 5,357,024 A | 10/1994 | LeClaire et al. |
| 5,364,256 A | 11/1994 | Lipscomb et al. |
| 5,369,158 A | 11/1994 | Knowles |
| 5,377,032 A | 12/1994 | Fergason et al. |
| 5,380,387 A | 1/1995 | Salamon et al. |
| 5,384,077 A | 1/1995 | Knowles |
| 5,385,955 A | 1/1995 | Tarshiani et al. |
| 5,391,327 A | 2/1995 | Ligas et al. |
| 5,405,958 A | 4/1995 | VanGemert |
| 5,411,679 A | 5/1995 | Kumar |
| 5,412,016 A | 5/1995 | Sharp |
| 5,415,816 A | 5/1995 | Buazza et al. |
| 5,422,046 A | 6/1995 | Tarshiani et al. |
| 5,424,611 A | 6/1995 | Moriarty, Jr. |
| 5,429,774 A | 7/1995 | Kumar |
| 5,448,136 A | 9/1995 | Fischer |
| 5,451,344 A | 9/1995 | Knowles et al. |
| 5,458,814 A | 10/1995 | Kumar et al. |
| 5,458,815 A | 10/1995 | Knowles |
| 5,464,567 A | 11/1995 | Knowles et al. |
| 5,466,398 A | 11/1995 | Van Gemert et al. |
| 5,470,892 A | 11/1995 | Gupta et al. |
| 5,476,717 A | 12/1995 | Floch |
| 5,485,399 A | 1/1996 | Saigo et al. |
| 5,514,214 A | 5/1996 | Joel et al. |
| 5,516,468 A | 5/1996 | Lipscomb et al. |
| 5,529,728 A | 6/1996 | Buazza et al. |
| 5,531,940 A | 7/1996 | Gupta et al. |
| 5,580,819 A | 12/1996 | Li et al. |
| 5,585,186 A | 12/1996 | Scholz et al. |
| 5,589,396 A | 12/1996 | Frye et al. |
| 5,597,519 A | 1/1997 | Martin et al. |
| 5,619,288 A | 4/1997 | White, Jr. et al. |
| 5,621,017 A | 4/1997 | Kobayakawa et al. |
| 5,622,784 A | 4/1997 | Okaue et al. |
| 5,623,184 A | 4/1997 | Rector |
| 5,627,434 A | 5/1997 | Sekiya et al. |
| 5,632,936 A | 5/1997 | Su et al. |
| 5,639,517 A | 6/1997 | Floch et al. |
| 5,644,014 A | 7/1997 | Schmidt et al. |
| 5,662,839 A | 9/1997 | Magne |
| 5,667,735 A | 9/1997 | Bae et al. |
| 5,681,871 A | 10/1997 | Molock et al. |
| 5,685,908 A | 11/1997 | Brytsche et al. |
| 5,689,324 A | 11/1997 | Lossman et al. |
| 5,693,366 A | 12/1997 | Mase et al. |
| 5,698,266 A | 12/1997 | Floch et al. |
| 5,699,189 A | 12/1997 | Murphy |
| 5,708,049 A | 1/1998 | Katagiri et al. |
| 5,716,679 A | 2/1998 | Krug et al. |
| 5,719,705 A | 2/1998 | Machol |

| | | |
|---|---|---|
| 5,741,830 A | 4/1998 | Kamiya et al. |
| 5,744,243 A | 4/1998 | Li et al. |
| 5,747,102 A | 5/1998 | Smith |
| 5,753,301 A | 5/1998 | Brytsche et al. |
| 5,762,081 A | 6/1998 | Keene et al. |
| 5,766,680 A | 6/1998 | Schmidt et al. |
| 5,782,460 A | 7/1998 | Kretzschmar et al. |
| 5,789,015 A | 8/1998 | Gupta et al. |
| 5,836,323 A | 11/1998 | Keene et al. |
| 5,849,209 A | 12/1998 | Kindt-Larsen et al. |
| 5,851,328 A | 12/1998 | Kohan |
| 5,861,934 A | 1/1999 | Blum et al. |
| 5,880,171 A | 3/1999 | Lim et al. |
| 5,903,105 A | 5/1999 | Lee et al. |
| 5,910,516 A | 6/1999 | Imura et al. |
| 5,914,074 A | 6/1999 | Martin et al. |
| 5,914,174 A | 6/1999 | Gupta et al. |
| 5,914,193 A | 6/1999 | Ono et al. |
| 5,926,247 A | 7/1999 | Kimura |
| 5,928,575 A | 7/1999 | Buazza |
| 5,949,518 A | 9/1999 | Belmares et al. |
| 5,965,680 A | 10/1999 | Herold et al. |
| 5,976,423 A | 11/1999 | Buazza |
| 5,989,462 A | 11/1999 | Buazza et al. |
| 6,022,498 A | 2/2000 | Buazza et al. |
| 6,042,754 A | 3/2000 | Yang et al. |
| 6,060,125 A | 5/2000 | Fujii |
| 6,068,464 A | 5/2000 | Su et al. |
| 6,074,579 A | 6/2000 | Greshes |
| 6,082,987 A | 7/2000 | Su et al. |
| 6,086,799 A | 7/2000 | Buazza et al. |
| 6,099,283 A | 8/2000 | Soane et al. |
| 6,102,543 A | 8/2000 | Melzig |
| 6,103,148 A | 8/2000 | Su et al. |
| 6,105,925 A | 8/2000 | Lossman et al. |
| 6,110,574 A | 8/2000 | Ochi et al. |
| 6,130,270 A | 10/2000 | Ukon et al. |
| 6,171,525 B1 | 1/2001 | Effer et al. |
| 6,171,528 B1 | 1/2001 | Buazza et al. |
| 6,174,155 B1 | 1/2001 | Buazza et al. |
| 6,174,465 B1 | 1/2001 | Buazza et al. |
| 6,200,124 B1 | 3/2001 | Buazza et al. |
| 6,201,037 B1 | 3/2001 | Lipscomb et al. |
| 6,206,673 B1 | 3/2001 | Lipscomb et al. |
| 6,218,494 B1 | 4/2001 | White, Jr. et al. |
| 6,228,289 B1 | 5/2001 | Powers et al. |
| 6,241,505 B1 | 6/2001 | Buazza et al. |
| 6,245,428 B1 | 6/2001 | Port et al. |
| 6,253,957 B1 | 7/2001 | Messerly et al. |
| 6,280,171 B1 | 8/2001 | Buazza |
| 6,284,159 B1 | 9/2001 | Lossman et al. |
| 6,328,445 B1 | 12/2001 | Buazza |
| 6,331,058 B1 | 12/2001 | Lipscomb et al. |
| 6,367,928 B1 | 4/2002 | Buazza et al. |
| 6,368,523 B1 | 4/2002 | Buazza et al. |
| 6,386,707 B1 | 5/2002 | Pellicano |
| D460,468 S | 7/2002 | Powers et al. |
| 6,416,307 B1 | 7/2002 | Buazza et al. |
| 6,419,873 B1 | 7/2002 | Buazza et al. |
| 6,439,870 B1 | 8/2002 | Marceau et al. |
| 6,451,226 B1 | 9/2002 | Buazza |
| 6,464,484 B1 | 10/2002 | Powers et al. |
| 6,478,990 B1 | 11/2002 | Powers et al. |
| D467,948 S | 12/2002 | Powers et al. |
| 6,494,702 B1 | 12/2002 | Buazza et al. |
| 6,528,955 B1 | 3/2003 | Powers et al. |
| 6,557,734 B1 | 5/2003 | Buazza et al. |
| 6,576,167 B1 | 6/2003 | Buazza et al. |
| 6,579,478 B1 | 6/2003 | Lossman et al. |
| 6,632,535 B1 | 10/2003 | Buazza et al. |
| 6,634,879 B1 | 10/2003 | Buazza et al. |
| 6,655,946 B1 | 12/2003 | Foreman et al. |
| 6,673,278 B1 | 1/2004 | Buazza et al. |
| 6,676,399 B1 * | 1/2004 | Foreman .................... 425/145 |
| 6,698,708 B1 | 3/2004 | Powers et al. |
| 6,702,564 B1 | 3/2004 | Foreman et al. |
| 6,709,257 B1 | 3/2004 | Foreman et al. |
| 6,712,331 B1 | 3/2004 | Foreman et al. |
| 6,712,596 B1 | 3/2004 | Buazza et al. |
| 6,716,375 B1 | 4/2004 | Powers et al. |
| 6,723,260 B1 | 4/2004 | Powers et al. |
| 6,729,866 B1 | 5/2004 | Buazza et al. |
| 6,730,244 B1 | 5/2004 | Lipscomb et al. |
| 6,790,022 B1 * | 9/2004 | Foreman .................... 425/135 |
| 6,808,381 B1 | 10/2004 | Foreman et al. |
| 2001/0035929 A1 | 11/2001 | Nakamura et al. |
| 2001/0038890 A1 | 11/2001 | Buazza et al. |
| 2001/0047217 A1 | 11/2001 | Buazza et al. |
| 2001/0048002 A1 | 12/2001 | Buazza et al. |
| 2002/0018824 A1 | 2/2002 | Buazza et al. |
| 2002/0158354 A1 | 10/2002 | Foreman et al. |
| 2002/0166944 A1 | 11/2002 | Foreman et al. |
| 2002/0167097 A1 | 11/2002 | Foreman et al. |
| 2002/0167098 A1 | 11/2002 | Foreman et al. |
| 2002/0167099 A1 | 11/2002 | Foreman et al. |
| 2002/0168438 A1 * | 11/2002 | Foreman .................... 425/135 |
| 2002/0168439 A1 | 11/2002 | Foreman et al. |
| 2002/0168440 A1 * | 11/2002 | Foreman ................. 425/174.4 |
| 2002/0175428 A1 * | 11/2002 | Powers ...................... 264/1.38 |
| 2002/0019326 A1 * | 12/2002 | Powers et al. ........... 425/174.4 |
| 2002/0185761 A1 * | 12/2002 | Lattis et al. ................ 264/1.36 |
| 2002/0185762 A1 * | 12/2002 | Foreman .................... 264/1.38 |
| 2003/0003176 A1 * | 1/2003 | Foreman et al. ............ 425/135 |
| 2003/0042633 A1 | 3/2003 | Foreman et al. |
| 2003/0042635 A1 * | 3/2003 | Foreman .................... 264/1.38 |
| 2003/0042636 A1 | 3/2003 | Foreman et al. |
| 2003/0049343 A1 | 3/2003 | Foreman et al. |
| 2003/0049344 A1 * | 3/2003 | Foreman et al. ......... 425/174.4 |
| 2003/0054061 A1 * | 3/2003 | Foreman ................. 425/174.4 |
| 2003/0094714 A1 | 5/2003 | Buazza et al. |
| 2003/0111748 A1 * | 6/2003 | Foreman .................... 264/1.38 |
| 2003/0146527 A1 | 8/2003 | Powers et al. |
| 2003/0183960 A1 | 10/2003 | Buazza et al. |
| 2003/0194462 A1 * | 10/2003 | Foreman ................. 425/174.4 |
| 2003/0203065 A1 | 10/2003 | Buazza et al. |

FOREIGN PATENT DOCUMENTS

| | | |
|---|---|---|
| DE | 40 10 784 | 10/1991 |
| DE | 196 10 563 | 9/1997 |
| EP | 0 226 123 | 6/1987 |
| EP | 0 227 337 | 7/1987 |
| EP | 0 245 020 | 11/1987 |
| EP | 0 245 022 | 11/1987 |
| EP | 0 274 595 | 7/1988 |
| EP | 0 297 871 | 1/1989 |
| EP | 0 314 417 | 5/1989 |
| EP | 0318 164 | 5/1989 |
| EP | 0 322 353 | 6/1989 |
| EP | 0 341 534 | 11/1989 |
| EP | 533 030 | 3/1993 |
| EP | 0 658 072 | 7/1995 |
| EP | 0 941 829 | 9/1999 |
| FR | 1334376 | 12/1993 |
| GB | 872421 | 7/1961 |
| GB | 1029335 | 5/1966 |
| GB | 1086114 | 10/1967 |
| GB | 2 184 734 | 7/1987 |
| JP | 49031768 | 3/1974 |
| JP | 550132221 | 10/1980 |
| JP | 57085002 | 5/1982 |
| JP | 560135032 | 10/1982 |
| JP | 58045445 | 10/1983 |
| JP | 59086603 | 5/1984 |
| JP | 59086615 | 5/1984 |
| JP | 590187819 | 10/1984 |

| | | | | | | |
|---|---|---|---|---|---|---|
| JP | 60-213901 | 10/1985 | | WO | 92/17536 | 10/1992 |
| JP | 62025162 | 6/1987 | | WO | 94/04345 | 3/1994 |
| JP | 93000478 | 11/1987 | | WO | 95/13567 | 5/1995 |
| JP | 620288030 | 12/1987 | | WO | 97/09170 | 3/1997 |
| JP | 630207632 | 8/1988 | | WO | 97/39880 | 10/1997 |
| JP | 01-286808 | 11/1989 | | WO | 98/11998 | 3/1998 |
| JP | 04-232706 | 8/1992 | | WO | 00/18567 | 4/2000 |
| JP | 05 147110 | 6/1993 | | WO | 00/18569 | 4/2000 |
| JP | 08 157546 | 6/1996 | | WO | 00/46016 | 8/2000 |
| JP | 09 005501 | 1/1997 | | WO | 00/64655 | 11/2000 |
| JP | 2002-118866 | 1/2002 | | | | |
| WO | 90/05629 | 5/1990 | | | | |
| WO | 92/12851 | 8/1992 | | | | |

* cited by examiner

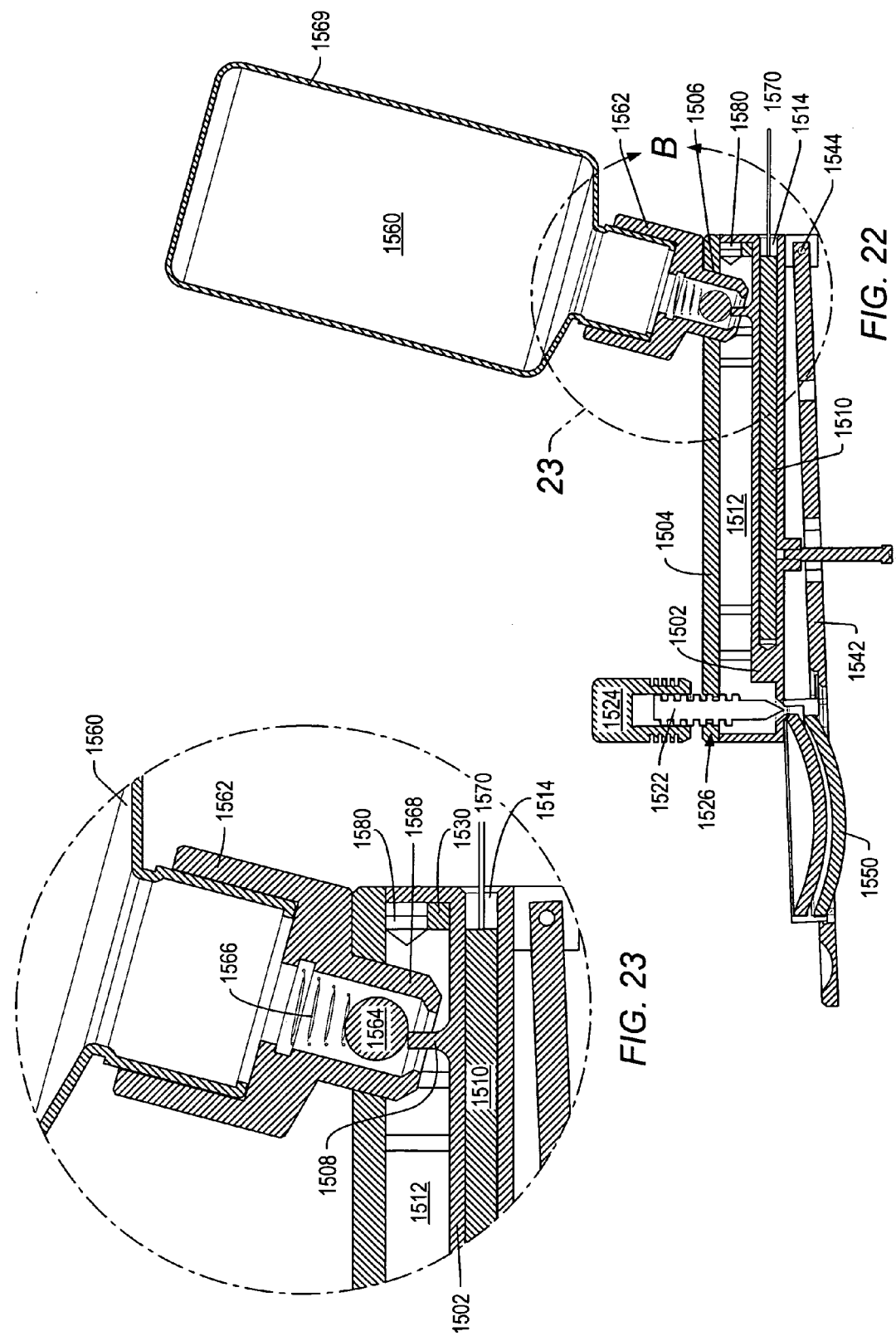

FIG. 48

Maintentance

Temperatures
- Post-Cure Chamer: 195.3
- On Time (min): 289.93 [Reset]
- %: 26.69
- Anneal Chamber: 217.4
- On Time (min): 254.73 [Reset]
- %: 23.45

Current Draws — 2264
- Upper Left Init Lights: 0.00
- Lower Left Init Lights: 0.00
- Rear Post-Cure Lights: 4.60
- Upper Right Init Lights: 0.00
- Lower Right Init Lights: 0.00
- Front Post-Cure Lights: 3.62

Digital Inputs, Slot 3
- Start PushButton ○
- Stop PushButton ○
- Anneal Conv Encoder ○
- Top Lft Fltr In Prox ○
- Top Rgt Fltr In Prox ○
- Bot Lft Fltr In Prox ○
- Bot Rgt Fltr In Prox ○
- Top Lft Fltr Out Prox ●
- Top Rgt Fltr Out Prox ●
- Bot Lft Fltr Out Prox ●
- Bot Rgt Fltr Out Prox ●
- Air Pressure OK ●
- Bot HiTemp Sens OK ●
- Top HiTemp Sens OK ●
- Init Conv Encoder ○
- Post-Cure Conv Encdr ○

Digital Inputs, Slot 4
- Font Post-Cure Lgt Flt ○
- Rear Post-Cure Lgt Flt ○
- Init Drv IOC Flt ○
- Post-Cure Drv IOC Flt ○
- Anneal Drv IOC Flt ○
- Tray Clear @ Xfer PE ○
- PstCure FanOvrld OK ●
- Anneal FanOvrld OK ●
- Init Drv Ovrld OK ●
- Anneal Drv Ovrld OK ●
- PstCure DrvOvrld OK ●
- Post-Cure Drive Alarm ○
- Init Drive Alarm ○
- Anneal Drive Alarm ○
- Not Tray Present PE ○
- Top Tray Present PE ○

Digital Inputs, Slot 5
- E-Stop #1 ○
- E=Stop #2 ○
- Spare ○
- Spare ○
- Spare ○
- Spare ○
- Spare ○
- Lft Wait Cyl Ext'd ●
- Lft Wait Cyl Ret'd ○
- Rgt Wait Cyl Ext'd ●
- Rgt Wait Cyl Ret'd ○
- Lft Init Cyl Ext'd ●
- Lft Init Cyl Ret'd ○
- Rgt Init Cyl Ext'd ●
- Rgt Init Cyl Ret'd ○

Lamp Life Remaining — 2266
- 499.77
- 499.90
- 493.70

[More...] — 2268

[Close] — 2270

METHODS AND SYSTEMS FOR COATING EYEGLASS LENS MOLDS

BACKGROUND

1. Field of the Invention

Embodiments presented herein generally relate to eyeglass lenses. More particularly, embodiments relate to systems and methods for the location, storage, identification, and coating of eyeglass mold members used in the production of eyeglass lenses. Further embodiments relate to methods and systems for separating a cast lens from a lens mold.

2. Description of the Relevant Art

It is conventional in the art to produce eyeglass lenses by thermal curing techniques from the monomer of diethylene glycol bis(allyl)-carbonate (DEG-BAC). Eyeglass lenses may also be made using radiation curing techniques. In general, radiation techniques to form eyeglass lens may use one or more lens molds. Additionally, a mold gasket may be used. Lens molds may include spherical surfaces, toric surfaces or aspherical surfaces, and may contain other features as well in order to impart desired optical properties to a formed lens. Due to the lens thickness differences and other features, different mold gaskets may be required for different lens mold sets. A typical eyeglass lens manufacturer may have a large number of eyeglass lens mold members available in order to produce the large variety of lenses requested. As a result, locating specific eyeglass mold members to produce a particular eyeglass lens may be time consuming. It may be difficult to visually distinguish one mold member from another. Productivity may be lost if a mold is misplaced or cannot be located in a timely manner. Accuracy may be lost if a mold member is misidentified. Thus, it may be advantageous to be able to accurately and efficiently identify a mold member's appropriate storage location.

A common method of storing lens molds may involve placing the molds in a storage drawer. Within the drawer, molds may be separated by tabs. The tabs may include an identification of an adjacent mold. An operator seeking a desired lens mold may look through the tabs to find the mold storage location. When the operator has finished using the lens mold, he or she may look through the tabs again to find the appropriate storage location.

Ophthalmic eyeglass lenses may include one or more coatings. For example, coatings may be applied to improve durability of the lenses, to change the appearance of the lenses, to improve the function of the lenses and/or to improve the manufacturability of the lenses. Various methods have been used to apply one or more coatings after forming a lens. Alternately, one or more coatings may also be applied to lens molds before casting a lens. Coatings applied to lens molds before casting a lens may adhere to or be integrated with the lens after casting the lens.

After forming an eyeglass lens using a lens casting technique, separating the cast lens from one or more of the lens molds may be problematic. Methods of demolding a cast lens may include applying force at an intersection of the lens and lens mold. Commonly, a sharp object, such as a knife blade, may be used to apply the force at the intersection of the lens and lens mold. Liquid bath demolding, wherein the cast lens mold assembly is immersed in a liquid to facilitate separation of the lens mold from the cast lens, may also be used. Demolding may result in damage to the lens and/or one or more lens molds.

SUMMARY

Embodiments disclosed herein, may allow mold members to be stored in an organized fashion. A controller may be utilized for processing and filing information about mold members, and their storage locations.

Systems and methods are disclosed for the location, storage, and identification of eyeglass mold members to be used in the production of eyeglass lenses. Such a system may employ a mold member storage system body including a plurality of mold member storage locations. In an embodiment, a mold member storage location may include a plurality of separating devices to inhibit mold members within the storage location from contacting one another. In an embodiment, an eyeglass mold member storage system may include one or more indicators proximate one or more mold member storage locations. The indicators may assist an operator in locating a desired mold member. In an embodiment, a controller may be coupled to the eyeglass mold member storage system. In such an embodiment, the controller may be configured to determine a mold member storage location associated with a desired mold member type. The controller may assist an operator in locating a desired mold member. For example, the controller may receive input relating to a desired mold member. The controller may activate an indicator proximate a mold member storage location of a desired mold member based the received input. The input may include, but is not limited to: eyeglass lens information. The operator may select a mold member from the indicated storage location and use the mold member to form an eyeglass lens. In an embodiment, the controller may be configured to maintain an inventory of mold members in the eyeglass mold member storage system. In such an embodiment, a mold member selection method may include determining whether a desired mold member is available in the eyeglass mold member storage system. The method may also provide output to the operator indicating whether a desired mold member is available or not. If a desired mold member is not available, the method may include putting a job associated with the received input on hold. If a desired mold member is available, the method may include receiving input from the operator regarding a selected mold member. The mold member inventory may be adjusted based on the input regarding the selected mold member. In an embodiment, the controller may provide a graphical display to assist an operator with the mold member selection process. For example, the graphical display may include a depiction of a mold assembly tray. A mold member to be selected may be indicated in the graphical display. The display may allow the operator to provide input regarding the selection of the desired mold member. If a desired mold member has been selected, the graphical display may indicate another mold member to be selected. A selected mold member may be used to form an eyeglass lens. In an embodiment, forming an eyeglass lens may include coating one or more lens molds. A lens mold may be coated in an apparatus including a plurality of process units and a transport device. For example, the process units may include one or more coating process units and one or more curing process units. The process units may also include one or more cleaning process units. In an embodiment, a curing process unit may include at least one coating applicator and a coating basin. Similarly, a cleaning process unit may include at least one cleaning applicator and a cleaning basin. As used herein, a "basin" may refer to any structure configured to restrict spreading of a process fluid. For example, a basin may include but is not limited to: a bowl, an enclosure, a berm, a box, a cover, a cylinder, etc. An embodiment of a curing process unit may include an activating light source. A transport device may include a rotation device. In an embodiment, an eyeglass lens mold coating apparatus may also include one or more mold staging areas. To coat a lens mold, the lens mold may be placed in a mold staging area and coating apparatus may be initiated. Coating and/or cleaning applicators may be disposed along a travel path of the transport device.

In an embodiment, a method of coating a lens mold may include coupling a mold to a mold holder of an eyeglass lens mold coating apparatus. In such an embodiment, the mold holder may be rotatably coupled to a transport device of the mold coating apparatus. The mold may be moved to a coating process unit. The mold may be rotated while a coating composition is applied to the casting face of the mold. The mold with the coating composition applied may be moved to a curing process unit. Activating light may be applied to the coating composition to initiate curing of the coating composition. In some embodiments, the coating and curing may be repeated until all of the desired lens coating layers have been formed on the lens mold. For example, to form an antireflective coating stack on a lens, a first coating composition and a second coating composition may be applied to the lens mold. The first coating composition may have a lower refractive index than the second coating layer when both are cured. The lens mold may then be used to form a lens.

In an embodiment, after forming a lens using a lens mold, the lens and the lens mold may need to be separated. In an embodiment, the lens and lens mold may be separated by a method including applying force to an edge of the lens mold. The force applied may be sufficient to elastically deform the mold. A separating force may then be applied to separate the lens and the lens mold.

In an embodiment, a demolding device may be used to assist the operator in separating the lens from the lens mold. The demolding device may include a clamping mechanism configured to engage an edge of a lens mold. For example, the clamping mechanism may include two or more clamping members. The demolding device may also include an urging means for urging the clamping members toward one another.

After use, a mold member may be placed back into an eyeglass mold member storage system. In an embodiment, a controller of an eyeglass mold member storage system may assist an operator in identifying a storage location associated with a mold member to be stored. For example, the operator may provide input to the controller identifying a mold member to be stored. The controller may determine a mold member storage location appropriate for storing the mold member. An indicator associated with a determined mold member storage location may be activated.

In an embodiment, a lens mold may include a machine-readable data code disposed thereon. The data code may include identifying information. For example, the data code may include or be associated with information related to the shape of the casting face of the lens mold. In an embodiment, an operator may provide input to a controller regarding a mold member to be stored using a mold reader. A mold reader may include a light source and a light detection device. The light detection device may be coupled to a controller. The light detection device may be configured to detect a light pattern formed by illumination of the data code on the lens mold. The light detector may send a signal to the controller corresponding to the detected light pattern. The controller may determine the identification of the mold member based on the light pattern.

In an embodiment, a data code may be formed on a lens mold by a method including directing laser light toward a determined location on the surface of the lens mold. The surface may then be allowed to cool. Directing laser light toward the surface and cooling the surface may continue until a provided data code is formed on the lens mold.

BRIEF DESCRIPTION OF THE DRAWINGS

The above brief description as well as further objects, features and advantages of the methods and apparatus of the present invention will be more fully appreciated by reference to the following detailed description of presently preferred but nonetheless illustrative embodiments in accordance with the present invention when taken in conjunction with the accompanying drawings in which:

FIGS. 22 and 23 depict cross-sectional side views of a heated polymerizable lens forming composition dispensing system;

FIG. 48 depicts an embodiment of a graphical user interface which may include a prescription viewer display;

FIG. 50 depicts an embodiment of a graphical user interface which may include a maintenance viewer display;

DETAILED DESCRIPTION

Apparatus, operating procedures, equipment, systems, methods, and compositions for lens coating and curing using activating light are available from Optical Dynamics Corporation in Louisville, Ky.

Figure 1:
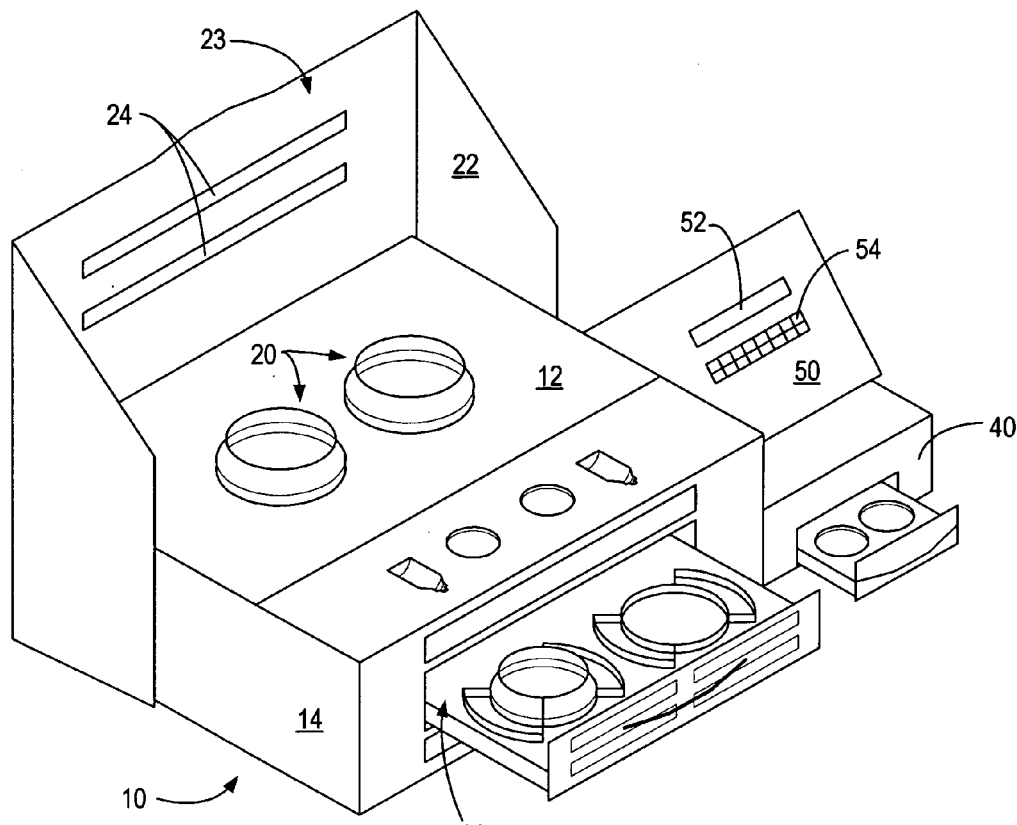
FIG. 1 depicts a perspective view of a plastic lens forming apparatus.

Referring now to FIG. 1, a plastic lens curing apparatus is generally indicated by reference numeral 10. As shown in FIG. 1, lens forming apparatus 10 includes at least one coating unit 20, a lens curing unit 30, a post-cure unit 40, and a controller 50. In one embodiment, apparatus 10 includes two coating units 20. Coating unit 20 may be configured to apply a coating layer to a mold member or a lens. Coating unit 20 may be a spin coating unit. Lens curing unit 30 includes an activating light source for producing activating light. As used herein "activating light" means light that may affect a chemical change. Activating light may include ultraviolet light (e.g., light having a wavelength between about 300 nm to about 400 nm), actinic light, visible light or infrared light. Generally, any wavelength of light capable of affecting a chemical change may be classified as activating. Chemical changes may be manifested in a number of forms. A chemical change may include, but is not limited to, any chemical reaction that causes a polymerization to take place. In some embodiments, the chemical change causes the formation of an initiator species within the lens forming composition, the initiator species being capable of initiating a chemical polymerization reaction. The activating light source may be configured to direct light toward a mold assembly. Post-cure unit 40 may be configured to complete the polymerization of plastic lenses. Post-cure unit 40 may include an activating light source and a heat source. Controller 50 may be a programmable logic controller. Controller 50 may be coupled to coating units 20, lens curing unit 30, and post-cure unit 40, such that the controller is capable of substantially simultaneously operating the three units 20, 30, and 40. Controller 50 may be a computer.

A coating unit for applying a coating composition to a lens or a mold member and then curing the coating composition is described in U.S. Pat. No. 4,895,102 to Kachel et al., U.S. Pat. No. 3,494,326 to Upton, and U.S. Pat. No. 5,514,214 to Joel et al. (all of which are incorporated herein by reference). In addition, the apparatus shown in FIGS. 2 and 3 may also be used to apply coatings to lenses or mold members.

Figure 2:
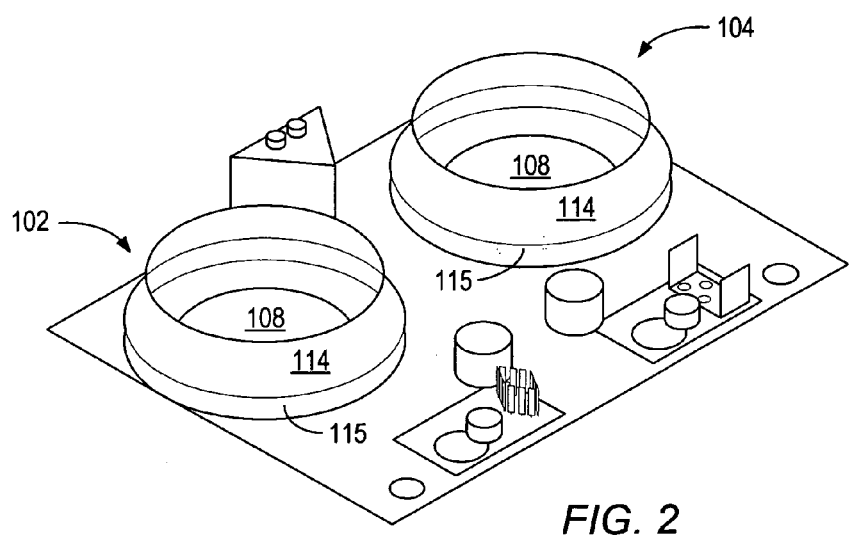
FIG. 2 depicts a perspective view of a spin coating unit.
Figure 3:
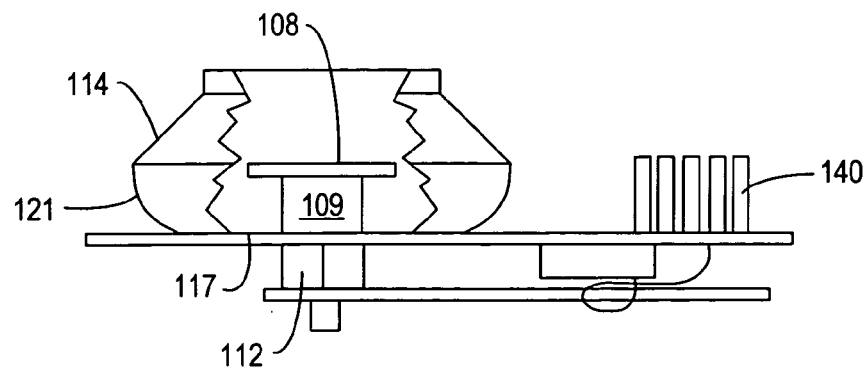
FIG. 3 depicts a cut-away side view of a spin coating unit.

FIG. 2 depicts a pair of spin coating units 102 and 104. These spin coating units may be used to apply a scratch resistant coating or a tint coating to a lens or mold member. Each of the coating units includes an opening through which an operator may apply lenses and lens mold assemblies to a holder 108. Holder 108 may be partially surrounded by barrier 114. Barrier 114 may be coupled to a dish 115. As shown in FIG. 3, the dish edges may be inclined to form a peripheral sidewall 121 that merges with barrier 114. The bottom 117 of the dish may be substantially flat. The flat bottom may have a circular opening that allows an elongated member 109 coupled to lens holder 108 to extend through the dish 115.

Holder 108 may be coupled to a motor 112 via elongated member 109. Motor 112 may be configured to cause rotation of holder 108. In such a case, motor 112 may be configured to cause rotation of elongated member 109, that in turn causes the rotation of holder 108. The coating unit 102/104, may also include an electronic controller 140. Electronic controller 140 may be coupled to motor 112 to control the rate at which holder 108 is rotated by motor 112. Electronic controller 140 may be coupled to a programmable logic controller, such as controller 50, shown in FIG. 1. The programmable logic controller may send signals to the electronic controller to control the rotational speed of holder 108. In one embodiment, motor 112 is configured to rotate holder 108 at different rates. Motor 112 may be capable of rotating the lens or mold member at a rate of up to 1500 revolutions per minute ("RPM").

In one embodiment, barrier 114 has an interior surface that may be made or lined with an absorbent material such as foam rubber. This absorbent material may be disposable and removable. The absorbent material may be configured to absorb any liquids that fall off a lens or mold member during use. Alternatively, the interior surface of barrier 114 may be substantially non-absorbent, allowing any liquids used during the coating process to move down barrier 114 into dish 115.

Coating units 20, in one embodiment, are positioned in a top portion 12 of lens forming apparatus 10, as depicted in FIG. 1. A cover 22 may be coupled to body 14 of the lens forming apparatus to allow top portion 12 to be covered during use. A light source 23 may be positioned on an inner surface of cover 22. The light source may include at least one lamp 24, preferably two or more lamps, positioned on the inner surface of cover 22. Lamps 24 may be positioned such that the lamps are oriented above the coating units 20 when cover 22 is closed. Lamps 24 emit activating light upon the lenses or mold members positioned within coating units 20. Lamps may have a variety of shapes including, but not limited to, linear (as depicted in FIG. 1), square, rectangular, circular, or oval. Activating light sources emit light having a wavelength that will initiate curing of various coating materials. For example, most currently used coating materials may be curable by activating light having wavelengths in the ultraviolet region, therefore the light sources should exhibit strong ultraviolet light emission. The light sources may also be configured to produce minimal heat during use. Lamps that exhibit strong ultraviolet light emission have a peak output at a wavelength in the ultraviolet light region, between about 200 nm to about 400 nm, preferably the peak output is between about 200 nm to 300 nm, and more preferably at about 254 nm. In one embodiment, lamps 24 may have a peak output in the ultraviolet light region and have relatively low heat output. Such lamps are commonly known as "germicidal" lamps and any such lamp may be used. A "germicidal" light emitting light with a peak output in the desired ultraviolet region is commercially available from Voltarc, Inc. of Fairfield, Conn. as model UV-WX G10T5.

An advantage of using a spin coating unit is that lamps of a variety of shapes may be used (e.g., linear lamps) for the curing of the coating materials. In one embodiment, a coating material is preferably cured in a substantially uniform manner to ensure that the coating is formed uniformly on the mold member or lens. With a spin coating unit, the object to be coated may be spun at speeds high enough to ensure that a substantially uniform distribution of light reaches the object during the curing process, regardless of the shape of the light source. The use of a spin coating unit preferably allows the use of commercially available linear light sources for the curing of coating materials.

A switch may be incorporated into cover 22. The switch is preferably electrically coupled to light source 23 such that the switch must be activated prior to turning the light source on. Preferably, the switch is positioned such that closing the cover causes the switch to become activated. In this manner, the lights will preferably remain off until the cover is closed, thus preventing inadvertent exposure of an operator to the light from light source 23.

During use a lens or lens mold assembly may be placed on the lens holder 108. The lens holder 108 may include a suction cup connected to a metal bar. The concave surface of the suction cup may be attachable to a face of a mold or lens, and the convex surface of the suction cup may be attached to a metal bar. The metal bar may be coupled to motor 112. The lens holder may also include movable arms and a spring assembly that may be together operable to hold a lens against the lens holder with spring tension during use.

Figure 4:
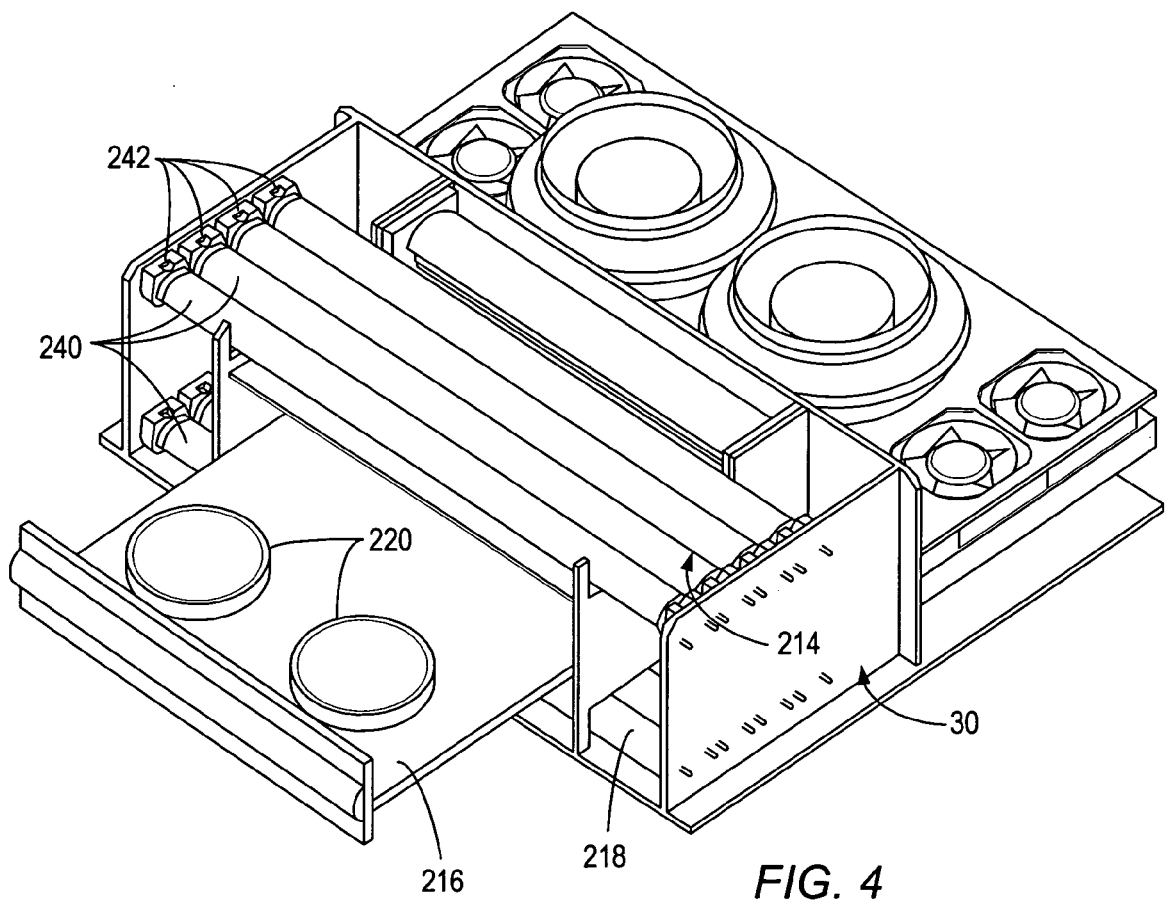
FIG. 4 depicts a perspective view of a plastic lens forming apparatus with a portion of the body removed.

As shown in FIG. 4, the curing unit 30 may include an upper light source 214, a lens drawer assembly 216, and a lower light source 218. Lens drawer assembly 216 preferably includes a mold assembly holder 220, more preferably at least two mold assembly holders 220. Each of the mold assembly holders 220 is preferably configured to hold a pair of mold members that together with a gasket form a mold assembly. The lens drawer assembly 216 is preferably slidingly mounted on a guide. During use, mold assemblies may be placed in the mold assembly holders 220 while the lens drawer assembly is in the open position (i.e., when the door extends from the front of the lens curing unit). After the mold assemblies have been loaded into the mold holder 220 the door may be slid into a closed position, with the mold assemblies directly under the upper light source 214 and above the lower light source 218. Vents (not shown) may be placed in communication with the lens curing unit to allow a stream of air to be directed toward the mold members when the mold members are positioned beneath the upper lamps. An exhaust fan (not shown) may communicate with the vents to improve the circulation of air flowing through the lens curing unit.

Figure 5:
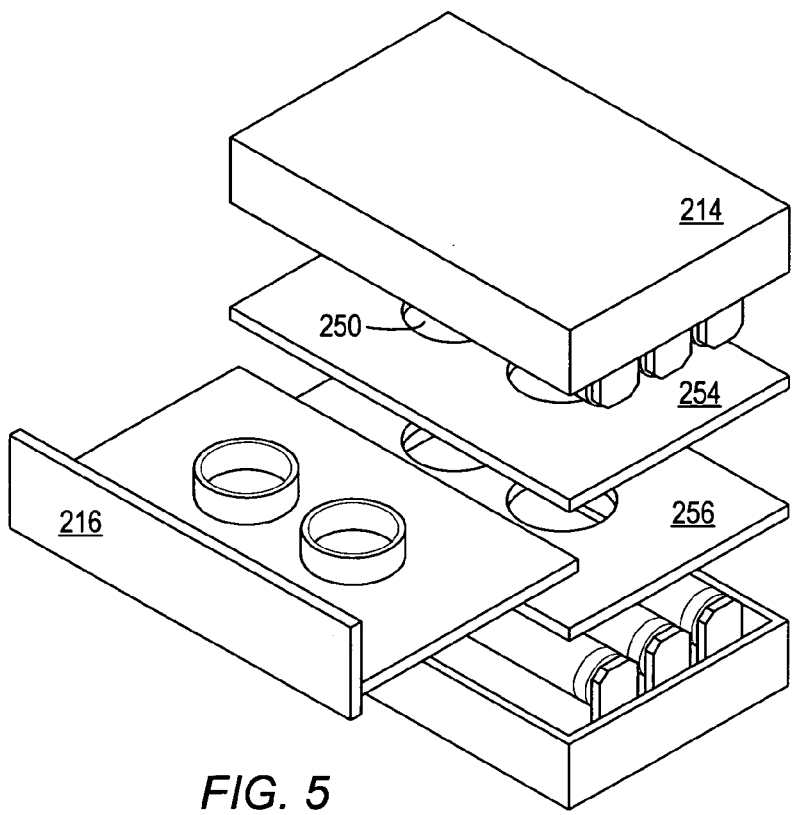
FIG. 5 depicts a perspective view of the components of a lens curing unit.

As shown in FIGS. 4 and 5, it is preferred that the upper light source 214 and lower light source 216 include a plurality of activating light generating devices or lamps 240. Preferably, the lamps are oriented proximate each other to form a row of lights, as depicted in FIG. 4. Preferably, three or four lamps are positioned to provide substantially uniform radiation over the entire surface of the mold assembly to be cured. The lamps 240, preferably generate activating light. Lamps 240 may be supported by and electrically connected to suitable fixtures 242. Lamps 240 may generate either ultraviolet light, actinic light, visible light, and/or infrared light. The choice of lamps is preferably based on the monomers used in the lens forming composition. In one embodiment, the activating light may be generated from a fluorescent lamp. The fluorescent lamp preferably has a strong emission spectra in the 380 to 490 nm region. A fluorescent lamp emitting activating light with the described wavelengths is commercially available from Philips as model TLD-15W/03. In another embodiment, the lamps may be ultraviolet lights.

Figure 6:
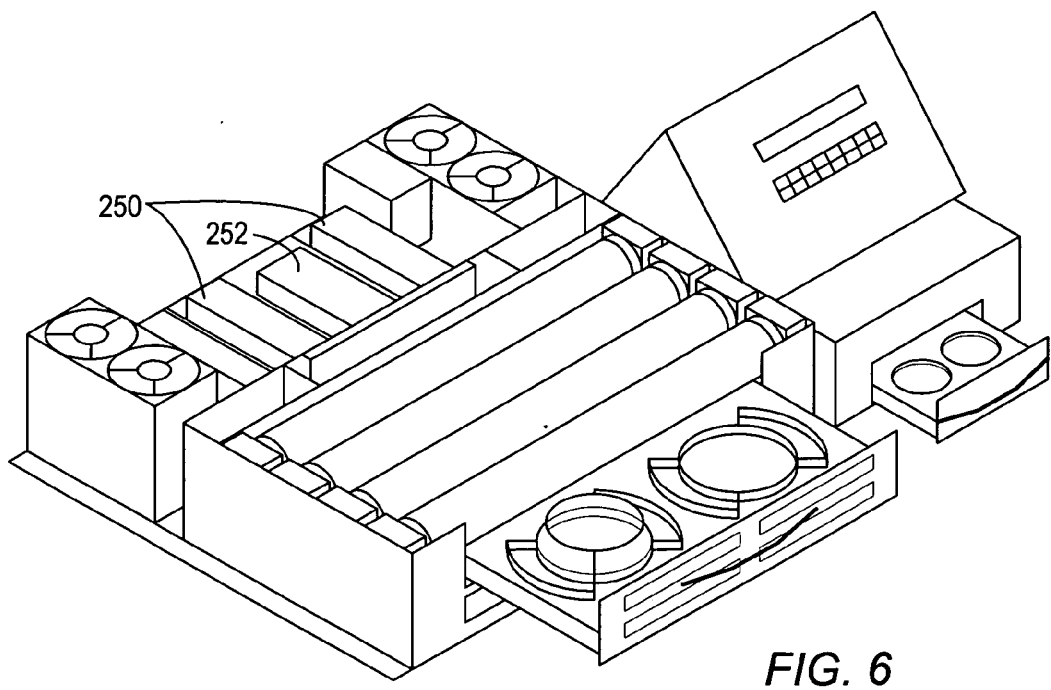
FIG. 6 depicts a perspective view of a plastic lens forming apparatus with a portion of the body removed and the coating units removed.

In one embodiment, the activating light sources may be turned on and off quickly between exposures. Ballasts 250, depicted in FIG. 6, may be used for this function. The ballasts may be positioned beneath the coating unit. Power supply 252 may also be located proximate the ballasts 250, underneath the coating unit.

Typically, when a fluorescent lamp is turned off the filaments in the lamp will become cool. When the lamp is subsequently turned on, the lamp intensity may fluctuate as the filaments are warmed. These fluctuations may effect the curing of a lens forming compositions. To minimize the intensity fluctuations of the lamps, a ballasts 250 may allow the startup of a fluorescent lamp and minimizes the time required to stabilize the intensity of the light produced by the fluorescent lamp.

A number of ballast systems may be used. Ballasts for fluorescent lamps typically serve two purposes. One function is to provide an initial high voltage arc that will ionize the gases in the fluorescent lamp (known herein as the "strike voltage"). After the gases are ionized, a much lower voltage will be required to maintain the ionization of the gases. In some embodiments, the ballast will also limit the current flow through the lamp. In some ballast systems, the filaments of a lamp may be preheated before the starting voltage is sent through the electrodes.

An instant start ballast typically provides a strike voltage of between 500–600 V. The electrodes of fluorescent lamps that are used with an instant start ballast are usually designed for starting without preheating. Instant start ballast allow the fluorescent lamp to be turned on quickly without a significant delay. However, the intensity of light produced by the fluorescent lamp may fluctuate as the temperature of the filaments increases.

Rapid start ballasts include a high voltage transformer for providing the strike voltage and additional windings that supply a low voltage (between about 2 to 4 V) to the filaments to heat the filaments before the lamp is started. Because the filaments are already heated, the strike voltage required to ionize the gases in the lamp are lower than those used with an instant start ballast. A rapid start ballast typically produces a strike voltage of 250 to 400 V. A rapid start ballast may be used to minimize fluctuations in the intensity of the light produced by the lamp. Since the filaments are preheated before the lamp comes on, the time required to heat up the filaments to their normal operating temperature is minimal.

Rapid start ballasts typically continually run the heating voltage through the filaments during operation of the lamp and when the lamps are switched off. Thus, during long periods when the lamps are not used, the filaments will be maintained in a heated state. This tends to waste power and increase the operating costs of the apparatus.

Figure 7:
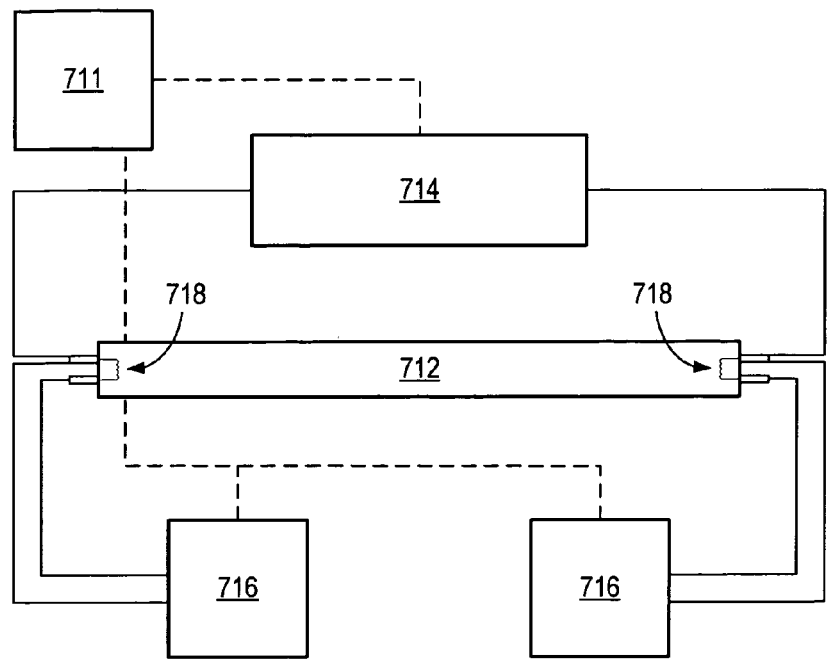
FIG. 7 depicts a schematic of a fluorescent light ballast system.

To allow more control over the heating of the filaments, a flasher ballast system may be used. A schematic drawing of an embodiment of a flasher ballast system is depicted in FIG. 7. In a flasher ballast system a fluorescent lamp 712 is electrically coupled to a high frequency instant start ballast 714 and one or more transformers 716. The high frequency instant start ballast 714 may provide the strike voltage and perform the current limiting functions once the lamp is lighted. High frequency instant start ballasts are available from many different manufacturers including Motorola, Inc. and Hatch Transformers, Inc. Tampa, Fla. The transformers 716 may be electrically coupled to one or both of the filaments 718 to provide a low voltage (between about 2 to about 4 V) to the filaments. This low voltage may heat the filaments 718 to a temperature that is close to the operating temperature of the filaments 718. By heating the filaments before turning the lamp on, the intensity of light produced by the lamp may be stable because the filaments of the lamp are kept close to the optimum operating temperature. Transformers are available from many different manufacturers. In one embodiment, toroidal transformers may be used to supply low voltage to the filaments. Toroidal transformers may be obtained from Plitron Manufacturing Inc. Toronto, Ontario, Canada or Toroid Corporation of Maryland, Salisbury, Md.

Because the instant start ballast 714 and the transformers 716 are separate units they may be operated independently of each other. A controller 711 may be coupled to both the instant start ballast 714 and the transformers 716 to control the operation of these devices. The transformers 716 may be left on or off when the striking voltage is applied to the lamp. In some embodiments, controller 711 may turn off the transformers 716 just before the strike voltage is applied to the lamp. The controller 711 may also monitor the operation of the lamp. The controller 711 may be programmed to turn the transformers 716 on when the lamps are switched off, thus maintaining the lamps in a state of readiness. To conserve power, the filaments 718 may be warmed only prior to turning on the lamp. Thus, when the controller 711 receives a signal to turn the lamp on, the controller may turn on the transformers 716 to warm the filaments 718, and subsequently turn on the lamp by sending a striking voltage from the instant start ballast 714. The controller may be configured to turn the transformer off after a predetermined amount of inactivity of the lamps. For example, the controller may be configured to receive signals when the lamps are used in a curing process. If no such signals are received, the controller may turn off the lamps (by turning off the instant start ballast), but leave the transformer on. The lamps may be kept in a state of readiness for a predetermined amount of time. If no signals are received by the controller to turn on the lamp, the controller may turn the transformer off to conserve energy.

In one embodiment, an upper light filter 254 may be positioned between upper light source 214 and lens drawer assembly 216, as depicted in FIG. 5. A lower light filter 256 may be positioned between lower light source 218 and lens drawer assembly 216. The upper light filter 254 and lower light filter 256 are shown in FIG. 5 as being made of a single filter member, however, those of ordinary skill in the art will recognize that each of the filters may include two or more filter members. The components of upper light filter 254 and lower light filter 256 are preferably modified depending upon the characteristics of the lens to be molded. For instance, in an embodiment for making negative lenses, the upper light filter 254 includes a plate of Pyrex glass that may be frosted on both sides resting upon a plate of clear Pyrex glass. The lower light filter 256 includes a plate of Pyrex glass, frosted on one side, resting upon a plate of clear Pyrex glass with a device for reducing the intensity of activating light incident upon the center portion relative to the edge portion of the mold assembly.

Conversely, in a an alternate arrangement for producing positive lenses, the upper light filter 254 includes a plate of Pyrex glass frosted on one or both sides and a plate of clear Pyrex glass resting upon the plate of frosted Pyrex glass with a device for reducing the intensity of activating light incident upon the edge portion in relation to the center portion of the mold assembly. The lower light filter 256 includes a plate of clear Pyrex glass frosted on one side resting upon a plate of clear Pyrex glass with a device for reducing the intensity of activating light incident upon the edge portion in relation to the center portion of the mold assembly. In this arrangement, in place of a device for reducing the relative intensity of activating light incident upon the edge portion of the lens, the diameter of the aperture 250 may be reduced to achieve the same result, i.e., to reduce the relative intensity of activating light incident upon the edge portion of the mold assembly.

It should be apparent to those skilled in the art that each filter 254 or 256 could be composed of a plurality of filter members or include any other means or device effective to reduce the light to its desired intensity, to diffuse the light and/or to create a light intensity gradient across the mold assemblies. Alternately, in certain embodiments no filter elements may be used.

In one embodiment, upper light filter 254 or lower light filter 256 each include at least one plate of Pyrex glass having at least one frosted surface. Also, either or both of the filters may include more than one plate of Pyrex glass each frosted on one or both surfaces, and/or one or more sheets of tracing paper. After passing through frosted Pyrex glass, the activating light is believed to have no sharp intensity discontinuities. By removing the sharp intensity distributions, a reduction in optical distortions in the finished lens may be achieved. Those of ordinary skill in the art will recognize that other means may be used to diffuse the activating light so that it has no sharp intensity discontinuities. In another embodiment, a plastic filter may be used. The plastic filter may be formed from a substantially clear sheet of plastic. The plastic filter may frosted or non-frosted. The substantially clear sheet of plastic is formed from a material that does not significantly absorb wavelengths of light that initiate the polymerization reaction. In one embodiment, the plastic filter may be formed from a sheet of polycarbonate. An example of a polycarbonate that may be used is LEXAN polycarbonate, commercially available from General Electric Corporation. In another embodiment, the filter may be formed from a borosilicate type glass.

In operation, the apparatus may be appropriately configured for the production of positive lenses which are relatively thick at the center or negative lenses which are relatively thick at the edge. To reduce the likelihood of premature release, the relatively thick portions of a lens are preferably polymerized at a faster rate than the relatively thin portions of a lens.

The rate of polymerization taking place at various portions of a lens may be controlled by varying the relative intensity of activating light incident upon particular portions of a lens. For positive lenses, the intensity of incident activating light is preferably reduced at the edge portion of the lens so that the thicker center portion of the lens polymerizes faster than the thinner edge portion of the lens.

It is well known by those of ordinary skill in the art that lens forming materials tend to shrink as they cure. If the relatively thin portion of a lens is allowed to polymerize before the relatively thick portion, the relatively thin portion will tend to be rigid at the time the relatively thick portion cures and shrinks and the lens will either release prematurely from or crack the mold members. Accordingly, when the relative intensity of activating light incident upon the edge portion of a positive lens is reduced relative to the center portion, the center portion may polymerize faster and shrink before the edge portion is rigid so that the shrinkage is more uniform.

The variation of the relative intensity of activating light incident upon a lens may be accomplished in a variety of ways. According to one method, in the case of a positive lens, a metal plate having an aperture disposed in a position over the center of the mold assembly may be placed between the lamps and the mold assembly. The metal plate is positioned such that the incident activating light falls mainly on the thicker center portion of the lens. In this manner, the polymerization rate of the center of a positive lens may be accelerated with respect to the outer edges of the positive lens, which receive less activating light. The metal plate may be inserted manually or may be inserted by an automatic device that is coupled to the controller. In one embodiment, the prescription entered into the controller determines whether the metal plate is placed between the lamps and the mold assembly.

As shown in FIG. 7, the mold assembly 352 may include opposed mold members 378, separated by an annular gasket 380 to define a lens molding cavity 382. The opposed mold members 378 and the annular gasket 380 may be shaped and selected in a manner to produce a lens having a desired diopter.

The mold members 378 may be formed of any suitable material that will permit the passage of activating light. The mold members 378 are preferably formed of glass. Each mold member 378 has an outer peripheral surface 384 and a pair of opposed surfaces 386 and 388 with the surfaces 386 and 388 being precision ground. Preferably the mold members 378 have desirable activating light transmission characteristics and both the casting surface 386 and non-casting surface 388 preferably have no surface aberrations, waves, scratches or other defects as these may be reproduced in the finished lens.

As noted above, the mold members 378 are preferably adapted to be held in spaced apart relation to define a lens molding cavity 382 between the facing surfaces 386 thereof. The mold members 378 are preferably held in a spaced apart relation by a T-shaped flexible annular gasket 380 that seals the lens molding cavity 382 from the exterior of the mold members 378. In use, the gasket 380 may be supported on a portion of the mold assembly holder 220 (shown in FIG. 4).

In this manner, the upper or back mold member 390 has a convex inner surface 386 while the lower or front mold member 392 has a concave inner surface 386 so that the resulting lens molding cavity 382 is preferably shaped to form a lens with a desired configuration. Thus, by selecting the mold members 378 with a desired surface 386, lenses with different characteristics, such as focal lengths, may be produced.

Rays of activating light emanating from lamps 240 preferably pass through the mold members 378 and act on a lens forming material disposed in the mold cavity 382 in a manner discussed below so as to form a lens. As noted above, the rays of activating light may pass through a suitable filter 254 or 256 before impinging upon the mold assembly 352.

The mold members 378, preferably, are formed from a material that will not transmit activating light having a wavelength below approximately 300 nm. Suitable materials are Schott Crown, S-1 or S-3 glass manufactured and sold by Schott Optical Glass Inc., of Duryea, Pa. or Corning 8092 glass sold by Corning Glass of Corning, N.Y. A source of flat-top or single vision molds may be Augen Lens Co. in San Diego, Calif.

The annular gasket 380 may be formed of vinyl material that exhibits good lip finish and maintains sufficient flexibility at conditions throughout the lens curing process. In an embodiment, the annular gasket 380 is formed of silicone rubber material such as GE SE6035 which is commercially available from General Electric. In another preferred embodiment, the annular gasket 380 is formed of copolymers of ethylene and vinyl acetate which are commercially available from E. I. DuPont de Nemours & Co. under the trade name ELVAX7. Preferred ELVAX7 resins are ELVAX7 350 having a melt index of 17.3–20.9 dg/min and a vinyl acetate content of 24.3–25.7 wt. %, ELVAX7 250 having a melt index of 22.0–28.0 dg/min and a vinyl acetate content of 27.2–28.8 wt. %, ELVAX7 240 having a melt index of 38.0–48.0 dg/min and a vinyl acetate content of 27.2–28.8 wt. %, and ELVAX7 150 having a melt index of 38.0–48.0 dg/min and a vinyl acetate content of 32.0–34.0 wt. %. In another embodiment, the gasket may be made from polyethylene. Regardless of the particular material, the gaskets 380 may be prepared by conventional injection molding or compression molding techniques which are well-known by those of ordinary skill in the art.

Figure 9:
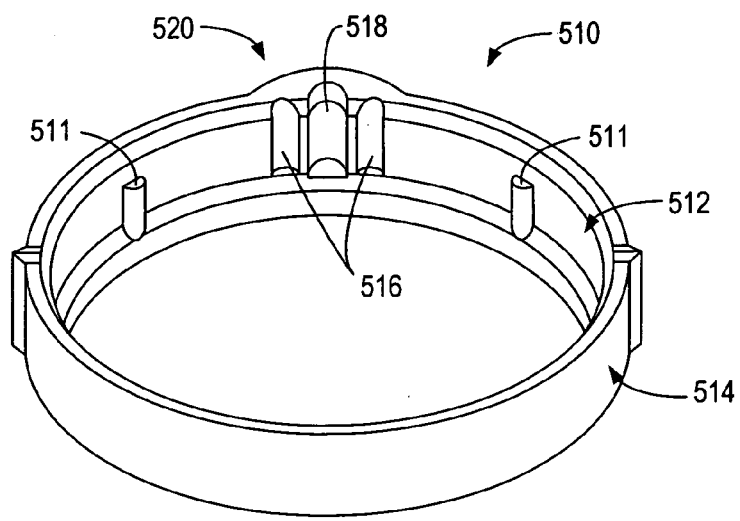
FIG. 9 depicts an isomeric view of an embodiment of a gasket.
Figure 10:
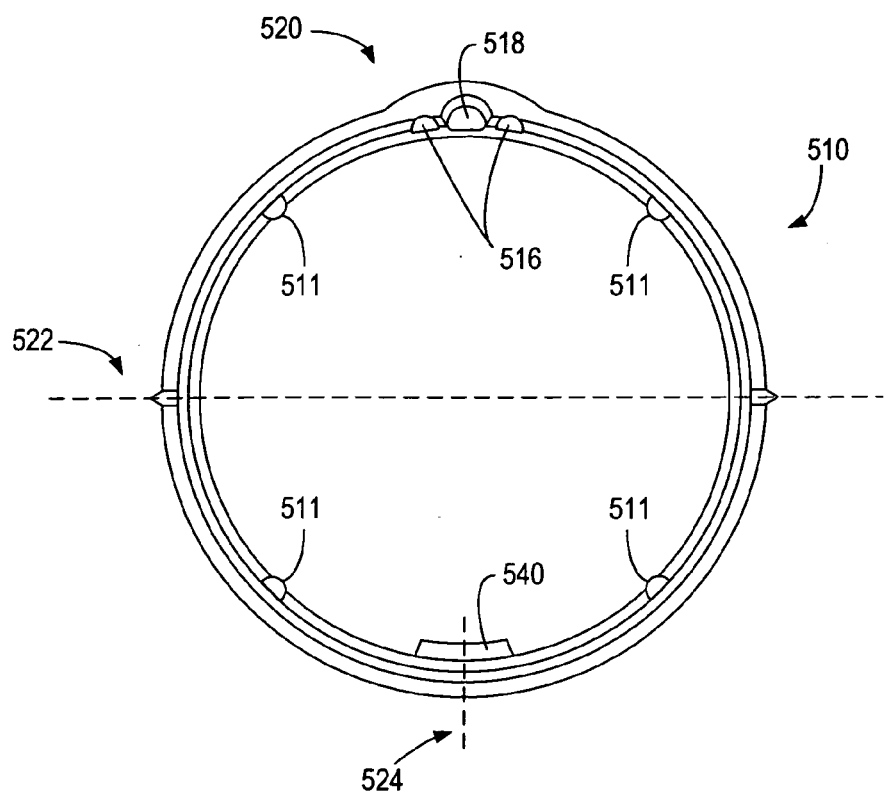
FIG. 10 depicts a top view of the gasket of FIG. 9.

FIGS. 9 and 10 present an isometric view and a top view, respectively, of a gasket 510. Gasket 510 may be annular, and is preferably configured to engage a mold set for forming a mold assembly. Gasket 510 is preferably characterized by at least four discrete projections 511. Gasket 510 preferably has an exterior surface 514 and an interior surface 512. The projections 511 are preferably arranged upon inner surface 512 such that they are substantially coplanar. The projections are preferably evenly spaced around the interior surface of the gasket. Preferably, the spacing along the interior surface of the gasket between each projection is about 90 degrees. Although four projections are preferred, it is envisioned that more than four could be incorporated. For example, a fifth projection may be incorporated into the gasket which may be configured to contact one of the mold members. The gasket 510 may be formed of a silicone rubber material such as GE SE6035 which is commercially available from General Electric. In another embodiment, the gasket 510 may be formed of copolymers of ethylene and vinyl acetate which are commercially available from E. I. DuPont de Nemours & Co. under the trade name ELVAX7. In another embodiment, the gasket 510 may be formed from polyethylene. In another embodiment, the gasket may be formed from a thermoplastic elastomer rubber. An example of a thermoplastic elastomer rubber that may be used is, of DYNAFLEX G-2780 commercially available from GLS Corporation.

Figure 11:
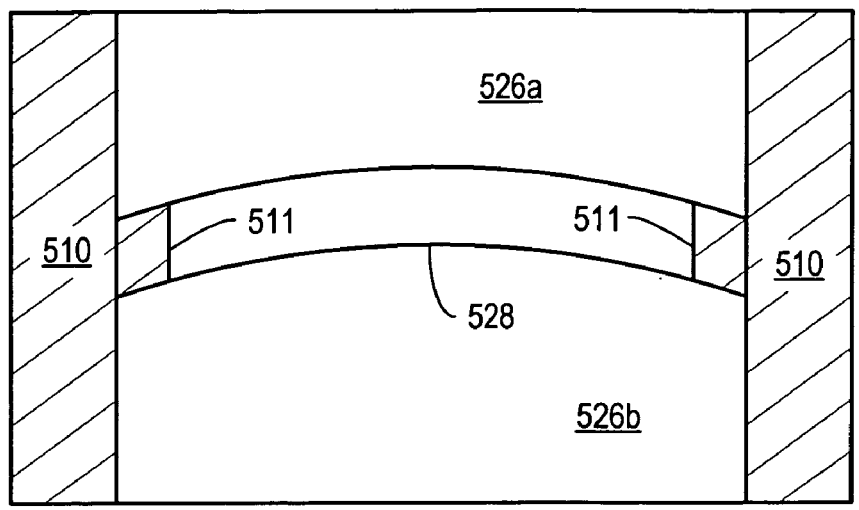
FIG. 11 depicts a cross-sectional view of an embodiment of a mold/gasket assembly.

As shown in FIG. 11, projections 511 are preferably capable of spacing mold members 526 of a mold set. Mold members 526 may be any of the various types and sizes of mold members that are well known in the art. A mold cavity 528 at least partially defined by mold members 526 and gasket 510, is preferably capable of retaining a lens forming composition. Preferably, the seal between gasket 510 and mold members 526 is as complete as possible. The height of each projection 511 preferably controls the spacing between mold members 526, and thus the thickness of the finished lens. By selecting proper gaskets and mold sets, lens cavities may be created to produce lenses of various powers.

A mold assembly consists of two mold members. A front mold member 526a and a back mold member 526b, as depicted in FIG. 11. The back mold member is also known as the convex mold member. The back mold member preferably defines the concave surface of a convex lens. Referring back to FIGS. 9 and 10, locations where the steep axis 522 and the flat axis 524 of the back mold member 526b preferably lie in relation to gasket 510 have been indicated. In conventional gaskets, a raised lip may be used to space mold members. The thickness of this lip varies over the circumference of the lip in a manner appropriate with the type of mold set a particular gasket is designed to be used with. In order to have the flexibility to use a certain number of molds, an equivalent amount of conventional gaskets is typically kept in stock.

However, within a class of mold sets there may be points along the outer curvature of a the back mold member where each member of a class of back mold members is shaped similarly. These points may be found at locations along gasket 510, oblique to the steep and flat axes of the mold members. In a preferred embodiment, these points are at about 45 degree angles to the steep and flat axes of the mold members. By using discrete projections 511 to space the mold members at these points, an individual gasket could be used with a variety of mold sets. Therefore, the number of gaskets that would have to be kept in stock may be greatly reduced.

In addition, gasket 510 may include a recession 518 for receiving a lens forming composition. Lip 520 may be pulled back in order to allow a lens forming composition to be introduced into the cavity. Vent ports 516 may be incorporated to facilitate the escape of air from the mold cavity as a lens forming composition is introduced.

Gasket 510 may also include a projection 540. Projection 540 may extend from the side of the gasket toward the interior of the mold cavity when a first and second mold are assembled with the gasket. The projection is positioned such that a groove is formed in a plastic lens formed using the mold assembly. The groove may be positioned near an outer surface of the formed lens. In this manner the groove is formed near the interface between the mold members and the formed lens. FIG. 14 depicts a side view of an lens 550 disposed between two mold members 526 after curing and the removal of the gasket. A variety of indentations/grooves may be seen along the outer surface of the lens caused by the various projections from the gasket. Grooves 544 may be caused by the projections 511 of a gasket used to space the mold members at the appropriate distance. Groove 546 may be caused by the projection 540. The groove is positioned at the interface of the mold members and the formed lens. While depicted as near the interface of the upper mold member, it should be understood that the groove may also be positioned at the interface between the lower mold member and the formed lens. In one embodiment, the fill port 538 (see FIGS. 12 and 13) may produce a groove near the interface of the upper mold member and the formed lens. The projection 511 may therefore be positioned at the interface between the lower mold member and the formed lens. In this manner, two grooves may be created at the interfaces between the formed lens and each of the mold members.

After the gasket is been removed, the molds may adhere to the formed lens. In some instances a sharp object may be inserted between the mold members and the formed lens to separate the formed lens from the mold members. The groove 546 may facilitate the separation of the mold members from the formed lens by allowing the insertion of a sharp object to pry the molds away from the formed lens.

Figure 12:
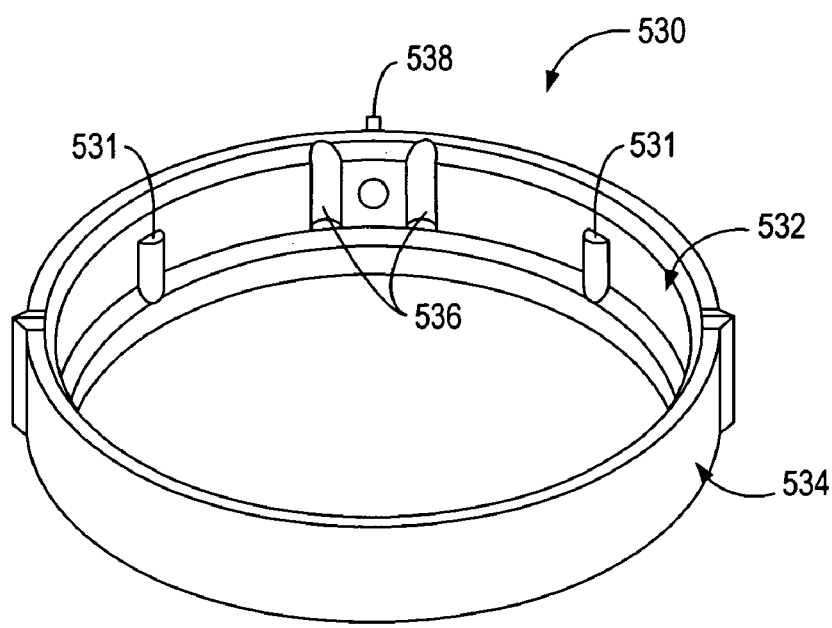
FIG. 12 depicts an isometric view of an embodiment of a gasket.
Figure 13:
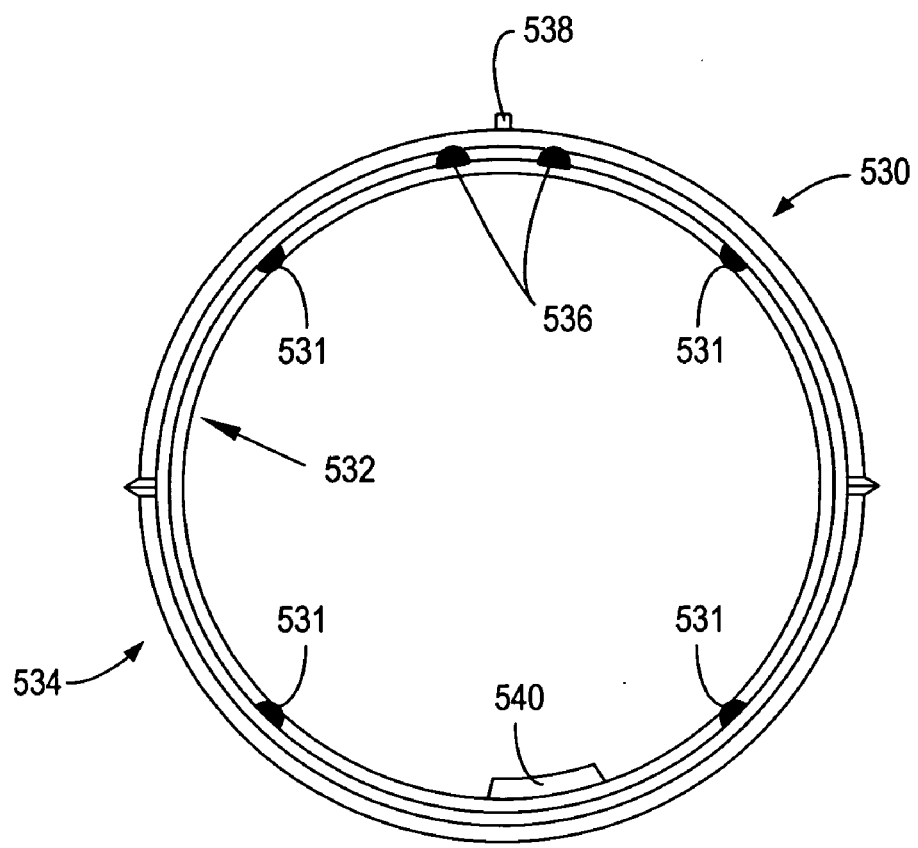
FIG. 13 depicts a top view of the gasket of FIG. 12.
Figure 14:
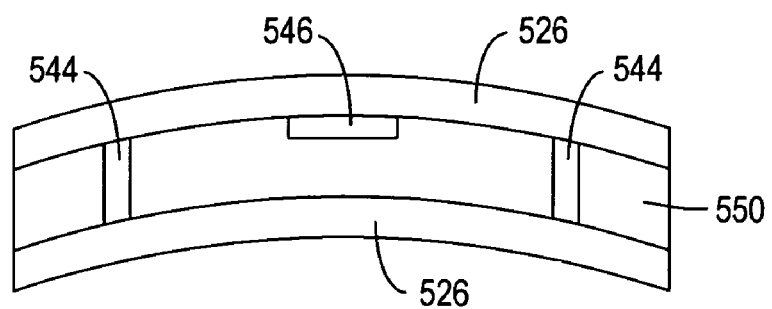
FIG. 14 depicts a side view of a cured lens and molds after removal of a gasket.

FIGS. 12 and 13 present an isometric view and a top view, respectively, of an improved gasket. Gasket 530 may be composed of similar materials as gasket 510. Like gasket 510, gasket 530 is preferably annular, but may be take a variety of shapes. In addition, gasket 530 may incorporate projections 531 in a manner similar to the projections 511 shown in FIG. 9. Alternatively, gasket 530 may include a raised lip along interior surface 532 or another method of spacing mold members that is conventional in the art.

Gasket 530 preferably includes a fill port 538 for receiving a lens forming composition while gasket 530 is fully engaged to a mold set. Fill port 538 preferably extends from interior surface 532 of gasket 530 to an exterior surface 534 of gasket 530. Consequently, gasket 530 need not be partially disengaged from a mold member of a mold set in order to receive a lens forming composition. In order to introduce a lens forming composition into the mold cavity defined by a conventional mold/gasket assembly the gasket must be at least partially disengaged from the mold members. During the process of filling the mold cavity, lens forming composition may drip onto the backside of a mold member. Lens forming composition on the backside of a mold member may cause activating light used to cure the lens to become locally focused, and may cause optical distortions in the final product. Because fill port 538 allows lens forming composition to be introduced into a mold cavity while gasket 530 is fully engaged to a mold set, gasket 530 preferably avoids this problem. In addition, fill port 538 may be of sufficient size to allow air to escape during the introduction of a lens forming composition into a mold cavity; however, gasket 530 may also incorporate vent ports 536 to facilitate the escape of air.

A method for making a plastic eyeglass lenses using either gasket 510 or 530 is presented. The method preferably includes engaging gasket 510 with a first mold set for forming a first lens of a first power. The first mold set preferably contains at least a front mold member 526a and a back mold member 526b. A mold cavity for retaining a lens forming composition may be at least partially defined by mold members 526a and 526b and gasket 510. Gasket 510 is preferably characterized by at least four discrete projections 511 arranged on interior surface 512 for spacing the mold members. Engaging gasket 510 with the mold set preferably includes positioning the mold members such that each of the projections 511 forms an oblique angle with the steep and flat axis of the back mold member 526b. In a preferred embodiment, this angle is about 45 degrees. The method preferably further includes introducing a lens forming composition into mold cavity 528 and curing the lens forming composition. Curing may include exposing the composition to activating light and/or thermal radiation. After the lens is cured, the first mold set may be removed from the gasket and the gasket may then be engaged with a second mold set for forming a second lens of a second power. When using the gasket 530, the method further includes introducing a lens forming composition through fill port 538, wherein the first and second mold members remain fully engaged with the gasket during the introduction of the lens forming composition. The lens forming composition may then be cured by use of activating light and/or thermal radiation.

Figure 15:
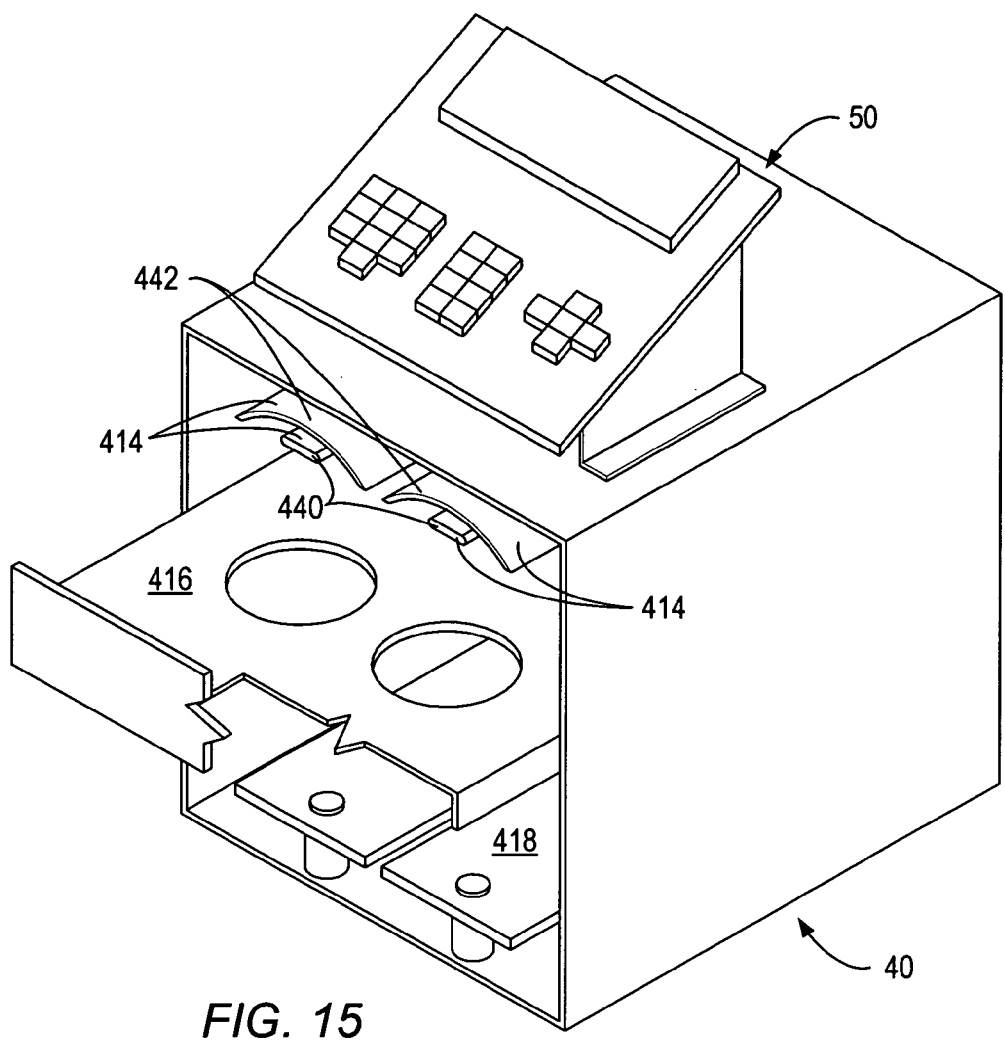
FIG. 15 depicts a post-cure unit.
Figure 16A:
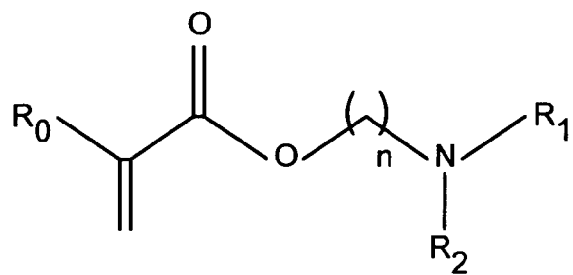
FIG. 16 depicts chemical structures of acrylated amines.
Figure 16B:
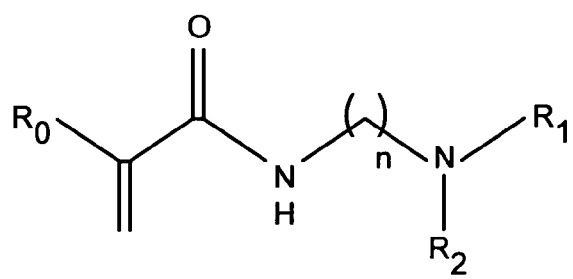
Figure 16C:
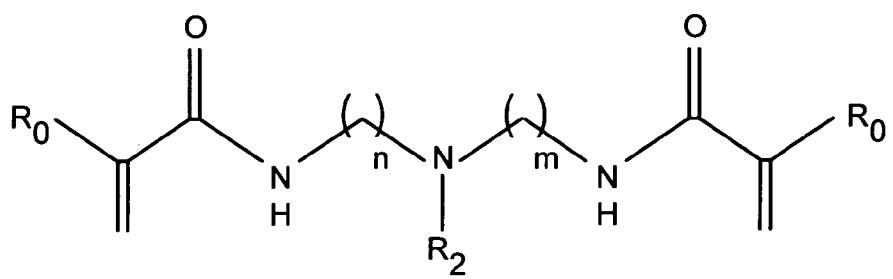
Figure 16D:
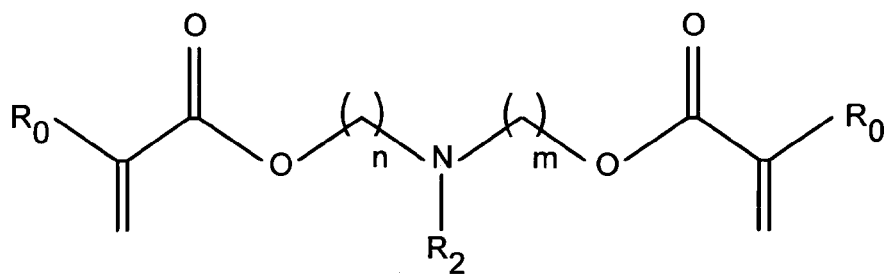

After curing of the lens in lens curing unit 30, the lens may be de-molded and post-cured in the post-cure unit 40. Post-cure unit 40 is preferably configured to apply light, heat or a combination of light and heat to the lens. As shown in FIG. 15, post-cure unit 40 may include a light source 414, a lens drawer assembly 416, and a heat source 418. Lens drawer assembly 416 preferably includes a lens holder 420, more preferably at least two lens holders 420. Lens drawer assembly 416 is preferably slidingly mounted on a guide. Preferably, lens drawer assembly 416 is made from a ceramic material. Cured lenses may be placed in lens holders 420 while the lens drawer assembly 416 is in the open position (i.e., when the door extends from the front of post-cure unit 40). After the lenses have been loaded into lens holders 420 the door may be slid into a closed position, with the lenses directly under light source 414 and above heat source 418.

As shown in FIG. 15, it is preferred that the light source 414 includes a plurality of light generating devices or lamps 440. Preferably, lamps 440 may be oriented above each of the lens holders when the lens drawer assembly is closed. The lamps 440, preferably, generate activating light. The lamps 440 may be supported by and electrically connected to suitable fixtures 442. The fixtures may be at least partially reflective and concave in shape to direct light from the lamps 440 toward the lens holders. The lamps may generate either ultraviolet light, actinic light, visible light, and/or infrared light. The choice of lamps is preferably based on the monomers used in the lens forming composition. In one embodiment, the activating light may be generated from a fluorescent lamp. The fluorescent lamp preferably has a strong emission spectra from about 200 nm to about 800 nm, more preferably between about 200 nm to about 400 nm. A fluorescent lamp emitting activating light with the described wavelengths is commercially available from Voltarc as model SNEUV RPR 4190. In another embodiment, the lamp may generate ultraviolet light.

In one embodiment, the activating light source may be turned on and off quickly between exposures. A ballast may be used for this function. The ballast may be positioned beneath the post-cure unit. Alternatively, a ballast and transformer system, as depicted in FIG. 7 and described above may be used to control the activating light source.

Heat source 418 may be configured to heat the interior of the post-cure unit. Preferably, heat source 418 is a resistive heater. Heat source 418 may be made up of one or two resistive heaters. The temperature of heat source 418 may be thermostatically controlled. By heating the interior of the post-cure unit, the lenses which are placed in post-cure unit 40 may be heated to complete curing of the lens forming material. Post-cure unit 40 may also include a fan to circulate air within the unit. The circulation of air within the unit may help maintain a relatively uniform temperature within the unit. The fan may also be used to cool the temperature of post-cure unit 40 after completion of the post cure process.

In an embodiment, a lens cured by exposure to activating light may be further processed by conductive heating. The use of a conductive heating post-cure procedure is described in detail in U.S. Pat. No. 5,928,575 to Buazza which is incorporated by reference.

In another embodiment, the edges of a lens may be treated to cure or remove incompletely cured lens forming material (see above description) before a post-cure heat is applied. Techniques for further curing of incompletely cured lens forming material are described in U.S. Pat. No. 5,976,423 to Buazza, which is incorporated herein by reference.

In another embodiment, a lens may be tinted after receiving conductive heat postcure treatment in a mold cavity. During tinting of the lens, the lens is preferably immersed in a dye solution.

The operation of the lens curing system may be controlled by a microprocessor based controller 50 (FIG. 1). Controller 50 preferably controls the operation of coating unit 20, lens curing unit 30, and post-cure unit 40. Controller 50 may be configured to substantially simultaneously control each of these units. In addition, the controller may include a display 52 and an input device 54. The display and input device may be configured to exchange information with an operator.

Controller 50 preferably controls a number of operations related to the process of forming a plastic lens. Many of the operations used to make a plastic lens (e.g., coating, curing and post-cure operations) are preferably performed under a predetermined set of conditions based on the prescription and type of lens being formed (e.g., ultraviolet/visible light absorbing, photochromic, colored, etc.). Controller 50 is preferably programmed to control a number of these operations, thus relieving the operator from having to continually monitor the apparatus.

In some embodiments, the lens or mold members may be coated with a variety of coatings (e.g., a scratch resistant or tinted coating). The application of these coatings may require specific conditions depending on the type of coating to be applied. Controller 50 is preferably configured to produce these conditions in response to input from the operator.

When a spin coating unit is used, controller 50 may be configured to control the rotation of the lens or mold member during the coating process. Controller 50 is preferably electronically coupled to the motor of the spin coating unit. The controller may send electronic signals to the motor to turn the motor on and/or off. In a typical coating process the rate at which the mold or lens is rotated is preferably controlled to achieve a uniform and defect free coating. The controller is preferably configured to control the rate of rotation of the mold or lens during a curing process. For example, when a coating material is being applied, the mold or lens is preferably spun at relatively high rotational rates (e.g., about 900 to about 950 RPM). When the coating material is being cured, however, a much slower rotational rate is preferably used (e.g., about 200 RPM). The controller is preferably configured to adjust the rotational rate of the lens or mold depending on the process step being performed.

The controller is also preferably configured to control the operation of lamps 24. The lamps are preferably turned on and off at the appropriate times during a coating procedure. For example, during the application of the coating material activating lights are typically not used, thus the controller may be configured to keep the lamps off during this process. During the curing process, activating light may be used to initiate the curing of the coating material. The controller is preferably configured to turn the lamps on and to control the amount of time the lamps remain on during a curing of the coating material. The controller may also be configured to create light pulses to affect curing of the coating material. Both the length and frequency of the light pulses may be controlled by the controller.

The controller is also preferably configured to control operation of the lens-curing unit. The controller may perform some and/or all of a number of functions during the lens curing process, including, but not limited to: (i) measuring the ambient room temperature; (ii) determining the dose of light (or initial dose of light in pulsed curing applications) required to cure the lens forming composition, based on the ambient room temperature; (iii) applying the activating light with an intensity and duration sufficient to equal the determined dose; (iv) measuring the composition's temperature response during and subsequent to the application of the dose of light; (v) calculating the dose required for the next application of activating light (in pulsed curing applications); (vi) applying the activating light with an intensity and duration sufficient to equal the determined second dose; (vii) determining when the curing process is complete by monitoring the temperature response of the lens forming composition during the application of activating light; (viii) turning the upper and lower light sources on and off independently; (ix) monitoring the lamp temperature, and controlling the temperature of the lamps by activating cooling fans proximate the lamps; and (x) turning the fans on/off or controlling the flow rate of an air stream produced by a fan to control the composition temperature. Herein, "dose" refers to the amount of light energy applied to an object, the energy of the incident light being determined by the intensity and duration of the light. A controller that is configured to alter the dose activating light applied to a lens forming composition in response to the temperature of lens forming composition is described in U.S. Pat. No. 5,989,462 to Buazza et al., which is incorporated herein by reference.

In an embodiment, a shutter system may be used to control the application of activating light rays to the lens forming material. The shutter system preferably includes air-actuated shutter plates that may be inserted into the curing chamber to prevent activating light from reaching the lens forming material. The shutter system may be coupled to the controller, which may actuate an air cylinder to cause the shutter plates to be inserted or extracted from the curing chamber. The controller preferably allows the insertion and extraction of the shutter plates at specified time intervals. The controller may receive signals from temperature sensors allowing the time intervals in which the shutters are inserted and/or extracted to be adjusted as a function of a temperature of the lens forming composition and/or the molds. The temperature sensor may be located at numerous positions proximate the mold cavity and/or casting chamber.

In some embodiments, the lens may require a post-curing process. The post-cure process may require specific conditions depending on the type of lens being formed. The controller is preferably configured to produce these conditions in response to input from the operator.

The controller is preferably configured to control the operation of lamps in the post-cure unit. The lamps are preferably turned on and off at the appropriate times during the post-cure procedure. For example, in some post-cure operations the lights may not be required, thus the controller would keep the lights off during this process. During other processes, the lights may be used to complete the curing of the lens. The controller is preferably configured to turn the lights on and to control the amount of time the lights remain on during a post-cure procedure. The controller may also be configured to create light pulses during the post-cure procedure. Both the length and frequency of the light pulses may be controlled by the controller.

The controller is preferably configured to control operation of the heating device 418 during the post-cure operation. Heating device 418 is preferably turned on and off to maintain a predetermined temperature within the post-cure unit. Alternatively, when a resistive heater is used, the current flow through the heating element may be altered to control the temperature within the post-cure unit. Preferably, both the application of light and heat are controlled by the controller. The operation of fans, coupled to the post-cure unit, is also preferably controlled by the controller. The fans may be operated by the controller to circulate air within or into/out of the post-cure unit.

Additionally, the controller may provide system diagnostics to determine if the system is operating properly. The controller may notify the user when routine maintenance is due or when a system error is detected. The system monitors the following conditions to warn the user when the machine has malfunctioned, requires standard maintenance, or is drifting out of its suggested operating envelope: I$^2$C network errors; line voltage; top rack light intensity; bottom rack light intensity; post-cure rack light intensity; top activating light ballast current; bottom activating light ballast current; post-cure activating light ballast current; germicidal light ballast current; post-cure heater current; top activating light filament heat transformer current; bottom activating light filament heat transformer current; germicidal light filament heat transformer current; the number of times the top activating light is turned on; the number of times the bottom activating light is turned on; the number of times the post-cure activating light is turned on; the number of times the germicidal light is turned on; top activating light on time; bottom activating light on time; post cure activating light on time; germicidal light on time; top lamp temperature; bottom lamp temperature; spin board temperature; post-cure temperature.

For example, the controller may monitor the current passing through lamps of the coating, lens curing, or post-cure unit to determine if the lamps are operating properly. The controller may keep track of the number of hours that the lamps have been used. When a lamp has been used for a predetermined number of hours, a message may be transmitted to an operator to inform the operator that the lamps may require changing. The controller may also monitor the intensity of light produced by the lamp. A photodiode may be placed proximate the lamps to determine the intensity of light being produced by the lamp. If the intensity of light falls outside a predetermined range, the current applied to the lamp may be adjusted to alter the intensity of light produced (either increased to increase the intensity; or decreased to decrease the intensity). Alternatively, the controller may transmit a message informing the operator that a lamp needs to be changed when the intensity of light produced by the lamp drops below a predetermined value.

When the machine encounters an error in these areas, the following error messages may be displayed:

post cure temperature The temperature of your post cure is out of its suggested operating range. If the lens drawer is closed, the unit has had sufficient warm-up time, and the problem continues after a system restart, your machine may need service.

light intensity Your _____ light source output has dropped below its recommended range. If the problem continues after a system restart, you may need to replace your _____ lamps.

lamp power Your _____ lamps are not functioning properly. If the problem continues after a system restart, you may need to replace your _____ lamps.

filament heat power Your _____ lamps are not functioning properly. If the problem continues after a system restart, you may need to replace your _____ lamps.

lamp on time Your _____ lamps have exceeded their expected life. Please replace your _____ lamps.

PC heaters The heaters in your post cure unit are not functioning properly. If the problem continues after a system restart, your machine may need service The controller may also manage an interlock system for safety and energy conservation purposes. If the lens drawer assembly from the coating or post-cure units are open the controller is preferably configured to prevent the lamps from turning on. This may prevent the operator from inadvertently becoming exposed to the light from the lamps. Lamps 24 for the coating unit 20 are preferably positioned on cover 22 (See FIG. 1). In order to prevent inadvertent exposure of the operator to light from lamps 24 a switch is preferably built into the cover, as described above. The controller is preferably configured to prevent the lamps 24 from turning on when the cover is open. The controller may also automatically turn lamps 24 off if the cover is opened when the lenses are on. Additionally, the controller may conserve energy by keeping fans and other cooling devices off when the lamps are off.

The controller may display a number of messages indicating problems that prevent further operation of the lens forming apparatus. Process tips appear in the appropriate location on the display (over a button when related to that function, at the top and flashing when important, etc.). The controller uses the following list of tips to instruct the user during machine use. The list is in order of priority (i.e. the tip at the top of the list is displayed if both it and the second item need to be displayed simultaneously).

WARNING JOBS RUNNING,
CONFIRM PURGE
WARNING JOBS RUNNING, CONFIRM RERUN
ROTATE ENCODER TO CONFIRM PURGE
NOT ALLOWED WHILE JOBS RUNNING
MOVE CAVITY TO POST-CURE & PRESS THE KEY
CLOSE LID
PRESS & HOLD TO RERUN POST-CURE PROCESS
PRESS & HOLD TO RERUN CURE PROCESS
PRESS & HOLD TO RERUN ANNEAL PROCESS
PRESS & HOLD TO CANCEL
PRESS & HOLD TO RERUN COAT PROCESS
PRESS THE CURE KEY TO START JOB
MUST WAIT FOR POST-CURE TO COMPLETE
MUST WAIT FOR POST-CURE TO START
MUST SPIN LEFT AND RIGHT BOWLS
NO JOBS CURRENTLY IN MEMORY
ROTATE ENCODER TO SELECT JOB
NO CURED JOBS AVAILABLE TO POST-CURE
NO JOBS READY TO ANNEAL
LEFT MOLD DOES NOT EXIST, RE-ENTER RX
RIGHT MOLD DOES NOT EXIST, RE-ENTER RX
MOLDS NOT IN KIT, ACCEPT OR RE-ENTER RX
ROTATE ENCODER TO SELECT SAVE OR DISCARD
PRESS ENCODER WHEN READY
PLEASE WAIT WHILE COMPUTING
ANNEAL COMPLETE

COAT COMPLETE
POST-CURE COMPLETE, DEMOLD & ANNEAL
MOLDS DO NOT EXIST, RE-ENTER RX
RIGHT MOLD NOT IN KIT, ACCEPT|RE-ENTER
LEFT MOLD NOT IN KIT, ACCEPT|RE-ENTER
THERE ARE NO STORED Rx's TO EDIT
THERE ARE NO JOBS TO PURGE/RERUN
THERE ARE NO STORED JOBS TO VIEW

THERE ARE NO STORED JOBS TO EDIT

The controller may also be configured to interact with the operator. The controller preferably includes an input device 54 and a display screen 52. The input device may be a keyboard (e.g., a full computer keyboard or a modified keyboard), a light sensitive pad, a touch sensitive pad, or similar input device. A number the parameters controlled by the controller may be dependent on the input of the operator. In the initial set up of the apparatus, the controller may allow the operator to input the type of lens being formed. This information may include type of lens (clear, ultraviolet absorbing, photochromic, colored, etc.), prescription, and type of coatings (e.g., scratch resistant or tint).

Based on this information the controller is preferably configured to transmit information back to the operator. The operator may be instructed to select mold members for the mold assembly. The mold members may be coded such that the controller may indicate to the operator which molds to select by transmitting the code for each mold member. The controller may also determine the type of gasket required to properly seal the mold members together. Like the mold members, the gaskets may also be coded to make the selection of the appropriate gasket easier.

The lens forming compositions may also be coded. For the production of certain kinds of lenses a specific lens forming composition may be required. The controller may be configured to determine the specific composition required and transmit the code for that composition to the operator. The controller may also signal to the operator when certain operations need to be performed or when a particular operation is completed (e.g., when to place the mold assembly in the lens curing unit, when to remove the mold assembly, when to transfer the mold assembly, etc.).

The controller may also display Help functions to instruct the user on machine use and give general process guidance. The following paragraphs are examples of some of the help files that may be available to an operator:

1) Navigation and Data Entry

The information entry knob is used for most data selection and entry. Rotating the knob moves the cursor in menus and scrolls through choices on data entry screens. Pressing the knob down enters the selection. Prompts at the top of the screen help the user through the process. The arrow keys allow for correction of previously entered data and can be used as an alternative to the data entry knob during navigation.

The menu key returns the user to the previous menu.

The help key gives general process help and also shows machine malfunctions when there is a problem with the system. When an error is present, the user will be given information about any errors and suggested courses of action to remedy them.

2) Screen Descriptions

NEW Rx Prescription information is entered in this screen. The availability of molds is displayed on this screen in real time. Molds that are available have a checkmark next to them. Molds that can be added to your kit are displayed with a box next to them. Powers that are out of the range of the machine will produce dashes in the area where the mold information is normally shown. When all prescription information is entered the data entry knob is pressed and the job is saved in memory. The view screen displays the data for cavity creation. If the data was entered in plus cylinder format, it will be transposed and shown in minus cylinder form. If you need to see the data as it was input, it is available in the EDIT Rx screen in both plus and minus cylinder forms.

VIEW and EDIT Allow the user to see and modify jobs that are in memory. Once the view or edit selection is made on the main menu, the user can scroll through all jobs that have been saved. When using edit, pressing the data entry knob will move the cursor into an edit screen where the displayed job's prescription can be modified. In the view menu, pressing the knob will put the user at the main menu.

PURGE/RERUN JOB Allows the user to delete and rerun jobs if necessary. When a single lens of a pair needs to be rerun, edit job can be used to change the job type to left or right only after rerun is selected for that job. Purge all jobs clears all jobs from the memory. If you would like to start your job numbering back at zero, this feature is used.

INSTRUMENT STATUS Shows the current status of individual sections of the machine-spin speeds, current being delivered to a device, network errors etc. These screens are useful when diagnosing errors. The system's serial numbers and software version numbers are also in the status screens.

ADVANCED The advanced menu contains all user adjustable settings, program upload options, and mold kit selections. This menu is password protected to minimize the risk that changes will be made by accident. When password is displayed, pressing the data entry knob lets the user enter a password by rotating the data entry knob. Press the knob when the proper password is dialed in. Incorrect passwords will return the user to the password screen. The proper password will take the user to the advanced menu which functions like the main menu. Within these menus, when the desired field is highlighted, the data entry knob is pressed and parentheses appear around the field indicating that it is changeable by rotating the data entry knob. When the proper value is selected, pressing the knob again removes the parentheses and sets the field to the value selected. In the date and time setting screen, changes will not be saved until the save settings field is highlighted and the data entry knob is pressed. The kit menu allows the user to select the available mold package and power range.

3) Running a Job

Making lenses is a 3 part process. Applying a scratch resistant coating is optional and is covered at the end of this section.

When the user enters a prescription and saves the job, the view screen displays the data required to retrieve the molds and gasket necessary for each lens. The system is designed for minus cylinder format prescriptions. If the Rx information is entered in plus cylinder format, it will be transposed and returned in minus cylinder form. The cavity must be assembled based on the view screen data (the axis will be 90° different from the plus cylinder input). The original prescription can be viewed at the Edit Rx screen along with its transposed return information.

Before assembling a cavity, the molds and gasket must be thoroughly cleaned. Any contaminants on the molds or gasket may be included in the finished lens rendering it undispensable. Spin clean the casting side of each mold with IPA and acetone. Assemble the cavity next, ensuring that the axis is set properly. Fill the cavity with the appropriate monomer. A filled cavity should not be exposed to room light for more than 3 minutes. High ambient light levels caused by windows or high intensity room lighting can significantly shorten the allowable room light exposure time.

CURING Press the cure button to initiate a curing cycle. Rotating the data entry knob will allow the user to select the job to be run. The necessary filters for the cycle are displayed with the job number. When the correct job is displayed, press the cure key. The area over the key instructs you to put in the pair or the left or right lens only. Ensure that the left and right lenses are always on the proper side of the chamber. Put the cavity in the initial curing drawer and press the cure button. When the initial cure is done, transfer the cavity or cavities to the front part of the post cure drawer and press the post cure key. If the job was split because of power differences in the left and right lenses, the area over the cure button will instruct the user to insert the second cavity in the initial cure drawer and press the cure key again (the first cavity should be in the post cure when performing the initial curing step on the second cavity). When prompted, move the cavity to the post cure section and press the post cure button again.

POST CURING The front openings in the post cure oven drawer are used to post cure the cavities. When the post cure cycle is over, press the post cure key, remove the cavities from the post cure chamber, and allow them to cool for 1 to 2 minutes. After the cooling period, remove the gasket and separate one mold from each assembly with the demolding tool. The tool is inserted in the gap created by the tab on the gasket and the mold is gently pried off the assembly. Place the remaining lens and mold in the Q-Soak container to separate the mold from the lens. Clean the lenses and proceed to the annealing step.

ANNEALING If more than one job is available for annealing, the user can choose which job they would like to anneal by rotating the data entry knob when the area over the anneal button displays a job number. Press the anneal button when the proper job is displayed. The cleaned lens is placed over the rear openings of the post cure chamber drawer. Press the anneal key when prompted at the end of the annealing cycle.

COATING Scratch coating is optional and is applied in the spin bowls of the main chamber. The timed buttons by the spin bowls initiate the coat curing cycle. When the front molds are cleaned and coated, the hood is closed and a 90 second curing cycle is started for the coatings. When the cycle is complete, the light turns off, the motors stop, and the controller signals the user that the molds are ready. The cavity is assembled in the normal fashion and the lens monomer is dispensed into the cavity.

Lens coating is also available and is applied to the finished lens after the annealing step is complete.

4) Tinting Tips

After edging, lenses may be tinted by conventional means. As with many modern lens materials, tinting results may be improved with slightly modified handling procedures. First, when mounting the lenses in the dye holders, do not use spring-type holders or apply excessive pressure to the lenses. Lenses become somewhat flexible at dye tank temperatures and may bend. Faster and more uniform dye absorption will be achieved if the lenses are agitated in a slow back and forth motion while in the dye tank.

In some embodiments, the controller may be a computer system. A computer system may include a memory medium on which computer programs configured to perform the above described operations of the controller are stored. The term "memory medium" is intended to include an installation medium, e.g., a CD-ROM, or floppy disks, a computer system memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network. In the latter instance, the second computer provides the program instructions to the first computer for execution. Also, the computer system may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software program for controlling the operation of a lens forming apparatus. The software program may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU, executing code and data from the memory medium comprises a means for creating and executing the software program according to the methods or flowcharts described below.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Lens Forming Compositions

Figure 8:
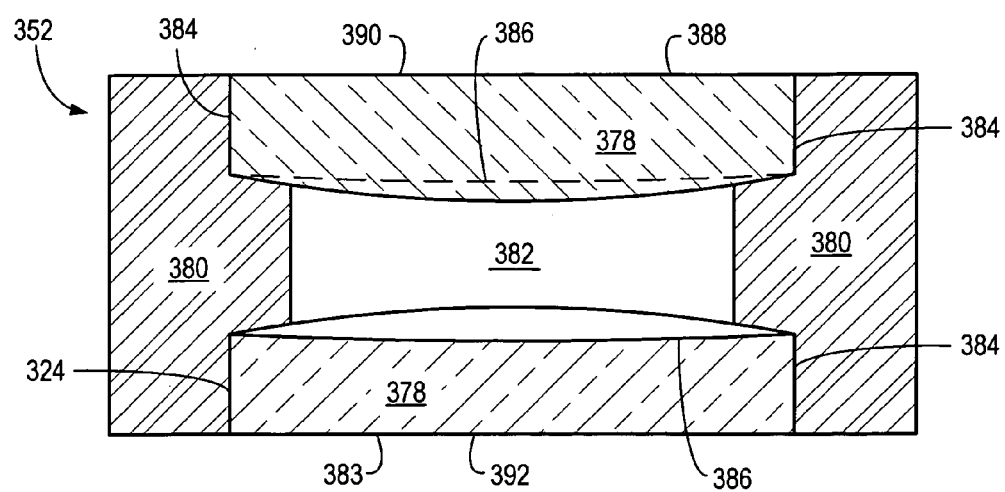
FIG. 8 depicts a mold assembly.

The lens forming material may include any suitable liquid monomer or monomer mixture and any suitable photosensitive initiator. As used herein "monomer" is taken to mean any compound capable of undergoing a polymerization reaction. Monomers may include non-polymerized material or partially polymerized material. When partially polymerized material is used as a monomer, the partially polymerized material preferably contains functional groups capable of undergoing further reaction to form a new polymer. The lens forming material preferably includes a photoinitiator that interacts with activating light. In one embodiment, the photoinitiator absorbs ultraviolet light having a wavelength in the range of 300 to 400 nm. In another embodiment, the photoinitiator absorbs actinic light having a wavelength in the range of about 380 nm to 490 nm. The liquid lens forming material is preferably filtered for quality control and placed in the lens molding cavity 382 by pulling the annular gasket 380 away from one of the opposed mold members 378 and injecting the liquid lens forming material into the lens molding cavity 382 (See FIG. 8). Once the lens molding cavity 382 is filled with such material, the annular gasket 380 is preferably replaced into its sealing relation with the opposed mold members 378.

Those skilled in the art will recognize that once the cured lens is removed from the lens molding cavity 382 by disassembling the opposed mold members 378, the lens may be further processed in a conventional manner, such as by grinding its peripheral edge.

A polymerizable lens forming composition includes an aromatic-containing bis(allyl carbonate)-functional monomer and at least one polyethylenic-functional monomer containing two ethylenically unsaturated groups selected from acrylyl or methacrylyl. In a preferred embodiment, the composition further includes a suitable photoinitiator. In other preferred embodiments, the composition may include one or more polyethylenic-functional monomers containing three ethylenically unsaturated groups selected from acrylyl or methacrylyl, and a dye. The lens forming composition may also include activating light absorbing compounds such as ultraviolet light absorbing compounds and photochromic compounds. Examples of these compositions are described in more detail in U.S. Pat. No. 5,989,462 to Buazza et al. which is incorporated by reference.

In another embodiment, an eyeglass lens may be made from a lens forming composition comprising a monomer composition and a photoinitiator composition.

The monomer composition preferably includes an aromatic containing polyethylenic polyether functional monomer. In an embodiment, the polyether employed is an ethylene oxide derived polyether, propylene oxide derived polyether, or mixtures thereof. Preferably, the polyether is an ethylene oxide derived polyether. The aromatic polyether polyethylenic functional monomer preferably has the general structure (V), depicted below where each $R_2$ is a polymerizable unsaturated group, m and n are independently 1 or 2, and the average values of j and k are each independently in the range of from about 1 to about 20. Common polymerizable unsaturated groups include vinyl, allyl, allyl carbonate, methacrylyl, acrylyl, methacrylate, and acrylate.

$$R_2-[CH_2-(CH_2)_m-O]_j-A_1-[O-(CH_2)_n-CH_2]_k-R_2$$

$A_1$ is the divalent radical derived from a dihydroxy aromatic-containing material. A subclass of the divalent radical $A_1$ which is of particular usefulness is represented by formula (II):

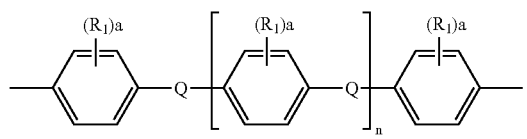

(II)

in which each $R_1$ is independently alkyl containing from 1 to about 4 carbon atoms, phenyl, or halo; the average value of each (a) is independently in the range of from 0 to 4; each Q is independently oxy, sulfonyl, alkanediyl having from 2 to about 4 carbon atoms, or alkylidene having from 1 to about 4 carbon atoms; and the average value of n is in the range of from 0 to about 3. Preferably Q is methylethylidene, viz., isopropylidene.

Preferably, the value of n is zero, in which case $A_1$ is represented by formula (III):

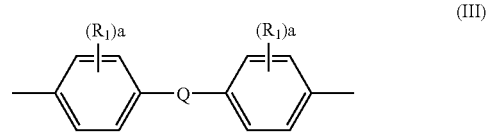

(III)

in which each $R_1$, each a, and Q are as discussed with respect to Formula II. Preferably, the two free bonds are both in the ortho or para positions. The para positions are especially preferred.

In an embodiment, when para, para-bisphenols are chain extended with ethylene oxide, the central portion of the aromatic containing polyethylenic polyether functional monomer may be represented by the formula:

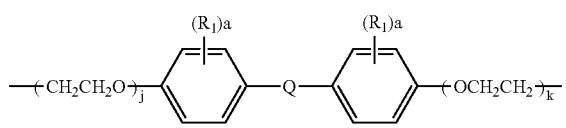

(IV)

where each $R_1$, each a, and Q are as discussed with respect to Formula II, and the average values of j and k are each independently in the range of from about 1 to about 20.

In another embodiment, the polyethylenic functional monomer is an aromatic polyether polyethylenic functional monomer containing at least one group selected from acrylyl or methacrylyl. Preferably the aromatic polyether polyethylenic functional monomer containing at least one group selected from acrylate and methacrylate has the general structure (VI), depicted below where $R_0$ is hydrogen or methyl, where each $R_1$, each a, and Q are as discussed with respect to Formula II, where the values of j and k are each independently in the range of from about 1 to about 20, and where $R_2$ is a polymerizable unsaturated group (e.g., vinyl, allyl, allyl carbonate, methacrylyl, acrylyl, methacrylate, or acrylate).

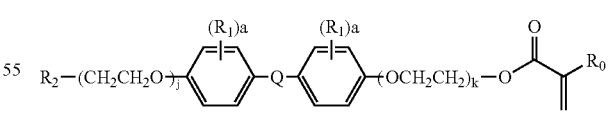

(VI)

In one embodiment, the aromatic containing polyether polyethylenic functional monomer is preferably an ethoxylated bisphenol A di(meth)acrylate. Ethoxylated bisphenol A di(meth)acrylates have the general structure depicted below where each $R_0$ is independently hydrogen or methyl, each $R_1$, each a, and Q are as discussed with respect to Formula II, and the values of j and k are each independently in the range of from about 1 to about 20.

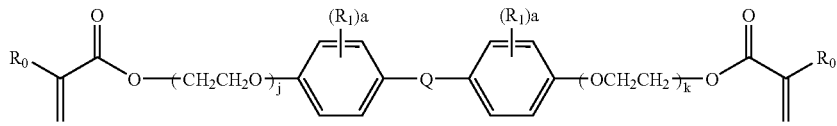

Preferred ethoxylated bisphenol A dimethacrylates include ethoxylated 2 bisphenol A diacrylate (where j+k=2, and $R_0$ is H), ethoxylated 2 bisphenol A dimethacrylate (where j+k=2, and $R_0$ is Me), ethoxylated 3 bisphenol A diacrylate (where j+k=3, and $R_0$ is H), ethoxylated 4 bisphenol A diacrylate (where j+k=4, and $R_0$ is H), ethoxylated 4 bisphenol A dimethacrylate (where j+k=4, and $R_0$ is Me), ethoxylated 6 bisphenol A dimethacrylate (where j+k=6, and $R_0$ is Me), ethoxylated 8 bisphenol A dimethacrylate (where j+k=8, and $R_0$ is Me), ethoxylated 10 bisphenol A diacrylate (where j+k=10, and $R_0$ is H), ethoxylated 10 bisphenol A dimethacrylate (where j+k=10, and $R_0$ is Me), ethoxylated 30 bisphenol A diacrylate (where j+k=30, and $R_0$ is H), ethoxylated 30 bisphenol A dimethacrylate (where j+k=30, and $R_0$ is Me). These compounds are commercially available from Sartomer Company under the trade names PRO-631, SR-348, SR-349, SR-601, CD-540, CD-541, CD-542, SR-602, SR-480, SR-9038, and SR-9036 respectively. Other ethoxylated bisphenol A dimethacrylates include ethoxylated 3 bisphenol A dimethacrylate (where j+k=3, and $R_0$ is Me), ethoxylated 6 bisphenol A diacrylate (where j+k=30, and $R_0$ is H), and ethoxylated 8 bisphenol A diacrylate (where j+k=30, and $R_0$ is H). In all of the above described compounds Q is $C(CH_3)_2$.

The monomer composition preferably may also include a polyethylenic functional monomer. Polyethylenic functional monomers are defined herein as organic molecules which include two or more polymerizable unsaturated groups. Common polymerizable unsaturated groups include vinyl, allyl, allyl carbonate, methacrylyl, acrylyl, methacrylate, and acrylate. Preferably, the polyethylenic functional monomers have the general formula (VII) or (VIII) depicted below, where each $R_0$ is independently hydrogen, halo, or a $C_1$–$C_4$ alkyl group and where $A_1$ is as described above. It should be understood that while general structures (VII) and (VIII) are depicted as having only two polymerizable unsaturated groups, polyethylenic functional monomers having three (e.g., tri(meth)acrylates), four (e.g., tetra(meth)acrylates), five (e.g., penta(meth)acrylates), six (e.g., hexa(meth)acrylates) or more groups may be used.

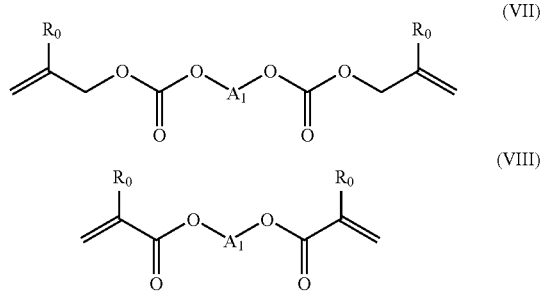

Preferred polyethylenic functional monomers which may be combined with an aromatic containing polyethylenic polyether functional monomer to form the monomer composition include, but are not limited to, ethoxylated 2 bisphenol A dimethacrylate, tris(2-hydroxyethyl)isocyanurate triacrylate, ethoxylated 10 bisphenol A dimethacrylate, ethoxylated 4 bisphenol A dimethacrylate, dipentaerythritol pentaacrylate, 1,6-hexanediol dimethacrylate, isobornyl acrylate, pentaerythritol triacrylate, ethoxylated 6 trimethylolpropane triacrylate, and bisphenol A bis allyl carbonate.

According to one embodiment, the liquid lens forming composition includes ethoxylated 4 bisphenol A dimethacrylate. Ethoxylated 4 bisphenol A dimethacrylate monomer, when cured to form an eyeglass lens, typically produces lenses that have a higher index of refraction than comparable lenses produced using DEG-BAC. Lenses formed from such a mid-index lens forming composition which includes ethoxylated 4 bisphenol A dimethacrylate may have an index of refraction of about 1.56 compared to the non-ethoxylated monomer compositions which tend to have an index of refraction of about 1.51. A lens made from a higher index of refraction polymer may be thinner than a lens made from a lower index of refraction polymer because the differences in the radii of curvature between the front and back surface of the lens do not have to be as great to produce a lens of a desired focal power. Lenses formed from a lens forming composition which includes ethoxylated 4 bisphenol A dimethacrylate may also be more rigid than lenses formed from non-ethoxylated monomer based compositions.

The monomer composition may include additional monomers, which, when combined with ethoxylated 4 bisphenol A dimethacrylate, may modify the properties of the formed eyeglass lens and/or the lens forming composition. Tris(2-hydroxyethyl)isocyanurate triacrylate, available from Sartomer under the trade name SR-368, is a triacrylate monomer that may be included in the composition to provide improved clarity, high temperature rigidity, and impact resistance properties to the finished lens. Ethoxylated 10 bisphenol A dimethacrylate, available from Sartomer under the trade name SR-480, is a diacrylate monomer that may be included in the composition to provide impact resistance properties to the finished lens. Ethoxylated 2 bisphenol A dimethacrylate, available from Sartomer under the trade name SR-348, is a diacrylate monomer that may be included in the composition to provide tintability properties to the finished lens. Dipentaerythritol pentaacrylate, available from Sartomer under the trade name SR-399, is a pentaacrylate monomer that may be included in the composition to provide abrasion resistance properties to the finished lens. 1,6-hexanediol dimethacrylate, available from Sartomer under the trade name SR-239, is a diacrylate monomer that may be included in the composition to reduce the viscosity of the lens forming composition. Isobornyl acrylate, available from Sartomer under the trade name SR-506, is an acrylate monomer that may be included in the composition to reduce the viscosity of the lens forming composition and enhance tinting characteristics. Bisphenol A bis allyl carbonate may be included in the composition to control the rate of reaction during cure and also improve the shelf life of the lens forming composition. Pentaerythritol triacrylate, available from Sartomer under the trade name SR-444, is a triacrylate monomer that may be included in the composition to promote better adhesion of the lens forming composition to the molds during curing. Ethoxylated 6 trimethylolpropane triacrylate, available from Sartomer under the trade name SR-454, may also be added.

Photoinitiators which may be used in the lens forming composition have been described in previous sections. In one embodiment, the photoinitiator composition preferably includes phenyl bis(2,4,6-trimethylbenzoyl) phosphine oxide (IRG-819) which is commercially available from Ciba Additives under the trade name of Irgacure 819. The amount of Irgacure 819 present in a lens forming composition preferably ranges from about 30 ppm by weight to about 2000 ppm by weight. In another embodiment, the photoinitiator composition may include a mixture of photoinitiator. Preferably, a mixture of Irgacure 819 and 1-hydroxycyclohexylphenyl ketone, commercially available from Ciba Additives under the trade name of Irgacure 184 (IRG-184), is used. Preferably, the total amount of photoinitiators in the lens forming composition ranges from about 50 ppm to about 1000 ppm.

In another embodiment, an eyeglass lens may be made from lens forming composition comprising a monomer composition, a photoinitiator composition, and a co-initiator composition. The lens forming composition, in liquid form, is preferably placed in a mold cavity defined by a first mold member and a second mold member. It is believed that activating light which is directed toward the mold members to activate the photoinitiator composition causes the photoinitiator to form a polymer chain radical. The co-initiator may react with a fragment or an active species of either the photoinitiator or the polymer chain radical to produce a monomer initiating species. The polymer chain radical and the monomer initiating species may react with the monomer to cause polymerization of the lens forming composition.

The monomer composition preferably includes an aromatic containing polyethylenic polyether functional monomer having a structure as shown above. Preferably, the polyethylenic functional monomer is an aromatic polyether polyethylenic functional monomer containing at least one group selected from acrylyl or methacrylyl.

More preferably, the polyethylenic functional monomer is an ethoxylated bisphenol A di(meth)acrylate. The monomer composition may include a mixture of polyethylenic functional monomers, as described above. The photoinitiators which may be present in the lens forming composition have been described above.

The lens forming composition preferably includes a co-initiator composition. The co-initiator composition preferably includes amine co-initiators. Amines are defined herein as compounds of nitrogen formally derived from ammonia ($NH_3$) by replacement of the hydrogens of ammonia with organic substituents. Co-initiators include acrylyl amine co-initiators commercially available from Sartomer Company under the trade names of CN-381, CN-383, CN-384, and CN-386, where these co-initiators are monoacrylyl amines, diacrylyl amines, or mixtures thereof. Other co-initiators include ethanolamines. Examples of ethanolamines include but are not limited to N-methyldiethanolamine (NMDEA) and triethanolamine (TEA) both commercially available from Aldrich Chemicals. Aromatic amines (e.g., aniline derivatives) may also be used as co-initiators. Example of aromatic amines include, but are not limited to, ethyl-4-dimethylaminobenzoate (E-4-DMAB), ethyl-2-dimethylaminobenzoate (E-2-DMAB), n-butoxyethyl-4-dimethylaminobenzoate, p-dimethylaminobenzaldehyde, N,N-dimethyl-p-toluidine, and octyl-p-(dimethylamino)benzoate commercially available from Aldrich Chemicals or The First Chemical Group of Pascagoula, Miss.

Preferably, acrylated amines are included in the co-initiator composition. Acrylyl amines may have the general structures depicted in FIG. 16, where $R_0$ is hydrogen or methyl, n and m are 1 to 20, preferably 1–4, and $R_1$ and $R_2$ are independently alkyl containing from 1 to about 4 carbon atoms or phenyl. Monoacrylyl amines may include at least one acrylyl or methacrylyl group (see compounds (A) and (B) in FIG. 16). Diacrylyl amines may include two acrylyl, two methacrylyl, or a mixture of acrylyl or methacrylyl groups (see compounds (C) and (D) in FIG. 16). Acrylyl amines are commercially available from Sartomer Company under the trade names of CN-381, CN-383, CN-384, and CN-386, where these co-initiators are monoacrylyl amines, diacrylyl amines, or mixtures thereof. Other acrylyl amines include dimethylaminoethyl methacrylate and dimethylaminoethyl acrylate both commercially available from Aldrich. In one embodiment, the co-initiator composition preferably includes a mixture of CN-384 and CN-386. Preferably, the total amount of co-initiators in the lens forming composition ranges from about 50 ppm to about 7% by weight.

An advantage to lens forming compositions which include a co-initiator is that less photoinitiator may be used to initiate curing of the lens forming composition. Typically, plastic lenses are formed from a lens forming composition which includes a photoinitiator and a monomer. To improve the hardness of the formed lenses the concentration of photoinitiator may be increased. Increasing the concentration of photoinitiator, however, may cause increased yellowing of the formed lens, as has been described previously. To offset this increase in yellowing, a permanent dye may be added to the lens forming composition. As the amount of yellowing is increased, the amount of dye added may also be increased. Increasing the concentration of the dye may cause the light transmissibility of the lens to decrease.

A lens forming composition that includes a co-initiator may be used to reduce the amount of photoinitiator used. To improve the hardness of the formed lenses a mixture of photoinitiator and co-initiator may be used to initiate curing of the monomer. The above-described co-initiators typically do not significantly contribute to the yellowing of the formed lens. By adding co-initiators to the lens forming composition, the amount of photoinitiator may be reduced. Reducing the amount of photoinitiator may decrease the amount of yellowing in the formed lens. This allows the amount of dyes added to the lens forming composition to be reduced and light transmissibility of the formed lens may be improved without sacrificing the rigidity of the lens.

The lens forming composition may also include activating light absorbing compounds. These compounds may absorb at least a portion of the activating light which is directed toward the lens forming composition during curing. One example of activating light absorbing compounds are photochromic compounds. Photochromic compounds which may be added to the lens forming composition have been previously described. Preferably, the total amount of photochromic compounds in the lens forming composition ranges from about 1 ppm to about 1000 ppm. Examples of photochromic compounds which may be used in the lens forming composition include, but are not limited to Corn Yellow, Berry Red, Sea Green, Plum Red, Variacrol Yellow, Palatinate Purple, CH-94, Variacrol Blue D, Oxford Blue and CH-266. Preferably, a mixture of these compounds is used. Variacrol Yellow is a napthopyran material, commercially available from Great Lakes Chemical in West Lafayette, Indiana. Corn Yellow and Berry Red are napthopyrans and Sea Green, Plum Red and Palatinate Purple are spironaphthoxazine materials commercially available from Keystone Aniline Corporation in Chicago, Ill. Variacrol Blue D and Oxford Blue are spironaphthoxazine materials, commercially available from Great Lakes Chemical in West Lafayette, Indiana. CH-94 and CH-266 are benzopyran materials, commercially available from Chroma Chemicals in Dayton, Ohio. The composition of a Photochromic Dye Mixture which may be added to the lens forming composition is described in Table 1.

TABLE 1

Photochromic Dye Mixture

| | |
|---|---|
| Corn Yellow | 22.3% |
| Berry Red | 19.7% |
| Sea Green | 14.8% |
| Plum Red | 14.0% |
| Variacrol Yellow | 9.7% |
| Palatinate Purple | 7.6% |
| CH-94 | 4.0% |
| Variacrol Blue D | 3.7% |
| Oxford Blue | 2.6% |
| CH-266 | 1.6% |

The lens forming composition may also include other activating light absorbing compounds such as UV stabilizers, UV absorbers, and dyes. UV stabilizers, such as Tinuvin 770 may be added to reduce the rate of degradation of the formed lens caused by exposure to ultraviolet light. UV absorbers, such as 2-(2H-benzotriazol-2-yl)-4-(1,1,3,3,-tetramethylbutyl)phenol, may be added to the composition to provide UV blocking characteristics to the formed lens. Small amounts of dyes, such as Thermoplast Blue 684 and Thermoplast Red from BASF may be added to the lens forming composition to counteract yellowing. These classes of compounds have been described in greater detail in previous sections.

In an embodiment, a UV absorbing composition may be added to the lens forming composition. The UV absorbing composition preferably includes a photoinitiator and a UV absorber. Photoinitiators and UV absorbers have been described in greater detail in previous sections. Typically, the concentration of UV absorber in the lens forming composition required to achieve desirable UV blocking characteristics is in the range from about 0.1 to about 0.25% by weight. For example, 2-(2H-benzotriazol-2-yl)-4-(1,1,3,3,-tetramethylbutyl)phenol may be added to the lens forming composition as a UV absorber at a concentration of about 0.17%.

By mixing a photoinitiator with a UV absorbing compound the combined concentration of the photoinitiator and the UV absorber required to achieve the desired UV blocking characteristics in the formed lens may be lower than the concentration of UV absorber required if used alone. For example, 2-(2H-benzotriazol-2-yl)-4-(1,1,3,3,-tetramethylbutyl)phenol may be added to the lens forming composition as a UV absorber at a concentration of about 0.17% to achieve the desired UV blocking characteristics for the formed lens. Alternatively, a UV absorbing composition may be formed by a combination of 2-(2H-benzotriazol-2-yl)-4-(1,1,3,3,-tetramethylbutyl)phenol with the photoinitiator 2-isopropyl-thioxanthone (ITX), commercially available from Aceto Chemical in Flushing, New York. To achieve similar UV blocking characteristics in the formed lens, significantly less of the UV absorbing composition may be added to the lens forming composition, compared to the amount of UV absorber used by itself. For example, 2-(2H-benzotriazol-2-yl)-4-(1,1,3,3,-tetramethylbutyl)phenol at a concentration of about 700 ppm, with respect to the lens forming composition, along with 150 ppm of the photoinitiator 2-isopropyl-thioxanthone (2-ITX) may be used to provide UV blocking characteristics. Thus, a significant reduction, (e.g., from 0.15% down to less than about 1000 ppm), in the concentration of UV absorber may be achieved, without a reduction in the UV blocking ability of the subsequently formed lens. An advantage of lowering the amount of UV absorbing compounds present in the lens forming composition is that the solubility of the various components of the composition may be improved. Tables 2–6 list some examples of mid-index lens forming compositions. The UV absorber is 2-(2H-benzotriazol-2-yl)-4-(1,1,3,3,-tetramethylbutyl)phenol.

TABLE 2

| Ingredient | Formula 1 | Formula 2 | Formula 3 | Formula 4 | Formula 5 | Formula 6 |
|---|---|---|---|---|---|---|
| Irgacure 819 | 694.2 ppm | 486 ppm | 480 ppm | 382 ppm | 375 ppm | 414 ppm |
| Irgacure 184 | | | | | | |
| CN 384 | 0.962% | 0.674% | 0.757% | 0.62% | 0.61% | 0.66% |
| CN386 | 0.962% | 0.674% | 0.757% | 0.62% | 0.61% | 0.66% |
| SR-348 | 97.98% | 68.65% | 98.2% | 81.2% | 79.6% | 86.4% |
| SR-368 | | | | | | |
| SR-480 | | 29.95% | | | | |
| CD-540 | | | | | | |
| SR-399 | | | | | | |
| SR-239 | | | | | 2.0% | 2.08% |
| SR-506 | | | | | | |
| CR-73 | | | | 17.2% | 16.9% | 10.0% |
| PRO-629 | | | | | | |
| Tinuvin 770 | | | 290 ppm | | | |
| UV Absorber | | | 0.173% | | | |
| Thermoplast Blue | 0.534 ppm | 0.374 ppm | 0.6 ppm | 0.5 ppm | 4.5 ppm | 4.58 ppm |
| Thermoplast Red | 0.019 ppm | 0.0133 ppm | 0.015 ppm | 0.012 ppm | 0.58 ppm | 0.58 ppm |
| Mineral Oil | | | 136 ppm | | | 65 ppm |
| Photochromic Dye Mixture | | | | | 470 ppm | 507 ppm |

TABLE 3

| Ingredient | Formula 7 | Formula 8 | Formula 9 | Formula 10 | Formula 11 | Formula 12 |
|---|---|---|---|---|---|---|
| Irgacure 819 | 531.2 ppm | 462 ppm | 565.9 ppm | 226 ppm | 443 ppm | 294 ppm |
| Irgacure 184 | 18.7 ppm | | | 144 ppm | | |
| CN 384 | 0.77% | 0.887% | 0.78% | 0.40% | 0.61% | |
| CN386 | 0.77% | 0.887% | 0.78% | 0.53% | 0.61% | |
| SR-348 | 72.4% | 70.36% | 58.20% | 41.5% | 88.70% | |
| SR-368 | 24.1% | 23.87% | 21.4% | 7.0% | | |
| SR-480 | | | | | | |
| CD-540 | | | 18.7% | 0.74% | | 97.76% |
| SR-399 | | | | 46.8% | | |
| SR-239 | 1.86% | 3.65% | 20.1% | | | 2.00% |
| SR-506 | | | | | 10.0% | |
| CR-73 | | | 20.1% | 2.9% | | |
| PRO-629 | 0.05% | | | | | |
| Tinuvin 770 | | | | | | |
| UV Absorber | | | | | | |
| Thermoplast Blue | 0.567 ppm | 3.62 ppm | 0.70 ppm | 0.255 ppm | 0.6 ppm | 4.3 ppm |
| Thermoplast Red | 0.0147 ppm | 0.576 ppm | 0.014 ppm | 0.006 ppm | 0.028 ppm | 0.24 ppm |
| Photochromic Dye Mixture | | 450 ppm | | | | |

TABLE 4

| Ingredient | Formula 13 | Formula 14 | Formula 15 | Formula 16 | Formula 17 | Formula 18 |
|---|---|---|---|---|---|---|
| Irgacure 819 | 760 ppm | 620 ppm | 289 ppm | | 105 ppm | 343 ppm |
| Irgacure 184 | | | | | | |
| CN 384 | | 0.73% | 0.34% | | | 0.475% |
| CN 386 | | 0.73% | 0.34% | 1.00% | 0.70% | 0.475% |
| 2-ITX | | | | | 188 ppm | 141 ppm |
| SR-348 | | | | 89.00% | 92.00% | 98.90% |
| SR-368 | | | | | | |
| SR-480 | | | | | | |
| CD-540 | 97.57% | 96.20% | 99.28% | | 0.34% | |
| SR-399 | | | | | | |
| SR-239 | 2.30% | 2.30% | 0.01% | | | |
| SR-506 | | | | | | |
| SR-444 | | | | | | |
| SR-454 | | | | 10.00% | 6.9% | |
| CR-73 | | | | | | |
| PRO-629 | | | | | | |
| Tinuvin 770 | | | | | | |
| UV Absorber | | | | | | 785 ppm |
| Thermoplast Blue | 4.9 ppm | 5.1 ppm | 0.508 ppm | | 0.35 ppm | 0.69 ppm |
| Thermoplast Red | 0.276 ppm | 0.285 ppm | 0.022 ppm | | 0.002 ppm | 0.034 ppm |
| Dioctyl-phthalate | | | | | | 125 ppm |
| Butyl stearate | | | | | | |
| Photochromic Dye Mixture | 499 ppm | | | | | |

TABLE 5

| Ingredient | Formula 19 | Formula 20 | Formula 21 | Formula 22 | Formula 23 | Formula 24 |
|---|---|---|---|---|---|---|
| Irgacure 819 | 490 ppm | 635 ppm | 610 ppm | 735 ppm | 320 ppm | 600 ppm |
| Irgacure 184 | | | | | | |
| CN 384 | 0.680% | 0.746% | 0.705% | 0.60% | | |
| CN 386 | 0.680% | 0.746% | 0.705% | 0.60% | | |
| 2-ITX | | | | | | |
| SR-348 | 69.30% | | | | | 68.60% |
| SR-368 | | | | | 74.0% | 22.10% |
| SR-480 | | | | | | |
| CD-540 | | 98.45% | 92.60% | 98.50% | 1.0% | 1.97% |
| SR-399 | | | | | | |
| SR-239 | | 0.01% | 3.86% | 0.16% | | |
| SR-506 | | | | 0.10% | | |
| SR-444 | 29.30% | | | | | |
| SR-454 | | | | | 25.0% | 7.40% |
| CR-73 | | | | | | |

TABLE 5-continued

| Ingredient | Formula 19 | Formula 20 | Formula 21 | Formula 22 | Formula 23 | Formula 24 |
|---|---|---|---|---|---|---|
| PRO-629 | | 0.007% | 2.06% | | | |
| Tinuvin 770 | | | | | | |
| UV Absorber | | | | | | |
| Thermoplast Blue | 0.37 ppm | 0.507 ppm | 3.07 ppm | 4.3 ppm | 0.15 ppm | 0.29 ppm |
| Thermoplast Red | 0.013 ppm | 0.0126 ppm | 0.336 ppm | 0.41 ppm | 0.006 ppm | 0.012 ppm |
| Dioctyl-phthalate | | | | | | |
| Butyl stearate | | | | | | |
| Photochromic Dye Mixture | | | 442 ppm | 497 ppm | | |

TABLE 6

| Ingredient | Formula 25 | Formula 26 | Formula 27 | Formula 28 | Formula 29 | Formula 30 | Formula 31 |
|---|---|---|---|---|---|---|---|
| Irgacure 819 | 650 ppm | 464 ppm | 557 ppm | 448 ppm | 460 ppm | | |
| Irgacure 184 | | | | | | | 300 ppm |
| CN 384 | 0.650% | 0.70% | | | | | |
| CN 386 | 0.650% | 0.70% | | | | | |
| 2-ITX | | | | | | 600 ppm | 120 ppm |
| SR-348 | | 39.10% | | | | | |
| SR-368 | | 13.00% | | 19.60% | 20.70% | | |
| SR-480 | | | | | 10.70% | | |
| CD-540 | 88.96% | 41.90% | 1.60% | 1.30% | | 99.94% | 99.96% |
| SR-399 | | | | | | | |
| SR-239 | | | | | | | |
| SR-506 | | | 98.30% | 79.00% | 67.24% | | |
| SR-444 | 9.70% | 4.60% | | | | | |
| SR-454 | | | | | | | |
| CR-73 | | | | | | | |
| PRO-629 | | | | | | | |
| Tinuvin 770 | | | | | | | |
| UV Absorber | | | | | | | |
| Thermoplast Blue | 0.566 ppm | 0.52 ppm | 0.24 ppm | 0.19 ppm | 0.467 ppm | | |
| Thermoplast Red | 0.02 ppm | 0.013 ppm | 0.01 ppm | 0.008 ppm | 0.024 ppm | | |
| Dioctyl-phthalate | | | | | | | |
| Butyl stearate | 75 ppm | 35 ppm | | | | | |
| Photochromic Dye Mixture | | | | | | | |

In one embodiment, plastic lenses may be formed by disposing a mid-index lens forming composition into the mold cavity of a mold assembly and irradiating the mold assembly with activating light. Coating materials may be applied to the mold members prior to filling the mold cavity with the lens forming composition.

After filing the mold cavity of the mold assembly the mold assembly is preferably placed in the lens curing unit and subjected to activating light. Preferably, actinic light is used to irradiate the mold assembly. A clear polycarbonate plate may be placed between the mold assembly and the activating light source. The polycarbonate plate preferably isolates the mold assembly from the lamp chamber, thus preventing airflow from the lamp cooling fans from interacting with the mold assemblies. The activating light source may be configured to deliver from about 0.1 to about 10 milliwatts/cm2 to at least one non-casting face, preferably both non-casting faces, of the mold assembly. Depending on the components of the lens forming composition used the intensity of activating light used may be <1 milliwatt/cm$^2$. The intensity of incident light at the plane of the lens curing unit drawer is measured using an International Light IL-1400 radiometer equipped with an XRL140A detector head. This particular radiometer preferably has a peak detection wavelength at about 400 nm, with a detection range from about 310 nm to about 495 nm. The International Light IL-1400 radiometer and the XRL140A detector head are both commercially available International Light, Incorporated of Newburyport, Mass.

After the mold assembly is placed within the lens curing unit, the mold assemblies are preferably irradiated with activating light continuously for 30 seconds to thirty minutes, more preferably from one minute to five minutes. Preferably, the mold assemblies irradiated in the absence of a cooling air stream. After irradiation, the mold assemblies were removed from the lens curing unit and the formed lens demolded. The lenses may be subjected to a post-cure treatment in the post-cure unit.

In general, it was found that the use of a photoinitiator (e.g., IRG-819 and IRG-184) in the lens forming composition produces lenses with better characteristics than lens formed using a co-initiator only. For example, formula 15, described in the Table 4, includes a monomer composition (a mixture of SR-348 and SR-454) and a co-initiator (CN-386). When this lens forming composition was exposed to activating light for 15 min. there was no significant reaction or gel formation. It is believed that the co-initiator requires an initiating species in order to catalyze curing of the monomer composition. Typically this initiating species is produced from the reaction of the photoinitiator with activating light.

A variety of photoinitiators and photoinitiators combined with co-initiators may be used to initiate polymerization of the monomer composition. One initiator system which may be used includes photoinitiators IRG-819 and 2-ITX and a co-initiator, see Formulas 17–18. Such a system is highly efficient at initiating polymerization reactions. The efficiency of a polymerization catalyst is a measurement of the amount of photoinitiator required to initiate a polymerization reaction. A relatively small amount of an efficient photoinitiator may be required to catalyze a polymerization reaction, whereas a greater amount of a less efficient photoinitiator may be required to catalyze the polymerization reaction. The IRG-819/2-ITX/co-initiator system may be used to cure lenses forming compositions which include a UV absorbing compound. This initiator system may also be used to form colored lenses.

An initiator system that is less efficient than the IRG-819/2-ITX/co-initiator system includes a mixture of the photoinitiators IRG-819 and 2-ITX, see Formula 31. This system is less efficient at initiating polymerization of lens forming compositions than the IRG-819/2-ITX/co-initiator system. The IRG-819/2-ITX system may be used to cure very reactive monomer compositions. An initiator system having a similar efficiency to the IRG-819/2-ITX system includes a mixture of IRG-819 and co-initiator, see Formulas 1–6, 8–9, 11, 14–15, 19–22, and 25–26. The IRG-819/co-initiator system may be used to cure clear lenses which do not include a UV blocking compound and photochromic lens forming compositions.

Another initiator system which may be used includes the photoinitiator 2-ITX and a co-initiator. This initiator system is much less efficient at initiating polymerization reactions than the IRG-819/co-initiator system. The 2-ITX/co-initiator system is preferably used for curing monomer compositions which include highly reactive monomers.

The use of the above described mid-index lens forming compositions may minimize or eliminate a number of problems associated with activating light curing of lenses. One problem typical of curing eyeglass lenses with activating light is pre-release. Pre-release may be caused by a number of factors. If the adhesion between the mold faces and the shrinking lens forming composition is not sufficient, pre-release may occur. The propensity of a lens forming composition to adhere to the mold face, in combination with its shrinkage, determine how the process variables are controlled to avoid pre-release. Adhesion is affected by such factors as geometry of the mold face (e.g., high-add flat-top bifocals tend to release because of the sharp change in cavity height at the segment line), the temperature of the mold assembly, and the characteristics of the in-mold coating material. The process variables which are typically varied to control pre-release include the application of cooling fluid to remove exothermic heat, controlling the rate of heat generation by manipulating the intensities and timing of the activating radiation, providing differential light distribution across the thin or thick sections of the mold cavity manipulating the thickness of the molds, and providing in-mold coatings which enhance adhesion. An advantage of the above described mid-index lens forming compositions is that the composition appears to have enhanced adhesion characteristics. This may allow acceptable lenses to be produced over a greater variety of curing conditions. Another advantage is that higher diopter lenses may be produced at relatively low pre-release rates, broadening the achievable prescription range.

Another advantage of the above described mid-index lens forming compositions is that they tend to minimize problems associated with dripping during low intensity curing of lenses (e.g., in the 1 to 6 milliwatt range). Typically, during the irradiation of the lens forming composition with activating light, small amounts of monomer may be squeezed out of the cavity and run onto the non-casting faces of the molds. Alternatively, during filling of the mold assembly with the lens forming composition, a portion of the lens forming composition may drip onto the non-casting faces of the mold assembly. This "dripping" onto the non-casting faces of the mold assembly tends to cause the activating light to focus more strongly in the regions of the cavity located underneath the drippings. This focusing of the activating light may affect the rate of curing. If the rate of curing underneath the drippings varies significantly from the rate of curing throughout the rest of the lens forming composition, optical distortions may be created in the regions below the drippings.

It is believed that differences in the rate of gelation between the center and the edge regions of the lens forming composition may cause dripping to occur. During the curing of a lens forming composition, the material within the mold cavity tends to swell slightly during the gel phase of the curing process. If there is enough residual monomer around the gasket lip, this liquid will tend to be forced out of the cavity and onto the non-casting faces of the mold. This problem tends to be minimized when the lens forming composition undergoes fast, uniform gelation. Typically, a fast uniform gelation of the lens forming composition may be achieved by manipulating the timing, intensities, and distribution of the activating radiation. The above described mid-index lens forming compositions, however, tend to gel quickly and uniformly under a variety of curing conditions, thus minimizing the problems caused by dripping.

Another advantage of the above described mid-index lens forming compositions is that the compositions tend to undergo uniform curing under a variety of curing conditions. This uniform curing tends to minimize optical aberrations within the formed lens. This is especially evident during the formation of high plus power flattop lenses which tend to exhibit optical distortions after the lens forming composition is cured. It is believed that the activating radiation may be reflected off of the segment line and create local differences in the rate of gelation in the regions of the lens forming composition that the reflected light reaches. The above described mid-index lens forming compositions tend to show less optical distortions caused by variations of the intensity of activating radiation throughout the composition.

Other advantages include drier edges and increased rigidity of the formed lens. An advantage of drier edges is that the contamination of the optical faces of the lens by uncured or partially cured lens forming composition is minimized.

In an embodiment, a lens forming composition may be cured into a variety of different lenses. The lens forming composition includes an aromatic containing polyether polyethylenic functional monomer, a co-initiator composition configured to activate curing of the monomer, and a photoinitiator configured to activate the co-initiator composition in response to being exposed to activating light. The lens forming composition may include other components such as ultraviolet light absorbers and photochromic compounds. Lenses which may be cured using the lens forming composition include, but are not limited to, spheric single vision, aspheric single vision lenses, flattop bifocal lenses, and asymmetrical progressive lenses.

One lens forming composition includes a mixture of the following monomers.

| | |
|---|---|
| 98.25% | Ethoxylated$_{(4)}$bisphenol A dimethacrylate (CD-540) |
| 0.75% | Difunctional reactive amine coinitiator (CN-384) |
| 0.75% | Monofunctional reactive amine coinitiator (CN-386) |
| 0.15% | Phenyl bis(2,4,6-trimethylbenzoyl) phosphine oxide (Irgacure-819) |
| 0.10% | 2-(2H-Benzotriazol-2-yl)-4-(1,1,3,3-tetramethylbutyl)-phenol |
| 0.87 ppm | Thermoplast Blue 684 |
| 0.05 ppm | Thermoplast Red LB 454 |

Another lens forming composition includes a mixture of the following monomers. The presence of photochromic compounds in this composition allows the composition to be used to form photochromic lenses.

| | |
|---|---|
| 97.09% | Ethoxylated(4)bisphenol A dimethacrylate (CD-540) |
| 1.4% | Difunctional reactive amine coinitiator (CN-384) |
| 1.4% | Monofunctional reactive amine coinitiator (CN-386) |
| 0.09% | Phenyl bis(2,4,6-trimethylbenzoyl) phosphine oxide (Irgacure-819) |
| 0.9 ppm | Thermoplast Red LB 454 |
| 50 ppm | Variacrol Blue D |
| 73.5 ppm | Variacrol Yellow |
| 145 ppm | Berry Red |
| 29 ppm | Palatinate Purple |
| 55.5 ppm | Corn Yellow |
| 62 ppm | Sea Green |
| 85 ppm | Plum Red |

A lens forming composition which includes an aromatic containing polyether polyethylenic functional monomer, a co-initiator composition and a photoinitiator may be used to form a variety of prescription eyeglass lenses, including eyeglass lenses which have a sphere power ranging from about +4.0 diopter to about −6.0 diopter. The lenses formed from this lens forming composition are substantially free of distortions, cracks, patterns and striations, and that have negligible yellowing, in less than thirty minutes by exposing the lens forming composition to activating light and heat. An advantage of the lens forming composition is that it exhibits increased adhesion to the molds. This may reduce the incidence of premature release of the formed lens from the molds. Additionally, the use of adhesion promoting agents, typically applied to the molds to prevent premature release, may no longer be necessary.

The increased adhesion of the lens forming composition to the molds allows curing of the lens forming composition at higher temperatures. Typically, control of the temperature of the lens forming composition may be necessary to prevent premature release of the lens from the molds. Premature release may occur when the lens forming composition shrinks as it is cured. Shrinkage typically occurs when the lens forming composition is rapidly heated during curing. Lens forming compositions which include an aromatic containing polyether polyethylenic functional monomer, a co-initiator composition and a photoinitiator may reduce the incidence of premature release. The increased adhesion of this lens forming composition may allow higher curing temperatures to be used without increasing the incidence of premature release. It is also believed that this lens forming composition may exhibit less shrinkage during curing which may further reduce the chance of premature release.

An advantage of curing at higher temperatures is that an eyeglass lens having a high crosslink density may be formed. The crosslink density of an eyeglass lens is typically related to the curing temperature. Curing a lens forming composition at a relatively low temperature leads to a lower crosslink density than the crosslink density of a lens cured at a higher temperature. Lenses which have a higher crosslink density generally absorb tinting dyes substantially evenly without blotching or streaking. Lenses which have a high crosslink density also may exhibit reduced flexibility.

Methods of Forming Plastic Lenses

Plastic lenses may be formed by disposing a lens forming composition into the mold cavity of a mold assembly and irradiating the mold assembly with activating light. Coating materials may be applied to the mold members prior to filling the mold cavity with the lens forming composition. The lens may be treated in a post-cure unit after the lens-curing process is completed.

The operation of the above described system to provide plastic lenses involves a number of operations. These operations are preferably coordinated by the controller 50, which has been described above. After powering the system, an operator is preferably signaled by the controller to enter the prescription of the lens, the type of lens, and the type of coating materials for the lens. Based on these inputted values the controller will preferably indicate to the operator which molds and gaskets will be required to form the particular lens.

The formation of lenses involves: 1) preparing the mold assembly; 2) filling the mold assembly with the lens forming composition; 3) curing the lens; 4) post-curing the lens; and 5) annealing the lens. Optionally, the lens may be coated before use. The formation of lenses may be accomplished using the plastic lens curing apparatus described above.

The preparation of a mold assembly includes selecting the appropriate front and back molds for a desired prescription and lens type, cleaning the molds, and assembling the molds to form the mold assembly. The prescription of the lens determines which front mold, back mold, and gasket are used to prepare the mold assembly. In one embodiment, a chart which includes all of the possible lens prescriptions may be used to allow a user to determine the appropriate molds and gaskets. Such a chart may include thousands of entries, making the determination of the appropriate molds and gaskets somewhat time consuming.

In an embodiment, the controller 50 of the plastic lens curing apparatus 10 (see FIG. 1) will display the appropriate front mold, back mold, and gasket identification markings when a prescription is submitted to the controller. The controller will prompt the user to enter the 1) the monomer type; 2) the lens type; 3) spherical power; 4) cylindrical power; 5) axis; 6) add power, and 7) the lens location (i.e., right or left lens). Once this information is entered, the computer will determine the correct front mold, back mold and gasket to be used. The controller may also allow a user to save and recall prescription data.

Figure 17:
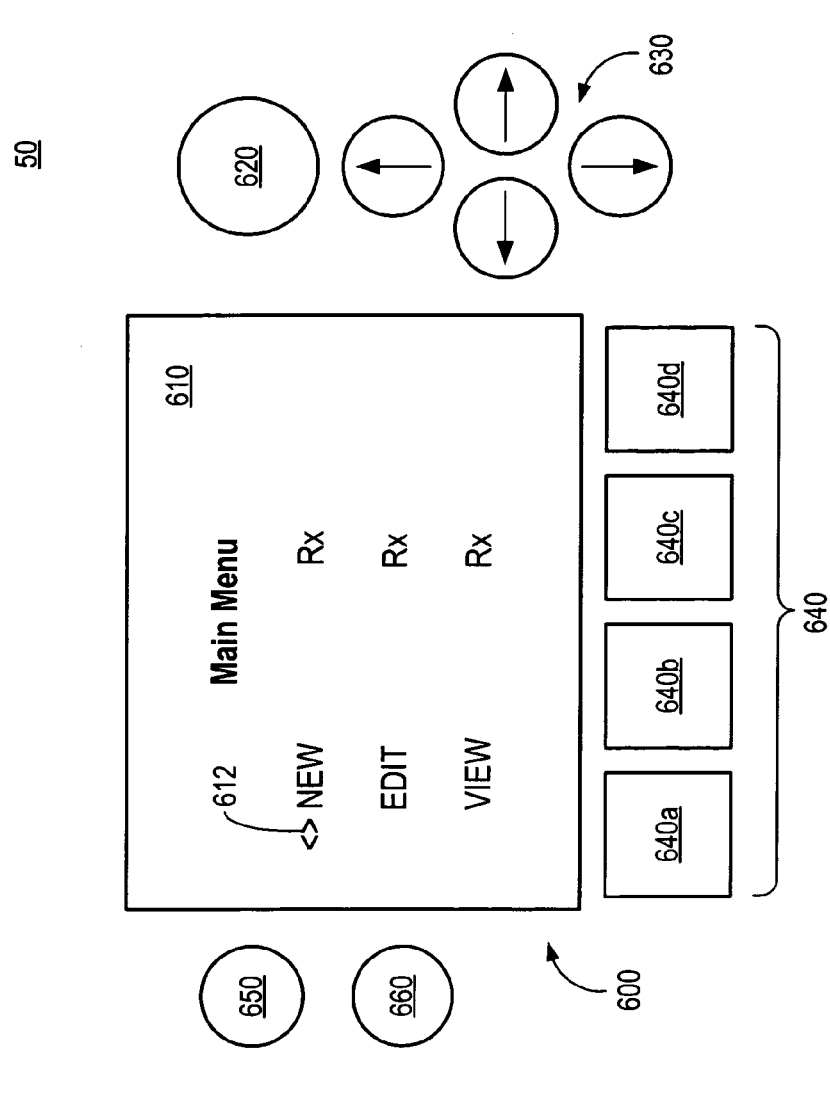
FIGS. 17–19 depict a front panel of a controller with a display screen depicting various display menus.

FIG. 17 shows an embodiment of a front panel for the controller 50. The controller includes an output device 610 and at least one input device. A variety of input devices may be used. Some input devices include pressure sensitive devices (e.g., buttons), movable data entry devices (e.g., rotatable knobs, a mouse, a trackball, or moving switches), voice data entry devices (e.g., a microphone), light pens, or a computer coupled to the controller. Preferably, the input devices include buttons 630, 640, 650 and 660 and a selection knob 620. The display panel preferably displays the controller data requests and responses. The output device may be a cathode ray tube, an LCD panel, or a plasma display screen.

When initially powered, the controller will preferably display a main menu, such as the menu depicted in FIG. 17.

If the main menu is not displayed, a user may access the main menu by pressing button 650, which may be labeled Main Menu. In response to activating the Main Menu button 650, the controller will cause the main menu screen to be displayed. As depicted in FIG. 17, a display screen offers a number of initial options on the opening menu. The options may include 1) NEW Rx; 2) EDIT Rx; and 3) VIEW Rx. The main menu may also offer other options which allow the operator to access machine status information and instrument setup menus. The scrolling buttons 630 preferably allow the user to navigate through the options by moving a cursor 612 which appears on the display screen to the appropriate selection. Selection knob 620 is preferably configured to be rotatable to allow selection of options on the display screen. Knob 620 is also configured to allow entry of these items. In one embodiment, selection knob 620 may be depressed to allow data entry. That is, when the appropriate selection is made, the knob may be pushed down to enter the selected data. In the main menu, when the cursor 612 is moved to the appropriate selection, the selection may be made by depressing the selection knob 620.

Figure 18:
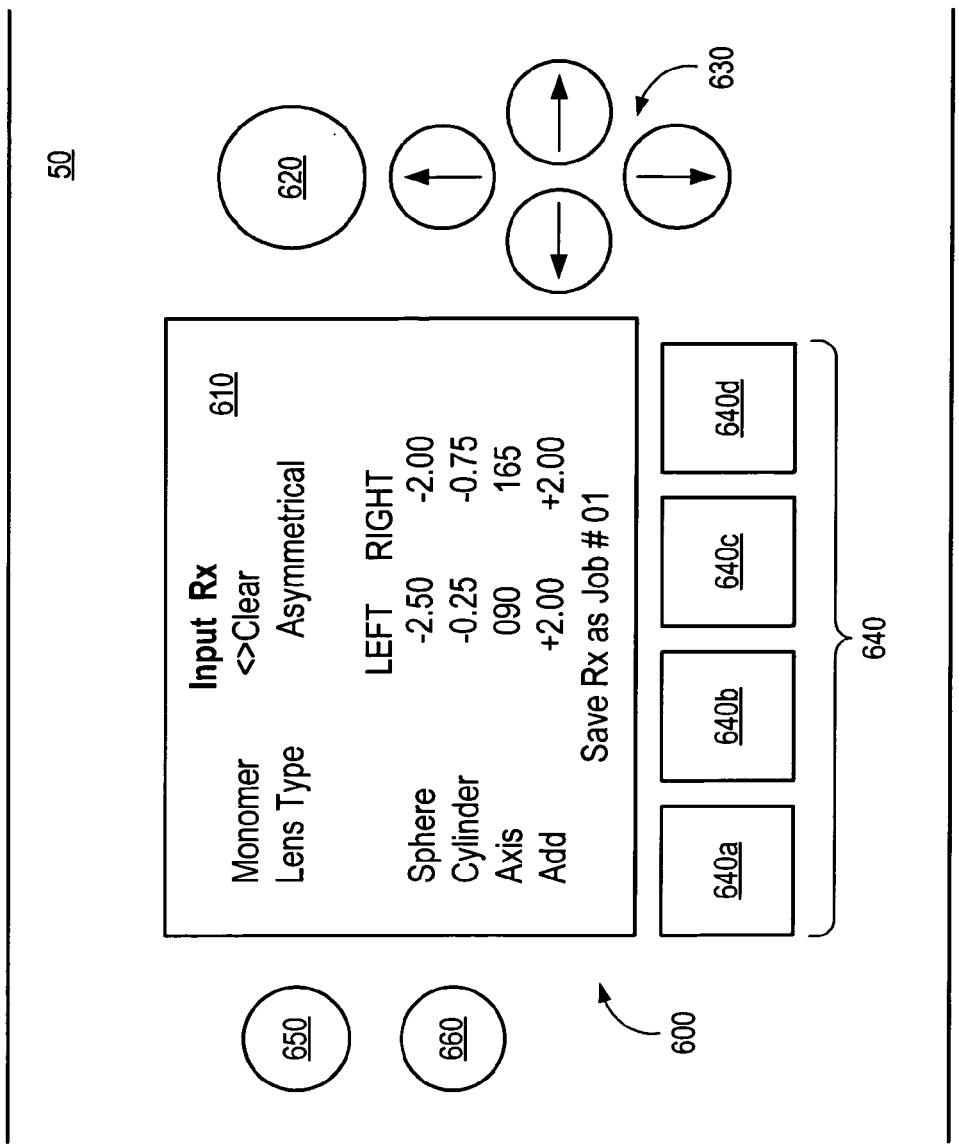

Selection of the NEW Rx menu item will cause the display screen to change to a prescription input menu, depicted in FIG. 18. The prescription input menu will preferably allow the user to enter data pertaining to a new lens type. The default starting position will be the lens monomer selection box. Once the area is highlighted, the selection knob 620 is rotated to make a choice among the predetermined selections. When the proper selection is displayed, the selection knob may be pushed down to enter the selection. Entry of the selection may also cause the cursor to move to the next item on the list. Alternatively, a user may select the next item to be entered using the scrolling arrows 630.

Each of the menu items allows entry of a portion of the lens prescription. The lens prescription information includes 1) the monomer type; 2) the lens type; 3) lens location (i.e., left lens or right lens); 4) spherical power; 5) cylindrical power; 6) axis; and 7) add power. The monomer selection may include choices for either clear or photochromic lenses. The lens type item may allow selection between spheric single vision, aspheric single vision lenses, flattop bifocal lenses, and asymmetrical progressive lenses. The sphere item allows the sphere power of the lens to be entered. The cylinder item allows the cylinder power to be entered. The axis item allows the cylinder axis to be entered. The add item allows the add power for multifocal prescriptions to be added. Since the sphere power, cylinder power, cylinder axis, and add power may differ for each eye, and since the molds and gaskets may be specific for the location of the lens (i.e., right lens or left lens), the controller preferably allows separate entries for right and left lenses. If an error is made in any of the entry fields, the scrolling arrows 630 preferably allow the user to move the cursor to the incorrect entry for correction.

After the data relating to the prescription has been added, the controller may prompt the user to enter a job number to save the prescription type. This preferably allows the user to recall a prescription type without having to renter the data. The job number may also be used by the controller to control the curing conditions for the lens. The curing conditions typically vary depending on the type and prescription of the lens. By allowing the controller access to the prescription and type of lens being formed, the controller may automatically set up the curing conditions without further input from the user.

Figure 19:
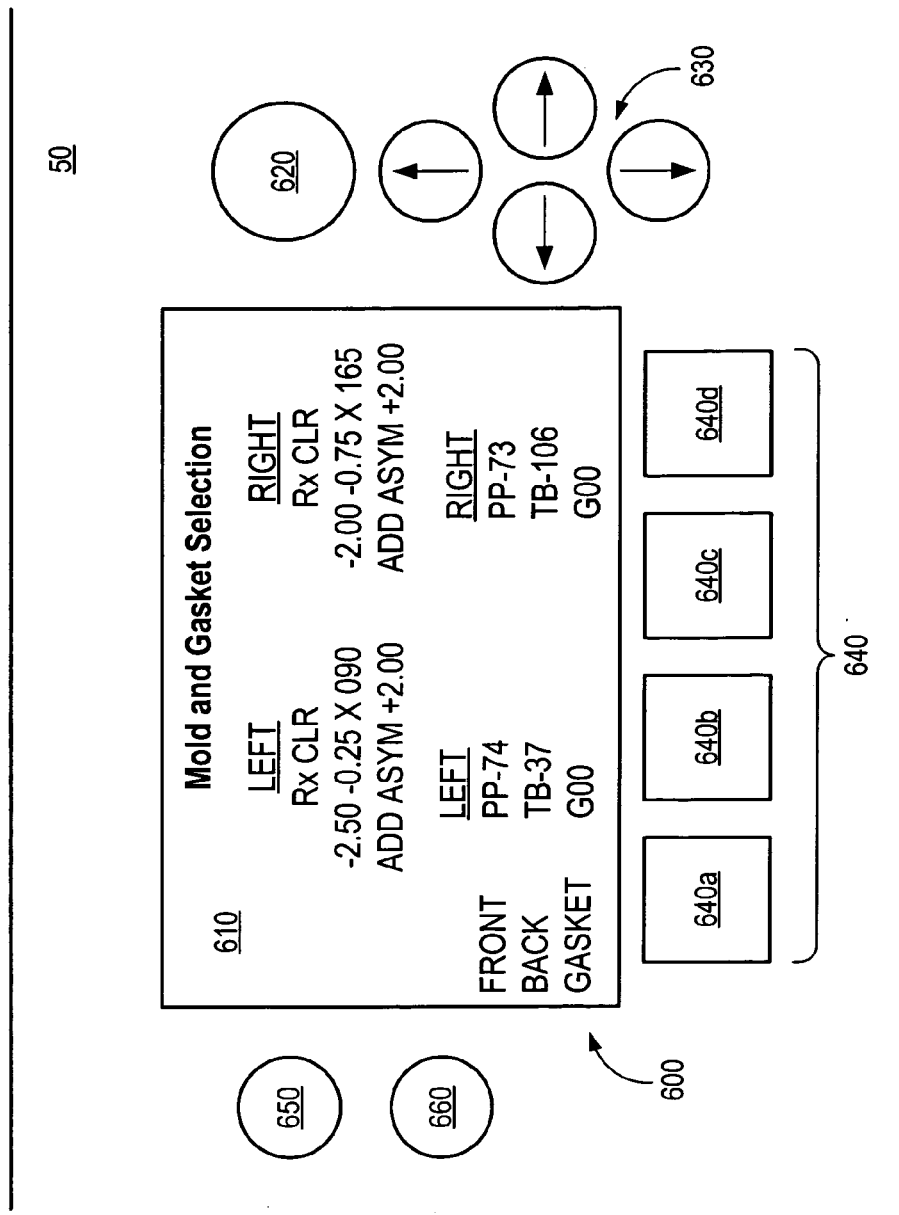

After the job is saved, the display screen will preferably display information which allows the user to select the appropriate front mold, back mold and gasket for preparing the lens, as depicted in FIG. 19. This information is preferably generated by the use of a stored database which correlates the inputted data to the appropriate lenses and gasket. The prescription information is also summarized to allow the user to check that the prescription has been entered correctly. The mold and gasket information may be printed out for the user. A printer may be incorporated into the controller to allow print out of this data. Alternatively, a communication port may be incorporated into the controller to allow the data to be transferred to a printer or personal computer. Each of the molds and gaskets has a predetermined identification marking. Preferably, the identification markings are alphanumeric sequences. The identification markings for the molds and gasket preferably correspond to alphanumeric sequences for a library of mold members. The user, having obtained the mold and gasket identification markings, may then go to the library and select the appropriate molds and gaskets.

The controller is preferably configured to run a computer software program which, upon input of the eyeglass prescription, will supply the identification markings of the appropriate front mold, back mold and gasket. The computer program includes a plurality of instructions configured to allow the controller to collect the prescription information, determine the appropriate front mold, back mold, and gasket required to a form a lens having the inputted prescription, and display the appropriate identification markings for the front mold, back mold and gasket. In one embodiment, the computer program may include an information database. The information database may include a multidimensional array of records. Each record may include data fields corresponding to identification markings for the front mold, the back mold, and the gasket. When the prescription data is entered, the computer program is configured to look up the record corresponding to the entered prescription. The information from this record may be transmitted to the user, allowing the user to select the appropriate molds and gasket.

In one embodiment the information database may be a three dimensional array of records. An example of a portion of a three dimensional array of records is depicted in Table 7. The three dimensional array includes array variables of sphere, cylinder, and add. A record of the three dimensional array includes a list of identification markings. Preferably, this list includes identification markings for a front mold (for either a left or right lens), a back mold and a gasket. When a prescription is entered, the program includes instructions which take the cylinder, sphere and add information and look up the record which is associated with that information. The program obtains from the record the desired information and transmits the information to the user. For example, if a prescription for left lens having a sphere power of +1.00, a cylinder power of −0.75 and an add power of 2.75 is entered, the front mold identification marking will be FT-34, the back mold identification marking will be TB-101, and the gasket identification marking will be G25. These values will be transmitted to the user via an output device. The output device may include a display screen or a printer. It should be understood that the examples shown in Table 7 represent a small portion of the entire database. The sphere power may range from +4.00 to −4.00 in 0.25 diopter increments, the cylinder power may range from 0.00 diopters to −2.00 diopters in 0.25 diopter increments, and the add power may range from +1.00 to +3.00 in 0.25 diopter increments.

TABLE 7

| ARRAY VARIABLES | | | IDENTIFICATION MARKINGS | | | |
|---|---|---|---|---|---|---|
| Sphere | Cylinder | Add | Front (Right) | Front (Left) | Back | Gasket |
| +1.00 | −0.75 | +1.25 | FT-21 | FT-22 | TB-101 | G25 |
| +1.00 | −0.75 | +1.50 | FT-23 | FT-24 | TB-101 | G25 |
| +1.00 | −0.75 | +1.75 | FT-25 | FT-26 | TB-101 | G25 |
| +1.00 | −0.75 | +2.00 | FT-27 | FT-28 | TB-101 | G25 |
| +1.00 | −0.75 | +2.25 | FT-29 | FT-30 | TB-101 | G25 |
| +1.00 | −0.75 | +2.50 | FT-31 | FT-32 | TB-101 | G25 |
| +1.00 | −0.75 | +2.75 | FT-33 | FT-34 | TB-101 | G25 |
| +1.00 | −0.75 | +3.00 | FT-35 | FT-36 | TB-101 | G25 |
| +0.75 | −0.75 | +1.00 | FT-19 | FT-20 | TB-102 | G25 |
| +0.75 | −0.75 | +1.25 | FT-21 | FT-22 | TB-102 | G25 |
| +0.75 | −0.75 | +1.50 | FT-23 | FT-24 | TB-102 | G25 |
| +0.75 | −0.75 | +1.75 | FT-25 | FT-26 | TB-102 | G25 |
| +0.75 | −0.75 | +2.00 | FT-27 | FT-28 | TB-102 | G25 |
| +0.75 | −0.75 | +2.25 | FT-29 | FT-30 | TB-102 | G25 |
| +0.75 | −0.75 | +2.50 | FT-31 | FT-32 | TB-102 | G25 |
| +0.75 | −0.75 | +2.75 | FT-33 | FT-34 | TB-102 | G25 |
| +0.75 | −0.75 | +3.00 | FT-35 | FT-36 | TB-102 | G25 |
| +0.50 | −0.75 | +1.00 | FT-19 | FT-20 | TB-103 | G25 |
| +0.50 | −0.75 | +1.25 | FT-21 | FT-22 | TB-103 | G25 |

A second information database may include information related to curing the lens forming composition based on the prescription variables. Each record may include information related to curing clear lenses (i.e., non-photochromic lenses) and photochromic lenses. The curing information may include filter information, initial curing dose information, postcure time and conditions, and anneal time. An example of a portion of this database is depicted in Table 8. Curing conditions typically depend on the sphere power of a lens, the type of lens being formed (photochromic or non-photochromic), and whether the lens will be tinted or not. Curing information includes type of filter being used, initial dose conditions, postcure time, and anneal time. A filter with a 50 mm aperture (denoted as "50 mm") or a clear plate filter (denoted as "clear") may be used. Initial dose is typically in seconds, with the irradiation pattern (e.g., top and bottom, bottom only) being also designated. The postcure time represents the amount of time the mold assembly is treated with activating light and heat in the postcure unit. The anneal time represents the amount of time the demolded lens is treated with heat after the lens is removed from the mold assembly. While this second database is depicted as a separate database, the database may be incorporated into the mold and gasket database by adding the lens curing information to each of the appropriate records.

The controller may also be configured to warn the user if the lens power is beyond the range of the system or if their mold package does not contain the necessary molds to make the desired lens. In these cases, the user may be asked to check the prescription information to ensure that the proper prescription was entered.

The controller may also be used to control the operation of the various components of the plastic lens curing apparatus. A series of input devices 640 may allow the operation of the various components of the system. The input devices may be configured to cause the commencement of the lens coating process (640a), the cure process (640b), the postcure process (640c), and the anneal process (640d).

In an embodiment, activating any of the input devices 640 may cause a screen to appear requesting a job number corresponding to the type of lenses being formed. The last job used may appear as a default entry. The user may change the displayed job number by cycling through the saved jobs. When the proper job is displayed the user may enter the job by depressing the selection knob.

TABLE 8

| LENS INFORMATION | | | | CURING INFORMATION | | |
|---|---|---|---|---|---|---|
| Sphere | Lens Type | Tinted | Filter | Initial Dose | Postcure Time | Anneal Time |
| +2.25 | Clear | No | 50 mm | 90 Sec. Top and Bottom | 13 Min. | 7 Min. |
| +2.25 | Clear | Yes | 50 mm | 90 Sec. Top and Bottom | 15 Min. | 7 Min. |
| +2.25 | Photo-chromic | No | 50 mm | 90 Sec. Top and Bottom | 13 Min. | 7 Min. |
| +2.00 | Clear | No | Clear | 7 Sec. Bottom | 13 Min. | 7 Min. |
| +2.00 | Clear | Yes | Clear | 7 Sec. Bottom | 15 Min. | 7 Min. |
| +2.00 | Photo-chromic | No | Clear | 15 Sec. Bottom | 13 Min. | 7 Min. |

After the job has been entered, the system will be ready to commence the selected function. Activating the same input device again (e.g., depressing the button) will cause the system to commence the selected function. For example, pressing the cure button a second time may cause a preprogrammed cure cycle to begin. After the selected function is complete, the display screen may display a prompt informing the user that the action is finished.

The controller may be configured to prevent the user from using curing cycles other than those that have been prescribed by the programmer of the controller. After a prescription is entered, the job enters the work stream where the controller allows only the prescribed curing conditions. Timers (set by the algorithm picked at prescription input) may run constantly during the lens cycle to monitor doses and deliver both audible and visible prompts to the user of at times of transition in the process. The system tracks job completion and status and gives visual representation of job status in the view job screen. Boxes at the bottom of the screen are checked as the necessary steps are competed. In sensitive parts of the lens cycle, no deviation from the established method is allowed. Operator discretion is allowed when the process is not time critical. The software warns the user during procedures that will interrupt jobs during their execution, erase jobs that are not finished, rerun jobs that are not finished, etc.

The system may be configured to prevent a new cure cycle from being started until the previous job's cure is finished. This "gatekeeper" function ensures post cure chamber availability during time sensitive transitions. When the cure stage is finished, both audible and visual prompts instruct the user to place the cavities in the post cure area.

The main menu may also include selections allowing a saved job to be edited. Returning to the main menu screen, depicted in FIG. 17, selecting the edit menu item will cause an interactive screen to be displayed similar to the input screen. This will allow a user to change the prescription of a preexisting job. The view menu item will allow a user to view the prescription information and mold/gasket selection information from an existing job.

Once the desired mold and gasket information has been obtained, the proper molds and gasket are selected from a collection of molds and gaskets. The molds may be placed into the gasket to create a mold assembly. Prior to placing the molds in the gasket, the molds are preferably cleaned. The inner surface (i.e., casting surface) of the mold members may be cleaned on a spin coating unit 20 by spraying the mold members with a cleaning solution while spinning the mold members. Examples of cleaning solutions include methanol, ethanol, isopropyl alcohol, acetone, methyl ethyl ketone, or a water based detergent cleaner. Preferably, a cleaning solution which includes isopropyl alcohol is used to clean the mold members. As the mold member is contacted with the cleaning solution, dust and dirt may be removed and transferred into the underlying dish 115 of the curing unit. After a sufficient amount of cleaning solution has been applied, the mold members may be dried by continued spinning without the application of cleaning solution.

In an embodiment, the inner surface, i.e., the casting face, of the front mold member may be coated with one or more hardcoat layers before the lens forming composition is placed within the mold cavity. Preferably, two hardcoat layers are used so that any imperfections, such as pin holes in the first hardcoat layer, are covered by the second hardcoat layer. The resulting double hardcoat layer is preferably scratch resistant and protects the subsequently formed eyeglass lens to which the double hardcoat layer adheres. The hardcoat layers are preferably applied using a spin coating unit 20. The mold member is preferably placed in the spin coating unit and the coating material applied to the mold while spinning at high speeds (e.g., between about 900 to 1000 RPM). After a sufficient amount of coating material has been applied, the coating material may be cured by the activating light source disposed in the cover. The cover is preferably closed and activating light is preferably applied to the mold member while the mold member is spinning at relatively low speeds (e.g., between about 150 to 250 RPM). Preferably control of the spinning and the application of activating light is performed by controller 50. Controller 50 is preferably configured to prompt the operator to place the mold members on the coating unit, apply the coating material to the mold member, and close the cover to initiate curing of the coating material.

In an embodiment, the eyeglass lens that is formed may be coated with a hydrophobic layer, e.g. a hardcoat layer. The hydrophobic layer preferably extends the life of the photochromic pigments near the surfaces of the lens by preventing water and oxygen molecules from degrading the photochromic pigments.

In a preferred embodiment, both mold members may be coated with a cured adhesion-promoting composition prior to placing the lens forming composition into the mold cavity. Providing the mold members with such an adhesion-promoting composition is preferred to increase the adhesion between the casting surface of the mold and the lens forming composition. The adhesion-promoting composition thus reduces the possibility of premature release of the lens from the mold. Further, it is believed that such a coating also provides an oxygen and moisture barrier on the lens which serves to protect the photochromic pigments near the surface of the lens from oxygen and moisture degradation. Yet further, the coating provides abrasion resistance, chemical resistance, and improved cosmetics to the finished lens.

In an embodiment, the casting face of the back mold member may be coated with a material that is capable of being tinted with dye prior to filling the mold cavity with the lens forming composition. This tintable coat preferably adheres to the lens forming composition so that dyes may later be added to the resulting eyeglass lens for tinting the lens. The tintable coat may be applied using the spin coating unit as described above.

The clean molds are placed on the gasket to form a mold assembly. The front mold is preferably placed on the gasket first. For single vision prescriptions, the front mold does not have to be placed in any particular alignment. For flat-top bifocal or progressive front molds, the molds are preferably aligned with alignment marks positioned on the gasket. Once the front mold has been placed into the gasket, the back mold is placed onto the gasket. If the prescription calls for cylinder power, the back mold must be aligned with respect to the front mold. If the prescription is spherical (e.g., the lens has no cylinder power), the back mold may be placed into the gasket without any special alignment. Once assembled the mold assembly will be ready for filling.

The controller may prompt the user to obtain the appropriate lens forming composition. In one embodiment, the controller will inform the user of which chemicals and the amounts of each chemical that is required to prepare the lens forming composition. Alternatively, the lens forming compositions may be preformed. In this case the controller may indicate to the operator which of the preformed lens forming compositions should be used.

In an embodiment, dyes may be added to the lens forming composition. It is believed that certain dyes may be used to attack and encapsulate ambient oxygen so that the oxygen may be inhibited from reacting with free radicals formed during the curing process. Also, dyes may be added to the composition to alter the color of an unactivated photochromic lens. For instance, a yellow color that sometimes results after a lens is formed may be "hidden" if a blue-red or blue-pink dye is present in the lens forming composition. The unactivated color of a photochromic lens may also be adjusted by the addition of non-photochromic pigments to the lens forming composition.

In a preferred technique for filling the lens molding cavity 382, the annular gasket 380 is placed on a concave or front mold member 392 and a convex or back mold member 390 is moved into place. The annular gasket 380 is preferably pulled away from the edge of the back mold member 390 at the uppermost point and a lens forming composition is preferably injected into the lens molding cavity 382 until a small amount of the lens forming composition is forced out around the edge. The excess is then removed, preferably, by vacuum. Excess liquid that is not removed could spill over the face of the back mold member 390 and cause optical distortion in the finished lens.

The lens forming composition is typically stored at temperatures below about 100° F. At these temperatures, however, the lens forming composition may be relatively viscous. The viscosity of the solution may make it difficult to fill a mold cavity without creating bubbles within the lens forming composition. The presence of bubbles in the lens forming composition may cause defects in the cured eyeglass lens. To reduce the viscosity of the solution, and therefore reduce the incidence of air bubbles during filling of the mold cavity, the lens forming composition may be heated prior to filling the mold cavity. In an embodiment, the lens forming composition may be heated to a temperature of about 70° F. to about 220° F., preferably from about 130° F. to about 170° F. prior to filing the mold cavity. Preferably, the lens forming composition is heated to a temperature of about 150° F. prior to filling the mold cavity.

Figure 20:
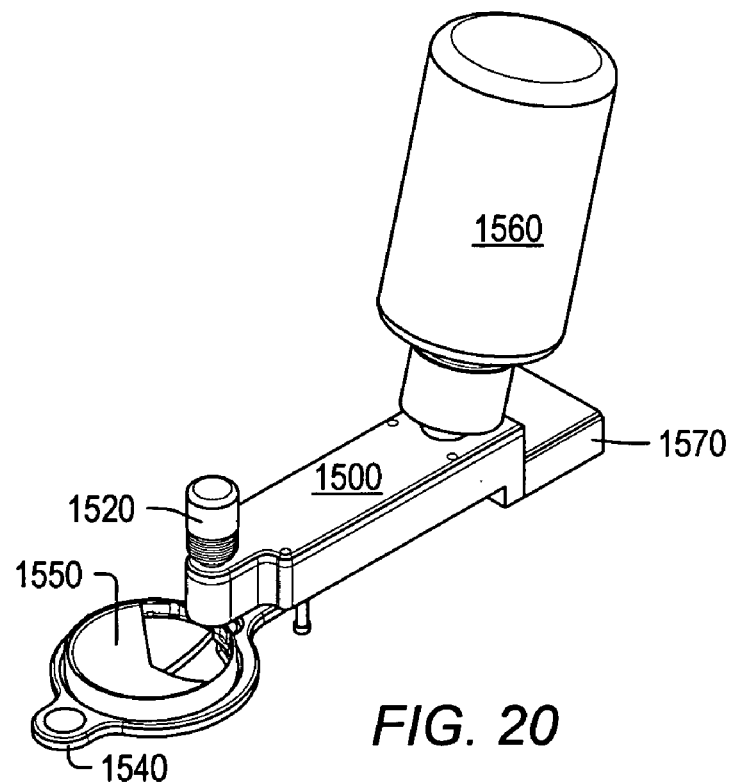
FIG. 20 depicts an isometric view of a heated polymerizable lens forming composition dispensing system.
Figure 21:
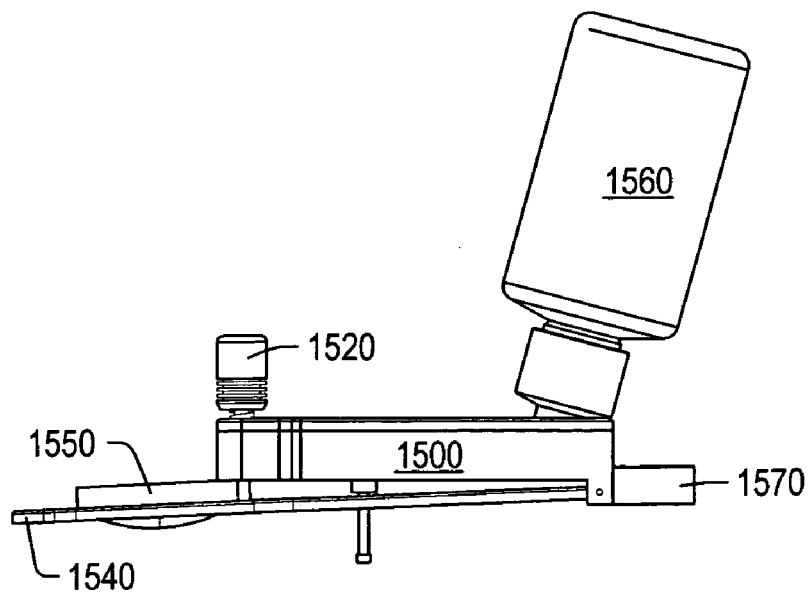
FIG. 21 depicts a side view of a heated polymerizable lens forming composition dispensing system.

The lens forming composition may be heated by using an electric heater, an infrared heating system, a hot air system, a hot water system, or a microwave heating system. Preferably, the lens forming composition is heated in a monomer heating system, such as depicted in FIGS. 20 and 21. FIG. 20 depicts an isometric view of the monomer heating system and FIG. 21 depicts a side view of the monomer heating system depicted in FIG. 20. The monomer heating system includes a body 1500 configured to hold the lens forming composition and a valve 1520 for transferring the heated lens forming composition from the body to a mold assembly. The monomer heating system may also include a mold assembly support 1540 for holding a mold assembly 1550 proximate the valve. The monomer heating system may also include an opening for receiving a container 1560 that holds a monomer composition.

FIG. 22 depicts a cross sectional view of the monomer heating system. The body includes a bottom 1502 and top 1504. The top of the body 1504 may include an opening 1506 sized to allow a fluid container 1560 to be inserted within the opening. The opening may be sized such that the bottle rests at an angle when placed in the opening, as depicted in FIG. 22. In some embodiments, the angle of the bottle may be between about 5 and about 45 degrees. In one embodiment, the opening is sized to receive a cap 1562 of a fluid container 1560. The cap 1562 and the opening 1506 may be sized to allow the cap to be easily inserted through the opening. If all of the fluid in the fluid container 1562 will fit in the body 1500 of the monomer heating system, the cap 1562 may be removed and the bottle placed in the opening. The fluid container 1560 may be left until all of the fluid has been emptied into the body 1500. The fluid container 1560 may be removed or left in the opening after the monomer has emptied into the body 1500.

In another embodiment, the fluid container 1560 may include a self sealing cap 1562 coupled to the fluid container body 1569. A cross sectional view of the fluid container 1560 with a self sealing cap is depicted in FIG. 23. The self sealing cap 1562 may be configured to fit within the opening 1506 in the body. The self sealing cap 1562 may be couplable to the fluid container body 1569 via a threaded fit (e.g., screwed onto the fluid container) or, alternatively, may be fastened to the fluid container body using a suitable adhesive. In another embodiment, the cap 1562 may be fastened to the fluid container body by both a threaded fit and the use of a suitable adhesive.

The cap 1562 includes, in one embodiment, a fluid control member 1564 and an elastic member 1566. The fluid control member 1564 may have a size and shape to substantially fit against an inner surface of the top of cap 1562 such that the fluid control member inhibits the passage of fluid out of the fluid container. The elastic member 1566 may be coupled to the fluid control member 1564 such that the elastic member exerts a force on the fluid control member such that the fluid control member is forced against the top inner surface of the cap. In one embodiment, the elastic member may be a spring while the fluid control member may be a substantially spherical object. In a normal resting position, the elastic member 1566 exerts a force against the fluid control member 1564, forcing it against the top inner surface 1568 of the cap. The top of the cap is sized to inhibit the passage of the spherical object 1564 through the top 1568 of the cap. Thus, when not is use, the fluid control member 1564 is forced against the top 1568 of the cap 1562, forming a seal that inhibits the flow of a fluid through the cap.

When the monomer heating station is to be filled, the fluid container 1560 may be inserted into opening 1506 of the body 1500. If a self sealing cap is used, as depicted in FIG. 23, the body may be configured to force the fluid control member away from the top of the fluid container. As the fluid control member is moved away from the top of the cap, the fluid will flow around the fluid control member and out of the fluid container. In one embodiment, the body 1500 may include a projection 1508 (see FIG. 23) that extends from the bottom 1502 of the body and toward the opening. When the fluid container is inserted into the opening, the projection may hit the fluid control member forcing the fluid control member away from the top. When the bottle is removed, the projection will move away from the fluid control member and the fluid control member may be pushed back to its resting position, thus inhibiting the further flow of fluid from the fluid container.

A heating system 1510 is preferably coupled to the body. The heating system 1510 is preferably configured to heat the lens forming composition to a temperature of between about 80° F. to about 220° F. Preferably, a resistive heater is used to heat the lens forming composition. Other heating systems such as hot air system, hot water systems, and infrared heating systems may also be used. In one embodiment, the heating system may include a silicon pad heater. A silicon pad heater includes one or more of resistive heating elements embedded within a silicon rubber material.

The heating system is preferably disposed within the body, as depicted in FIG. 22. In an embodiment, the body may be divided into a main chamber 1512 and a heating system chamber 1514. The lens forming composition may be disposed within the main chamber 1512, while the heating system 1510 is preferably disposed within the heating system chamber 1514. The heating system chamber 1514 preferably isolates the heating system 1510 from the main chamber 1512 such that the lens forming composition is inhibited from contacting the heating system. Typically, the heating system 1510 may attain temperatures significantly higher than desired. If the heating system 1510 were to come into contact with the lens forming composition, the higher temperature of the heating system may cause the contacted lens forming composition to become partially polymerized. By isolating the heating system 1510 from the lens forming composition, such partial polymerization may be avoided. To further prevent partial polymerization, the heating system is preferably insulated from the bottom surface of the main chamber. An insulating material may be placed between the heating system and the bottom of the main chamber. Alternatively, an air gap may be formed between the heating system and the bottom of the main chamber to prevent overheating of the bottom of the main chamber.

A thermostat or thermocouple 1530 may be placed within the chamber, in contact with either the lens forming composition and/or the heating system chamber. In another embodiment, the thermostat may be placed in the heating system chamber between the main chamber and the heating element. When positioned in this manner, the thermostat may be more responsive to changes in the temperature of the monomer. The thermostat 1530 preferably monitors the temperature of the lens forming composition. In an embodiment, the thermostat may be a bi-metal immersion temperature switch. Such thermostats may be obtained from Nason, West Union, S.C. The temperature switch may be configured for a specific temperature by the manufacturer. For example, the optimal monomer composition may be about 150° F. The temperature switch may be preset by the manufacturer for about 150° F. When the monomer solution is below 150° F., the switch may be in an "on" state, which causes the heating system to continue operating. Once the temperature of the monomer solution reaches about 150° F., the temperature switch may change to an "off" state. In the off state, the heating system may be switched off. As the temperature of the monomer solution cools to below 150° F., the switch may cause the heating system to turn back on.

Alternatively, a controller 1570 may be coupled to a thermocouple 1530 and the heating system 1510. The thermocouple 1530 may provide a signal to the controller that indicates a temperature determined by the thermocouple. The thermocouple may be positioned within an aluminum block disposed within the main chamber and adjacent to the heating system chamber. The temperature detected by the thermocouple may be a combination of the temperature of the heating system chamber wall and the lens forming composition. The controller 1570 may monitor the temperature of the lens forming composition via the signals produced by thermocouple 1530 and controls the heating system 1510 to keep the lens forming composition at a predetermined temperature. For example, as the lens forming composition becomes cooler the controller may activate the heating system 1510 to heat the lens forming composition back to the desired temperature. The controller 1570 may be a computer, programmable logic controller, or any of other known controller systems known in the art. These systems may include a proportional-integral ("PI") controller or a proportional-integral-derivative ("PID") controller.

A body 1500 may be in the form of a small volume conduit for transferring the lens forming composition out of the body. The use of a small volume conduit may minimize the amount of monomer solution that is in contact with the heating system at any given time. Monomer solution passes through the body and exits the body via the outlet valve 1520.

A fluid monitor 1580 may be used to monitor the level of fluid in the body 1500. A fluid monitor 1580 may be positioned within the body 1500. Fluid monitors are commercially available from Gems Sensors Inc., Plainville, Conn. In one embodiment model ELS-1100HT from Gems Sensors may be used. The fluid monitor may be configured to monitor the level of fluid in the body 1500. If the fluid level drops below a preselected minimum, the fluid sensor may produce a signal to a controller. A controller may be coupled to the monomer heating system (e.g., controller 1570) or may be part of the lens forming apparatus (e.g., controller 50). In one embodiment, the controller may produce a warning message when a low fluid level signal is received from the fluid sensor. Alternatively, the controller may determine when a fluid level may be low in the body by monitoring the number of fills. For example, a sensor may be coupled to the body and may send a signal to the controller each time a fill is completed. The warning message may be an alphanumeric readout on a controller output device (e.g., and LCD screen) or the warning message may involve causing a light to turn on signifying the low fluid level. The controller may also be configured to turn the heating system 1510 off when the fluid level within the body is too low. The warning message may also be an alphanumeric readout on the monomer heating system. In addition, warning messages may also be generated by the controller computer to signify a ready state of the fill unit or a warming up state of the fill unit.

Outlet valve 1520 is positioned near the outlet of the body. The outlet valve includes an elongated member 1522 and a movable member 1524 for altering the position of the elongated member, as depicted in FIG. 22. The elongated member 1522 preferably inhibits the flow of lens forming composition through the conduit when the elongated member is in a closed position. The elongated member may be moved into an open position such that the lens forming composition may flow through the conduit.

As depicted in FIG. 22, the elongated member 1522 is in an open position. The elongated member 1522 is preferably oriented perpendicular to the longitudinal axis of the body 1500, as depicted in FIG. 22. The elongated member 1522 resides in a channel 1526 extending through the top 1504 of the body 1500. When in the open position, the elongated member 1522 is positioned away from the outlet of the body. The end of the elongated member, as depicted in FIG. 22, has been moved past a portion of the bottom surface 1502 of the conduit such that the lens forming solution may flow through the conduit and out of the body. The elongated member may be positioned to control the flow rate of the lens forming composition through the conduit. For example, as depicted in FIG. 22, the elongated member, although in an open position, still partially blocks the conduit, thus partially inhibiting flow of the lens forming composition through the conduit. As the elongated member is moved further away from the outlet, the flow of the lens forming composition may increase. The flow rate of the lens forming composition may reach a maximum when the elongated member no longer blocks the conduit.

In a closed position, the elongated member 1522 may extend to the bottom surface 1502 near the outlet. Preferably, the elongated member 1522 extends past the outer surface of the bottom of the body proximate the outlet, when in the closed position. Configuring the elongated member 1522 such that it extends past the outer surface of the conduit may inhibit any residual lens forming composition from building up near the outlet. As the elongated member 1522 is extended toward the outlet any lens forming composition present may be forced out, leaving the outlet substantially clear of lens forming composition. The outlet may be subsequently cleaned by removing the excess lens forming composition from the outer surface of the conduit and the elongated member.

The interaction of the elongated member 1522 with the movable member 1524 allows the elongated member to be positioned in either a closed or open position. The top of the body 1504 preferably includes a plurality of threads that interact with complimentary threads along the elongate member 1522. Rotation of the movable member may cause the elongated member to move away from or toward the outlet, depending on the direction of rotation of the movable member.

A mold assembly holder 1540 may be coupled to the body of the monomer heating system, as depicted in FIG. 21. The mold assembly holder 1540 is configured to hold the mold assembly at a preferred location with respect to the outlet of the body 1500. The mold assembly holder may secure the mold assembly during filling. In one embodiment, the mold assembly holder is spring mounted to the bottom surface of the monomer heating system. The mold assembly holder includes an arm 1542 that is coupled to the body 1500 by hinge 1544. The hinge allows the mold assembly holder to be rotated away from or toward the body 1500 of the monomer heating solution. Hinge 1544 may be spring loaded such that a constant force is exerted on the arm, forcing the arm toward the bottom of the body 1500. To place the mold assembly 1550 on the mold assembly arm 1544, the arm may be rotated away from the body and the mold assembly placed onto a portion of the arm configured to hold the mold assembly. The portion of the arm configured to hold the mold assembly may include a clamping system to secure the mold assembly.

To fill the mold assembly, the mold assembly is placed on the mold assembly holders and positioned proximate to the outlet. The monomer solution is preferably introduced into the body of the fill station and heated to a temperature of about 150° F. After the mold assembly is in place, the valve of the mold fill station is aligned with a fill port of the mold assembly. The lens forming composition is now flowed through the valve and into the mold assembly. The movable member 1524, may be adjusted to control the flow rate of the monomer.

After the mold assembly is filled, any monomer which may have spilled on the surface of the molds is removed using a lint free wipe. Excess monomer that may be around the edge of the filling port may be removed by using a micro vacuum unit. The mold assembly may be inspected to insure that the mold cavity is filled with monomer. The mold assembly is also inspected to insure that no air bubbles are present in the mold cavity. Any air bubbles in the mold cavity may be removed by rotating the mold assembly such that the air bubbles rise to the top of the assembly.

The heating of the monomer solution may be coordinated with the entry of a prescription using a controller. In one embodiment, the monomer heating system may be electrically coupled to a lens forming apparatus, such as the apparatus depicted in FIG. 1. The monomer heating system may have ports that are appropriate for using standard data transfer cables to couple to ports that are disposed on the lens forming apparatus. The operation of the monomer heating system may thus coordinate with the operation of the lens forming apparatus. In some embodiments, it may be desirable to minimize the amount of time a monomer solution is heated. In these instances, it may be desirable to heat the monomer solution just before filling the mold assembly. The controller 50 of the lens forming apparatus may be configured to coordinate the filling operation with the needs of an operator.

When forming a prescription lens, an operator may first enter the prescription into the controller 50 as described above. Once the prescription has been entered, the operator typically spends some time finding and cleaning the appropriate molds for the prescription and assembling the molds with a gasket. In one embodiment, the controller may signal a monomer heating system to begin heating the monomer solution when a prescription is entered. By the time the mold assembly has been assembled, the monomer solution may be at or near the desired temperature. This may minimize the amount of time required by the operator to prepare and fill the mold assembly. In some instances the operator may, after preparing a first prescription enter additional prescriptions to process. In this case, the monomer heating system may be left in an "on" state. If a prescription is not entered after a predetermined amount of time, the controller may turn off the monomer heating system, so that the monomer in the system does not remain in a heated state for long periods of time. In some embodiments, the predetermined amount of time may be about 10 or more minutes.

After filing the mold assembly, the lens forming composition may be cured using a lens curing apparatus. In one embodiment, the curing of the lens forming composition may be accomplished by a procedure involving the application of heat and activating light to the lens forming composition. Initially, activating light is directed toward at least one of the mold members. The activating light is directed for a sufficient time to initiate curing of the lens forming composition. Preferably, the activating light is directed toward at least one of the mold members for a time of less than about 2 minutes. In some embodiments, the activating light is directed toward at least one of the mold members for a time of less than about 25 seconds. In other embodiments, the activating light is directed toward at least one of the mold members for a time of less than about 10 seconds. The activating light is preferably stopped before the lens forming composition is completely cured.

After the curing is initiated, the mold assembly may be transferred to a post cure unit. In the post cure unit the mold assembly is preferably treated with additional activating light and heat to further cure the lens forming composition. The activating light may be applied from the top, bottom, or from both the top and bottom of the curing chamber during the post cure process. The lens forming composition may exhibit a yellow color after the curing is initiated. It is believed that the yellow color is produced by the photoinitiator. As the lens forming composition cures, the yellow color may gradually disappear as the photoinitiator is used up. Preferably, the mold assembly is treated in the post cure unit for a time sufficient to substantially remove the yellow color from the formed eyeglass lens. The mold assembly may be treated in the post cure unit for a time of up to about 15 minutes, preferably for a time of between about 10 minutes to 15 minutes. After the lens is treated in the post cure unit, the formed eyeglass lens may be demolded and placed back into the post cure unit.

TABLE 9

| LENS INFORMATION | | | CURING INFORMATION | | | |
| --- | --- | --- | --- | --- | --- | --- |
| Sphere | Lens Type | Tinted | Filter | Initial Dose | Postcure Time | Anneal Time |
| +4.00 to +2.25 | Clear | No | 50 mm | 90 Sec. Back and Front | 13 Min. | 7 Min. |
| +4.00 to +2.25 | Clear | Yes | 50 mm | 90 Sec. Back and Front | 15 Min. | 7 Min. |
| +4.00 to +2.25 | Photo | | 50 mm | 90 Sec. Back and Front | 13 Min. | 7 Min. |
| +2.00 to −4.00 | Clear | No | Clear Plate | 7 Sec. Front | 13 Min. | 7 Min. |
| +2.00 to −4.00 | Clear | Yes | Clear Plate | 7 Sec. Front | 15 Min. | 7 Min. |
| +2.00 to plano | Photo | | Clear Plate | 15 Sec. Front | 13 Min. | 7 Min. |
| −0.25 to −4.00 | Photo | | Clear Plate | 20 Sec. Back, w/7 Sec. Front starting @ | 13 Min. | 7 Min. |

TABLE 9-continued

| LENS INFORMATION | | | CURING INFORMATION | | | |
|---|---|---|---|---|---|---|
| Sphere | Lens Type | Tinted | Filter | Initial Dose | Postcure Time | Anneal Time |
| | | | | 13 Sec. elapsed time. | | |

In some instances, it may be desirable to subject the lens to an anneal process. When a lens, cured by the activating light, is removed from a mold assembly, the lens may be under a stressed condition. It is believed that the power of the lens can be more rapidly brought to a final resting power by subjecting the lens to an anneal treatment to relieve the internal stresses developed during the cure. Prior to annealing, the lens may have a power that differs from the desired final resting power. The anneal treatment is believed to reduce stress in the lens, thus altering the power of the lens to the desired final resting power. Preferably, the anneal treatment involves heating the lens at a temperature between about 200° F. to 225° F. for a period of up to about 10 minutes. The heating may be performed in the presence or absence of activating light.

The post-cure and anneal times given in Table 9 are strictly exemplary of the particular system described herein. It should be understood that the time for the post-cure and anneal process may vary if the intensity of the lamps or the temperature of the process is altered. For example, increasing the intensity of light used during the post-cure process may allow a shorter post-cure time. Similarly, reducing the temperature of the post-cure unit during the annealing process may cause an increase in the anneal time. Generally, the post-cure process is believed to be related to the time required to substantially complete curing of the lens forming composition. The anneal process is believed to be related to the amount of time required to bring the formed lens to its final resting power.

The use of a lens forming composition which includes an aromatic containing polyether polyethylenic functional monomer, a co-initiator composition and a photoinitiator allows much simpler curing conditions than other lens forming compositions. While pulsed activated light curing sequences may be used to cure the lenses, continuous activating light sequences may also be used, as described in Table 9. The use of continuous activating light sequences allows the lens curing equipment to be simplified. For example, if continuous activating light is used, rather than pulsed light, equipment for generating light pulses is no longer required. Thus, the cost of the lens curing apparatus may be reduced. Also, the use of such a lens forming composition allows more general curing processes to be used. As shown in Table 9, seven different processes may be used to cure a wide variety of lenses. This greatly simplifies the programming and operation of the lens curing unit.

Furthermore, the use a lens forming composition which includes an aromatic containing polyether polyethylenic functional monomer, a co-initiator composition and a photoinitiator may alleviate the need for cooling of the lens forming composition during curing. This may further simplify the procedure since cooling fans, or other cooling systems, may no longer be required. Thus, the lens curing apparatus may be further simplified by removing the mold apparatus cooling systems.

Table 9 shows the preferable curing conditions for a variety of lenses. The sphere column refers to the sphere power of the lens. The monomer type is either clear (i.e., non-photochromic) or photochromic. Note that the lens type (e.g., spheric single vision, aspheric single vision lens, flat-top bifocal lens or progressive multifocal lens) does not significantly alter the lens curing conditions. Tinted refers to whether the formed eyeglass lens will be soaked in a dye bath or not.

Based on the prescription information the lens curing conditions may be determined. There are four curing variables to be set. The type of light filter refers to the filter placed between the lamps and the mold assembly in the curing unit and the post cure unit. The initial dose refers to the time that activating light is applied to the lens forming composition in the curing unit. The irradiation pattern (e.g., irradiation of the front mold only, the back mold only, or both molds) is also dependent on the lens being formed. After the initial dose is applied, the mold assembly is transferred to the post cure unit where it is treated with activating light and heat. The chart lists the preferred time spent in the post cure chamber. After treatment in the post cure chamber the formed eyeglass lens is removed from the mold assembly. The lens may undergo an annealing process, for the time listed, in which the lens is heated either in the presence or absence of activating light. It should be noted that all of the lens curing processes recited are preferably performed without any cooling of the mold apparatus.

To further illustrate this procedure, the method will be described in detail for the production of a clear, non-tinted lens having sphere power of +3.00. A mold assembly is filled with a non-photochromic monomer solution. The mold assembly is placed in a lens curing unit to apply the initial dose to the lens forming composition. The curing of the lens forming composition is preferably controlled by controller 50. As shown in FIG. 17, the controller 50 includes a number of input devices which allow an operator to initiate use of the various components of the plastic lens curing apparatus 10. In an embodiment, buttons 640 may be used to control operation of the coating process (640a), the curing process (640b), the postcure process (640c), and the anneal process (640d). After the mold assembly is placed in the lens curing unit, the curing process button 640b may be pressed to set the curing conditions. In one embodiment, an operator has preloaded the prescription information and saved the information as described above. Pressing the cure button may cause the controller to prompt the user to enter a reference code corresponding to the saved prescription information. The controller is preferably configured to analyze the prescription information and set up the appropriate initial dose conditions.

After determining the appropriate lens forming conditions, the controller may inform the user of the type of filters to be used. The controller may pause to allow the proper filters to be installed within the lens curing unit. Typically, two types of filters may be used for the initial cure process.

The filters are preferably configured to distribute the light so that the activating light which is imparted to the lens molds is properly distributed with respect to the prescription of the lens. A clear plate filter refers to a plate that is substantially transparent to activating light. The clear plate may be composed of polycarbonate or glass. A 50 mm filter refers to filter which includes a 50 mm aperture positioned in a central portion of the filter. The 50 mm aperture is preferably aligned with the mold assembly when the filter is placed in the curing unit. Preferably, two filters are used, the first being placed between the top lamps and the mold assembly, the second being placed between the bottom lamps and the mold assembly.

After the filters have been placed, the user may indicate to the controller that the filters are in place. Alternatively, the controller may include a sensor disposed within the lens curing unit which informs the controller when a filter is placed within the curing unit. After the filters are placed in the curing unit, the controller may prompt the user to ensure that the mold assembly is in the curing unit prior to commencing the curing process. When the filters and mold are in place, the initial dose may be started by the controller. For a clear, non-tinted lens having sphere power of +3.00 the initial dose will be 90 seconds of activating light applied to both the front and back molds. A 50 mm filter is preferably positioned between the top and bottom lamps.

After the initial cure process is completed, the mold assembly is transferred to the post cure unit. The completion of the initial cure process may cause the controller to alert the operator that the process is completed. An alarm may go off to indicate that the process is completed. To initiate the post cure process, the post cure button 640c may be pressed. Pressing the post cure button may cause the controller to prompt the user to enter a reference code corresponding to the saved prescription information. The controller is preferably configured to analyze the prescription information and set up the appropriate post cure conditions. For a clear, non-tinted lens having sphere power of +3.00 the post cure conditions will include directing activating light toward the mold assembly in a heated post cure unit for 13 minutes. The post cure unit is preferably heated to a temperature of about 200° F. to about 225° F. during the post cure process.

After the post cure process is completed, the mold assembly is disassembled and the formed lens is removed from the mold members. The completion of the post cure process may cause the controller to alert the operator that the process is completed. An alarm may go off to indicate that the process is completed. After the molds are removed from the post cure unit, the gasket is removed and the molds placed in a demolding solution. A demolding solution is commercially available as "Q-Soak Solution" commercially available from Optical Dynamics Corporation, Louisville, Ky. The demolding solution causes the lens to separate from the molds. The demolding solution also aids in the subsequent cleaning of the molds. After the lens has been demolded, the lens is preferably cleaned of dust particles using a solution of isopropyl alcohol and water.

In some instances it is desirable that the formed lens undergoes an anneal process. To initiate the anneal process the anneal button 640d may be pressed. Pressing the anneal button will set the conditions for the anneal process. For a clear, non-tinted lens having sphere power of +3.00 the anneal conditions will include heating the lens in the post cure unit, in the absence of activating light, for about 7 minutes. The post cure unit is preferably heated to a temperature of about 200° F. to about 225° F. during the anneal process.

In one embodiment, the drawer of the post cure unit includes a front row of mold assembly holders and a back row of lens holders. For the post cure process, the mold assemblies are preferably placed in the front row. The front row is preferably oriented under the post cure lamps when the post cure drawer is closed. For the anneal process the lenses are preferably placed in the back row of the post-cure drawer. The back row may be misaligned with the lamps such that little or no activating light reaches the back row.

After the anneal process, the lens may be coated in the coating unit with a scratch resistant hard coat. The lens may also be tinted by placing in a tinting bath. It is believed that tinting of the lens is influenced by the crosslink density of the lens. Typically, a lens having a relatively high crosslink density exhibits more homogenous absorption of the dye. Problems such as blotching and streaking of the dye are typically minimized by highly crosslinked lenses. The crosslink density of a lens is typically controlled by the temperature of curing of the lens. A lens which is cured at relatively high temperatures typically exhibits a crosslink density that is substantially greater than a low temperature cured lens. The curing time may also influence the hardness of a lens. Treating a lens for a long period of time in a post cure unit will typically produce a lens having a greater crosslink density than lenses treated for a shorter amount of time. Thus, to produce lenses which will be subsequently treated in a tinting bath, the lens forming composition is treated with heat and activating light in the post cure unit for a longer period of time than for the production of non-tinted lenses. As shown in Table 9, non-tinted clear lenses are treated in the postcure unit for about 13 minutes. For clear lenses which will be subsequently tinted, the post cure time is extended to about 15 minutes, to produce a lens having a relatively high crosslink density.

Figure 24:
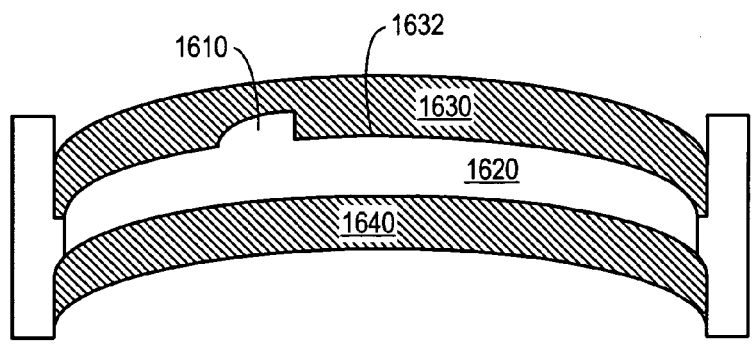
FIG. 24 depicts a mold assembly for making flat-top bifocal lenses.

The formation of flat-top bifocal lenses may also be accomplished using the above described procedure. One problem typical of curing flat-top bifocal eyeglass lenses with activating light is premature release. Flat-top bifocals include a far vision correction zone and a near vision correction region. The far vision correction zone is the portion of the lens which allows the user to see far away objects more clearly. The near vision correction zone is the region that allows the user to see nearby objects clearer. The near vision correction zone is characterized by a semicircular protrusion which extends out from the outer surface of an eyeglass lens. As seen in FIG. 24, the portion of the mold cavity which defines the near vision correction zone 1610 is substantially thicker than the portion of the mold cavity defining the far vision correction zone 1620. Directing activating light toward the mold members causes the polymerization of the lens forming composition to occur. It is believed that the polymerization of the lens forming composition begins at the casting face of the irradiated mold and progresses through the mold cavity toward the opposite mold. For example, irradiation of the front mold 1630 causes the polymerization to begin at the casting surface of the front mold 1632 and progress toward the back mold 1640. As the polymerization reaction progresses, the lens forming composition is transformed from a liquid state to a gel state. Thus, shortly after the front mold 1632 is irradiated with activating light, the portion of the lens forming composition proximate the casting face of the front mold member 1632 will become gelled while the portion of the lens forming composition proximate the back mold member 1640 will remain substantially liquid. If the polymerization is initiated from the back mold 1640, the lens forming composition throughout the far vision correction zone 1620 may become substantially gelled prior to gelation of the lens forming composition in the near vision correction zone proximate the casting surface of the front mold member 1610 (herein referred to as the "front portion of the near vision correction zone"). It is believed that when the gelation of the lens forming composition in the front portion of the near vision correction zone 1610 occurs after the far vision correction zone 1620 has substantially gelled, the resulting strain may cause premature release of the lens.

To reduce the incidence of premature release in flat-top bifocal lenses, it is preferred that polymerization of the lens forming composition in the front portion of the near vision correction zone 1610 is initiated before the portion of the lens forming composition in the far vision correction zone proximate the back mold member 1640 is substantially gelled. Preferably, this may be achieved by irradiating the front mold 1630 with activating light prior to irradiating the back mold 1640 with activating light. This causes the polymerization reaction to begin proximate the front mold 1630 and progress toward the back mold 1640. It is believed that irradiation in this manner causes the lens forming composition in the front portion of the near vision correction zone 1610 to become gelled before the lens forming composition proximate the back mold 1640 becomes gelled. After the polymerization is initiated, activating light may be directed at either mold or both molds to complete the polymerization of the lens forming composition. The subsequent post cure and anneal steps for the production of flat-top bifocal lenses are substantially the same as described above.

Alternatively, the incidence of premature release may also be reduced if the front portion of the near vision correction zone 1610 is gelled before gelation of the lens forming composition extends from the back mold member 1640 to the front mold member 1630. In this embodiment, the polymerization of the lens forming composition may be initiated by irradiation of the back mold 1640. This will cause the gelation to begin proximate the back mold 1640 and progress toward the front mold 1630. To reduce the incidence of premature release, the front mold 1630 is irradiated with activating light before the gelation of the lens forming composition in the far vision correction zone 1620 reaches the front mold. After the polymerization is initiated in the front portion of the near vision correction zone 1610, activating light may be directed at either mold or both molds to complete the polymerization of the lens forming composition. The subsequent post cure and anneal steps for the production of flat-top bifocal lenses are substantially the same as described above.

Figure 25:
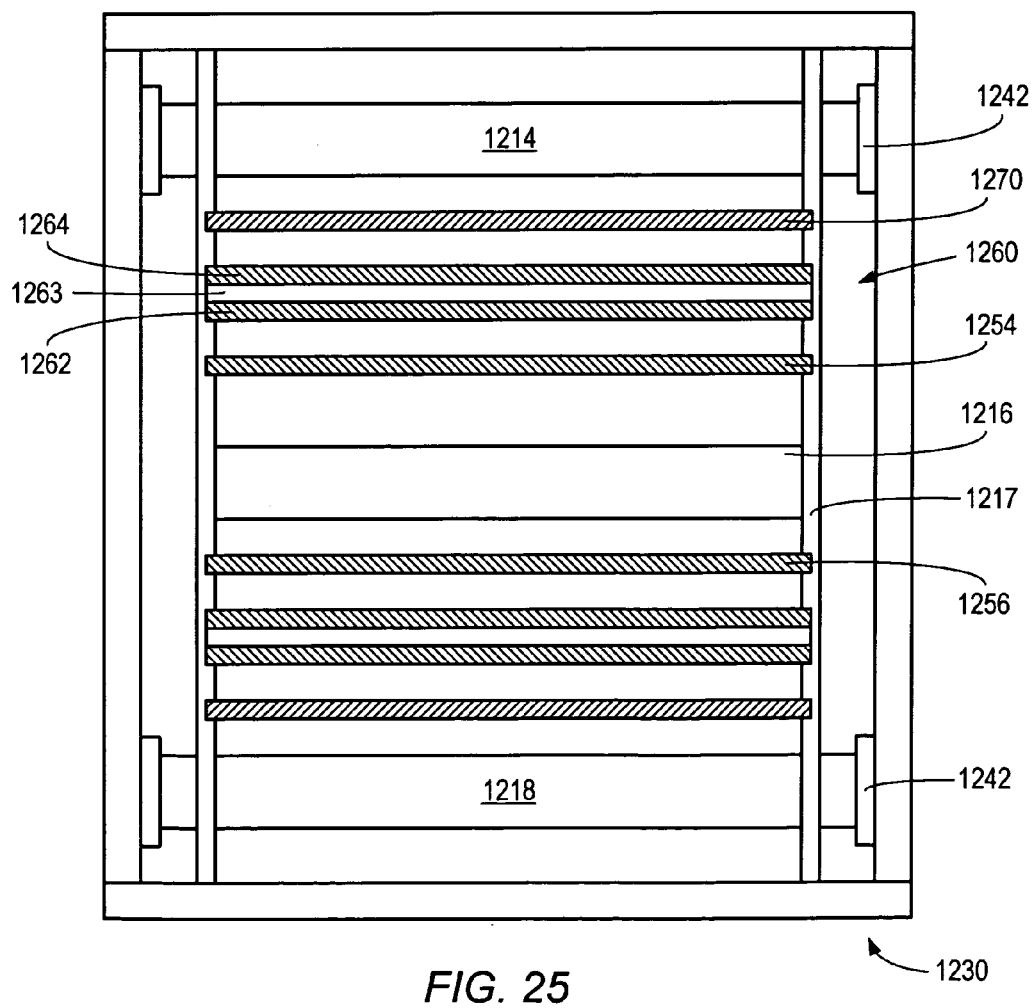
FIG. 25 depicts a front view of a lens curing unit.
Figure 26:
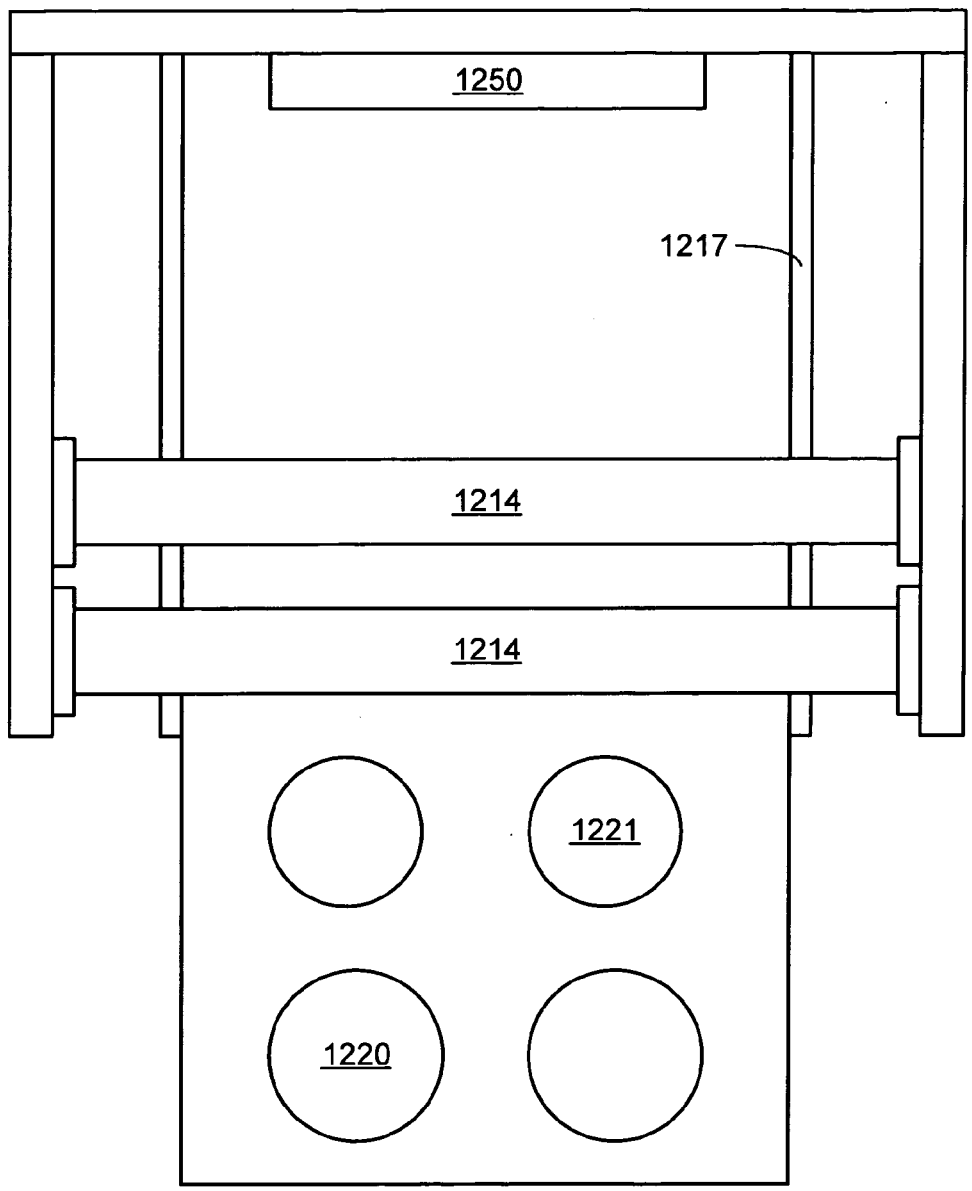
FIG. 26 depicts a top view of a lens curing unit.

In another embodiment, a single curing unit may be used to perform the initial curing process, the post cure process, and the anneal process. A lens curing unit is depicted in FIG. 25 and FIG. 26. The curing unit 1230 may include an upper light source 1214, a lens drawer assembly 1216, and a lower light source 1218. Lens drawer assembly 1216 preferably includes a mold assembly holder 1220 (see FIG. 26), more preferably at least two mold assembly holders 1220. Each of the mold assembly holders 1220 is preferably configured to hold a pair of mold members that together with a gasket form a mold assembly. Preferably, the lens drawer assembly may also include a lens holder 1221 (see FIG. 26), more preferably at least two lens holders 1221. The lens holders 1221 are preferably configured to hold a formed eyeglass lens. The lens drawer assembly 1216 is preferably slidingly mounted on a guide 1217. During use, mold assemblies and/or lenses may be placed in the mold assembly holders 1220 or lens holders 1221, respectively, while the lens drawer assembly is in the open position (i.e., when the drawer extends from the front of the lens curing unit). After the holders have been loaded, the drawer may be slid into a closed position, with the mold assemblies directly under the upper light source 1214 and above the lower light source 1218. The lens holders and lenses disposed upon the lens holders may not be oriented directly under the upper and lower light sources. As depicted in FIG. 26, the light sources 1214 and 1218 preferably extend across a front portion of the curing unit, while no lamps are placed in the rear portion of the curing unit. When the lens drawer assembly is slid back into the curing unit, the mold assembly holders 1220 are oriented under the lamps, while the lens holders 1221 are oriented in the back portion where no lamps are present. By orienting the holders in this manner curing process, which involve light and heat (e.g., post cure processes) and annealing processes, which may involve either application of heat and light or the application of heat only, may be performed in the same unit.

The light sources 1214 and 1218, preferably generate activating light. Light sources 1214 and 1218 may be supported by and electrically connected to suitable fixtures 1242. Lamps 1214 may generate either ultraviolet light, actinic light, visible light, and/or infrared light. The choice of lamps is preferably based on the monomers and photo-initiator system used in the lens forming composition. In one embodiment, the activating light may be generated from a fluorescent lamp. The fluorescent lamp preferably has a strong emission spectra in the 380 to 490 nm region. A fluorescent lamp emitting activating light with the described wavelengths is commercially available from Philips as model TLD-15W/03. In another embodiment, the lamps may be ultraviolet lights.

In one embodiment, an upper light filter 1254 may be positioned between upper light source 1214 and lens drawer assembly 1216, as depicted in FIG. 25. A lower light filter 1256 may be positioned between lower light source 1218 and lens drawer assembly 1216. Examples of suitable light filters have been previously described. The light filters are used to create a proper distribution of light with regard to the prescription of the eyeglass lens. The light filters may also insulate the lamps from the curing chamber. During post cure and annealing process it is preferred that the chamber is heated to temperatures between about 200 and 225° F. Such temperatures may have a detrimental effect on the lamps such as shortening the lifetime of the lamps and altering the intensity of the light being produced. The light filters 1254 and 1256, when mounted into the guide 1217, will form an inner chamber which partially insulates the lamps from the heated portion of the chamber. In this manner, the temperatures of the lamps may be maintained within the usual operating temperatures.

Alternatively, a heat barrier 1260 may be disposed within the curing chamber. The heat barrier may insulate the lamps from the curing chamber, while allowing the activated light generated by the lamps to pass into the chamber. In one embodiment, the heat barrier may include a borosilicate plate of glass (e.g., PYREX glass) disposed between the light sources and the mold assembly. In one embodiment, a pair of borosilicate glass plates 1264 and 1262 with an intervening air gap between the plates 1263 serves as the heat barrier. The use of borosilicate glass allows the activating radiation to pass from the light sources to the lamps without any significant reduction in intensity.

Along with the heat barrier 1260 and filter 1254, an opaque plate 1270, may be placed between the light sources and the mold assembly. The opaque plate is substantially opaque toward the activating light. Apertures are preferably disposed in the opaque plate to allow light to pass through the plate onto the mold assemblies.

In order to allow post cure and annealing procedures to be performed, a heating system 1250 is preferably disposed within the curing unit, as depicted in FIG. 26. The heating system 1250 may be a resistive heating system, a hot air system, or an infrared heating system. The heating system 1250 may be oriented along the back side of the curing chamber. The heating system 1250 is preferably disposed at a position between the two filters, such that the heating system is partially insulated from the light sources 1214 and 1218. Preferably, the heating system is configured to heat the curing chamber to a temperature of about 200° F. to about 225° F.

The incorporation of a heating system into a system which allows irradiation of a mold assembly from both sides will allow many of the above described operations to be performed in a single curing unit. The use of lamps in the front portion of the curing unit, while leaving the back portion of the curing chamber substantially free of lamps, allows both activating light curing steps and annealing steps to performed in the same unit at the same time. Thus, the curing conditions described in Table 9 may be performed in a single unit, rather than the two units as described above.

In another embodiment, the method of producing the lenses may be modified such that all of the initial curing process is performed while heat is applied to the lens forming composition. Table 10 shows alternate curing conditions which may be used to cure the lens forming compositions.

the mold members while substantially simultaneously applying heat to the mold assemblies. As shown in Table 10, the light curing conditions are similar to the previously described conditions. However, the initial dose and the post-cure processes have been combined into a single process. Thus, for the formation of a photochromic lens having a sphere power of +1.50, the mold assemblies are placed in the lens curing unit and irradiated with activating light from the bottom of the unit for about 15 seconds. The curing unit is preferably at a temperature of about 225° F. while the activating light is applied. After 15 seconds, the bottom light is turned off and the mold assemblies are treated with activating light from the top lamps for about 13 minutes. This subsequent treatment with activating light is also performed at a curing chamber temperature of about 225° F. After the 13 minutes have elapsed, the lights may be turned off, the lens removed from the molds and an anneal process begun.

The anneal process may be performed in the same unit that the cure process is performed. The demolded lens is preferably placed in the lens holders of the curing unit drawer. The curing unit is preferably at a temperature of about 225° F., when the lens is placed in the curing unit. Preferably, the lens holders are positioned away from the lamps, such that little activating light reaches the lenses when the lamps are on. This allows anneal processed to be performed at the same time that curing processes are performed and within the same curing unit. Lenses that have been formed with a mixture of heating and light typically exhibit crosslink density that are greater than lenses which are cured using combinations of light only curing with light and heat curing.

TABLE 10

| LENS INFORMATION | | | | CURING INFORMATION | |
|---|---|---|---|---|---|
| Sphere | Lens Type | Tinted | Filter | Curing Conditions | Anneal Time |
| +4.00 to +2.25 | Clear | No | 50 mm | 90 Seconds Front and Back 13 Minutes Back Temperature 225° F. | 7 Min. |
| +4.00 to +2.25 | Clear | Yes | 50 mm | 90 Seconds Front and Back 15 Minutes Front Temperature 225° F. | 7 Min. |
| +4.00 to +2.25 | Photo | | 50 mm | 90 Seconds Front and Back 13 Minutes Front Temperature 225° F. | 7 Min. |
| +2.00 to −4.00 | Clear | No | Clear Plate | 7 Seconds Front 13 Minutes Back Temperature 225° F. | 7 Min. |
| +2.00 to −4.00 | Clear | Yes | Clear Plate | 7 Seconds Front 15 Minutes Back Temperature 225° F. | 7 Min. |
| +2.00 to plano | Photo | | Clear Plate | 15 Seconds Front 13 Minutes Back Temperature 225° F. | 7 Min. |
| −0.25 to −4.00 | Photo | | Clear Plate | 20 Seconds Back w/7 Sec. Front starting @ 13 Sec. elapsed time 13 Minutes Back Temperature 225° F. | 7 Min. |

After the mold assembly is filled with the appropriate monomer solution the mold assemblies are placed in the mold assembly holders of the drawer of the curing unit. The drawer is slid back into the curing unit. The curing unit may be preheated to a temperature of about 225° F. prior to placing the mold assemblies in the curing unit. The curing conditions include applying activating light to one or both of The mold assembly, with a lens forming composition disposed within the mold cavity, is preferably placed within the lens curing unit. Curing of the lens forming composition is preferably initiated by the controller after the lens curing unit drawer is closed. The curing conditions are preferably set by the controller based on the prescription and type of lens being formed.

After the curing cycle has been completed, the controller preferably prompts the user to remove the mold assembly from the lens curing unit. In an embodiment, the cured lens may be removed from the mold apparatus. The cured lens may be complete at this stage and ready for use.

In another embodiment, the cured lens may require a post cure treatment. After the lens is removed from the mold apparatus, the edges of the lens may be dried and scraped to remove any uncured lens forming composition near the edges. The controller may prompt the user to place the partially cured lens into a post-cure unit. After the lens has been placed within the post-cure unit, the controller may apply light and/or heat to the lens to complete the curing of the lens. In an embodiment, partially cured lenses may be heated to about 115° C. while being irradiated with activating light. This post-treatment may be applied for about 5 minutes.

It has been determined that in some embodiments the finished power of an activating light polymerized lens may be controlled by manipulating the curing temperature of the lens forming composition. For instance, for an identical combination of mold members and gasket, the focusing power of the produced lens may be increased or decreased by changing the intensity of activating light across the lens mold cavity or the faces of the opposed mold members. Methods for altering the power of a formed lens are described in U.S. Pat. No. 5,989,462 to Buazza which is incorporated by reference.

In certain applications, all of the lens forming composition may fail to completely cure by exposure to activating light when forming the lens. In particular, a portion of the lens forming composition proximate the gasket often remains in a liquid state following formation of the lens. It is believed that the gaskets may be often somewhat permeable to air, and, as a result, oxygen permeates them and contacts the portions of the lens forming material that are proximate the gasket. Since oxygen tends to inhibit the polymerization process, portions of the lens forming composition proximate the gasket tend to remain uncured as the lens is formed. The wet edge problem has been addressed by a variety of methods described in U.S. Pat. No. 5,529,728 to Buazza et. al. and U.S. Pat. No. 5,989,462 to Buazza et al. which are incorporated by reference.

Methods for curing a lens forming composition by the use of pulses of ultraviolet light are described in U.S. Pat. No. 6,022,498 which is incorporated by reference.

Materials (hereinafter referred to as "activating light absorbing compounds") that absorb various degrees of ultraviolet/visible light may be used in an eyeglass lens to inhibit ultraviolet/visible light from being transmitted through the eyeglass lens. Such an eyeglass lens advantageously inhibits ultraviolet/visible light from being transmitted to the eye of a user wearing the lens. Curing of an eyeglass lens using activating light to initiate the polymerization of a lens forming composition that includes activating light absorbing compositions is described in detail in U.S. Pat. No. 5,989,462 which is incorporated by reference.

Figure 27:
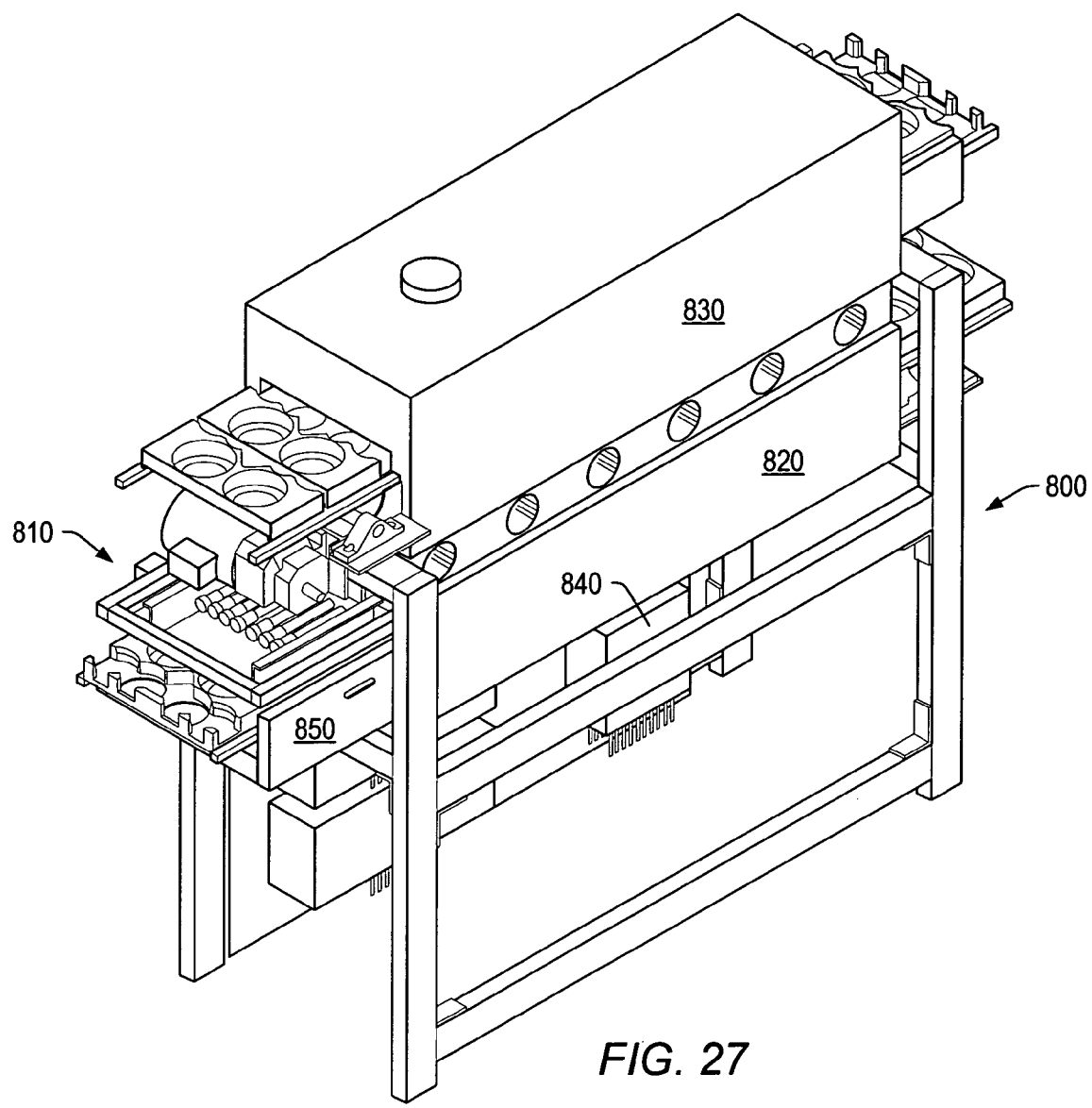
FIG. 27 depicts an isometric view of a high-volume lens curing apparatus.

Referring now to FIG. 27, a high-volume lens forming apparatus is generally indicated by reference numeral 800. As shown in FIG. 27, lens forming apparatus 800 includes at least a first lens curing unit 810 and a second lens curing unit 820. The lens forming apparatus may, optionally, include an anneal unit 830. In other embodiments, a post cure unit may be a separate apparatus which is not an integral part of the lens curing apparatus. A housing in which first lens curing unit 810, second lens curing unit 820, and anneal unit 830 may be disposed may be formed of an insulating material. In this manner, the housing may be configured to reduce heat transfer between the first lens curing unit, the second lens curing unit and the anneal unit. The lens forming apparatus may also include at least one monomer heating unit or fill unit as described in any of the above embodiments. The lens forming apparatus may also include conveyance system 850 positioned within the first and/or second lens curing units. The conveyance system 850 may be configured to allow a mold assembly, such as has been described above, to be transported from the first lens curing unit 810 to the second lens curing unit 820. For example, the conveyance system may be configured to allow a plurality of mold assemblies, which may be filled with a lens forming composition, to be transported into, through, and out of the lens forming apparatus.

The lens forming apparatus may be configured to form an eyeglass lens in less than approximately one hour. In addition, the lens forming apparatus may be configured to form at least 25 prescription cast eyeglass lenses per hour by application of activating light to cure a liquid forming composition into a prescription cast eyeglass lens. For example, the system may be configured to form approximately 100 prescription cast eyeglass lenses per hour by application of activating light to cure a liquid forming composition into a prescription cast eyeglass lens. Such a rate of production may also include a time required to anneal a prescription cast eyeglass lens.

Lens curing units 810 and 820 include an activating light source for producing activating light. The activating light sources disposed in units 810 and 820 are preferably configured to direct light toward a mold assembly. Anneal unit 830 may be configured to apply heat to an at least partially relieve or relax the stresses caused during the polymerization of the lens forming material. Anneal unit 830, in one embodiment, includes a heat source. A controller 840 may be a programmable logic controller, e.g., a computer. Controller 840 may be coupled to lens curing units 810 and 820 and, if present, an anneal unit 830, such that the controller is capable of substantially simultaneously operating the three units 810, 820, and 830.

Figure 28:
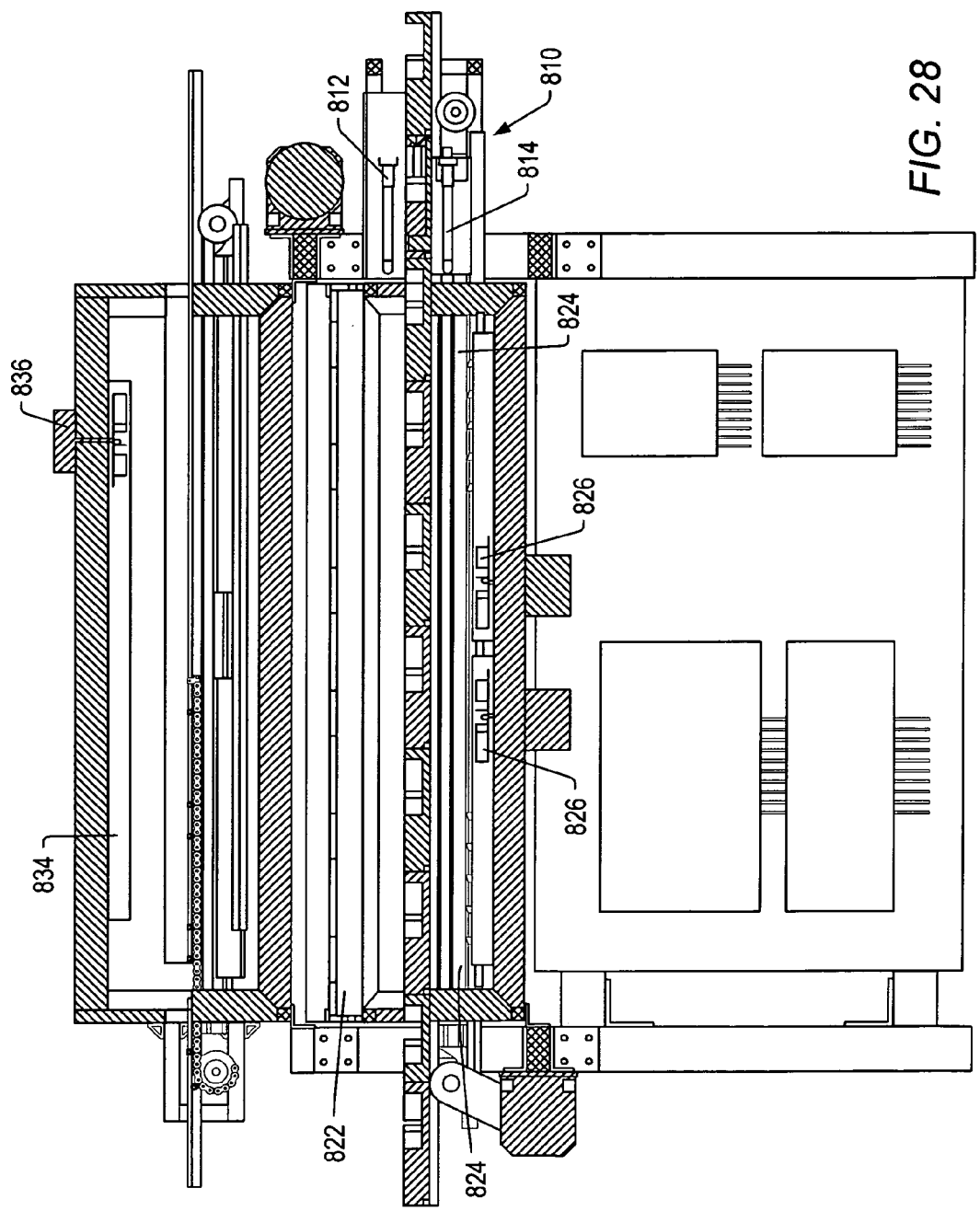
FIG. 28 depicts a cross-sectional side view of a high-volume lens curing apparatus.
Figure 29:
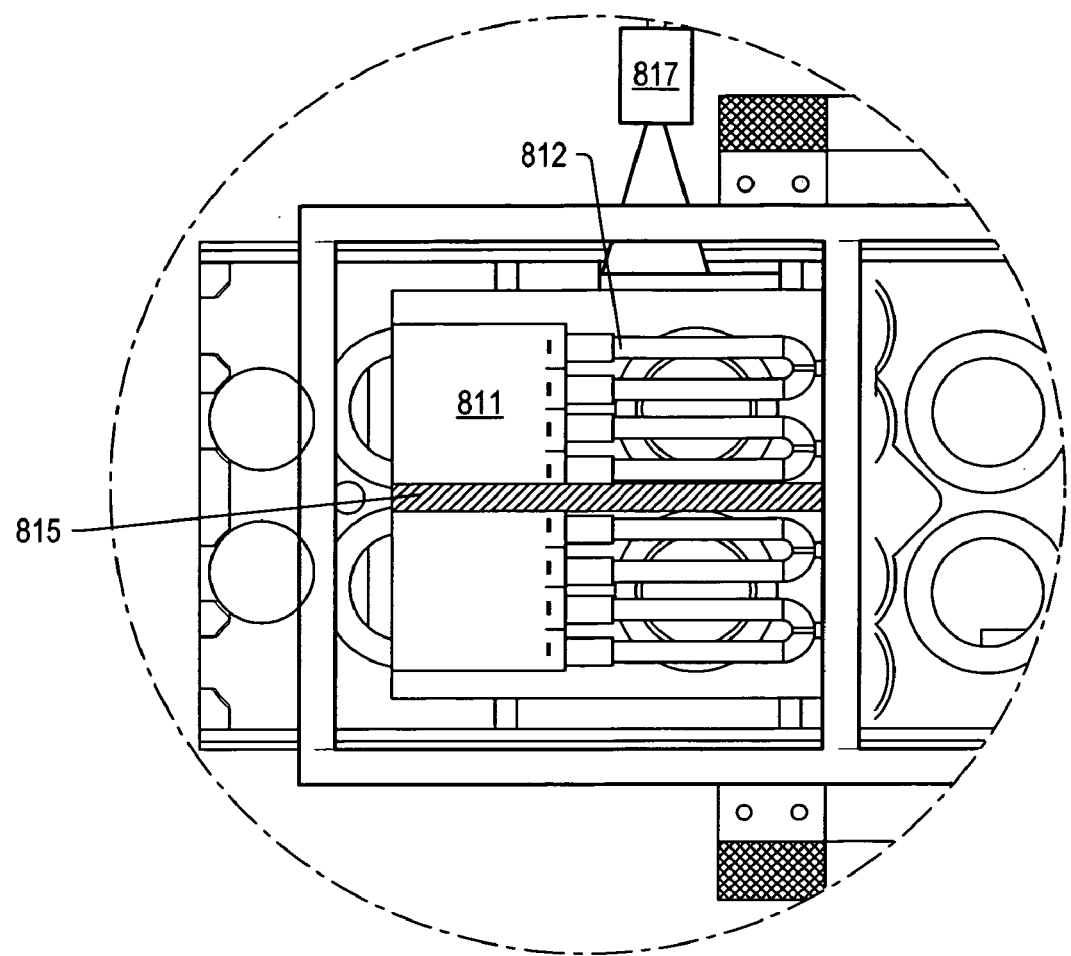
FIG. 29 depicts a cross-sectional top view of a first curing unit of a high-volume lens curing apparatus.

As shown in FIG. 28, first curing unit 810 may include upper light source 812 and lower light source 814. FIG. 29 depicts a cut away top view of first curing unit 810. As shown in FIG. 28, light sources 812 and 814 of first curing unit 810 may include a plurality of activating light generating devices or lamps. In one embodiment, the lamps are oriented proximate each other to form a row of lights, as depicted in FIG. 29. While the lamps are depicted as substantially U-shaped, it should be understood that the lamps may be linear, circular, or any other shape that allows a uniform irradiation of a lens forming assembly placed in the first curing unit. In one embodiment, three or four lamps are positioned to provide substantially uniform radiation over the entire surface of the mold assembly to be cured. The lamps may generate activating light.

The lamps may be supported by and electrically connected to suitable fixtures 811. Light sources 812 and 814 may generate either ultraviolet light, actinic light, visible light, and/or infrared light. The choice of lamps is preferably based on the monomers used in the lens forming composition. In one embodiment, the activating light may be generated from a fluorescent lamp. The fluorescent lamp preferably has a strong emission spectra in the 380 to 490 nm region. A fluorescent lamp emitting activating light with the described wavelengths is commercially available as model number FB290D15/ACT/2PC from LCD Lighting, Inc. in Orange Conn.

In some embodiments, the activating light sources may be turned on and off frequently during use. Fixture 811 may also include electronic hardware to allow a fluorescent lamp to be frequently turned on and off. Ballasts systems, such as the ones previously described, may be used to operate the lamps. In some embodiments, a barrier 815 may be placed between the lamps 811. The barrier may be configured to inhibit the passage of activating light from one set of lamps to the other. In this manner, the lamp sets may be optically isolated from each other. The lamps may be connected to separate ballast systems and a controller. In addition, the lamps may be coupled separately to fans. Thus, the lamps may be operated independently of each other. In addition, operation of the fans may be controlled by a controller to coincide with operation of the lamps. For example, if a lamp is turned on by a controller, a fan may also be turned on by a controller. This may be useful when lenses that require different initial curing sequences are being processed at the same time. The barrier 815 may inhibit the passage of light from one set of lamps to a mold assembly positioned below the other set of lamps.

In some embodiments, at least four independently controllable lamps or sets of lamps may be disposed in the first curing unit. The lamps may be disposed within the first curing unit with a sliding rack which may maintain a position of the lamps within the first curing unit. The lamps may be disposed in left and right top positions and left and right bottom positions. As shown in Table 10, a variety of different initial curing conditions may be required depending on the prescription. In some instances, the left eyeglass lens may require initial curing conditions that are substantially different from the initial curing conditions of the right eyeglass lens. To allow both lenses to be cured substantially simultaneously, the four sets of lamps may be independently controlled. For example, the right set of lamps may be activated to apply light to the back face of the mold assembly only, while, at the same time, the left set of lamps may be activated to apply light to both sides of the mold assembly. In this manner, a pair of eyeglass lenses whose left and right eyeglass prescriptions require different initial curing conditions may be cured at substantially the same time. Since the lenses may thus advantageously remain together in the same mold assembly holder throughout the process, the production process is simpler with minimized job tracking and handling requirements.

Figure 30:
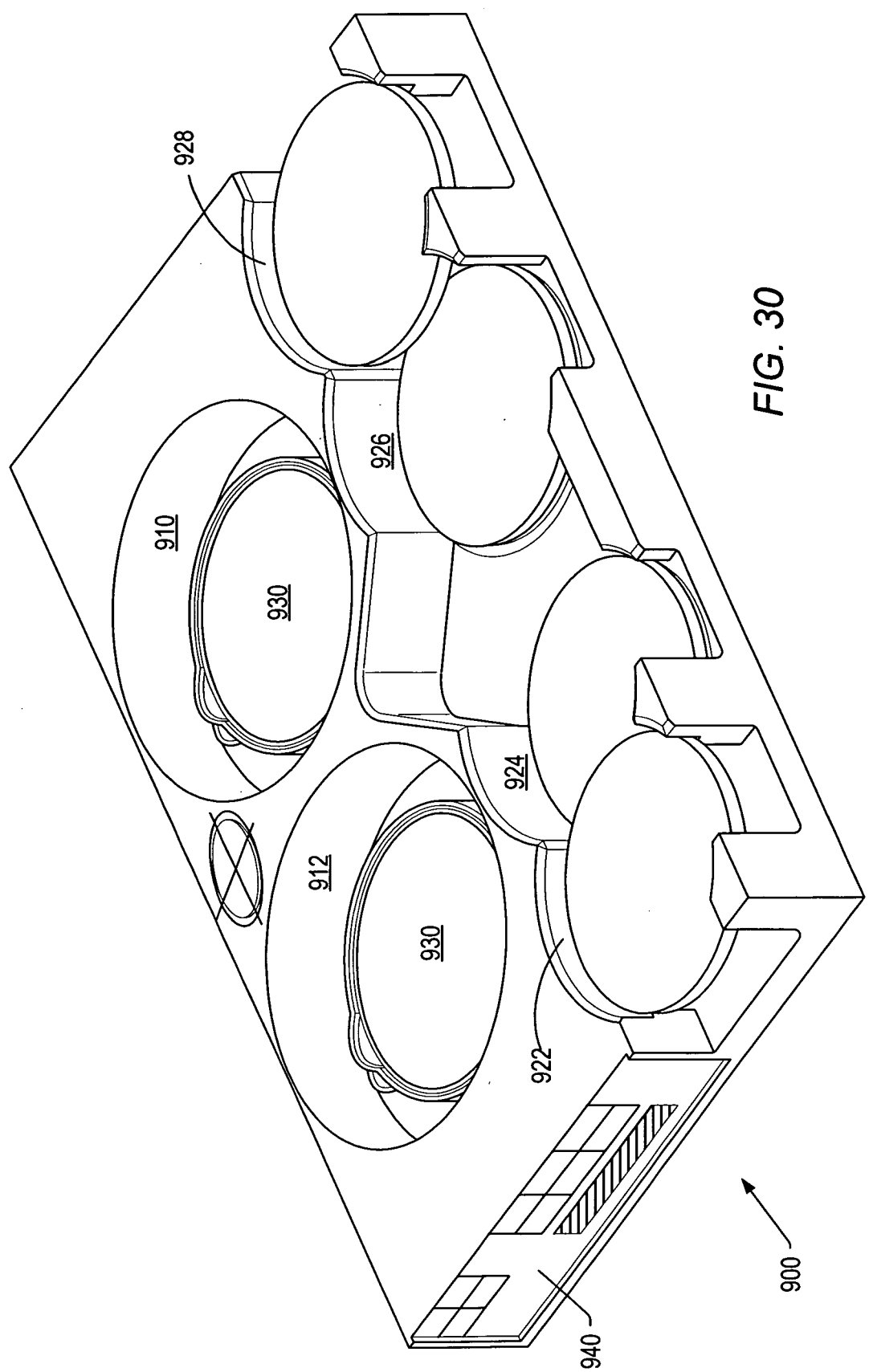
FIG. 30 depicts an isometric view of a mold assembly holder.

To facilitate the positioning and the conveyance of mold assemblies, a mold assembly holder may be used. An isometric view of a mold assembly holder 900 is depicted in FIG. 30. The mold assembly holder includes at least one, preferably two, portions 910 and 912 configured to hold a mold assembly 930. In one embodiment, the portions 910 and 912 are indentations machined into a plastic or metal block that is configured to hold a standard mold assembly. The mold assembly may be placed in the indentation. An advantage of such indentations is that the mold assemblies may be positioned in the optimal location for curing in the first and second curing units 810 and 820.

The indentations 910 and 912 may be sized to hold the mold assembly such that substantially all of the molds may be exposed to activating light when the mold assembly is positioned above or below an activating light source. The mold assembly holder may include an opening extending through the mold assembly holder. The opening may be positioned in the indentations 910 and 912 such that activating light may be shone through the mold assembly holder to the mold assembly. In some embodiments, the opening may be of a diameter that is substantially equal to the diameter of the molds. The opening will therefore allow substantially all of the surface area of the mold to be irradiated with activated light. In another embodiment, the diameter of the opening may be substantially less than a diameter of the molds. In this respect the opening may serve as an aperture which reduces the amount of light that contacts the outer edges of the molds. This may be particularly useful for curing positive lenses in which curing is initiated with more activating light being applied to the central portion of the molds than the edges. The indentations may extend in the body to a depth such that the mold assemblies, when placed in the indentations are even with or below the upper surface of the mold assembly holder. This imparts a low vertical profile to the mold assembly holder and allows the curing units of the high volume system to be constructed with a low vertical profile. In this manner, the size of the unit may be minimized.

The mold assembly holder 900 may also include further machined indentations for holding the unassembled pieces of the mold assembly (e.g., the molds and the gasket). For example, the mold assembly holder may be configured to hold at least two molds. During the assembly of the mold assembly, an operator typically will find and clean the molds and gasket before assembly. To minimize the possibility of mixing up the molds and gaskets, and to help minimize recontamination after the molds are cleaned, the mold assembly holder 900 includes sections to hold the various components. As depicted in FIG. 30, indentations 922, 924, 926, and 928 may also be formed in the mold assembly holder 900. The indentations may be labeled to facilitate the placement of the molds or gaskets. For example, indentation 922 may be labeled left lens, front mold, 924 may be labeled left lens, back mold, 928 may be labeled right lens, front mold, and 926 may be labeled right lens, back mold. Other variations of labeling and positioning of the indentations 922, 924, 926, and 928 may be used. This may help prevent operators from making mistakes due to use of incorrect molds to assemble the mold assemblies.

The mold assembly holder may also include a location for holding a job ticket 940. Job ticket may be placed in a holder mounted to a side of the mold assembly holder. Alternatively, the job ticket may have an adhesive that allows the ticket to be attached to the side of the mold assembly. The job ticket may include information such as: the prescription information, the mold ID numbers, the gasket ID numbers, the time, date, and type of lens being formed. The job ticket may also include a job number; the job number may correspond to a job number generated by the controller when the prescription is entered into the controller. The job number may also be depicted using a bar coding scheme. Use of a bar code on the job ticket may allow the use of bar-code scanners to determine the job number corresponding to the mold assemblies placed on the mold assembly holder.

The mold assembly holder may also include at least one indicia or an identifying mark. An indicia may include a color, at least one alphanumeric character, at least one graphical character, a barcode, or a radio frequency emitter. The indicia of a mold assembly holder may vary depending on the intended use of the mold assembly holder. For example, the color of a mold assembly holder may vary depending on the type of lens which may be formed within the mold assembly holder. For example, a mold assembly holder having a first color may be suitable for forming a photochromic lens, and a mold assembly holder having a second color may be suitable for forming a non-photochromic lens. In addition, alphanumeric characters formed in, printed on, or attached to the mold assembly unit may include, for example, "PHOTOCHROMIC LENS" or "NON-PHOTOCHROMIC LENS" depending on the type of lens which may be formed within the mold assembly holder. A graphical character may also vary depending on the type of lens which may be formed within the mold assembly holder.

A radio frequency emitter may be commonly referred to as an "RF tag." A radio frequency emitter may be formed within or coupled to a mold assembly holder. A radio frequency emitter may be configured to generate a radio frequency signal at least periodically. The generated radio frequency signal may include a signature which may be characteristic of the type of lens which may be formed within the mold assembly holder. A radio frequency detector may be coupled to a lens forming apparatus and may be configured to detect a radio frequency signal generated by the radio frequency emitter. The type of lens which may be formed with the mold assembly holder may then be determined from the detected radio frequency signal. In addition, a system may include a lens forming apparatus and mold assemblies of at least two different forms of at least one of the indicia described above.

The mold assembly holder 900 may be used in combination with a conveyor system 850 to transfer mold assemblies from the first curing unit to the second curing unit. The second curing unit is configured to apply activating light and heat to the mold assemblies after the curing is initiated by the first curing unit. The use of two curing units in this manner facilitates the application of curing sequences such as the sequences outlined in Table 9. In these embodiments, the mold assembly is subjected to an initiating dose of activating light, followed by a post-cure dose of activating light and heat. The initial dose may last from about 7 to 90 seconds. After the initial dose is applied, the mold assembly is subjected to a combination of activating light and heat for about 5 to 15 minutes. In many instances, subjecting the mold assembly to longer times under the post-cure conditions does not significantly effect the quality of the formed lens. Thus, the second curing unit is designed such that the amount of time that the mold assemblies spend in the second unit is not less than about 5 minutes.

During operation, a mold assembly or mold assembly holder is placed on the conveyor system and the mold assembly is moved to a position within the first curing unit 810. In the first curing unit 810, the mold assemblies receive the initial dose of light based on the prescription of the lens, e.g., as outlined in Table 9. After the mold assemblies receive their initial dose, the mold assemblies are moved by the conveyor system 850 to the second curing unit. In the second curing unit, the mold assemblies are treated with activating light and heat. The time it takes for the mold assembly to pass entirely through the second curing unit may be equal to or greater than the post-cure time.

Figure 32:
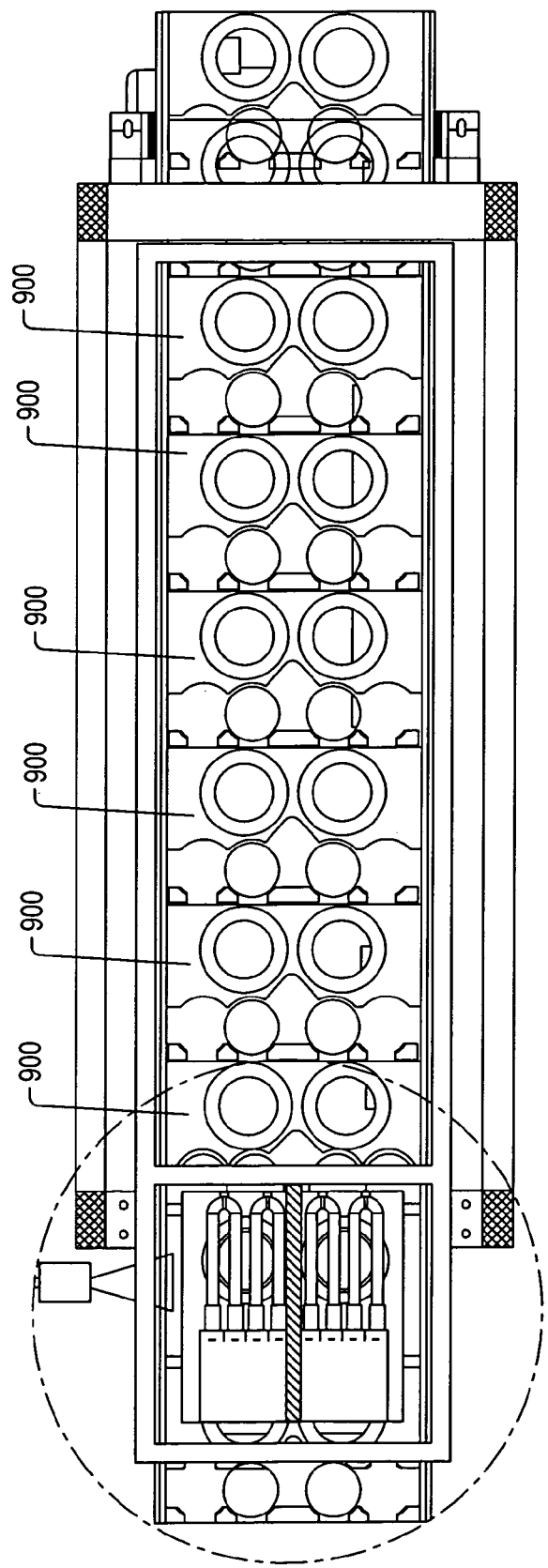
FIG. 32 depicts a cross sectional top view of a high-volume lens curing apparatus.

In one embodiment, the conveyor system may be a single continuous system extending from the first curing unit through the second curing unit. During the operation of the lens forming apparatus 800, it is envisioned that a continuous stream of mold assemblies may be placed on the apparatus. FIG. 32 depicts a top cut away of a system in which a continuous stream of mold assembly holders 900 are moving through the first and second curing units. Because the curing for any given prescription lens is complete in the first curing unit in a time of 90 seconds or less, the second unit may be constructed as a rectangular shaped unit that will hold multiple mold assemblies, as depicted in FIG. 27. The length of the second cure unit is determined by the time required for each mold assembly in the first unit. Because the conveyor system is a single continuous unit, the molds will move through the second curing unit in increments equal to the amount of time spent in the first curing unit. Thus, the molds move only when the curing cycle of the first curing unit is complete and the mold assemblies or mold assembly holder is advanced to the second curing unit.

In one embodiment, the mold assemblies are placed on a mold assembly holder 900 as described above. The mold assembly holder may have a predetermined length ($L_H$). After the mold assemblies are loaded onto the mold assembly holder, the mold assembly holder may be placed on the conveyor system 850 and advanced to the first curing unit. The mold assembly holder will remain in the first curing unit for a predetermined minimum amount of time, i.e., the initiation time ($T_I$). For example, for most of the lens forming compositions and prescriptions outlined above, this maximum time will be about 90 sec. After the initial cure is performed, the mold assembly holder is advanced to the second curing unit and another mold assembly holder is advanced to the first curing unit. To properly cure lens forming composition, the mold assemblies may need to remain in the second curing unit for a minimum amount of time, i.e., the post-cure time ($T_P$). The required minimum length of the second curing unit ($L_{SC}$) may, therefore be calculated by these predetermined values using the following equation.

$$L_{SC}=L_H \times (T_P/T_I)$$

By constructing the second curing unit to have a length based on this equation, the mold assembly holder will exit from the second curing unit after the correct amount of post-curing has occurred. This will ensure that the mold assembly will remain in a post-cure situation even if the minimal initiation times are used.

In practice, there is a wide variation in the initiation times based on the prescription and the type of lenses being formed. For example, Table 9 discloses some typical initiation times that range from about 7 sec. to about 90 sec. In order to optimize the system, the length of the second curing unit may be altered based on the maximum predetermined initiation time. For example, the ($T_I$) rather than being the minimum time will be the maximum time possible for initiation of the curing. In practice, the conveyor system may be configure to advance a mold assembly holder from the first curing unit to the second curing unit at time intervals equal to the maximum possible initial curing cycle (e.g., about 90 sec. for the above-described compositions). To accommodate the different initial curing cycles, a controller may be coupled to the lamps of the first curing unit. The controller may be configured to turn on the lamps such that the initial curing cycle ends at the end of the maximum initial curing time. For example, if the maximum initial curing time is 90 sec., however the prescription and lens type calls for only a 7 sec, cure. The lamps are kept off until 7 sec. before the end of the 90 sec. time interval (i.e., for 83 seconds). The lamps are, therefore, only activated for the last 7 sec. This may ensure that the time interval between the end of the completion of the initial cure and the entry into the second curing unit is the same regardless of the actual initiation dosage. The length of the second curing unit may be adjusted accordingly to accommodate this type of curing sequence.

In another embodiment, the conveyor system may include two independently operated conveyors. The first conveyor may be configured to convey the mold assembly holder or mold assemblies from the first curing unit to the second curing unit. A second conveyor may be positioned within the second curing unit. The second conveyor may be configured to convey the mold assemblies or the mold assembly holder through the second curing unit. As such, a speed of the first and second conveyors may be substantially different. For example, a speed of the first conveyor may be variable and a speed of the second conveyor may be substantially constant. In this manner, the second curing unit may be designed independently of the initial curing times. Instead, the length of the second curing unit may be based on the time required for a typical post-cure sequence. Thus, the length of the second curing unit may be determined by the rate at which the second conveyor system is operated and the amount of time required for a post-cure. This also allows an operator to operate the curing units independently of the other.

Figure 31:
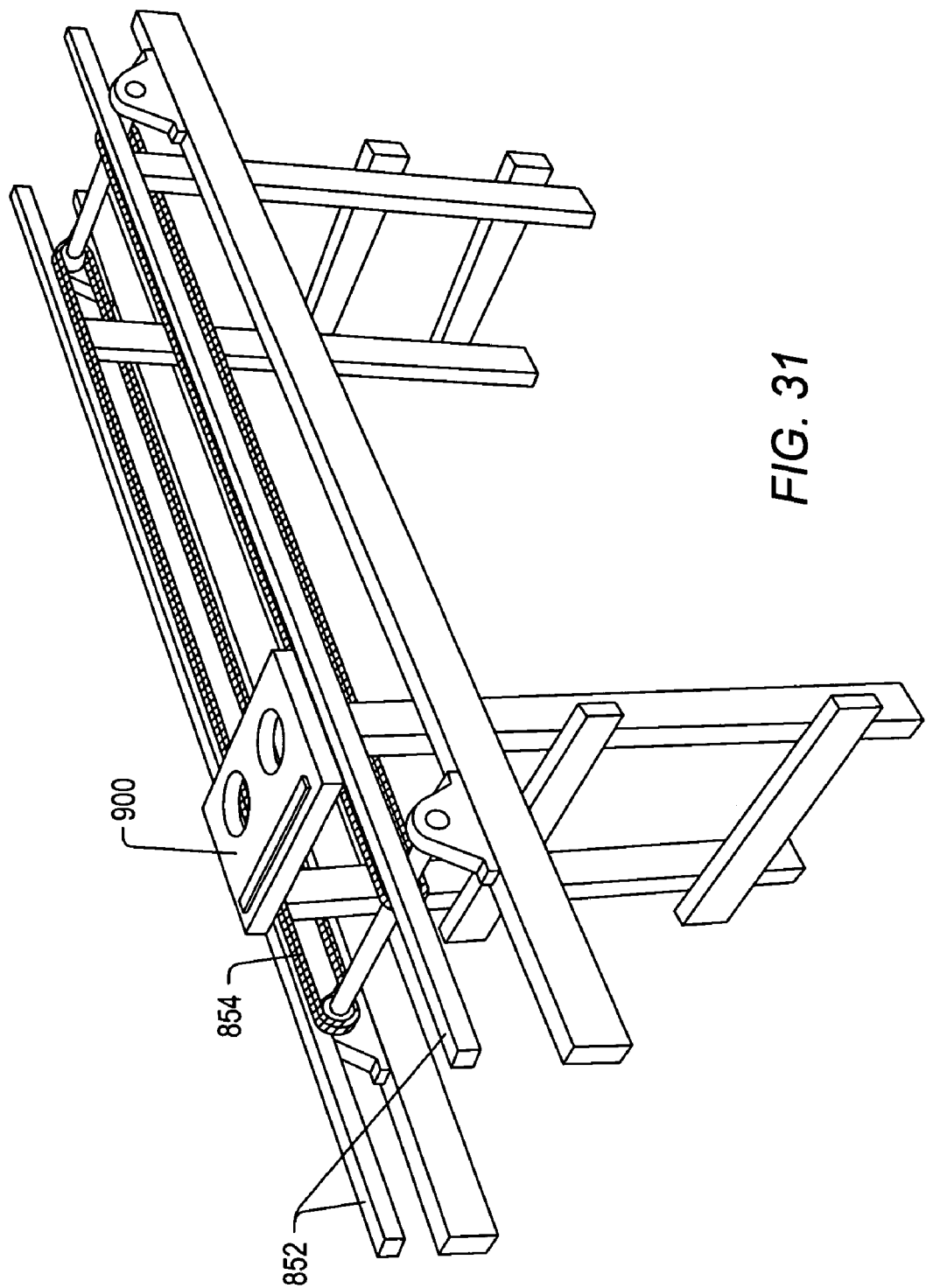
FIG. 31 depicts an isometric view of a conveyor system for a high-volume lens curing apparatus.

The conveyor system may be configured to convey either mold assemblies or a mold assembly holder (e.g., mold assembly holder 900) through the first and second curing units. A view of the conveyor system in which the curing units have been removed from the lens forming apparatus is depicted in FIG. 31. The conveyor system includes a platform for conveying a mold assembly holder. The platform may be configured to support the mold assembly holder 900 as it passes through the first and second curing units. In one embodiment, the platform is formed from two rails 852 that extend the length of the lens forming apparatus. The rails, 852 may be any width, however should be spaced apart from each other at a distance that allows activating light to pass past the rails 852 and to the mold assemblies on the mold assembly holder 900.

Figure 33:
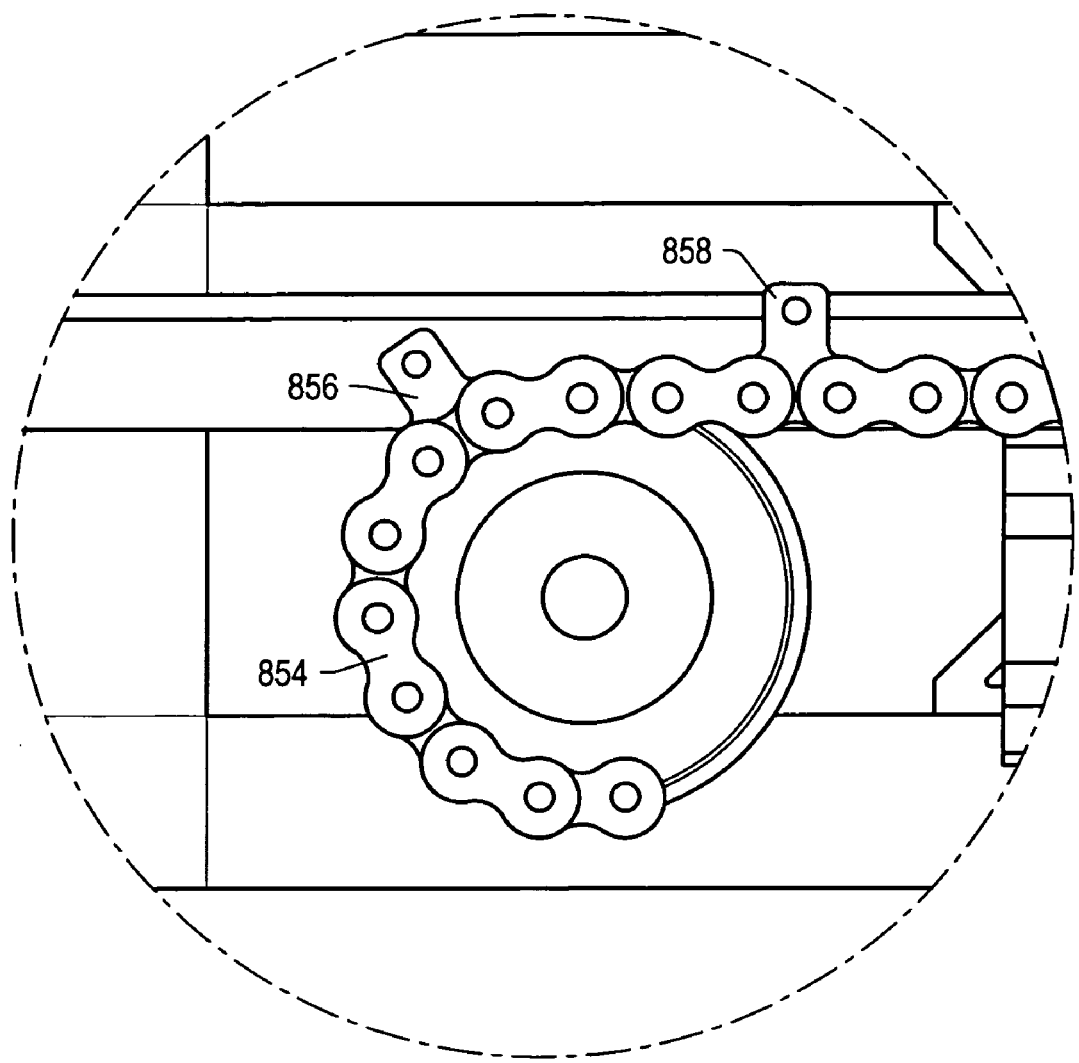
FIG. 33 depicts a side view of a portion of a conveyor system for a high-volume lens curing apparatus.

The conveyor system includes a flexible member 854 (e.g., a belt or chain) that is configured to interact with the mold assembly holder 900. The flexible member will interact with the mold assembly holder and pull or push the mold assembly holder along the platform. FIG. 33 depicts a close up view of a portion of the flexible member. In this embodiment, the flexible member is composed of a chain 854 that includes a number of projections 856 and 858 that are placed at predetermined positions along the chain. The projections may be configured to interact with the mold assembly holder. In one embodiment, the mold assembly holder may include a ridge along the bottom surface. The ridge will interact with the projections when the chain is moved to the appropriate position. While depicted as a chain, it should be understood that the flexible member may be formed of other materials such as a rubber belt. For example, the flexible member may be formed of a flexible material such as neoprene.

Figure 34:
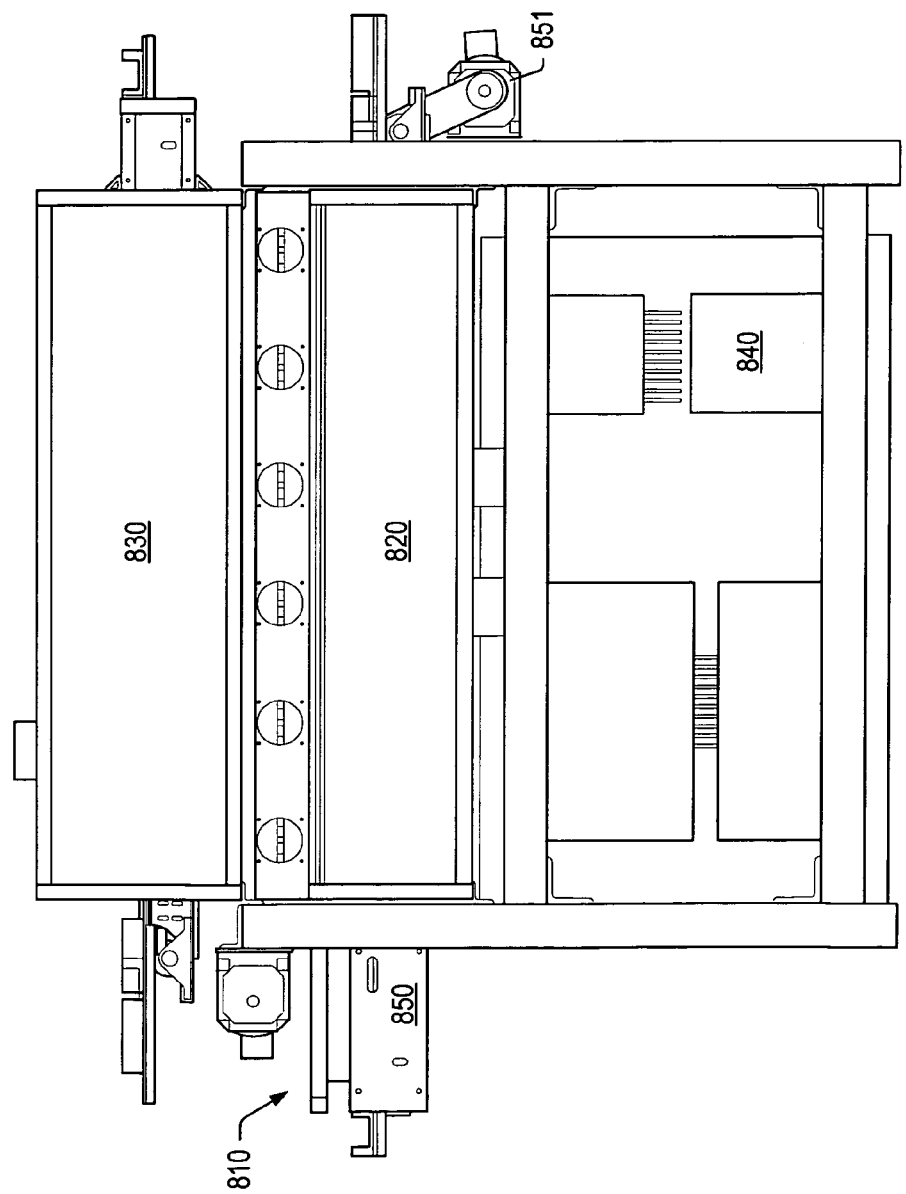
FIG. 34 depicts a side view of a high-volume lens curing apparatus.

The flexible member 854 may be coupled to a pair of wheels or gears disposed at opposite ends of the lens forming apparatus. FIG. 33 depicts a portion of the flexible member that is resting on a gear disposed at an end of the lens forming apparatus. The flexible member may be moved along the lens forming apparatus by turning either of the wheels or gears. The wheels or gears may be manually turned or may be coupled to a motor. FIG. 34 depicts a lens forming apparatus in which a motor 851 is coupled to an end of the second curing unit. The motor may be coupled to the flexible member such that the flexible member may be moved by the operation of the motor. The motor 851 may either pull or push the flexible member along the length of the lens forming apparatus. In addition, the motor and the flexible member may be configured such that the flexible member may continue to move under a mold member holder even if movement of the mold member holder may be obstructed. In this manner, the flexible member may "slip" under a mold member holder if, for example, a mold member has reached a safety stop coupled to the first or second curing units. For example, a safety stop may be coupled to an end of each of the curing units to prevent tray from falling off the conveyance system.

Figure 35:
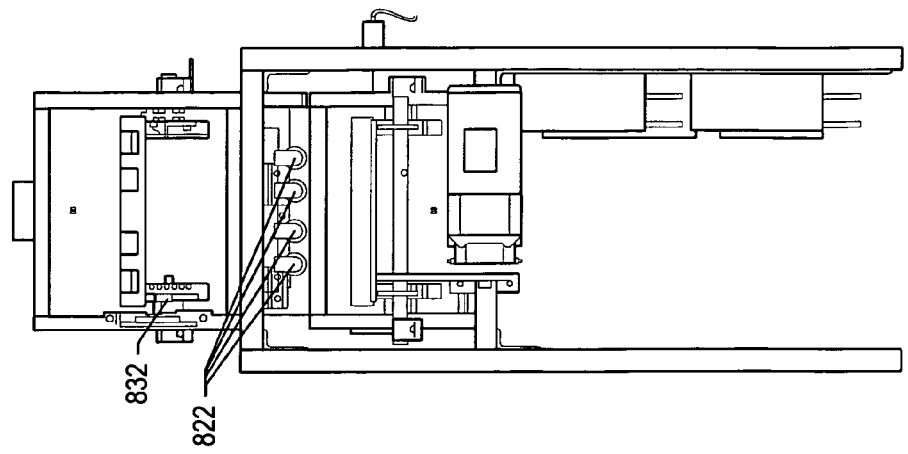
FIG. 35 depicts a cross-sectional front view of a high-volume lens curing apparatus.

The second curing unit may be configured to apply heat and activating light to a mold assembly as it passes through the second curing unit. The second curing unit may be configured to apply activating light to the top, bottom, or both top and bottom of the mold assemblies. As depicted in FIGS. 28 and 35, the second curing unit may include a bank of activating light producing lamps 822 and heating systems 824. The bank of lamps may include one or more substantially straight fluorescent lamps that extend through the entire length of the second curing unit. The activating light sources in the second curing unit may produce light having the same spectral output as the activating light sources in the first curing unit. The spectral output refers to the wavelength range of light produced by a lamp, and the relative intensity of the light at the specific wavelengths produced. Alternatively, a series of smaller lamps may be disposed with the curing unit. In either case, the lamps are positioned such that the mold assemblies will receive activating light as they pass through the second curing unit. The heating unit may be a resistive heater, hot air system, hot water systems, or infrared heating systems. In this manner, a chamber temperature may be controlled by altering the adjusting the power to, for example, the resistive heater. An air distributor 826 (e.g., a fan) may be disposed within the heating system to aid in air circulation within the second curing unit. By circulating the air within the second curing unit, the temperature within the second curing may be more homogenous.

In some embodiments, an anneal unit may also be coupled to the lens forming apparatus. As depicted in FIG. 27, an anneal unit 830 may be placed above the second curing unit. Alternatively, the anneal unit may be placed below or alongside of the first or second curing units. The anneal unit is configured to apply heat and, optionally light, to anneal a demolded lens. When a lens, cured by the activating light, is removed from a mold assembly, the lens may be under a stressed condition. It is believed that the power of the lens can be more rapidly brought to a final resting power by subjecting the lens to an anneal treatment to relieve the internal stresses developed during the cure. Prior to annealing, the lens may have a power that differs from the desired final resting power. The anneal treatment is believed to reduce stress in the lens, thus altering the power of the lens to the desired final resting power. Preferably, the anneal treatment involves heating the lens at a temperature between about 200° F. to 225° F. for a period of up to about 10 minutes. It should be understood that the anneal time may be varied depending on the temperature of the anneal unit. Generally, the higher the temperature of the anneal unit, the faster the anneal process will be completed. The anneal process time is predetermined based on the amount of time, at a predetermined temperature, a formed lens will need to be annealed to be brought to its final resting power.

In the embodiment depicted in FIG. 27, the anneal unit may be constructed in a similar manner to the second curing unit. Turning to FIG. 35, the anneal unit may include a conveyor system 832 for moving a demolded lens through the anneal unit. The demolded lens may be placed in the same mold assembly holder that was used for the first and second curing units. The mold assembly holder 900 may be configured to hold either the mold assembly and/or a demolded lens. The anneal unit includes a heating element

834 (depicted in FIG. 28). The heating element may include a air distributor 836 for circulating air throughout the anneal unit.

The anneal unit may have a length that is determined by the rate at which the mold assembly holders are transported through the anneal unit and the time required for the anneal process. For example, in some of the compositions listed above, an anneal time of about 10 min. may be used to bring the lens to its final resting power. The conveyor system of the anneal unit may therefore be configured such that the demolded lenses spend about 10 minutes within the anneal unit as the lenses traverse the length of the unit. A conveyor system similar to the system described above for the first and second curing units may be used. The conveyor system in the anneal unit may also be configured to move through the anneal unit continuously.

The controller 840 may be configured to control operation of the lens-curing units. The controller may perform some and/or all of a number of functions during the lens curing process, including, but not limited to: (i) determining the initial dose of light required for the first curing unit based on the prescription; (ii) applying the activating light with an intensity and duration sufficient to equal the determined dose; (iii) applying the activating light with an intensity and duration sufficient to equal the determined second curing unit dose; (iv) turning the lamps sources on and off independently and at the appropriate times; and (v) triggering the movement of the proper light filters into the proper position based on the prescription. These functions may be performed in response to information read by the bar code reader from the job ticket positioned on the mold assembly holder. This information may include the prescription information and may be correlated with the initial curing conditions by the controller 840.

The controller may also control the flow of the mold assembly holder through the system. The controller may include a monitoring device for determining the job number associated with a mold assembly holder. FIG. 29 depicts a monitoring device 817 which is coupled to the lens forming apparatus proximate the first curing unit. The monitoring device may be a laser or infrared reading device. In some embodiments, the monitoring device may be a bar code reader for reading a bar code. The monitoring device may be positioned within the first curing unit. When a mold assembly holder is placed on the conveyer system, it may be moved to a position such that the monitoring device may read a job number printed on the job ticket. In one embodiment, the job number is in the form of a bar code. The monitoring device may be coupled to the controller. The controller may use the job number, read from the mold assembly holder, to determine the curing conditions required for the job that is being transferred to the first curing unit. In addition, the controller may use the job number, read from the mold assembly holder, to determine when to apply light to the job being transferred to the first curing unit. As described before, the job number may correspond to a prescription that was previously entered into the controller. In this manner, the proper curing conditions may be achieved without relying on the operator to input the correct parameters.

Another advantage of the monitoring of the job number is that accidental usage of the lamps may be avoided. If the monitoring device is positioned within the first cure unit, the controller may prevent the activation of the first cure unit lamps, until a job ticket is detected. The detection of a job ticket may indicate that a mold assembly holder is placed in the proper position within the first curing unit. Once the mold assembly holder is placed within the first curing unit, the lamps of the first curing unit may be activated to initiate curing and the conveyance system may begin to move. If no job ticket is detected, the apparatus may wait in a stand-by mode until the mold assembly holder is inserted into the first curing unit. In this manner, the lifetime of a lamp of a lens forming apparatus may be extended.

Alternatively, a monitoring device positioned within the first cure unit may include a photosensor which may commonly be referred to as a "photoeye". The photosensor may be configured to determine if a mold assembly holder is placed at the entrance of an initialization unit within the curing unit. The photosensor may, for example, monitor an intensity of a light beam. If a mold assembly holder is in front of the photosensor, then an intensity of the light beam may be reduced. Such a reduction in intensity may be detected by the photosensor and may be processed to determine that a mold assembly holder may have been placed in the curing unit. As described above, once a mold assembly holder may be detected within the first curing unit, the lamps of the first curing unit may be activated to initiate curing and the conveyance system within the first curing unit may begin to move.

In addition, a speed of the conveyance system may increase upon detection of a mold assembly holder within the first curing unit. In this manner, a mold assembly holder may be moved into position quickly once the mold assembly holder has been placed in the curing unit. Furthermore, the photosensor may be configured to monitor an intensity of the light beam periodically. In this manner, the photosensor may determine how long a mold assembly holder may be located at a position in the lens forming apparatus. In addition, if a mold assembly holder is moved out of the light beam of the photosensor, the photosensor may detect an increase in an intensity of the light beam. The photosensor may be further configured to send the detected intensity of the light beam to a controller computer. The controller computer may be configured to control the conveyor system in response to the detected intensity of the light beam. In this manner, the controller computer may be configured to prevent a mold assembly holder from entering the lens forming apparatus until an increase in an intensity of a light beam is received from the photosensor by controlling the conveyor system.

Furthermore, multiple such photosensors may be positioned at various locations throughout a curing unit. In this manner, a presence of the mold assembly holder may be detected at various positions through a curing unit. In addition, the output of the multiple photosensors may be used to monitor the operation of the curing unit. Such a photosensor, or a plurality of photosensors, may also be positioned within the second cure unit and may also be configured to determine a presence of a mold assembly holder in the second cure unit. Position of a tray within a curing unit may also be used to determine when light may be applied to the mold assembly holder in an initialization chamber. For example, the controller may determine delay time for applying initialization light from a speed of the conveyance system. In this manner, application of initialization light may be delayed until a last portion of the time in which the mold assembly holder may be in the initialization unit. Minimization of the delay between application of initialization light and curing light may increase the consistency of resulting eyeglass lenses because each lens forming composition in each processed mold assembly holder may get the same treatment.

It should be understood, that the above-described lens curing system may be used in combination with any of the features of the previously described embodiments.

Additional embodiments relate to systems and method for the location, storage, and identification of eyeglass mold members to be used in the production of eyeglass lenses. The system may employ a two-dimensional or three-dimensional eyeglass mold member storage system (also called a storage array) that may allow a user to store and retrieve mold members in an organized fashion. The storage array may be configured as a horizontal, vertical or angled array. The mold members may be organized within the storage array such that mold members with similar properties may be arranged near one another. A controller computer may be coupled to the mold member storage array. Additionally, an indicator or indicators may be coupled to the mold member storage array to assist a user in locating a desired mold member.

Figure 36:
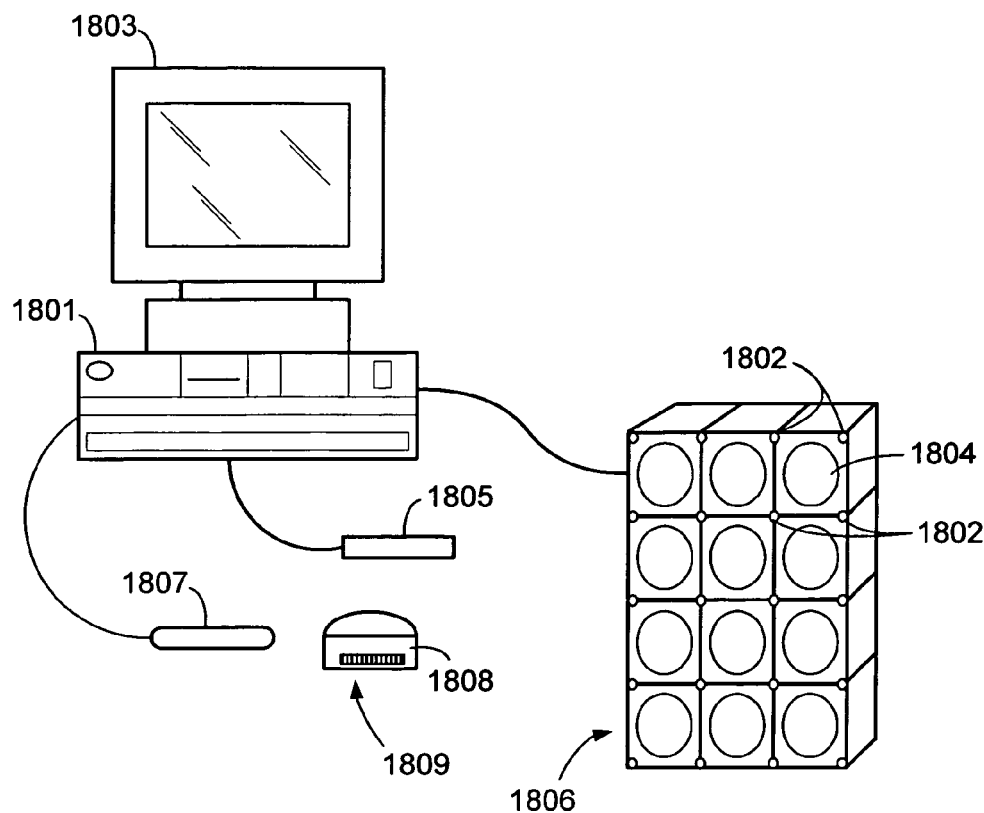
FIG. 36 depicts a schematic front view of an embodiment of a mold member storage array coupled to a controller computer.

FIG. 36 depicts an embodiment of an eyeglass mold member storage system including mold member storage array 1806 coupled to controller computer 1801. Mold member storage array 1806 may include rows or columns of mold member storage locations 1804. Indicators 1802 may be arranged proximate each mold member storage location 1804. In this embodiment, four indicators 1802 may surround each mold member storage location 1804 with adjacent storage locations sharing the indicators between them. To direct a user to select a mold member in a storage location, controller computer 1801 may produce a signal thereby activating indicators 1802. Mold member storage array 1806 may be configured as a vertical, horizontal, or angled array of storage locations 1804 in which an eyeglass mold member may be securely stored.

Figure 37A:
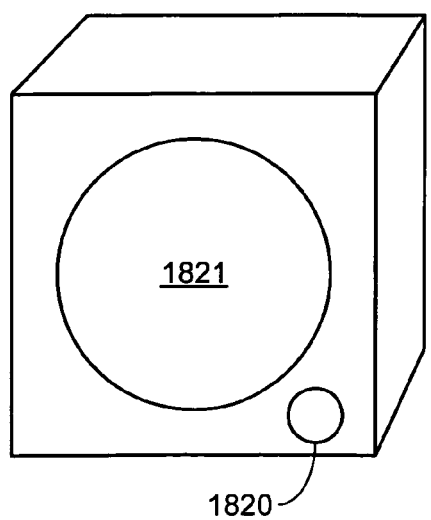
FIGS. 37a and 37b depict schematic perspective views of embodiments of indicators positioned on eyeglass mold member storage locations.
Figure 37B:
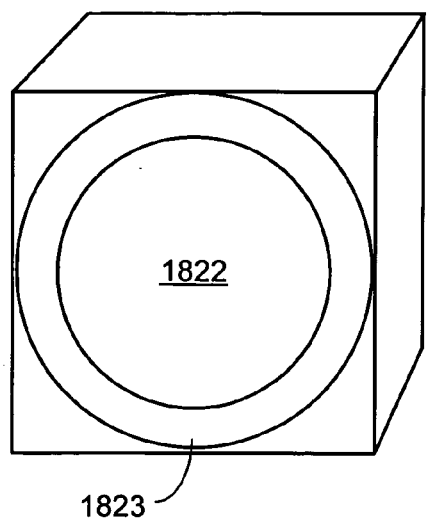

FIGS. 37a and 37b depicts several embodiments of mold member storage locations 1821 and 1822. In the embodiment of FIG. 37a, indicator 1820 may be located adjacent to each mold member storage location 1821. In the embodiment of FIG. 37b, indicator 1823 may be configured to encircle or illuminate each mold member storage location 1822. The indicator, however, may include any appropriate indicator which may be known in the art.

Figure 38:
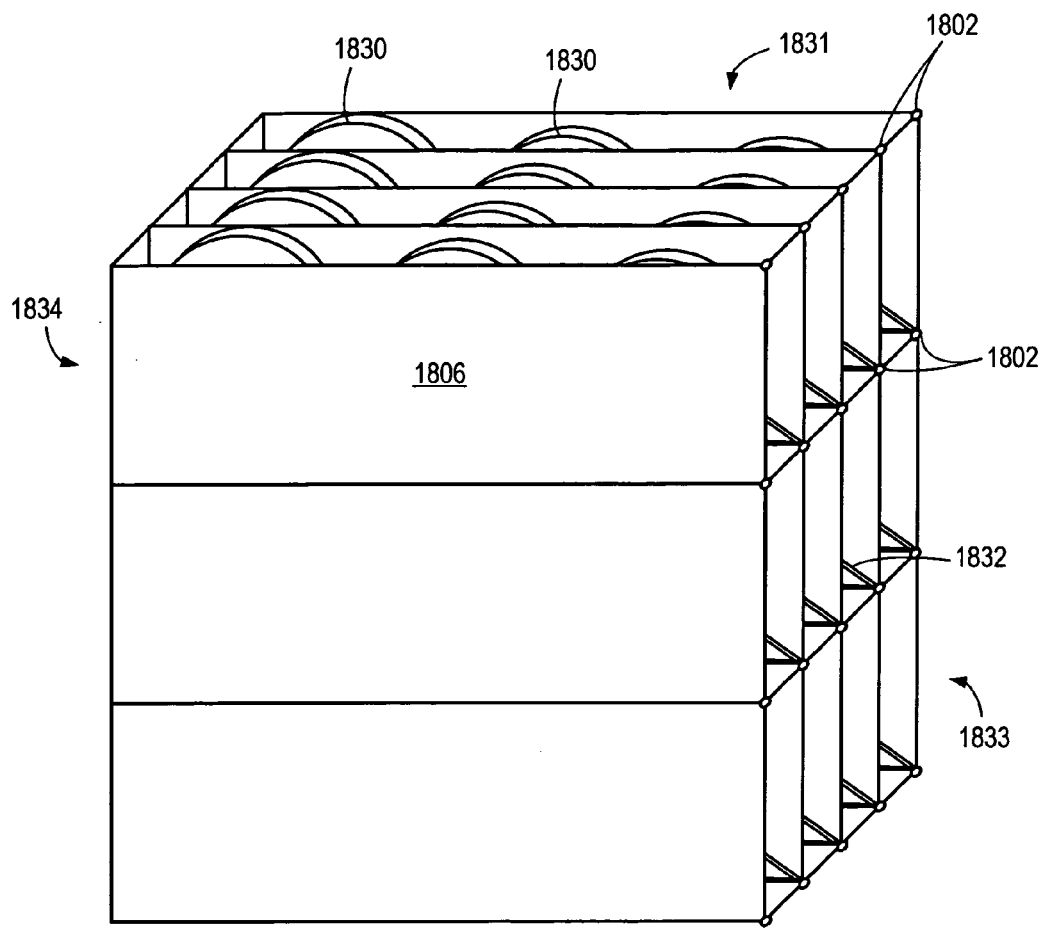
FIG. 38 depicts a schematic perspective view of an embodiment of a vertical mold member storage array.
Figure 39:
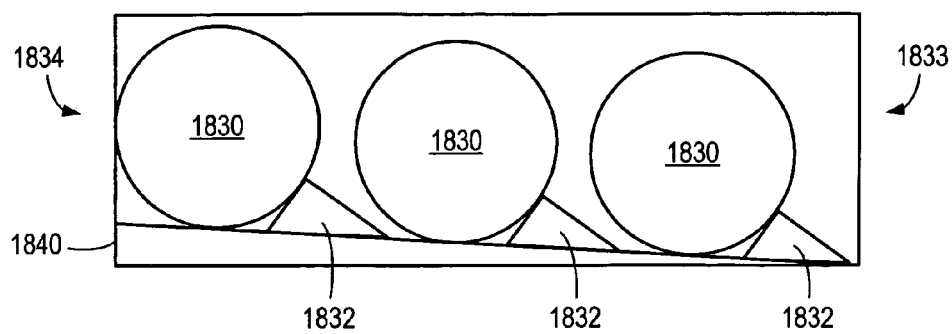
FIG. 39 depicts a partial cross-sectional view of an embodiment of the vertical mold member storage array of FIG. 38.

FIG. 38 depicts an embodiment of an eyeglass mold member storage array 1806. Storage array 1806 may facilitate the storage of a large number of mold members 1830. Mold member storage array 1806 may be configured vertically, i.e. such that molds within the array are vertical. As shown in FIG. 39, molds may be arranged on shelf 1840. Shelf 1840 may be tilted toward the front of array 1833 at an angle of about 5 degrees to about 10 degrees.

Figure 40:
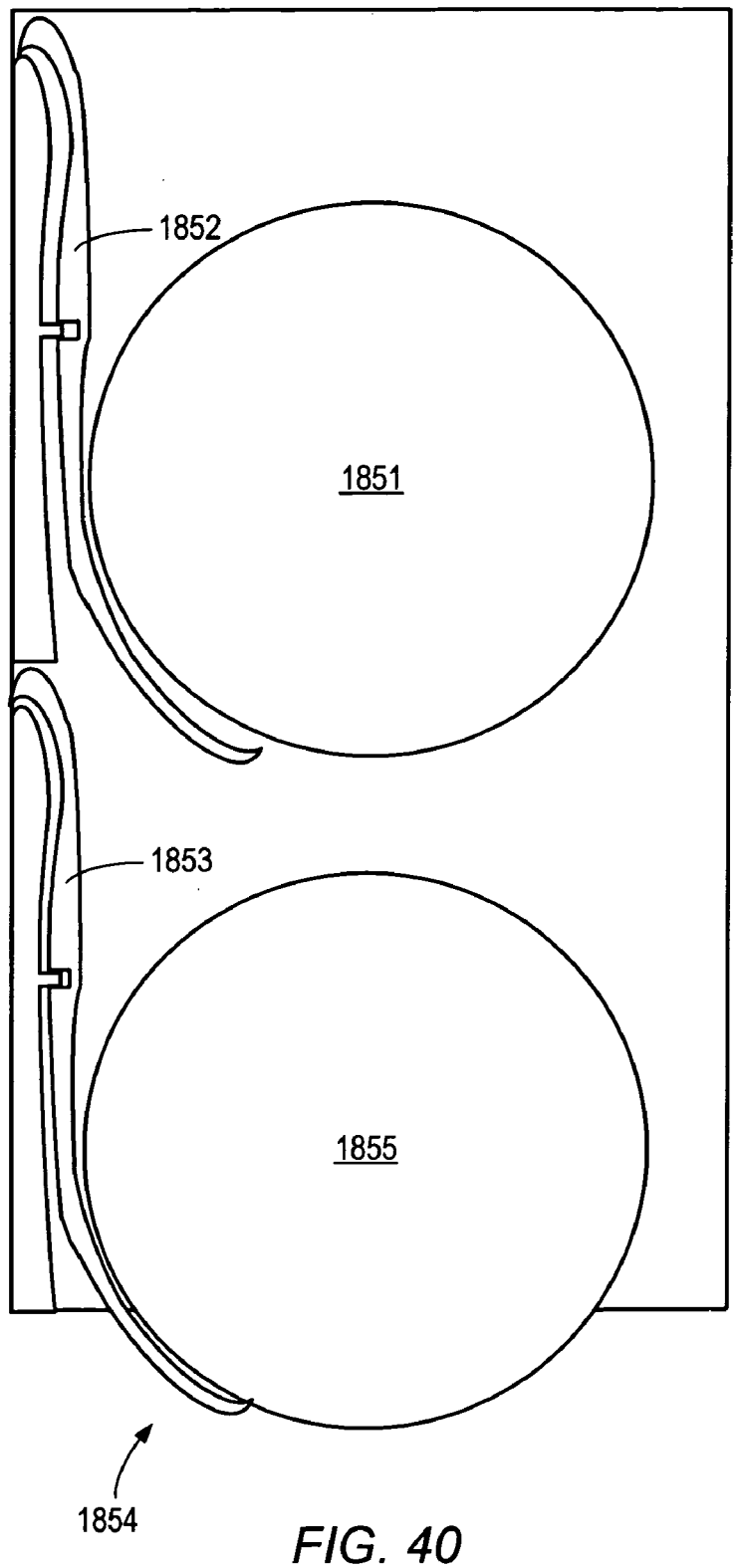
FIG. 40 depicts a partial cross-sectional view of an embodiment of a mold member storage unit in which mold members interact with the separating devices.
Figure 41A:
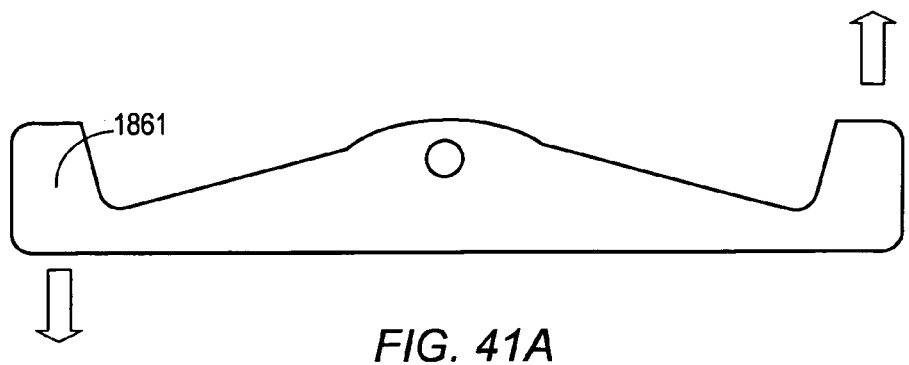
FIGS. 41A through 41D depict schematic perspective views of various embodiments of cams that may be employed in a mold storage array.
Figure 41B:
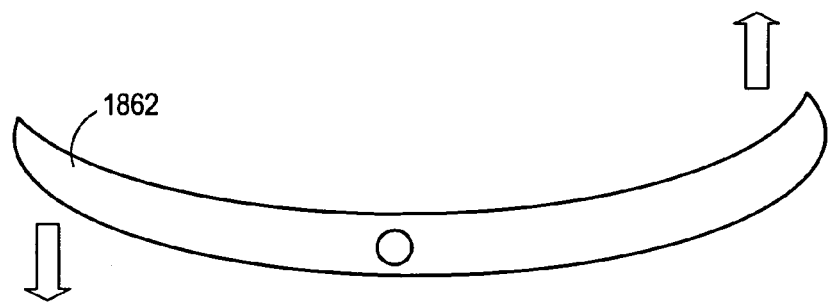
Figure 41C:
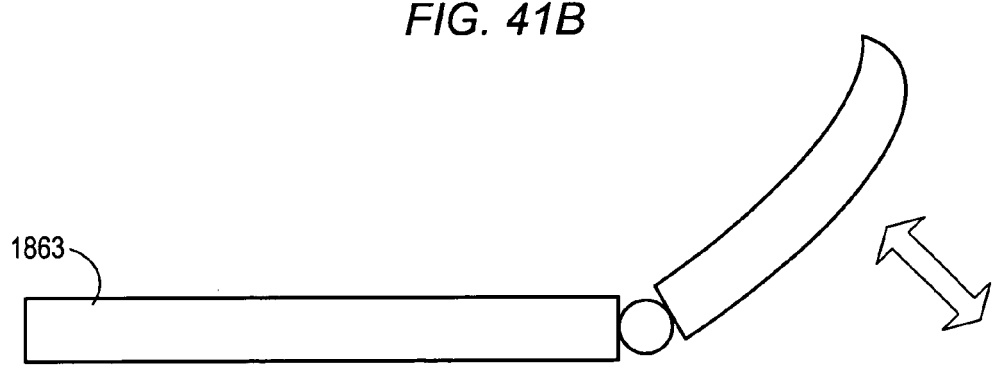
Figure 41D:
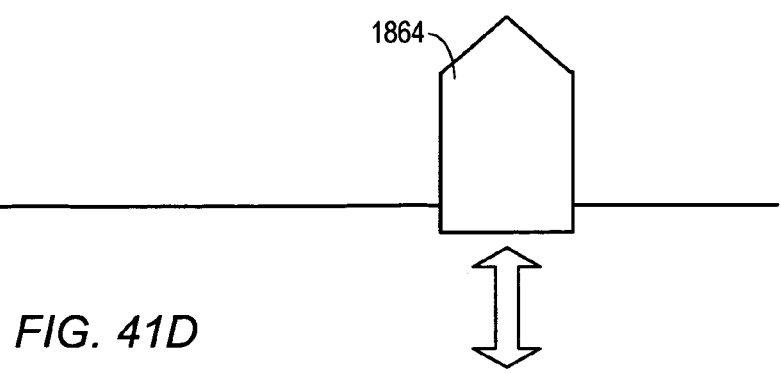

If the stored mold members are lens molds, as shown in FIG. 38, it may be possible for individual molds 1830 to be damaged by contact with one another. To prevent molds 1830 from contacting each other, separating device 1832 may be coupled to the mold storage array. A variety of cams or other separating devices may be used to separate individual molds. Separating device 1832 (more clearly illustrated in FIG. 39) may include one cam or a plurality of cams. Many different types and arrangements of cams may be used. FIGS. 40, 41A, 41B, 41C, and 41D depict a variety of cams, which may be suitable for separating devices. Reference numerals 1852, 1853, 1861, and 1862 indicate rocking type cams. Reference numeral 1863 indicates a hinged cam as depicted in FIG. 41C. Reference numeral 1864 indicates a reciprocating cam as depicted in FIG. 41D. FIG. 40 also depicts interaction of cams 1852 and 1853 with mold members 1851 and 1855. At dispensing end 1854, cam 1853 may retain mold member 1855 within the storage location, whereas within the body of the storage location, cam 1852 may prevent mold members 1851 and 1855 from contacting one another. The position of the separating devices may vary depending on the mold member storage array and preference. As each mold 1855 is removed for use, the separating devices 1853 may move to dispense the mold 1855.

In the embodiment of FIG. 38, molds 1830 may be removed from array 1806 at front end 1833. When mold 1830 is removed (or dispensed) from array 1806, separating devices 1832 may move or disengage to allow the adjacent mold to advance into the emptied storage location. This process may continue, with adjacent molds advancing into empty storage locations until the empty storage location coincides with the storage locations designated for restocking molds into mold member storage array 1806.

Once a mold member has been used and cleaned, it may be ready for storage. The cleaned mold member may be returned to storage by placing the mold member in the designated restocking location. The restocking location may be the same as the dispensing location, or it may be different. For example, in the case where the mold member is a lens mold, and the mold member storage array is a vertical array, the mold member storage array may be configured to allow the user to remove a desired mold from a first point. The array may further be configured to allow the user to restock the array at a second point. The second point may be on the opposite side of the array from the first point, or it may be on a side adjacent to the side of first point. In the embodiment of FIG. 38, the first point coincides with the front end of array 1833. Preferably, the second point coincides with back end 1834 of the array. However, rather than being restocked from back end 1834 of the array, the array may be configured to allow restocking from top end 1831 of the array. Separating devices 1832 may load and secure returned molds 1830 into place automatically.

Controller computer 1801, as depicted in FIG. 36, may be configured to interact with the operator. The controller computer may include at least one input device 1805 and at least one output device 1803. Input device 1805 may include a keyboard (e.g., a full computer keyboard or a modified keyboard), a light sensitive pad, a mouse, a touch sensitive pad, a bar code scanner, a microphone, or another appropriate input device. In a preferred embodiment, input devices 1805 may also include at least a keyboard, a mouse, and a bar code scanner. Output device 1803 or devices may include a display screen, a voice synthesizer, or another suitable output device. In a preferred embodiment, output device 1803 may include at least a display screen.

Controller computer 1801 may utilize user input to establish some control parameters. For example, the controller computer may allow the user to input information regarding the lens to be formed. This information may include type of lens (clear, ultraviolet absorbing, photochromic, colored, etc.), lens prescription, type of coatings (e.g., scratch resistant or tint) or other such information as may be desired to describe the lens to be formed. Based on this information controller computer 1801 may preferably be configured to send information back to the operator. For example, controller computer 1801 may inform the user of appropriate mold members to use in forming the desired lens, the location of the mold members, or process parameters. Controller computer 1801 may also signal an operator when certain operations may need to be performed or when a particular operation may be completed (e.g., when to place the mold assembly in the lens curing unit, when to remove the mold assembly, when to transfer the mold assembly, etc.).

In an embodiment, controller computer 1801 may be a computer system including display screen 1803 to view data, input device 1805 such as a keyboard, keypad or scanning device to input data, and a CPU to store and process data, and run software applications. The controller computer may be configured to send an activation signal to individual indicators 1802 as appropriate to instruct the user as to the location of a desired mold member, or the appropriate storage location for a mold member being placed into storage array 1806.

Mold members may be marked for identification. The mark may include a symbol, bar code, human readable code, text, or other identifying mark. In an embodiment, each mold member may be coded such that controller computer 1801 may indicate to a user which mold members to select by conveying the code for each mold member. In an embodiment, after mold member 1809 is selected, identifying mark 1808 on mold member 1809 may be sent to controller computer 1801. Controller computer 1801 may be configured to provide feedback to the user confirming or rejecting the selection. In an embodiment, when mold member 1809 is to be placed back into storage array 1806, identifying mark 1808 may be sent to controller computer 1801. Controller computer 1801 may be configured to notify a user of designated storage location 1804 for mold member 1809 by activating indicators 1802 proximate to that location 1804.

In an embodiment, the controller computer may be manipulated by utilizing software applications as described above. The software may include applications for classifying certain eyeglass molds for the production of prescription eyeglass lenses. The logic controller and the software may also be configured to accept data pertaining to certain parameters that characterize an eyeglass mold for lens production. In a preferred embodiment, the desired parameters may be recognized by the controller computer and a signal may be sent from controller computer 1801 to indicators 1802 proximate mold member storage location 1804, where the mold member possessing the desired parameters for production may be stored. In this manner, indicators 1802 may be activated to call a user's attention to the desired mold member.

As depicted in FIG. 36, device 1807 may be coupled to the controller computer to ease inputting data pertaining to mold member 1809. Device 1807 may be a scanner that reads a human readable code or bar code 1808 attached to mold member 1809. In a preferred embodiment, a code or marking may be assigned and attached to each eyeglass mold member 1809. For example, bar code 1808 may be located on an outside edge of eyeglass mold 1809, as depicted in FIG. 36. Scanning device 1807 may read bar code 1808 on an outside edge of eyeglass mold 1809. In addition, the controller computer 1801 may be configured to send an activation signal to indicators 1802 adjacent to the proper mold member storage location 1804 for mold member 1809.

In an alternate embodiment, device 1807 may include a peripheral device that may be configured to process data by way of voice recognition. The peripheral device may include a microphone configured to recognize voice input from the user. Once controller computer 1801 recognizes the input data, it may send a signal to mold member storage array 1806 or mold member storage location 1804 to indicate the proper storage location for an eyeglass mold member.

Additional embodiments relate to a system and a computer-implemented method for the collection and transmission of eyeglass lens information over a computer network. The system may also include at least one controller computer coupled to a lens forming apparatus. The system, in some embodiments, includes computer hardware and software operable to send and receive data over a computer network to and from a client computer system. In an embodiment, the computer-implemented method may be implemented by program instructions which may be computer-executable and may be incorporated into a carrier medium.

Eyeglass lens information may generally refer to any data representative of an eyeglass lens prescription, an eyeglass lens composition, operating conditions configured to produce an eyeglass lens, one or more lens molds appropriate to form an eyeglass lens, one or more lens mold gaskets appropriate to form an eyeglass lens and/or other appropriate characteristics of an eyeglass lens such as but not limited to tint or coating. The eyeglass lens composition information may include, for example, an identity of a monomer-containing fluid which may be polymerized to form an eyeglass lens. Such information may be in the form of raw data, including binary or alphanumeric, formatted data, or reports. In some embodiments, eyeglass lens information relates to data collected from a client or customer. More specifically, eyeglass lens information may take the form of data collected from a doctor examining a patient and/or prescribing an eyeglass lens for a patient. Other sources of eyeglass lens information may include, but are not limited to: an optician, an optometrist, an ophthalmologist, a retailer of eyeglass lenses, an optical lab, or a wholesaler of eyeglass lenses. The information may be encrypted for security purposes.

The term "computer system" as used herein generally describes the hardware and software components that in combination allow the execution of computer programs. The computer programs may be implemented in software, hardware, or a combination of software and hardware. Computer system hardware generally includes a processor, memory media, and input/output (I/O) devices. As used herein, the term "processor" generally describes the logic circuitry that responds to and processes the basic instructions that operate a computer system. The term "memory medium" includes an installation medium, e.g., a CD-ROM, floppy disks; a volatile computer system memory such as DRAM, SRAM, EDO RAM, Rambus RAM, etc.; or a non-volatile memory such as optical storage or a magnetic medium, e.g., a hard drive. The term "memory" is used synonymously with "memory medium" herein. The memory medium may include other types of memory or combinations thereof. In addition, the memory medium may be located in a first computer in which the programs are executed, or may be located in a second computer that connects to the first computer over a network. In the latter instance, the second computer provides the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for the reception, storage, analysis, and transmittal of eyeglass lens information. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A central processing unit (CPU), such as the host CPU, for executing code and data from the memory medium includes a means for creating and executing the software program or programs according to the methods, flowcharts, and/or block diagrams described below.

A computer system's software generally includes at least one operating system such as Windows NT, Windows 95, Windows 98, or Windows ME (all available from Microsoft Corporation); or Mac OS and Mac OS X Server (Apple Computer, Inc.), MacNFS (Thursby Software), PC MACLAN (Miramar Systems), or real time operating systems such as VXWorks (Wind River Systems, Inc.), QNX (QNX Software Systems, Ltd.), etc. The foregoing are all examples of specialized software programs that manage and provide services to other software programs on the computer system. Software may also include one or more programs configured to perform various tasks on the computer system and various forms of data to be used by the operating system or other programs on the computer system. Software may also be operable to perform the functions of an operating system ("OS"). The data may include, but is not limited to, databases, text files, and graphics files. A computer system's software generally is stored in non-volatile memory or on an installation medium. A program may be copied into a volatile memory when running on the computer system. Data may be read into volatile memory as the data is required by a program.

A server program may be defined as a computer program that, when executed, provides services to other computer programs executing in the same or other computer systems. The computer system on which a server program is executing may be referred to as a server, though it may contain a number of server and client programs. In the client/server model, a server program awaits and fulfills requests from client programs in the same or other computer systems. Examples of computer programs that may serve as servers include: Windows NT (Microsoft Corporation), Mac OS X Server (Apple Computer, Inc.), MacNFS (Thursby Software), PC MACLAN (Miramar Systems), etc.

A web server is a computer system which maintains a web site browsable by any of various web browser software programs. As used herein, the term 'web browser' refers to any software program operable to access web sites over a computer network.

An intranet is a network that may be contained within an enterprise. An intranet may include many interlinked local area networks (LANs) and may use data connections to connect LANs in a wide area network (WAN). An intranet may also include connections to the Internet. An intranet may use TCP/IP, HTTP, and other Internet protocols.

An extranet, or virtual private network, is a private network that uses Internet protocols and public telecommunication systems to securely share part of a business' information or operations with suppliers, vendors, partners, customers, or other businesses. An extranet may be viewed as part of a company's intranet that is extended to users outside the company. An extranet may require security and privacy. Companies may use an extranet to exchange large volumes of data, share product catalogs exclusively with customers, collaborate with other companies on joint development efforts, provide or access services provided by one company to a group of other companies, and to share news of common interest exclusively with partner companies.

Connection mechanisms included in a network may include copper lines, optical fiber, radio transmission, satellite relays, or any other device or mechanism operable to allow computer systems to communicate.

As used herein, a lens forming apparatus may refer to any device or instrument operable to form an eyeglass lens. More particularly, a lens forming apparatus may includes a first curing unit, which may be configured to direct light to an eyeglass lens mold, a second curing unit, which may be configured to direct light and heat to an eyeglass lens, and an anneal unit, which may be configured to direct heat to an eyeglass lens, as described herein.

Figure 42:
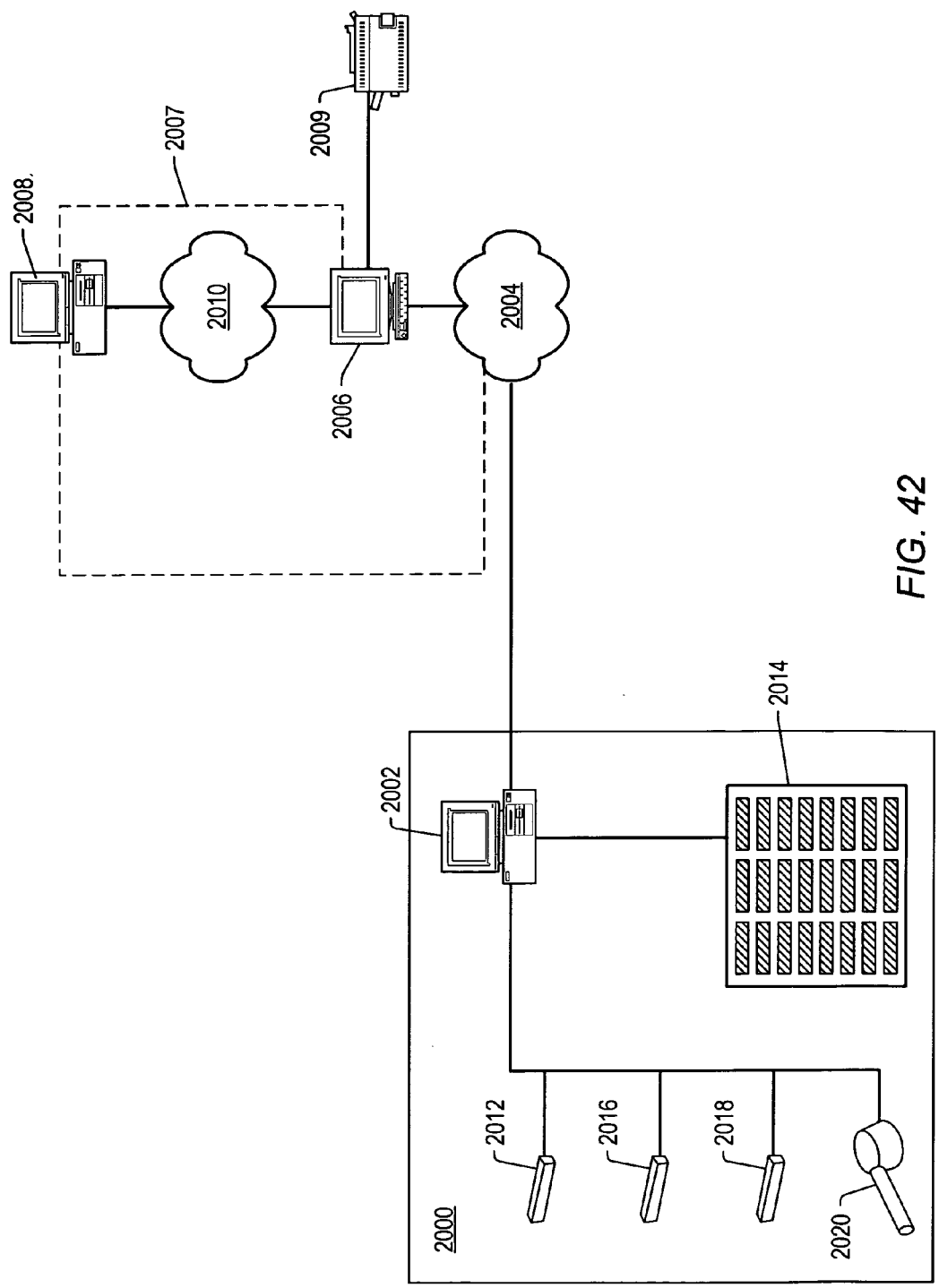
FIG. 42 depicts a schematic view of an embodiment of a system configured to collect and transmit eyeglass lens information over a computer network.

As illustrated in FIG. 42, lens forming apparatus 2000 may be operable to direct light and/or heat to an eyeglass lens mold to form an eyeglass lens. Lens forming apparatus 2000 may be further configured as described in any of the above embodiments. Lens forming apparatus 2000 may include at least one controller computer 2002. Controller computer 2002 may be operable to monitor and control the lens forming apparatus. Alternatively, multiple controller computers may be coupled to the lens forming apparatus, and each of the multiple controller computers may be configured to monitor and control a subset of the equipment coupled to the lens forming apparatus.

Controller computer 2002 may operable to connect to a computer network 2004 such as a local area network which may include an Ethernet device. As used herein, "computer network" may also refer to any type of intranet or extranet network which connects computers and/or networks of computers together, thereby providing connectivity between various systems for communication there between, using various network communication protocols, such as TCP/IP, FTP, HTTP, HTTPS, etc. Controller computer 2002 may execute software to communicate with other computer systems connected to network 2004. In addition, a plurality of controller computers may be connected to network 2004. Each controller computer may be coupled to a lens forming apparatus that may be configured as described in above embodiments.

A receiver computer 2006 may also be connected to network 2004. Receiver computer 2006 may be configured to receive an eyeglass lens order from a user. The user may enter the eyeglass lens order by using a user input device such as a keyboard coupled to receiver computer 2006. Alternatively, receiver computer 2006 may be configured to receive an eyeglass lens order from a client. For example, a client may include a doctor, an optician, an optometrist, an ophthalmologist, a retailer of eyeglass lenses, an optical lab, or a wholesaler of eyeglass lenses, a franchise of a national or local retail chain, or another enterprise which supplies eyeglass lenses. Therefore, the client may be located remotely from receiver computer 2006. A user at a client site such as an employee of a doctor or an employee of a franchise may enter an eyeglass lens order into computer system 2008 located at the client site. The eyeglass lens order may include eyeglass lens information as described above. Computer system 2008 at the client site may be configured to send the eyeglass lens order to the receiver computer.

Computer system 2008 may be a computer system, network appliance, Internet appliance, personal digital assistant (PDA) or other system. Computer system 2008 may execute software to communicate with receiver unit 2006, thus facilitating transmission of eyeglass lens data from computer system 2008 to receiver computer 2006 and vice versa. For example, computer system 2008 may be coupled to receiver computer 2006 by connection mechanism 2007 as described above. In one embodiment, computer system 2008 may execute software operable to transmit eyeglass lens data via any of various communication protocols over a network to one or more recipient computer systems and to receive responses from the recipient computers. These protocols may include, but are not limited to, TCP/IP, FTP, HTTP, and HTTPS. For example, computer system 2008 at the client site may be coupled to receiver computer 2006 by computer network 2010 such as an extranet as described above. Alternatively, computer system 2008 at the client site may be coupled to receiver computer 2006 by computer network 2004 as described above. In addition, the information may be encrypted for security purposes as described above.

Receiver computer 2006 may store the received eyeglass lens order in a database. In addition, the database may be stored in memory of receiver computer 2006, controller computer 2002, and/or client computer system 2008. Therefore, the database may include a plurality of eyeglass lens orders. Each eyeglass lens order may include eyeglass lens information as described above. For example, each eyeglass lens order may include a patient name, a priority classification, a job type such as right and/or left lens, a lens type such as aspheric, flat top, and paradigm progressive, a monomer or tint type, and an eyeglass lens prescription. The database may also include a sorted list of the plurality of eyeglass lens orders. For example, the receiver computer may be configured to sort the database by patient name, priority classification, or job type. In addition, the receiver computer may be configured to send such a database through network 2004 such that the database may be stored on controller computer 2002 or client computer system 2008.

Receiver computer 2006 may also be configured to generate a job ticket in response to the received eyeglass lens information. For example, a job ticket may include a barcode representative of the received eyeglass lens information. The barcode may be generated by the receiver computer. The job ticket may also include a portion or any of the received eyeglass lens information as described above. Receiver computer 2006 may also be configured to store the generated barcode in the database as a field associated with the received eyeglass lens information. In this manner, the database may include a look-up-table that may be searched by barcode or by any of the eyeglass lens information as described above. In addition, receiver computer 2006 may be further configured to send the generated job ticket to printer 2009. Printer 2009 may be configured to print job tickets in addition to any other type of document. A printed job ticket may be attached to a mold assembly holder by a user. The mold assembly holder may be configured to support an eyeglass lens mold during a process performed by the lens forming apparatus.

Lens forming apparatus 2000 may include first barcode reader 2012. First barcode reader 2012 may be configured to scan a barcode printed on a job ticket. For example, first barcode reader 2012 may include a light source and a detector. The light source may be configured to scan a beam of light across a barcode. The detector may be configured to detect light reflected from the barcode. The job ticket may be generated by the receiver computer 2006 as described above. First barcode reader 2012 may be coupled to controller computer 2002 and may be configured to send information representative of the barcode such as the detected light to controller computer 2002 over a serial line connection. The controller computer may be configured to send the information representative of the barcode to receiver computer 2006 over network 2004.

In addition, receiver computer 2006 may be configured to search the database of eyeglass lens orders using the information representative of the barcode as described above. Alternatively, the receiver computer may process the information representative of the barcode to determine information representative of an eyeglass lens order. For example, the receiver computer may search a first database with the barcode to determine information representative of an eyeglass lens order associated with the barcode. In addition, the receiver computer may use the determined information representative of an eyeglass order to search a second database. Furthermore, receiver computer 2006 may be configured to send results of searching the database to controller computer 2002 over computer network 2004. Results of searching the database may include any of the information representative of an eyeglass lens order as described above and a barcode associated with the eyeglass lens order. For example, results of searching the database may include a job number, a patient name, a mold assembly holder number, a priority, a bin location, a lens location (i.e., left lens or right lens), a lens type, a monomer type and/or tint, a spherical power, a cylindrical power, axis, an add power, curing conditions. In addition, controller computer 2002 may be configured to at least temporarily store the information in a memory coupled to controller computer 2002.

In a further embodiment, receiver computer 2006 may be configured to determine a front mold member identity and a back mold member identity from the information representative of the eyeglass lens order. In addition, receiver computer 2006 may be configured to send the determined front mold member identity and the determined back mold member identity to controller computer 2002. Alternatively, controller computer 2002 may be configured to determine the front mold member identity and the back mold member identity from information representative of an eyeglass lens order, which may be received from receiver computer 2006.

Controller computer 2002 may be further coupled to mold member storage array 2014. In addition, controller computer 2002 may be configured to send the determined front mold member identity and the determined back mold member identity to mold member storage array 2014. Mold member storage array 2014 may be configured as described in any of the above embodiments. For example, the mold member storage array may be configured to hold a plurality of eyeglass lens molds. In addition, the mold member storage array may be configured to determine a location of a front mold member and a back mold member and to generate a signal to indicate the determined locations. Alternatively, the location of front and back mold members may be determined by the controller computer. The mold member storage array may also be configured to display the generated signal to a user. The signal may be a visual and/or audible signal suitable for detection by a user. The mold member storage array may also be configured to generate and/or display the signal sequentially as described in above embodiments. As such, a generated signal may indicate an appropriate mold member to a user. The user may remove the appropriate mold member from the mold member storage array and may assemble an eyeglass lens mold in the mold assembly holder as described above. Assembly of the eyeglass lens mold may also include filling a space between two mold members with a lens forming composition. The lens forming composition may include any of the lens forming compositions as described in above embodiments.

Lens forming apparatus 2000 may be configured to receive a mold assembly holder and an assembled eyeglass lens mold in a first curing unit (not shown) as described in any of the above embodiments. For example, the first curing unit may be configured to direct light to the eyeglass lens mold to at least partially cure the lens forming composition. In addition, first curing unit may include second barcode reader 2016. Second barcode reader 2016 may be configured to scan a barcode on a job ticket as described in above embodiments. The job ticket may be attached to a mold assembly holder as described in above embodiments. In addition, the second barcode reader may be disposed within the first curing unit proximate to a location at which the mold assembly holder may be placed into the first curing unit by a user. Additional barcode readers may be disposed within the first curing unit proximate to a location at which the mold assembly holder may be removed from the first curing unit by a user and at various locations through the first curing unit. As such, the second barcode reader may be configured to scan a barcode of job ticket on a mold assembly holder containing an assembled eyeglass lens mold prior to, during, or subsequent to at least partial curing of a lens forming composition disposed within the assembled eyeglass lens mold. In addition, second barcode reader 2016 may be coupled to controller computer 2002 and may configured to send information representative of the barcode such as detected light to controller computer 2002 over a serial line connection. In addition, controller computer 2002 may be configured to monitor the progress of mold assembly units through the first curing unit from output from at least one barcode reader. Furthermore, the controller computer may be configured to determine a throughput of the first curing unit from the output from at least one barcode reader.

The controller computer may be configured to determine an eyeglass lens order and/or eyeglass lens information from the information received from the second barcode reader as described in above embodiments. For example, the controller computer may be configured to search a database of eyeglass lens information, which may be sent to controller computer by the receiver computer. In addition, the controller computer may be configured to send the information received from the second barcode reader to receiver computer 2006 over network 2004. Receiver computer 2006 may be configured to determine an eyeglass lens order and/or eyeglass lens information from the information received from the second barcode reader as described in above embodiments. Receiver computer 2006 may be configured to send the determined eyeglass lens order and/or the determined eyeglass lens information to controller computer 2002.

In addition, controller computer 2002 may be configured to alter a parameter of an instrument coupled to lens forming apparatus 2000 in response to the determined eyeglass lens order and/or the determined eyeglass lens information. For example, controller computer 2002 may be coupled to a first curing unit of lens forming apparatus 2000. In addition, controller computer 2002 may be configured to alter a parameter of an instrument coupled to the first curing unit of lens forming apparatus 2000 to alter a duration of a light pulse generated by the first curing unit. In this manner, the duration of the light pulse which is provided to an assembled eyeglass lens mold by a first curing unit may vary depending on the eyeglass lens being formed.

Furthermore, controller computer 2002 may be configured to monitor a parameter of at least one instrument coupled to the first curing unit during curing of a lens forming composition in the first curing unit. In addition, the controller computer may be configured to compare the monitored parameter to an acceptable range for the parameter and to display an error message if the monitored parameter is outside of the acceptable range. In this manner, the controller computer may be configured to monitor a curing process in situ and to provide real-time information to a user of the lens forming apparatus.

Lens forming apparatus 2000 may also be configured such that an assembled eyeglass lens mold may be transported from the apparatus subsequent to being treated in the first curing unit. For example, lens forming apparatus 2000 may include a conveyor system (not shown) configured to transport mold assembly holders which may contain eyeglass lens molds through a first curing unit as described in above embodiments. Therefore, subsequent to treatment in a first curing unit, a user may remove the mold assembly holder and the assembled eyeglass lens mold contained within the mold assembly holder from a conveyor system. Furthermore, the user may place the mold assembly holder into a second curing unit (not shown) of lens forming apparatus 2000.

In addition, second curing unit may include third barcode reader 2018. Third barcode reader 2018 may be configured to scan a barcode on a job ticket as described in above embodiments. The job ticket may be attached to a mold assembly holder as described in above embodiments. In addition, the third barcode reader may be disposed within the second curing unit proximate to a location at which the mold assembly holder may be placed into the second curing unit by a user. An additional barcode reader may also be disposed within the second curing unit proximate to a location at which the mold assembly holder may be removed from the second curing unit by a user or at various locations within the second curing unit.

As such, the third barcode reader may be configured to scan a barcode on a job ticket attached to a mold assembly holder containing an assembled eyeglass lens mold prior to, during, or subsequent to curing of a lens forming composition disposed within the assembled eyeglass lens mold. In addition, third barcode reader 2018 may be coupled to controller computer 2002 and may be configured to send information representative of the barcode such as detected light to controller computer 2002 over a serial line connection. In addition, controller computer 2002 may be configured to monitor the progress of mold assembly units through the second curing unit from output from at least one barcode reader. The controller computer may also be configured to alter a parameter of an instrument coupled to the first curing unit from output from at least the one barcode reader. In this manner, the controller computer may be configured to control the first curing unit based on conditions present in the second curing unit. As such, curing of a lens forming composition in the first and the second curing unit may be synchronized and/or optimized by the controller computer. Furthermore, the controller computer may be configured to determine a throughput of the second curing unit from the output from at least one barcode reader.

The controller computer may be configured to determine an eyeglass lens order and/or eyeglass lens information from the information received from the third barcode reader as described in above embodiments. In addition, the controller computer may be configured to send the information received from the third barcode reader to receiver computer 2006 over network 2004. Receiver computer 2006 may be configured to determine an eyeglass lens order and/or eyeglass lens information from the information received from the third barcode reader as described in above embodiments. Receiver computer 2006 may be configured to send the determined eyeglass lens order and/or the determined eyeglass lens information to controller computer 2002.

In addition, controller computer 2002 may be configured to alter a parameter of an instrument coupled to lens forming apparatus 2000 in response to the determined eyeglass lens order and/or the determined eyeglass lens information. For example, controller computer 2002 may be coupled to a second curing unit of lens forming apparatus 2000. In addition, controller computer 2002 may be configured to alter a parameter of an instrument coupled to the second curing unit of lens forming apparatus 2000 to alter an intensity of light or a temperature of heat generated by the second curing unit. As such, the intensity of light or the temperature of heat which may be provided to an assembled eyeglass lens mold by a second curing unit may vary depending on the eyeglass lens being formed.

As described above, controller computer 2002 may be configured to monitor a parameter of at least one instrument coupled to the second curing unit during curing of a lens forming composition in the second curing unit. For example, the controller computer may be configured to monitor a temperature of a second curing unit. In addition, the controller computer may be configured to alter a speed of the conveyor system in response to the monitored temperature. In this manner, the controller computer may be configured to prevent a mold assembly holder from being introduced into the second curing unit until the temperature is within an acceptable range for curing a lens forming composition disposed within the mold assembly holder. In addition, the controller computer may be configured to compare the monitored parameter to an acceptable range for the parameter and to display an error message if the monitored parameter is outside of the acceptable range. In this manner, the controller computer may be configured to monitor a curing process in situ and to provide real-time information to a user of the lens forming apparatus.

Lens forming apparatus 2000 may also be configured such that an eyeglass lens may be transported from the apparatus subsequent to being treated in the second curing unit. For example, lens forming apparatus 2000 may include a conveyor system configured to transport mold assembly holders which may contain at least partially cured lens forming compositions through a second curing unit as described in above embodiments. Therefore, subsequent to treatment in a second curing unit, a user may remove the mold assembly holder from a conveyor system and the eyeglass lens contained within the mold assembly holder. A user may also disassemble the eyeglass lens mold assembly and may remove the at least partially cured lens forming composition from the eyeglass lens mold assembly. In addition, the user may place the at least partially cured lens forming composition into the mold assembly holder from which the at least partially cured lens forming composition was removed.

The user may place the at least partially cured lens forming composition contained within the mold assembly holder into an anneal unit. At least one barcode reader may be disposed within the anneal unit as described in any of the above embodiments. In addition, at least the one barcode reader within the anneal unit may be configured as described in any of the above embodiments. Each barcode reader within the anneal unit may also be coupled to a controller computer. The controller computer may also be configured as described in any of the above embodiments.

In addition, the controller computer may be configured to alter operation of the lens forming apparatus in response to a predetermined signal. A predetermined signal may include login by an operator or an engineer, a predetermined time, or reception of an eyeglass lens order. For example, an operator or an engineer may login at the beginning of a work shift. Upon receiving the login data, the controller computer may alter an operation of the lens forming apparatus. In this manner, upon receiving login data, a controller computer may supply power to lamps of a curing unit and may supply power to a monomer heating unit. Similarly, a controller computer may be configured to supply power to lamps of a curing unit or a monomer heating unit at a predetermined time at which a work shift may begin. The predetermined time may be set by an operator or an engineer using the controller computer. Alternatively, a controller computer may be configured to supply power to lamps of a curing unit or a monomer heating unit upon reception of an eyeglass lens order. In this manner, the supplied power may vary depending on the eyeglass lens which may be formed in response to the order. As such, the controller computer may be configured to "warm up" a lens forming apparatus which may increase throughput and decrease cost.

Lens forming apparatus 2000 may also include mold reader 2020. Mold reader 2020 may be configured to scan a mold member and to determine a mold member identity. For example, a user may disassemble an eyeglass lens mold subsequent to removing the eyeglass lens mold from the second curing unit as described above. In addition, a user may use mold reader 2020 to scan a front mold member and a back mold member of the disassembled eyeglass lens mold. For example, mold reader 2020 may include a light source and a detector. The light source may be configured to scan a beam of light across an eyeglass lens mold. The detector may be configured to detect light reflected from the eyeglass lens mold.

Mold reader 2020 may be coupled to controller computer 2002 and may configured to send information representative of a mold member identity such as detected light to controller computer 2002 over a serial line connection. Controller computer 2002 may be configured to determine an identity of the front mold member and the back mold member from the sent information. Alternatively, controller computer 2002 may be configured to send information generated by mold reader 2020 to receiver computer 2006 over a computer network. Receiver computer 2006 may be configured to determine an identity of the front mold member and the back mold member and to send the determined identities to the controller computer over the computer network. Alternatively, mold reader 2020 may be configured to determine an identity of a front mold member and an identity of a back mold member. In this manner, mold reader 2020 may also be configured to send determined identities of the front and back mold members to the controller computer.

Controller computer 2002 may be coupled to mold member storage array 2014 as described above. Controller computer 2002 may be configured to send the determined front mold member identity and the determined back mold member identity to mold member storage array 2014. In addition, the mold member storage array may be configured to determine an appropriate location for a mold member within the mold member storage array from a mold member identity and to generate a signal to indicate the determined location. The mold member storage array may also be configured to display the generated signal to a user. The signal may be visual and/or audible such that the signal may be detected by a user. The mold member storage array may also be configured to generate and/or display the signal sequentially as described in above embodiments. As such, a generated signal may indicate, to a user, an appropriate location for an eyeglass mold member having the determined identity. In this manner, a user may place a mold member into an appropriate location in a mold member storage array until an eyeglass lens order is received which requires use of the mold member.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

In an alternate embodiment, the receiver computer may be operable to upload eyeglass lens data directly to the controller computer, for example, by a communications link such as a serial data connection, wireless data link, modem, floppy drive, etc. The controller computer may be connected to a computer network, as may be the client computer system. In addition, the controller computer may have software executable to transmit eyeglass lens information to the client computer system and to receive response information back from the client computer system, and the client computer system may have software executable to receive eyeglass lens information and to transmit a response back to the controller computer or to one or more receiver computers.

In a further embodiment, the receiver computer may connect to a server (not shown), either directly, as with a communication link, or remotely, via a computer network. The server may be operable to receive and store eyeglass lens information and to make the eyeglass lens information available to client computer systems also connected to a network. The server may be any of a variety of servers. For example, the server may be a web server such that the server may be operable to maintain a web site accessible by the client computer systems with browser software. A use of the client computer system may include viewing and/or downloading eyeglass lens information from a server using the browser software. As another example, the server may be an FTP server, in which case a user of a client computer system may be able to transfer the eyeglass lens information from the server to the client computer system using an FTP software program. As yet another example, a server may allow remote login to an account by a client computer system. The account may have been established for use by a user of the client computer system. The user of the client computer system may then view, edit, or transfer eyeglass lens information as needed. The client computer system may also optionally transmit a response back to the server, which may then be accessed by the receiver computer. A client computer system may also transmit the response information to one or more additional client computer systems. In all of these embodiments, security measures may be employed to protect the identity of the users, as well as the privacy and integrity of the information. Such security measures may include secure login, encryption, private communication lines, and other security measures.

In one embodiment, a server may be a web server operable to maintain a web site. When a client computer system accesses the web site of the web server, the web server may provide various data and information to a client browser on a client computer system, possibly including a graphical user interface (GUI) that displays the information, descriptions of the information, and/or other information that might be useful to the users of the system.

In some embodiments, the receiver computer may include an electronic controller, as described herein. The electronic controller may allow the receiver computer to be operated by a client computer system that is coupled to the electronic controller. The client computer system may include software that provides the user information regarding the operation of the receiver computer. The software may allow the user of the client computer to issue commands that allow operation of the receiver computer from the electronic controller. The issued commands may be converted to control signals. The control signals may be received by the electronic controller. The electronic controller may operate components of the receiver computer in response to the received control signals.

The client computer system may be coupled directly to the receiver computer. Alternatively, the client computer system may be coupled to the receiver computer via a computer network. In this embodiment, an operator may be in a different location than the location of the receiver system. By sending control signals over the computer network, the operator may remotely control the operation of the receiver system. The receiver system may also be configured to transmit the obtained eyeglass lens information back to the client computer system via the computer network.

Figure 43:
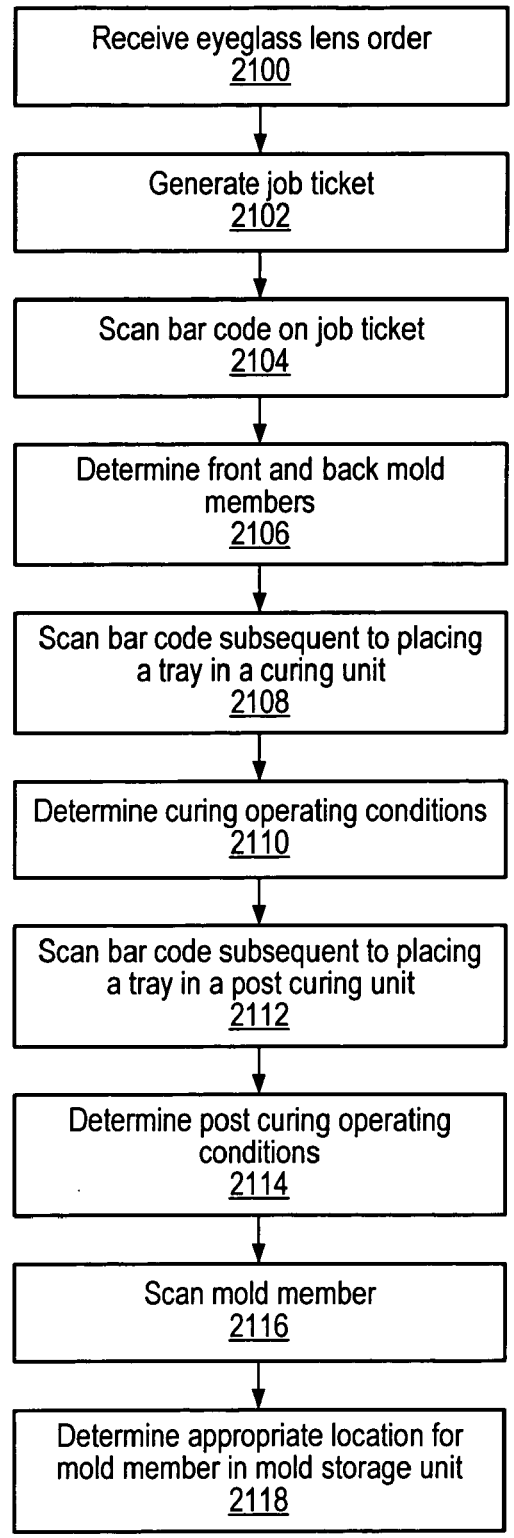
FIG. 43 depicts a flow chart illustrating an embodiment of a method for collecting and transmitting eyeglass lens information over a computer network.

As illustrated in FIG. 43, an embodiment of a computer-implemented method for forming an eyeglass lens may include receiving an eyeglass lens order with a receiver computer as shown in step 2100. The eyeglass lens order may include eyeglass lens information as described above. A receiver computer may be configured as described in any of the above embodiments. Receiving an eyeglass lens order may include receiving an eyeglass lens order from a user. For example, a user may enter an eyeglass lens order by using a user input device such as a keyboard coupled to a receiver computer. Alternatively, receiving an eyeglass lens order may include receiving an eyeglass lens order from a client such as a doctor, an optician, an optometrist, an ophthalmologist, a retailer of eyeglass lenses, an optical lab, or a wholesaler of eyeglass lenses, a franchise of a national or local retail chain, or another enterprise which supplies eyeglass lenses. Therefore, receiving an eyeglass lens order may include receiving the eyeglass lens order with a computer system located remotely at a client site and sending the eyeglass lens order to the receiver computer.

A computer system located remotely at a client site may be coupled to a receiver computer via a server as described above. The client computer system may be configured to receive and/or transmit information to the receiver computer. In one embodiment, the receiver computer may be configured to receive control signals from the client computer system via the server. The operation of the receiver system and subsequently the controller computer and the lens forming apparatus may, therefore, be controlled via a client computer through a server. As discussed before, the receiver computer may also transmit eyeglass lens information back to the client computer system via the server. The eyeglass lens information may be encrypted as described in above embodiments.

The method may also include storing the received eyeglass lens order in a database. The database may be stored by a receiver computer as described in above embodiments. Alternatively, the database may be stored by the controller computer as described above. The database may include a plurality of eyeglass lens orders. Each eyeglass lens order may include eyeglass lens information as described above. The method may also include sorting the plurality of eyeglass lens orders such that the database may include a sorted list of the plurality of eyeglass lens orders.

The method may also include generating a job ticket in response to the received eyeglass lens information as shown in step 2102. A job ticket may include a barcode representative of the received eyeglass lens information as described in above embodiments. The barcode may be generated by a receiver computer or a controller computer. The method may also include storing the barcode in the database as a field associated with the received eyeglass lens information. In this manner, the database may include a look-up-table that may be searched by barcode or by any of the eyeglass lens information as described above. In addition, the method may include printing the generated job ticket. A printed job ticket may be attached to a mold assembly holder by a user. The mold assembly holder may be configured as described in any of the above embodiments.

As shown in step 2104, the method may include scanning a barcode printed on a job ticket. The method may also include sending information resulting from scanning the barcode to a controller computer over a serial line connection. The controller computer may be configured as described in any of the above embodiments. The method may further include sending the information representative of the barcode to a receiver computer.

In addition, the method may include determining information associated with an eyeglass lens order associated with the scanned bar code. For example, the method may include searching a database of eyeglass lens orders using the information representative of the barcode. Alternatively, the method may include processing the information representative of the barcode to determine information representative of an eyeglass lens order. For example, the method may include searching a first database with the barcode to determine information representative of an eyeglass lens order associated with the barcode. In addition, the method may include searching a second database with the determined information representative of an eyeglass order. Furthermore, the method may include sending results of searching the database from a receiver computer to a controller computer over a computer network. Results of searching the database may include any of the information representative of an eyeglass lens order as described above and a barcode associated with the eyeglass lens order.

The method may also include determining a front mold member identity and a back mold member identity from the information representative of the eyeglass lens order, as shown in step 2106. In addition, the method may include sending the determined front mold member identity and the determined back mold member identity to a controller computer. The method may further include sending the determined front mold member identity and the determined back mold member identity to a mold member storage array. A mold member storage array may be configured as described in any of the above embodiments. In addition, the method may include generating a signal to indicate locations of mold members having the determined mold member identities. The method may also include displaying the generated signal to a user. For example, the generated signal may be displayed as a visual and/or audible signal suitable for detection by a user. Furthermore, the method may include generating and/or displaying the signal sequentially to indicate a location of a first mold member and a location of a second mold member. As such, a generated signal may indicate a location of an appropriate mold member to a user. The user may remove the appropriate mold member from the mold member storage array and may assemble an eyeglass lens mold containing a lens forming composition in a mold assembly holder as described above. The lens forming composition may include any of the lens forming compositions as described in above embodiments.

The method may further include scanning a bar code on a job ticket subsequent to placing a mold assembly holder including an assembled eyeglass lens mold in a first curing unit of a lens forming apparatus, as shown in step 2108. Scanning the bar code may include scanning the barcode with a second barcode reader, which may be configured as described in above embodiments. For example, the second barcode reader may be disposed within a first curing unit proximate to a location at which the mold assembly holder may be placed into the first curing unit by a user. The second barcode reader, however, may also be disposed within the first curing unit proximate to a location at which the mold assembly holder may be removed from the first curing unit or throughout the first curing unit. As such, step 2108 may include scanning a barcode of job ticket on a mold assembly holder containing an assembled eyeglass lens mold prior to, during, or subsequent to curing at least a portion of a lens forming composition disposed within the assembled eyeglass lens mold. In addition, the method may include sending information representative of the barcode to a controller computer over a serial line connection.

As shown in step 2110, the method may include determining parameters of an instrument of the first curing unit from information representative of the barcode. The parameters of the instrument of the first curing unit may define operating conditions for at least partial curing of a lens forming composition. In addition, the method may include altering a parameter of an instrument coupled to a first curing unit in response to the determined parameters. For example, altering a parameter of an instrument may include altering a duration of a light pulse generated by the first curing unit. In this manner, the duration of the light pulse, which may be provided to an assembled eyeglass lens mold by a first curing unit, may vary depending on the eyeglass lens being formed.

Subsequent to treatment in a first curing unit, a user may remove the mold assembly holder and the assembled eyeglass lens mold contained within the mold assembly holder from a conveyor system. Furthermore, the user may place the mold assembly holder into a second curing unit of a lens forming apparatus.

In addition, the method may include scanning a barcode on a job ticket with a third barcode reader subsequent to placing a mold assembly holder in a second curing unit, as shown in step 2112. The job ticket may be attached to a mold assembly holder as described in above embodiments. The second curing unit and a third barcode reader may be configured as described in any of the above embodiments. In addition, the third barcode reader may be disposed within the second curing unit proximate to a location at which the mold assembly holder may be placed into, moved through, or removed from the second curing unit by a user. As such, the method may include scanning a barcode on a job ticket attached to a mold assembly holder containing an at least partially cured lens forming composition prior to, during, or subsequent to curing of a lens forming composition. In addition, the method may include sending information representative of the barcode such as detected light to a controller computer over a serial line connection.

In addition, the method may include determining an eyeglass lens order and/or eyeglass lens information from the information received from the third barcode reader with a controller computer. In addition, the method may include sending the information received from the third barcode reader to a receiver computer over a computer network. The method may include determining an eyeglass lens order and/or eyeglass lens information from the information received from the third barcode reader with a receiver computer. As such, the method may include sending the determined eyeglass lens order and/or the determined eyeglass lens information from the receiver computer to a controller computer.

In addition, the method may include determining a parameter of an instrument coupled to a second curing unit in response to the determined eyeglass lens order and/or the determined eyeglass lens information, as shown in step 2114. For example, the method may include determining parameters of an instrument coupled to a second curing unit, which may define operating conditions for post curing of a lens forming composition. In addition, the method may include altering a parameter of an instrument coupled to a second curing unit in response to the determined eyeglass lens order and/or the determined eyeglass lens information. For example, altering a parameter of an instrument coupled to a second curing unit may include altering a temperature of heat generated by the second curing unit. As such, the temperature of heat, which may be provided to an at least partially cured lens forming composition, by a second curing unit may vary depending on the eyeglass lens being formed.

A user may disassemble the eyeglass lens mold and may remove the at least partially cured lens forming composition. In addition, the user may place the at least partially cured lens forming composition into the mold assembly holder from which the at least partially cured lens forming composition was removed. The user may also place the at least partially cured lens forming composition disposed within the mold assembly holder into an anneal unit. At least one barcode reader may also be coupled to the anneal unit as described in any of the above embodiments. In addition, at least the one barcode reader may be configured as described in any of the above embodiments. Furthermore, a controller computer may be coupled to at least the one barcode reader coupled to the anneal unit. The controller computer may be configured as described in any of the above embodiments.

The method may also include scanning a mold member as shown in step 2116. The mold member may include a mold member which may have been disassembled by a user subsequent to removing the eyeglass lens mold from the second curing unit as described above. In addition, the method may include scanning a front mold member and a back mold member of a disassembled eyeglass lens mold. For example, a mold member may be scanned with a mold reader.

In an alternative embodiment, the method may also include determining a mold member identity with the mold reader. The method may also include sending information representative of a mold member identity from a mold reader to a controller computer over a serial line connection. In addition, the method may include determining an identity of the front mold member and the back mold member with the controller computer. Alternatively, the method may include sending information representative of a mold member identity from a controller computer to a receiver computer over a computer network. In this manner, the method may include determining an identity of the front mold member and the back mold member with the receiver computer and sending the determined identities from the receiver computer to a controller computer over a computer network. The method may also include determining an identity of a front mold member and an identity of a back mold member.

In addition, the method may include sending the determined front mold member identity and the determined back mold member identity to a mold member storage array. A controller computer may be coupled to a mold member storage array as described above. A mold member storage array may be configured as described in any of the above embodiments. For example, the mold member storage array may include a plurality of drawers or locations configured to hold a mold member. In addition, the method may include determining an appropriate location for a mold member in a mold member storage array, as shown in step 2118. The method may further include generating a signal to indicate the determined location. In addition, the method may include displaying the generated signal to a user. The signal may be visual and/or audible such that the signal may be detected by a user. The method may also include generating multiple signals sequentially as described in above embodiments. As such, a generated signal may indicate, to a user, an appropriate location for an eyeglass mold member having the determined identity. In this manner, a user may place a mold member into an appropriate location in a mold member storage array until an eyeglass lens order is received which requires use of the mold member.

Figure 44:
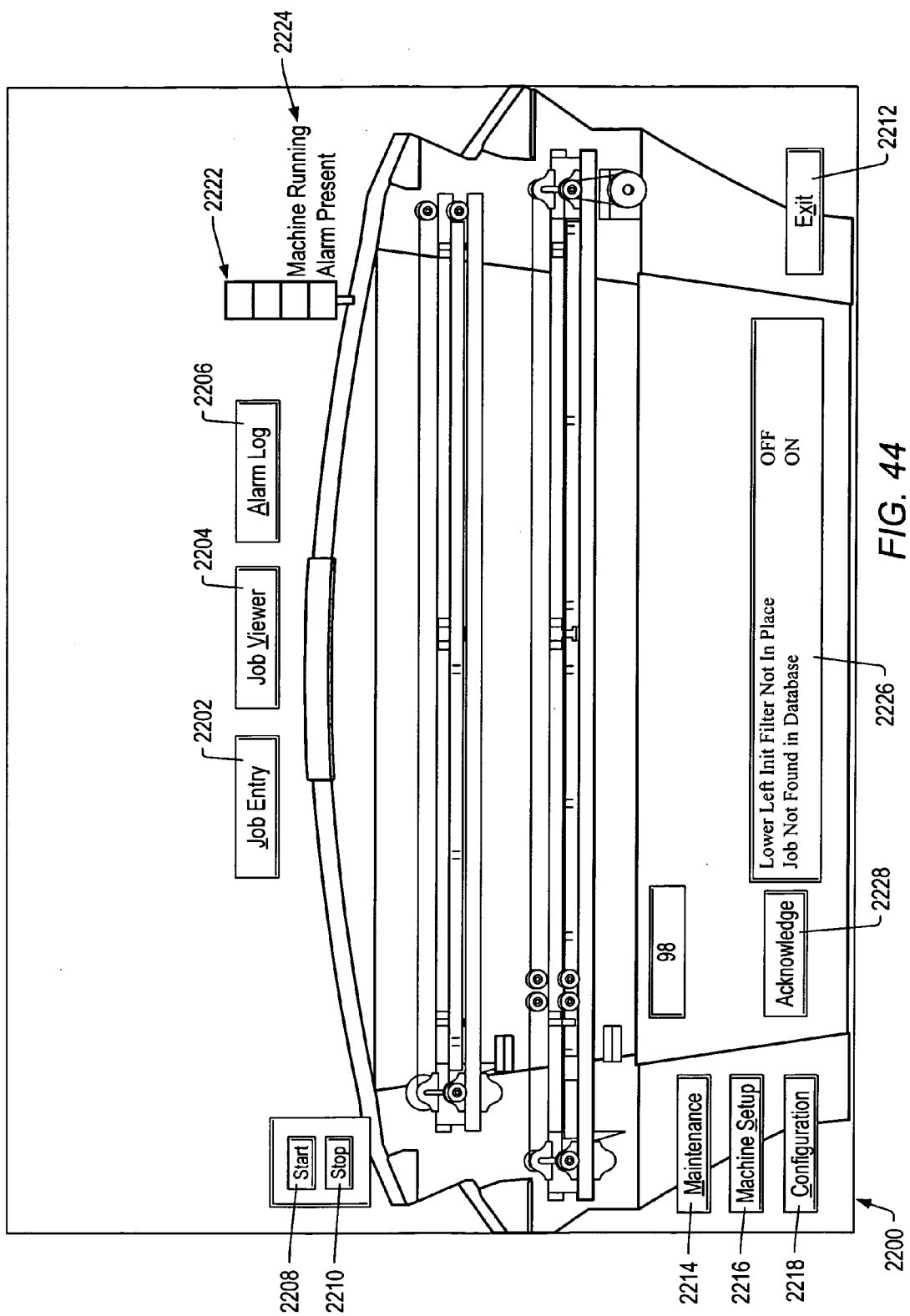
FIGS. 44, 45, and 46 depict embodiments of graphical user interfaces which may display eyeglass lens forming-related information.

FIG. 44 shows an embodiment of graphical user interface ("GUI") 2200 which may display eyeglass lens forming-related information on a front panel of controller computer 2002. GUI 2200, as illustrated in FIG. 44, may also be displayed on a front panel of receiver computer 2006. The controller computer and the receiver computer may be configured as described in any of the above embodiments. The controller computer and/or the receiver computer may include an output device and at least one input device. A variety of input devices may be used. Some input devices include pressure sensitive devices (e.g., buttons or screens), movable data entry devices (e.g., rotatable knobs, a mouse, a trackball, or moving switches), voice data entry devices (e.g., a microphone), light pens, or a computer coupled to the controller computer and/or the receiver computer. The GUI preferably displays controller and/or receiver computer data requests and responses. The output device may be a monitor cathode ray tube, an LCD panel, a plasma display screen, or a touch-sensitive screen.

GUI 2200 may include a main menu and may be displayed by a controller computer or a receiver computer when initially powered. If the main menu is not displayed, a user may access the main menu by clicking a button, which may be labeled Main Menu, on a displayed GUI with a mouse. In response to activating the Main Menu button, the controller and/or receiver computer may cause the main menu screen to be displayed. As depicted in FIG. 44, a GUI may offer a number of initial options on the main menu. The options may include Job Entry 2202, Job Viewer 2204, Alarm Log 2206, Start 2208, Stop 2210, and Exit 2212. Selection of some of the options such as Job Entry 2202, Job Viewer 2204 and Alarm Log 2206 may cause the display screen to change to a different GUI. Selection of other options such as Start 2008 and Stop 2210 may alter an operation of the lens forming apparatus. For example, selecting Start 2208 may cause the lens forming apparatus to begin a process such as curing a lens forming composition. The main menu may also offer other options which allow the user to access machine status information and instrument setup menus such as Maintenance 2214, Machine Setup 2216, and Configuration 2218. Any one of the options may be selected by a user by clicking an appropriate button with a mouse.

Figure 45:
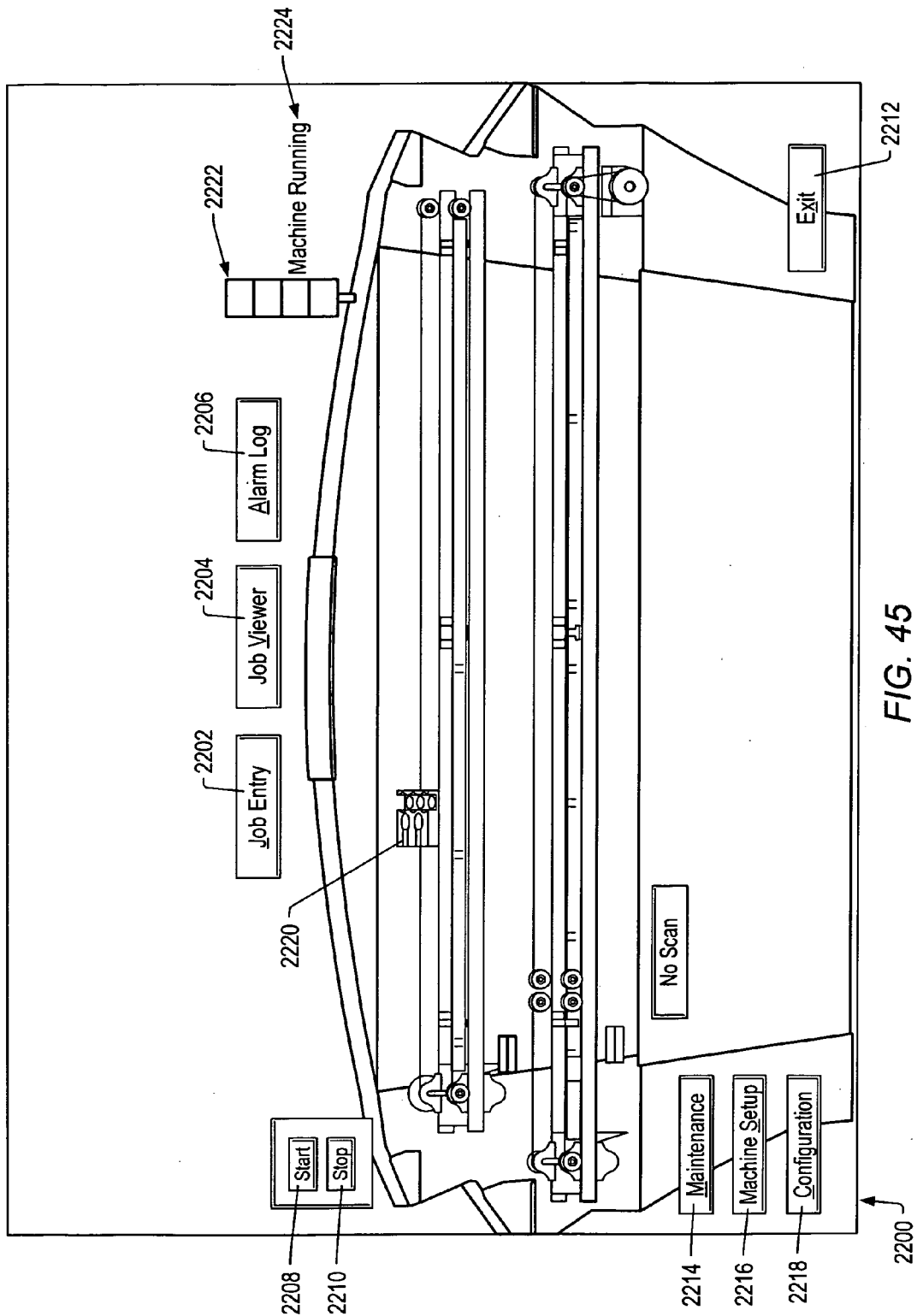

GUI 2200 may also display machine status-related information on the main menu. For example, GUI 2200 may include a graphical icon or a display listing properties of a lens forming apparatus in graphic and/or alphanumeric format. A graphical icon or a display may appear or may be altered on GUI 2200 in response to a change in status of lens forming apparatus 2000. For example, as shown in FIG. 45, icon 2220 representative of a mold assembly holder, as described in above embodiments, may appear on GUI 2200 when a mold assembly holder is placed in a first curing unit or a second curing unit of lens forming apparatus 2000. A position of icon 2220 on the GUI may also indicate a unit within which the mold assembly holder is disposed and a position of the mold assembly holder within the unit. For example, a position of the mold assembly holder within the unit may be determined from a time of initial detection and a speed of the conveyor system. In this manner, the position of icon 2220 on the GUI may correspond to the determined position of the mold assembly holder within the unit.

In addition, an icon may be altered in color to indicate a change in status of a lens forming apparatus. For example, an icon, which may represent a signal tower of a lens forming apparatus, may include series of icons 2222 of different colors. Upon a change in status of the apparatus or in an alarm coupled to the apparatus, a color of one of series of icons 2222 may be altered on GUI 2200. For example, in FIG. 44, a color intensity of two of series of icons 2222 of signal tower may be altered to indicate 1) that an alarm may be present and 2) that the machine may be running. Alternatively, as shown in FIG. 45, a color of only one of series of icons 2222 may be altered to indicate only 2) that the machine may be running. In addition, alphanumeric characters 2224 may appear on GUI 2200 proximate one of the series of icons representing the signal tower to indicate a change in status of the machine corresponding to a change in color of one of the series of icons.

As shown in FIG. 44, upon activation of an alarm, display 2226 of GUI 2200 may display machine-status information in alphanumeric format. Display 2226 of GUI 2200 may include a list of properties to indicate that, for example, "Lower Left Init Filter Not In Place" and "Job Not Found in Database" in addition to any other status-related information. GUI 2200 may also include an option such as Acknowledge 2228 arranged proximate text block 2226. A user may select Acknowledge 2228 to access and/or remove machine-status information from text block 2226.

Figure 46:
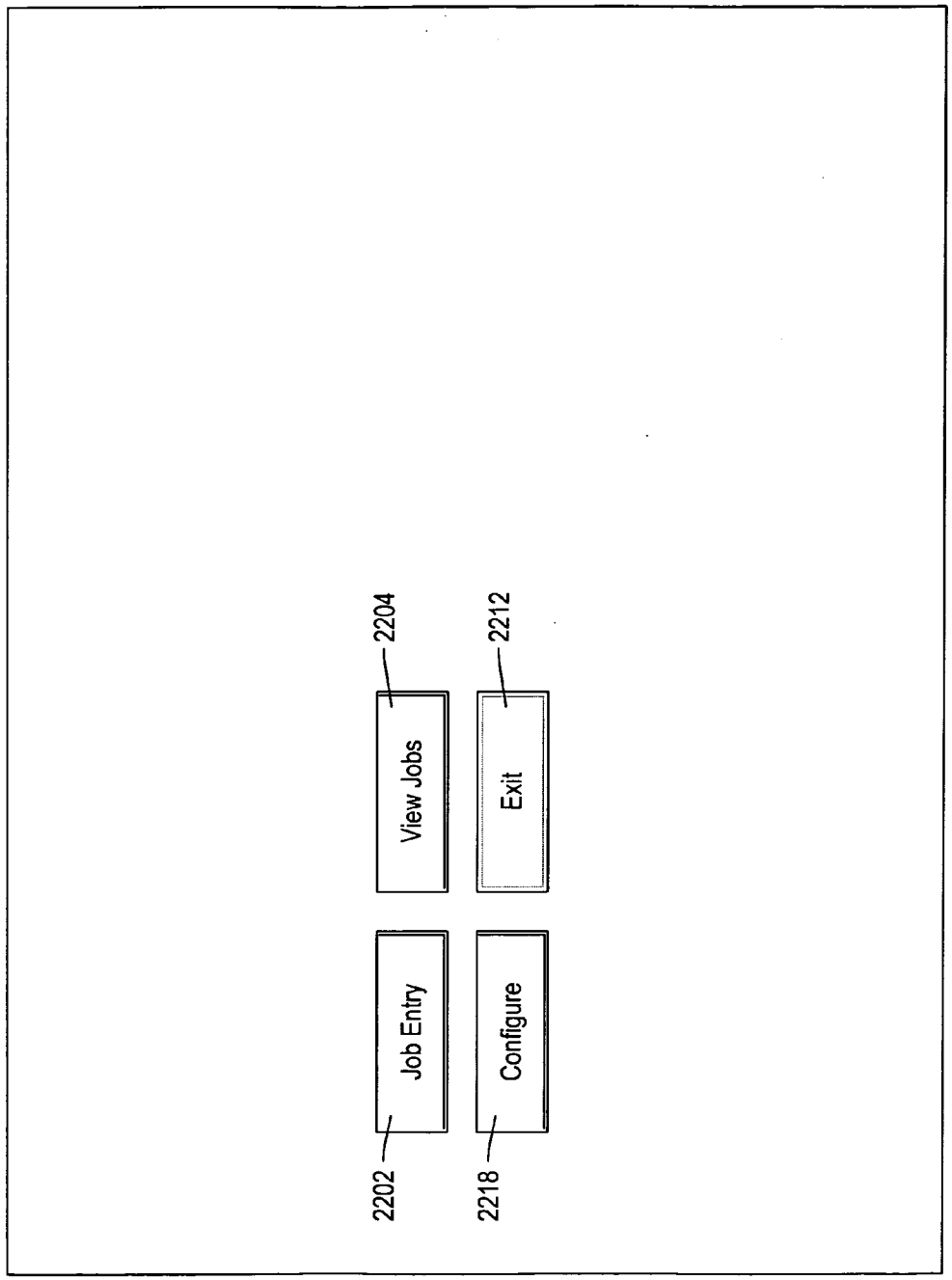

FIG. 46 shows an alternate embodiment of graphical user interface ("GUI") 2228 which may display eyeglass lens forming-related information on a front panel of controller computer 2002. GUI 2228, as illustrated in FIG. 46, may also be displayed on a front panel of receiver computer 2006 or on a front panel of client computer system 2008. The controller computer, the receiver computer, and the client computer system may be configured as described in above embodiments. GUI 2228 may display controller and/or receiver computer data requests and responses. GUI 2228 may include a main menu and may be displayed by a controller computer or a receiver computer when initially powered. GUI 2228 may also be displayed by a client computer system upon request from a user.

As depicted in FIG. 46, GUI 2228 may offer a subset of the initial options displayed on GUI 2200. For example, GUI 2228 may be displayed to a user who may have limited access to information and/or control of lens forming apparatus 2200. A user may be required to obtain a user id to access the system. Access granted to a user may vary depending on the user. For example, access granted to a user may be determined from information provided by a user upon request for a user id. For example, an operator or an engineer, who may operate and/or maintain a lens forming apparatus, may be granted more access to information and control of the apparatus than a client. Therefore, the options which may be displayed either on GUI 2200 or GUI 2228 may be determined by a user id provided by a user during a login routine. A login routine may also require a user to enter a password. In this manner, access to the system through either GUI 2200 or GUI 2228 may be controlled and/or monitored to protect the identity of the users, as well as the privacy and integrity of the information. A user may also be required to enter a password upon selecting Exit 2212 from either GUI 2200 or GUI 2228 for privacy and integrity purposes.

For example, upon login by an operator, GUI 2200 may be displayed on a controller computer or on a receiver computer. Upon login by a client, however, GUI 2228 may be displayed on a client computer system to provide a limited number of options such as Job Entry 2202, View Jobs 2204, Configure 2218, and Exit 2212. As described above, any one of the options may be selected by a user by clicking an appropriate button with a mouse. In addition, selection of a similar option from either GUI 2200 or GUI 2228 may cause the display screen to change to substantially the same GUI. Therefore, regardless of whether Job Entry or View Jobs is selected from GUI 2200 or GUI 2228, respectively, the display screen may be changed to a prescription input menu.

Figure 47:
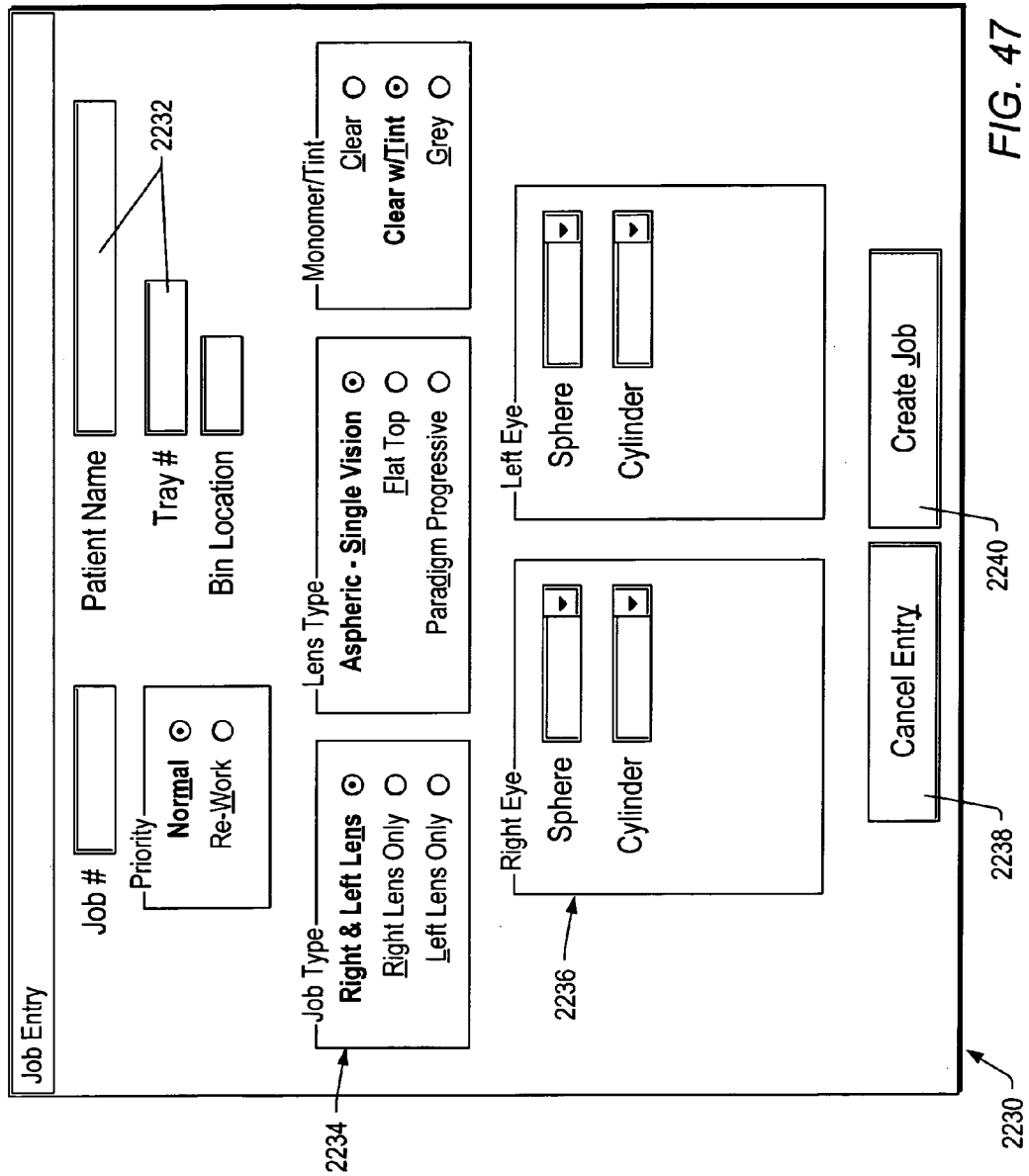
FIG. 47 depicts an embodiment of a graphical user interface which may include a prescription input menu.

Selection of Job Entry 2202 may cause the display screen to change to prescription input GUI 2230, an embodiment of which is shown in FIG. 47. GUI 2230 may be displayed on a controller computer, a receiver computer, and/or a client computer system. The controller computer, the receiver computer, and the client computer system may be configured as described in any of the above embodiments. Prescription input GUI 2230 may preferably allow a user to enter data pertaining to a new lens order. The prescription input menu may include a number of menu items which may be configured to collect information from a user. For example, the prescription input menu may include a number of input windows 2232 which may be configured to receive alphanumeric input from a user. In addition, the system may be configured to generate and display a signal to the user upon an invalid entry in an input window.

In addition, the prescription input menu may include a number of selection menus which may include radio buttons 2234 and/or pull-down menus 2236. A radio button may be an item that may be selected or deselected, and which displays its state to a user. In addition, in a menu of radio buttons, typically only one radio button may be selected at a time. For example, upon selection of one radio button in a menu, each of the other radio buttons in the menu may be shaded to indicate that these selections are unavailable. Furthermore, additional menu items displayed on a GUI may be altered upon selection of a radio button. For example, if a user selects a radio button to indicate that a new lens order includes a right lens and a left lens, then pull down menus may appear on the GUI to accept prescription information for both the right and the left lens. A pull down menu may include a number of options which may be viewed by selecting the pull down menu. In addition, a user may select one of the number of options from the pull down menu. A selected option may appear in a text box of the pull-down menu subsequent to selection by a user. Additional pull down menus may be altered upon a selection from a pull down menu. For example, upon selection of zero cylindrical power, a pull down menu for a cylinder axis power may be removed from GUI 2230 or may be shaded to indicate that the pull down menu is currently inactive (i.e., the menu may not accept input from a user).

Each of the menu items allows entry of a portion of the lens prescription. The lens prescription information may include, but is not limited to, job number, patient name, mold assembly holder number, priority, bin location, lens location (i.e., left lens or right lens), lens type, monomer type and/or tint, spherical power, cylindrical power, axis, and add power. The monomer selection may include choices for example, either clear or photochromic lenses. The lens type item may allow selection between spheric single vision, aspheric single vision lenses, flattop bifocal lenses, and asymmetrical progressive lenses. The sphere item allows the sphere power of the lens to be entered. The cylinder item allows the cylinder power to be entered. The axis item allows the cylinder axis to be entered. The add item allows the add power for multifocal prescriptions to be added. Since the sphere power, cylinder power, cylinder axis, and add power may differ for each eye, and since the molds and gaskets may be specific for the location of the lens (i.e., right lens or left lens), the GUI preferably allows separate entries for right and left lenses.

A user may cancel a new lens order at any time by selecting an option such as Cancel Entry 2238 which may be displayed on prescription input GUI 2230. In addition, a user may submit a new lens order by selecting an option such as Create Job 2240 which may also be displayed on prescription input GUI 2230. Upon selection of Create Job 2240, the new lens order submitted by the user may be sent to a receiver computer or a controller computer. In addition, the new lens order may be stored in a database of eyeglass lens orders as described in above embodiments. Furthermore, each entry of the new lens order may be compared to valid entries for an eyeglass lens order. If any of the entries do not match valid entries, GUI 2230 may display an error message to the user. For example, a new lens order submitted by a user may not be filled by a lens forming apparatus if the lens forming apparatus does not include appropriate molds to form the ordered lens. In this manner, GUI 2230 may display an error message to the user such as "Prescription Not Available." In addition, an entry may be determined to be invalid if the entry may have been left blank by a user. An appearance of an invalid entry may be altered on GUI 2230 to indicate the invalid entry to a user. For example, if a mold is not available for the left lens, pull down menus for prescription information for this lens may be highlighted, may be indicated with a graphical icon, or may be indicated by alphanumeric characters. GUI 2230 may also be configured to allow a user to alter the invalid entry and to provide a user with additional options such as Cancel Entry 2238 and Create Job 2240.

After the data relating to the prescription has been added, the controller computer, the receiver computer, or the client computer system may prompt the user to enter a job number to save the prescription type. The job number preferably allows the user to recall a prescription type without having to reenter the prescription data. The job number may also be used by the controller computer to control the curing conditions for the lens. The curing conditions typically vary depending on the type and prescription of the lens. By allowing the controller computer access to the prescription and type of lens being formed, the controller computer may automatically set up the curing conditions without further input from the user.

Figure 48:
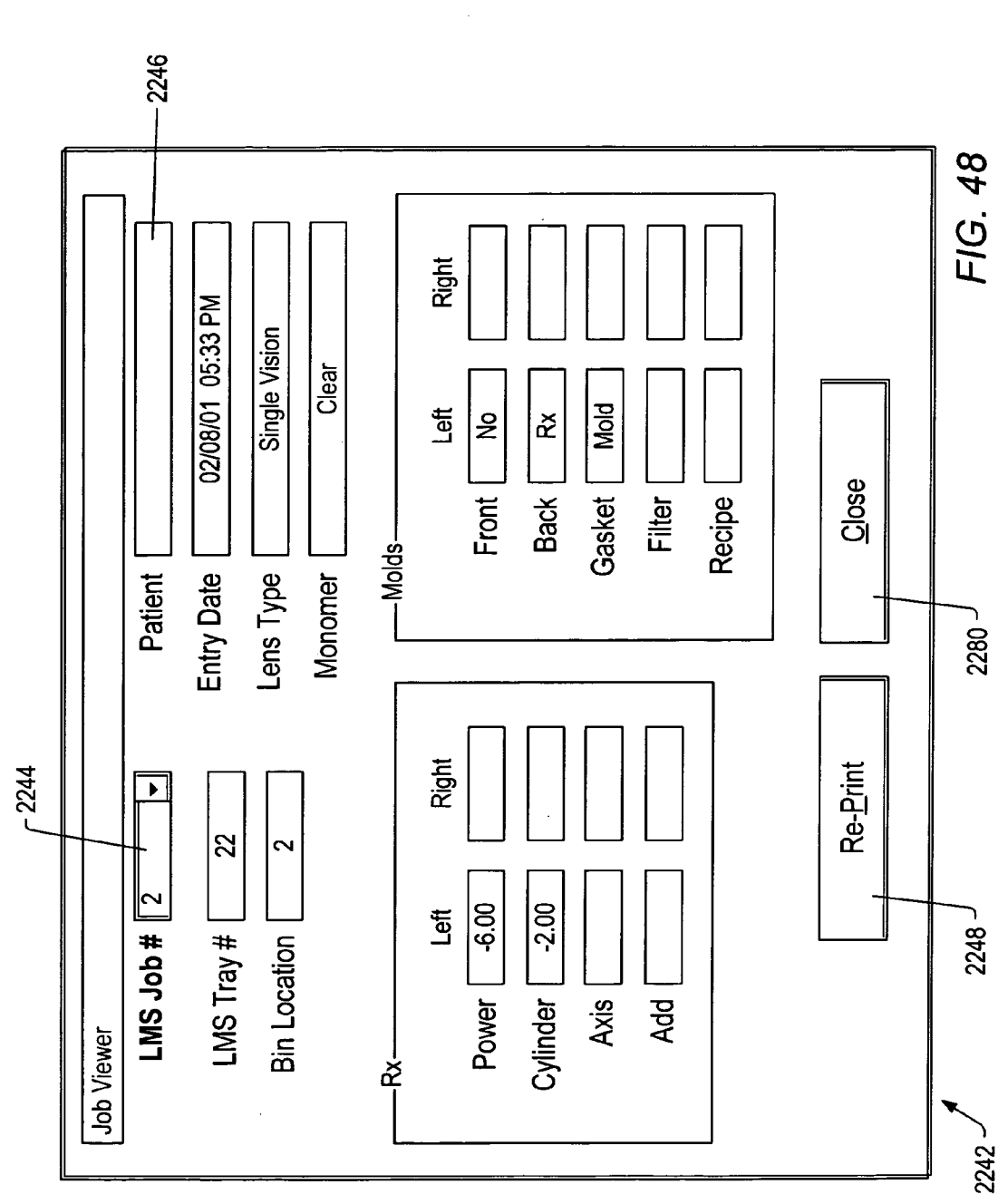

Selection of Job Viewer or View Jobs 2204 may cause the display screen to change to an embodiment of prescription viewer GUI 2242, an embodiment of which is shown in FIG. 48. GUI 2242 may be displayed on a controller computer, a receiver computer, and/or a client computer system. The controller computer, the receiver computer, and the client computer system may be configured as described in any of the above embodiments. Prescription viewer GUI 2242 may preferably allow a user to select an eyeglass lens order and to view data pertaining to the selected eyeglass lens order. For example, GUI 2242 may include input windows, radio buttons, and/or pull down menus as described in above embodiments to allow a user to enter information which may be associated with an eyeglass lens order. For example, GUI 2242 may include pull down menu 2244. The pull down menu may include a list of job numbers which may be viewed by selecting the pull down menu. In addition, a user may select one of the job numbers from the pull down menu. A selected job number may appear in a text box of the pull-down menu subsequent to selection by a user. In addition, GUI 2242 may include input window 2246 which may be configured to receive alphanumeric characters representative of an eyeglass lens order. For example, a user may enter a patient's name into an input window on GUI 2242. GUI 2242 may also be configured such that additional information related to an eyeglass lens order may be entered by a user.

The information entered by the user may be used to determine additional information related to the eyeglass lens order. The additional information may be determined by a client computer system, a receiver computer, or a controller computer, all of which may be configured as described in above embodiments. For example, the additional information may be determined by processing the input from the user and searching a database of information stored on the client computer system, the receiver computer, or the controller computer. The additional information may be displayed on GUI 2242 such that a user may view the additional information. In addition, GUI 2242 may include a number of options which may be available to the user. For example, GUI 2242 may include options such as Re-Print 2248 and Close 2250. In this manner, the user may select to print the information displayed in GUI 2242 or to close GUI 2242 and return to the previous menu displayed on the user's computer.

Figure 49:
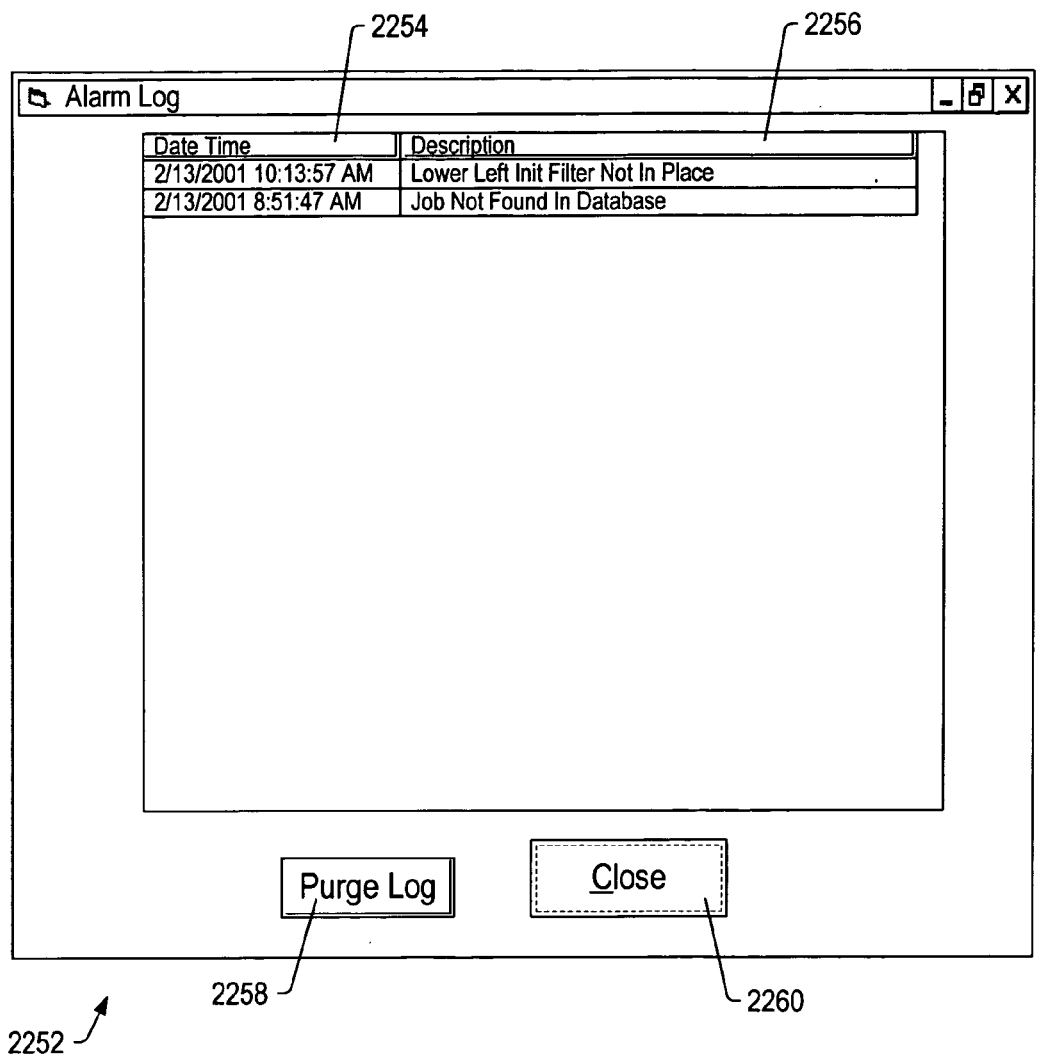
FIG. 49 depicts an embodiment of a graphical user interface which may include an alarm viewer display.

Selection of Alarm Log 2206 may cause the display screen to change to an embodiment of alarm viewer GUI 2252, an embodiment of which is shown in FIG. 49. GUI 2252 may be displayed on a controller computer and/or a receiver computer. The controller computer and the receiver computer may be configured as described in any of the above embodiments. Alarm viewer GUI 2252 may preferably allow a user to view information related to alarms which may have occurred during operation of a lens curing apparatus. Information related to alarms may be presented in tabular format and may include several columns. For example, as shown in FIG. 49, GUI 2252 may include column 2254 which may include alphanumeric characters representative of a date and a time at which an alarm occurred. In addition, GUI 2252 may include column 2256 which may include alphanumeric characters representative of a description of an alarm. GUI 2252 may also include additional columns which may include additional information related to an alarm such as a classification and a priority of the alarm.

A user may also select one of the alarms displayed in GUI 2252. Selection of one of the displayed alarms may cause the GUI to display additional information related to the alarm or to display additional options related to the alarm and/or operation of the lens forming apparatus. For example, upon selection of a displayed alarm, a user may further select to delete the selected alarm or to restart the lens forming apparatus. GUI 2252 may also include a number of options which may be available to the user. For example, GUI 2252 may include options such as Purge Log 2258 and Close 2260. In this manner, the user may select to delete all of the information displayed in GUI 2252 or to close GUI 2252 and return to the previous menu displayed on the user's computer.

Selection of Maintenance 2214 may cause the display screen to change to an embodiment of maintenance viewer GUI 2262, an embodiment of which is shown in FIG. 50. GUI 2262 may be displayed on a controller computer and/or a receiver computer. The controller computer and the receiver computer may be configured as described in any of the above embodiments. Maintenance viewer GUI 2262 may preferably allow a user to view information related to operational status of a lens curing apparatus. Operational status of a lens curing apparatus may be determined by parameters of a number of instruments coupled to the lens curing apparatus. For example, instruments coupled to the lens curing apparatus may include, but are not limited to, thermocouples, timing devices, light detection devices such as photodiodes, and electrical measurement devices. Therefore, parameters of an instrument may include, for example, output of a thermocouple, a timing device, a light detection device, or an electrical measurement device. In this manner, information related to operational status of lens curing apparatus may include, but may not be limited to, temperatures of a post-cure chamber, time, light intensity, and electrical currents being drawn by lamps coupled to the lens curing apparatus. As such, information which may be displayed on the maintenance viewer may include lamp current draws, current upper and lower limits for the current draw, and lamp life remaining.

Information related to operational status of a lens curing apparatus may be displayed in alphanumeric and graphical format. For example, as shown in FIG. 49, GUI 2262 may include output windows 2264 which may include alphanumeric characters representative of information related to operational status of a lens curing apparatus as described above. In addition, GUI 2262 may include a plurality of digital inputs 2266 which may include alphanumeric characters describing an operational status of a lens curing apparatus and a corresponding graphical icon. For example, alphanumeric characters may be used to describe an operation or a process which may be performed by a lens forming apparatus. A graphical icon corresponding to the alphanumeric characters may indicate if the operation or process is currently being performed by the lens forming apparatus or if the operation or process is being performed satisfactorily. For example, if the air pressure within a lens forming apparatus is within operational limits, a graphical icon corresponding to alphanumeric characters such as "Air Pressure OK" may appear as a solid shape such as a circle. Alternatively, if the air pressure within a lens forming apparatus is outside of operational limits, a graphical icon corresponding to alphanumeric characters such as "Air Pressure OK" may appear as an outlined shape such as a circle. The graphical icons may also be altered depending if various equipment of the lens forming apparatus is on or off. In an additional example, the maintenance viewer may also include digital inputs which may indicate if a lamp current draw is too high or too low and if an alarm is currently activated for the lamp current draw, thereby indicating lamp failure. As such, the maintenance viewer may provide comprehensive information related to the current operational status and setpoints for equipment of a lens forming apparatus.

GUI 2262 may also include a number of options which may be available to the user. For example, GUI 2262 may include options such as More . . . 2268 and Close 2270. In this manner, the user may select to view more digital inputs as described above by selecting More . . . 2268 or to close GUI 2262 and return to the previous menu displayed on the user's computer by selecting Close 2270.

Figure 51:
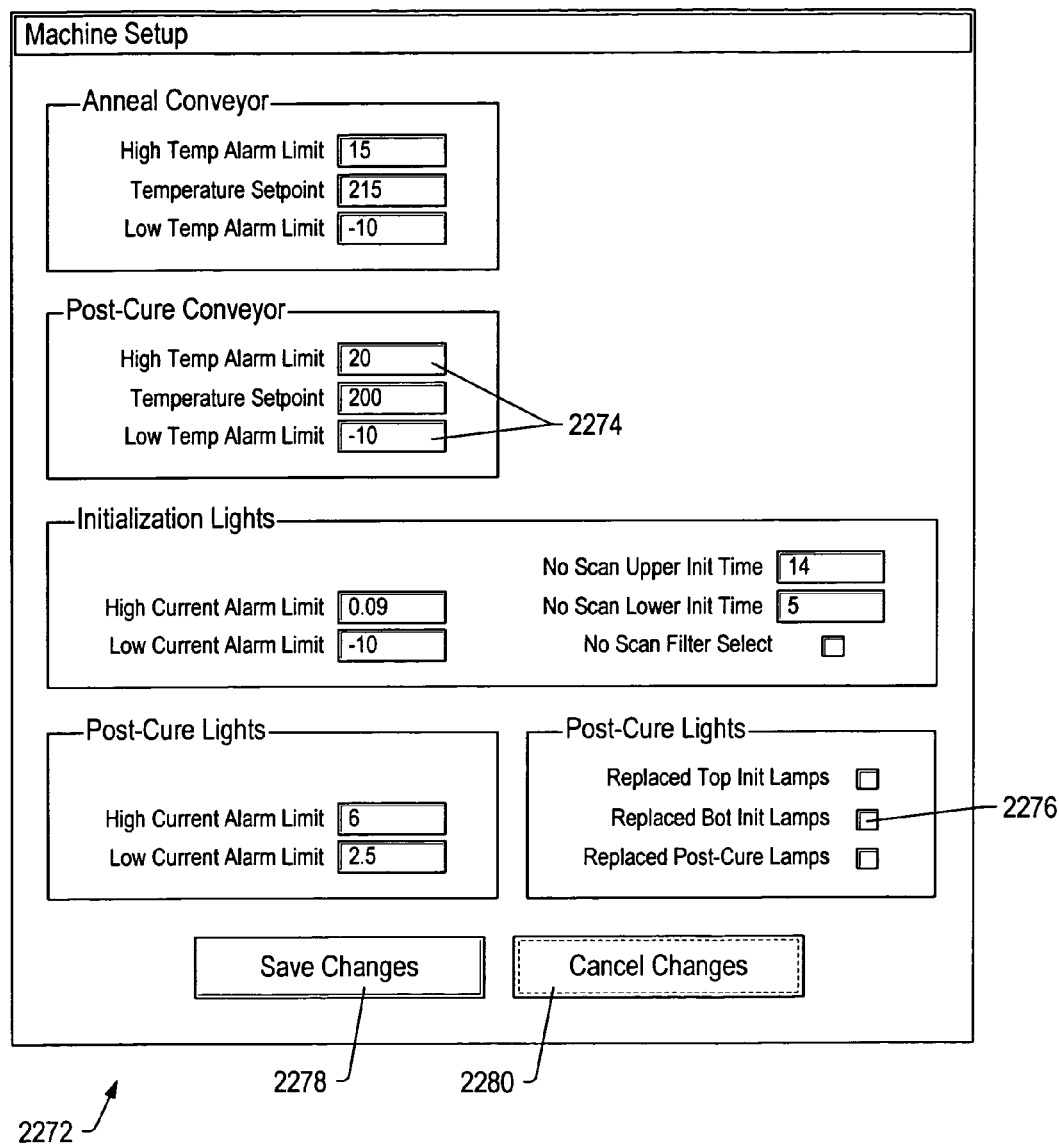
FIG. 51 depicts an embodiment of a graphical user interface which may include a machine setup menu.

Selection of Machine Setup 2216 may cause the display screen to change to an embodiment of machine setup menu GUI 2272, an embodiment of which is shown in FIG. 51. GUI 2272 may be displayed on a controller computer and/or a receiver computer. The controller computer and the receiver computer may be configured as described in any of the above embodiments. Machine Setup GUI 2272 may preferably allow a user to view information related to setpoints and upper and lower limits for parameters of a number of instruments coupled to the lens curing apparatus. As described above, instruments coupled to the lens curing apparatus may include, but are not limited to, thermocouples, timing devices, light detection devices such as photodiodes, and electrical measurement devices. A thermocouple may be configured to measure a temperature of a curing unit or an anneal unit. For example, a thermocouple may be disposed in an air intake vent of a curing unit or an anneal unit. Therefore, parameters of an instrument may include, for example, output of a thermocouple, a timing device, a light detection device, and an electrical measurement device. In this manner, information related to setpoints and limits for parameters of a number of instruments coupled to the lens curing apparatus may include, but may not be limited to, a temperature of a cure unit, a temperature of an anneal unit, time, light intensity, and electrical currents being drawn by lamps coupled to the lens curing apparatus. For example, a user may use the machine setup menu to enter a setpoint and upper and lower alarm limits for lamp current draws. A temperature of a curing unit may have upper and lower alarm limits of, for example, approximately 225° F. and approximately 200° F., respectively. A temperature of an anneal unit may have upper and lower alarm limits of, for example, approximately 250° F. and approximately 200° F., respectively.

The machine setup menu may include a number of menu items which may be configured to collect information from a user. For example, the machine setup menu may include a number of input windows 2274 which may be configured to receive alphanumeric input from a user. In addition, the system may be configured to generate and display a signal to the user upon an invalid entry in an input window. As such, a user may view and alter setpoints and upper and lower limits for a number of instruments coupled to the lens curing apparatus.

In addition, the machine setup menu may include a number of input boxes 2276 which may selected by the user. Upon selection of an input box, a "check" may appear in the input box to indicate to a user that the input box has been selected. The input boxes may include a number of maintenance operations which may be performed by an operator. In this manner, after performing a maintenance operation such as replacing top initialization lamps, replacing bottom initialization lamps, and/or replacing post-cure lamps, a user may access the machine setup menu and may select an appropriate input box. In addition, the system may be configured to store a date and a time at which an input box is selected and the maintenance operation corresponding to the selected input box in a memory. The stored information may also be stored in a database such as a maintenance log, which may also be viewed by a user through an appropriate GUI.

GUI 2272 may also include a number of options which may be available to the user. For example, GUI 2272 may include options such as Save Changes 2278 and Cancel Changes 2280. A user may submit changes to setpoints and upper and lower limits by selecting an option such as Save Changes 2278. Upon selection of Save Changes 2278, the changes to the setpoints and upper and lower limits may be sent to a receiver computer or a controller computer. In addition, the changes to the setpoints and upper and lower limits may be stored in a database as described in above embodiments. Furthermore, each change to a setpoint or an upper and lower limit may be compared to valid entries for the setpoint or the upper and lower limit. If any of the entries do not match valid entries, GUI 2272 may display an error message to the user. In this manner, GUI 2272 may display an error message to the user such as "Setpoint Out Of Range". In addition, an appearance of an invalid entry may be altered on GUI 2272 to indicate the invalid entry to a user. For example, if a temperature setpoint for an anneal conveyor is out of range, an appearance of an input window for this information may be altered, may be indicated with a graphical icon, or may be indicated with alphanumeric characters. GUI 2272 may also be configured to allow a user to alter the invalid entry and to provide a user with additional options such as Cancel Changes 2280 and Save Changes 2278. A user may cancel changes to setpoints and upper and lower limits at any time by selecting the Cancel Changes option.

Figure 52:
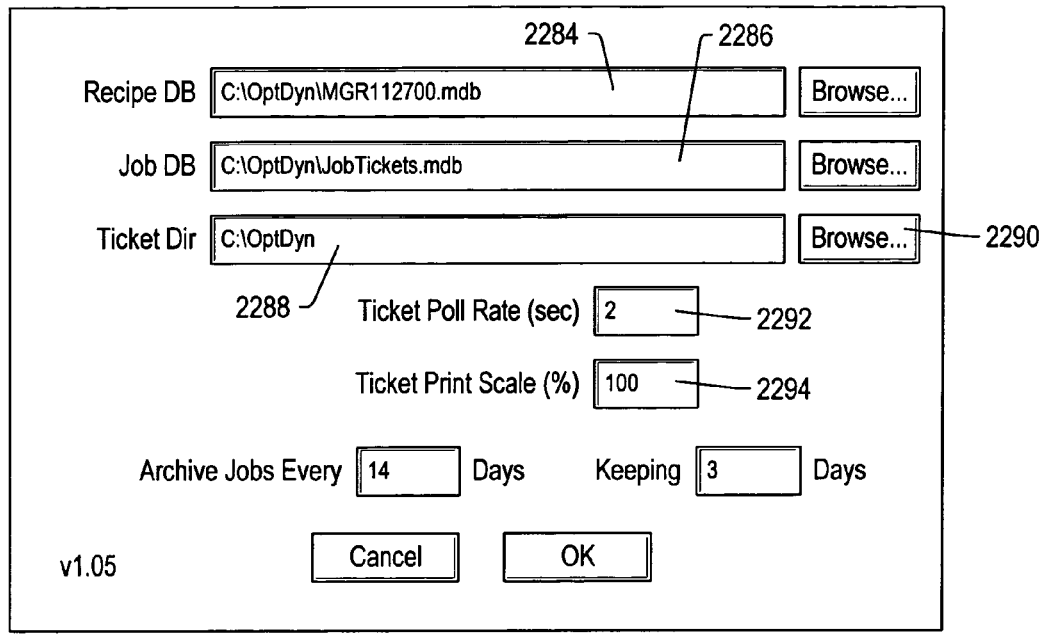
FIGS. 52 and 53 depict embodiments of graphical user interfaces which may include a configuration setup menu.

Selection of Configuration or Configure 2218 may cause the display screen to change to an embodiment of configuration setup menu GUI 2282, an embodiment of which is shown in FIG. 52. GUI 2282 may be displayed on a controller computer and/or a receiver computer. The controller computer and the receiver computer may be configured as described in any of the above embodiments. Configuration GUI 2282 may preferably allow a user to view information related to filepath names of various databases and/or directories of information. For example, the GUI may include various windows which may include filepath names of Recipe DB (database) 2284, Job DB (database) 2286, and Ticket Dir (directory) 2288. Each of the filepath names may be used by a computer system, such as a controller computer or a receiver computer, to find, open, and/or use a database or a directory. The Recipe DB may include a plurality of program instructions which may be computer-executable to implement a method for forming an eyeglass lens. The Job DB may include information related to lens forming processes which may have been performed by a lens forming apparatus. In addition, the Ticket Dir may include information related to job tickets which may have been entered by a plurality of users. In addition, the GUI may include an option such as Browse . . . 2290, which a user may select to search for additional available files which may be used for each database or directory. For example, a user may browse through a memory medium coupled to a computer to search for an alternate file that may be used as a database or directory. Alternatively, a user may enter a filepath name into an input window.

The GUI may also include additional windows which may include a numeric characters which may define a Ticket Poll Rate 2292, a Ticket Print Scale 2294, and a frequency for archiving jobs. Ticket Poll Rate 2292 may serve to define a frequency at which a system may be checked for new files such as job tickets. Ticket Print Scale 2294 may serve to define a size of a printed job ticket. In this manner, a size of a printed job ticket may be defined as a percentage of a page on which the job ticket may be printed.

Figure 53:
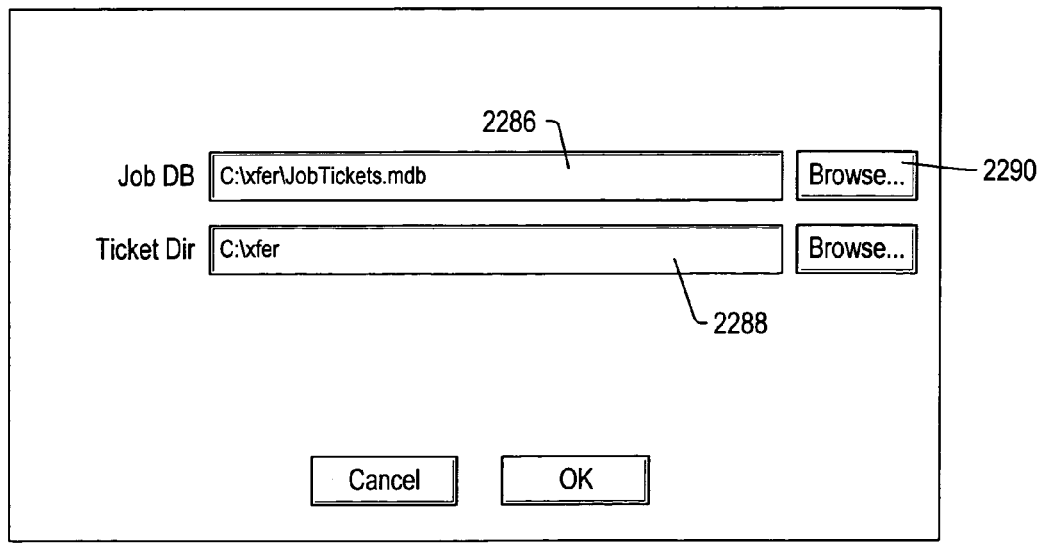

As depicted in FIG. 53, GUI 2296 may offer a subset of the initial options displayed on GUI 2282. For example, GUI 2296 may be displayed to a user who may have limited access to information and/or control of lens forming apparatus 2200. As defined above, a user may be required to obtain a user id to access the system. Access granted to a user may vary depending on the user. For example, access granted to a user may be determined from information provided by a user upon request for a user id. For example, an operator or an engineer, who may operate and/or maintain a lens forming apparatus, may be granted more access to information and control of the apparatus than a client. Therefore, the options which may be displayed either on GUI 2282 or GUI 2296 may be determined by a user id provided by a user during a login routine. For example, upon login by an operator, GUI 2282 may be displayed on a controller computer or on a receiver computer. Upon login by a client, however, GUI 2296 may be displayed on a client computer system to provide a limited number of options such as Job DB (database) 2286, and Ticket Dir (directory) 2288. GUI 2296, however, may also be displayed on a controller computer and/or a receiver computer depending on the user id entered by a user. In addition, GUI 2296 may include an option such as Browse . . . 2290, which a user may select to search for additional available files.

Antireflective Coatings for Plastic Eyeglass Lenses

For plastic eyeglass lenses, formed from the materials described above, a portion of the light incident upon the lenses may be reflected from the eyeglass lens rather than transmitted through the eyeglass lens. For plastic eyeglass lenses up to about 15% of the incident light may be reflected off the eyeglass lens surfaces. To reduce the reflection of light from a plastic eyeglass lens, a thin film may be applied to the lens. Such films may be referred to as "antireflective coating" films. Antireflective coatings may reduce the reflectance of light from a surface (i.e., increase light transmittance through the film/substrate interface).

While numerous approaches to reducing the reflective losses for glass materials have been developed, few techniques are available for producing antireflective coatings on plastics. Vapor deposition techniques have been used commercially to form antireflective coatings on plastic materials, however these techniques suffer from a number of drawbacks. Some of the disadvantages of using vapor deposition include relatively large capital expenditure for deposition equipment, significant space requirements, and relatively long cycle times.

Reactive liquid compositions for forming antireflective coatings on lenses have been previously studied. Many of the previously disclosed solutions require heating of the antireflective film to a high temperature after its application to a substrate. In some instances, the temperature to cure such solutions may be greater than about 200° C. Such temperatures may be suitable for the coating of glass substrates, but are higher than most plastic lens substrates are capable of withstanding.

U.S. Pat. No. 4,929,278 to Ashley et al. and U.S. Pat. No. 4,966,812 to Ashley et al. describe a process for depositing antireflective films on a plastic substrate by first synthesizing an ethanol gel in a $SiO_2$—$B_2O_3$—$Al_2O_3$—BaO system followed by reliquifying the gel. This material may be applied to a plastic substrate and thermally dried to form a porous film having a low refractive index. Such films, however, may exhibit poor abrasion resistance and can take weeks to form.

U.S. Pat. No. 5,580,819 to Li et al. and U.S. Pat. No. 5,744,243 to Li et al. disclose a composition for producing coatings and a process for preparing single-layer broad band antireflective coatings on a solid substrate, such as glass, ceramics, metals and organic polymeric materials. The process involves applying an acid-catalyzed sol-gel coating composition and a water soluble metal salt to the surface of a solid substrate and curing the applied coating with an aqueous electrolyte solution for a time sufficient to produce a coating. The two step preparation of the coating composition, however, may be time consuming since the treatment with the aqueous electrolyte may take several days.

The use of ultraviolet light curable liquid compositions for forming antireflective coatings on substrates offers a number of advantages over the deposition techniques described above. In particular, the equipment cost tends to be minimal and the application techniques tend to minimize alterations to the shape or clarity of the plastic item being coated. Additionally, the liquid compositions of embodiments presented herein, may be cured in a time of less than about 10 minutes. Finally, the liquid compositions, of the present invention, may be applied to a variety of visible light transmitting substrates. Such substrates may be composed of glass or plastic. It should be understood that the liquid compositions for forming an antireflective coating described herein may be applied to a number of visible light transmitting substrates including windows and the outer glass surface of television screens and computer monitors. The liquid composition may be used to form an antireflective coating on a lens, preferably on plastic lenses, and more preferably on plastic eyeglass lenses.

In an embodiment, a single layer coating may be formed on a plastic lens by coating the substrate with an ultraviolet light curable liquid composition and curing the composition. While the below described procedures refer to the coating of plastic lenses, it should be understood that the procedures may be adapted to coat any of the above described substrates. The cured composition may form a thin layer (e.g., less than about 500 nm) on the substrate. The cured composition layer may have antireflective properties if the thin layer has an index of refraction that is less than the index of refraction of the substrate. This may be sufficient for many applications where a limited increase in visible light transmission is acceptable. Single layer antireflective coatings, however, may exhibit poor adhesion to the plastic lens. Attempts to increase the adhesion to the plastic lens by altering the composition may cause the index of refraction of the single layer antireflective coating to increase and reduce the effectiveness of such layers.

Better antireflective properties and adhesion may be achieved by use of multi-layer antireflective coatings. In one embodiment, a two-layer stack of coating layers may be used as an anti-reflective coating. A first coating layer may be formed on the surface of a plastic lens. The first coating layer may be formed by dispensing a first composition on the surface of the lens and subsequently curing the first composition. The first coating layer may be formed from a material that has an index of refraction that is greater than the index of refraction of the plastic lens. A second coating layer may be formed upon the first coating layer. The second coating layer may be formed by dispensing a second composition onto the first coating layer and curing the second composition. The second coating layer may be formed from a material that has an index of refraction that is less than the index of refraction of the first coating layer. Together the first coating layer and the second coating layer form a stack that may act as an antireflective coating. The first and second coating layers, together, may form a stack having a thickness of less than about 500 nm.

In one embodiment, the first coating layer may be formed from a coating composition that includes a metal alkoxide or a mixture of metal alkoxides. Metal alkoxides have the general formula M $(Y)_p$ wherein M is titanium, aluminum, zirconium, boron, tin, indium, antimony, or zinc, Y is a $C_1$–$C_{10}$ alkoxy or acetylacetonate, and p is an integer equivalent to the valence of M. In some embodiments, M is titanium, aluminum, boron, or zirconium, and Y is $C_1$–$C_5$ alkoxy (e.g., methoxy or ethoxy). Examples of metal alkoxides include, but are not limited to aluminum tri-sec-butoxide, titanium (IV) isopropoxide, titanium (IV) butoxide, zirconium (IV) propoxide, titanium allylacetoacetate triisopropoxide, and trimethyl borate. The first coating layer may be formed by using a sol-gel (i.e., solution-gelation) process. Metal alkoxides, when reacted with water or an alcohol, undergo hydrolysis and condensation reactions to form a polymer network. As the polymer network is formed the solvent may be expelled. The polymer network will continue to grow until a gel is formed. Upon heating or the application of ultraviolet light, the metal alkoxide gel densifies to become a hardened coating on the plastic lens.

The hardened first coating layer, when formed from a sol-gel reaction of a metal alkoxide may have an index of refraction that is greater than the plastic lens. For example, most plastic lenses have an index of refraction from about 1.5 to about 1.7. The first coating layer may have an index of refraction that is greater than 1.7 when formed from a metal alkoxide. The use of metal alkoxides has the advantage of allowing a high index of refraction coating on the surface of the lens. Another advantage attained from the use of metal alkoxides is increased adhesion to the underlying substrate. A general problem for many antireflective coatings is poor adhesion to the underlying substrate. This is particularly true for coatings formed on plastic substrates, although adhesion may also be a problem for glass substrates. The use of metal alkoxides increases the adhesion of the coating material to both plastic and glass substrates. The use of metal alkoxides, therefore, increases the durability of the antireflective coating.

The metal alkoxide may be dissolved or suspended in an organic solvent and subsequently applied to a plastic lens. The coating composition may include a metal alkoxide dissolved or suspended in an organic solvent. The coating composition may include up to about 10% by weight of a metal alkoxide with the remainder of the composition being composed of the organic solvent and other additive compounds described below. In one embodiment, suitable organic solvents are capable of mixing with water and are substantially unreactive toward the metal alkoxide. Examples of such solvents include, but are not limited to ethyl acetate, ethers (e.g., tetrahydrofuran and dioxane), $C_1$–$C_6$ alkanol (e.g., methanol, ethanol, 1-propanol, and 2-propanol), alkoxyalcohols (e.g., 2-ethoxyethanol-2-(2-methoxyethoxy) ethanol, 2-methoxyethanol, 2-(2-ethoxymethoxy) ethanol, and 1-methoxy-2-propanol), ketones (e.g., acetone, methyl ethyl ketone, and methyl isobutyl ketones, or mixtures of any of these compounds.

In another embodiment, the first composition may include a silane monomer. Silane monomers have the general structure $R_mSiX_{4-m}$, where R may be $C_1$–$C_{20}$ alkyl, $C_1$–$C_{20}$ haloalkyl, $C_2$–$C_{20}$ alkenyl, $C_2$–$C_{20}$ haloalkenyl, phenyl, phenyl($C_1$–$C_{20}$)alkyl, $C_1$–$C_{20}$ alkylphenyl, phenyl ($C_2$–$C_{20}$)alkenyl, $C_2$–$C_{20}$ alkenylphenyl, glycidoxy ($C_1$–$C_{20}$) alkyl, epoxycyclohexyl($C_1$–$C_{20}$)alkyl, morpholino, amino ($C_1$–$C_{20}$)alkyl, amino($C_2$–$C_{20}$)alkenyl, mercapto($C_1$–$C_{20}$) alkyl, mercapto($C_2$–$C_{20}$)alkenyl, cyano($C_1$–$C_{20}$) alkyl, cyano($C_2$–$C_{20}$)alkenyl, acryloxy, methacryloxy, or halogen. The halo or halogen substituents may be bromo, chloro, or fluoro. Preferably, $R^1$ is a $C_1$–$C_{10}$ alkyl, $C_1$–$C_{10}$ haloalkyl, $C_2$–$C_{10}$ alkenyl, phenyl, phenyl($C_1$–$C_{10}$)alkyl, $C_1$–$C_{10}$ alkylphenyl, glycidoxy($C_1$–$C_{10}$)alkyl, epoxycyclohexyl ($C_1$–$C_{10}$)alkyl, morpholino, amino($C_1$–$C_{10}$) alkyl, amino ($C_2$–$C_{10}$) alkenyl, mercapto($C_1$–$C_{10}$)alkyl, mercapto ($C_2$–$C_{10}$) alkenyl, cyano($C_1$–$C_{10}$) alkyl, cyano($C_2$–$C_{10}$) alkenyl, or halogen and the halo or halogen is chloro or fluoro. X may be hydrogen, halogen, hydroxy, $C_1$–$C_5$ alkoxy, ($C_1$–$C_5$)alkoxy($C_1$–$C_5$)alkoxy, $C_1$–$C_4$ acyloxy, phenoxy, $C_1$–$C_3$ alkylphenoxy, or $C_1$–$C_3$ alkoxyphenoxy, said halo or halogen being bromo, chloro or fluoro; m is an integer from 0 to 3. The first coating composition may include up to about 5% by weight of a silane monomer.

Examples of silane monomers include, but are not limited to glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropylmethyldimethoxysilane, γ-glycidoxypropyldimethylethoxysilane, methyltrimethoxysilane, methyltriethoxysilane, methyltrimethoxyethoxysilane, methyltriacetoxysilane, methyltripropoxysilane, methyltributoxysilane, ethyltrimethoxysilane, ethyltriethoxysilane, γ-methacryloxypropyltrimethoxysilane, γ-aminopropyltrimethoxysilane, γ-aminopropyltriethoxysilane, γ-mercaptopropyltrimethoxysilane, chloromethyltrimethoxysilane, chloromethytriethoxysilane, dimethyldiethoxysilane, γ-chloropropylmethyldimethoxysilane, γ-chloropropyl methyldiethoxysilane, tetramethylorthosilicate, tetraethylorthosilicate, hydrolyzates of such silane monomers, and mixtures of such silane monomers and hydrolyzates thereof.

Silane monomers, along with colloidal silica, may form low index of refraction silicon-based coatings. In some instances, silane monomers and colloidal silica may be used to form a single layer low index of refraction coating layer on a lens. The use of silicon monomers and colloidal silica, however, tends to produce silicon-based coatings that have poor adhesion to the underlying substrate. The addition of a metal alkoxide to a composition that also contains a silane monomer or colloidal silica may improve the adhesion of the layer. In another embodiment, the adhesion of a silicon-based coating may be improved by the formation of a multi-layer stack. The stack may include a first coating layer which is formed from a metal alkoxide. A second layer may be formed upon the first layer, the second layer being formed from a silane monomer or colloidal silicon. The metal alkoxide based first layer acts as an adhesion layer that helps keep the stack bound to the underlying lens.

In addition, the silane monomers and colloidal silica may be mixed with metal alkoxides to alter the index of refraction of the coating composition. Typically, a mixture of a silane monomer with a metal alkoxide when cured onto a lens, will have a lower index of refraction than a coating formed from a metal alkoxide.

In some embodiments, one or more ethylenically substituted monomers may be added to the first composition. The ethylenically substituted group of monomers include, but are not limited to, $C_1$–$C_{20}$ alkyl acrylates, $C_1$–$C_{20}$ alkyl methacrylates, $C_2$–$C_{20}$ alkenyl acrylates, $C_2$–$C_{20}$ alkenyl methacrylates, $C_5$–$C_8$ cycloalkyl acrylates, $C_5$–$C_8$ cycloalkyl methacrylates, phenyl acrylates, phenyl methacrylates, phenyl($C_1$–$C_9$)alkyl acrylates, phenyl($C_1$–$C_9$)alkyl methacrylates, substituted phenyl ($C_1$–$C_9$)alkyl acrylates, substituted phenyl($C_1$–$C_9$)alkyl methacrylates, phenoxy($C_1$–$C_9$)alkyl acrylates, phenoxy($C_1$–$C_9$)alkyl methacrylates, substituted phenoxy($C_1$–$C_9$)alkyl acrylates, substituted phenoxy ($C_1$–$C_9$)alkyl methacrylates, $C_1$–$C_4$ alkoxy($C_2$–$C_4$)alkyl acrylates, $C_1$–$C_4$ alkoxy ($C_2$–$C_4$)alkyl methacrylates, $C_1$–$C_4$ alkoxy($C_1$–$C_4$)alkoxy($C_2$–$C_4$)alkyl acrylates, $C_1$–$C_4$ alkoxy ($C_1$–$C_4$)alkoxy($C_2$–$C_4$)alkyl methacrylates, $C_2$–$C_4$ oxiranyl acrylates, $C_2$–$C_4$ oxiranyl methacrylates, copolymerizable di-, tri- or tetra-acrylate monomers, copolymerizable di-, tri-, or tetra-methacrylate monomers. The first composition may include up to about 5% by weight of an ethylenically substituted monomer.

Examples of such monomers include methyl methacrylate, ethyl methacrylate, propyl methacrylate, isopropyl methacrylate, butyl methacrylate, isobutyl methacrylate, hexyl methacrylate, 2-ethylhexyl methacrylate, nonyl methacrylate, lauryl methacrylate, stearyl methacrylate, isodecyl methacrylate, ethyl acrylate, methyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, isodecyl acrylate, ethylene methacrylate, propylene methacrylate, isopropylene methacrylate, butane methacrylate, isobutylene methacrylate, hexene methacrylate, 2-ethylhexene methacrylate, nonene methacrylate, isodecene methacrylate, ethylene acrylate, propylene acrylate, isopropylene, hexene acrylate, 2-ethylhexene acrylate, nonene acrylate, isodecene acrylate, cyclopentyl methacrylate, 4-methyl cyclohexyl acrylate, benzyl methacrylate, o-bromobenzyl methacrylate, phenyl methacrylate, nonylphenyl methacrylate, benzyl acrylate, o-bromobenzyl phenyl acrylate, nonylphenyl acrylate, phenethyl methacrylate, phenoxy methacrylate, phenylpropyl methacrylate, nonylphenylethyl methacrylate, phenethyl acrylate, phenoxy acrylate, phenylpropyl acrylate, nonylphenylethyl acrylate, 2-ethoxyethoxymethyl acrylate, ethoxyethoxyethyl methacrylate, 2-ethoxyethoxymethyl acrylate, ethoxyethoxyethyl acrylate, glycidyl methacrylate, glycidyl acrylate, 2,3-epoxybutyl methacrylate, 2,3-epoxybutyl acrylate, 3,4-epoxybutyl acrylate, 3,4-epoxybutyl methacrylate, 2,3-epoxypropyl methacrylate, 2,3-epoxypropyl acrylate 2-methoxyethyl methacrylate, 2-ethoxyethyl methacrylate, 2-butoxyethyl methacrylate, 2-methoxyethyl acrylate, 2-ethoxyethyl acrylate, 2-butoxyethyl acrylate, tetrahydrofurfuryl acrylate, tetrahydrofuryl methacrylate, ethoxylated bisphenol-A-dimethacrylate, ethylene glycol diacrylate, 1,2-propane diol diacrylate, 1,3-propane diol diacrylate, 1,2-propane diol dimethacrylate, 1,3-propane diol dimethacrylate, 1,4-butane diol diacrylate, 1,3-butane diol dimethacrylate, 1,4-butane diol dimethacrylate, 1,5 pentane diol diacrylate, 2,5-dimethyl-1,6-hexane diol dimethacrylate, diethylene glycol diacrylate, diethylene glycol dimethacrylate, trimethylolpropane trimethacrylate, tetraethylene glycol diacrylate, tetraethylene glycol dimethacrylate, dipropylene glycol dimethacrylate, trimethylolpropane triacrylate, glycerol triacrylate, glycerol trimethacrylate, pentaerythritol triacrylate, pentaerythritol dimethacrylate, pentaerythritol tetracrylate, pentaerythritol tetramethacrylate.

The first composition may also include amines. Examples of amines suitable for incorporation into an antireflective coating composition include tertiary amines and acrylated amines. The presence of an amine tends to stabilize the antireflective coating composition. The antireflective coating composition may be prepared and stored prior to using. In some embodiments, the antireflective coating composition may slowly gel due to the interaction of the various components in the composition. The addition of amines tends to slow down the rate of gelation without significantly affecting the antireflective properties of subsequently formed coatings. The first composition may include up to about 5% by weight of amines.

The first composition may also include colloidal silica. Colloidal silica is a suspension of silica particles in a solvent. The silica particles may have a particle size of about 1 nanometer to about 100 nanometers in diameter. Amorphous silica particles may be dispersed in water, a polar solvent, or combinations of water and a polar solvent. Some polar solvents that may be used include, but are not limited to methanol, ethanol, isopropanol, butanol, ethylene glycol, and mixtures of these solvents. One example of colloidal silica is commercially available from Nissan Chemical Houston Corp., Houston, Tex., and sold under the trade name Snowtex. The first composition may include up to about 5% by weight of colloidal silica.

The first composition may also include a photoinitiator and/or a co-initiator. Examples of photoinitiators and co-initiators have been previously described. Up to about 1% by weight of the first coating composition may include a photoinitiator or a combination of a photoinitiator and a co-initiator.

The first composition may also include a fluorinated ethylenically substituted monomer. Fluorinated ethylenically substituted monomers have the general structure:

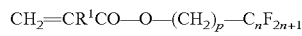

Where $R^1$ is H or —$CH_3$; p is 1 or 2; and n is an integer from 1 to 40. Examples of fluorinated ethylenically substituted monomer include, but are not limited to, trihydroperfluoroheptyl acrylate and trihydroperfluoroheptyl acrylate. The addition of a fluorinated ethylenically substituted monomer to a composition to be applied to a plastic lens may increase the hydrophobicity of the coating. Hydrophobicity refers to the ability of a substrate to repel water. The addition of a fluorinated ethylenically substituted monomer to the composition may increase the ability of the coated substrate to resist degradation due to exposure to water.

The first composition may be applied to one or both surfaces of a plastic lens. The antireflective coating composition may be applied using a coating unit such as the one described previously. The antireflective coating composition may be applied to the eyeglass lens as the lens is rotated within the coating unit. The plastic lens may be rotated at speeds up to about 2000 rpm as the first composition is added to the plastic lens. Less than 1 mL of the antireflective coating composition may be applied to the eyeglass lens. More than 1 ml may also be applied, however, this amount may be excessive and much of the antireflective coating composition may be flung from the surface of the lens.

The thickness of the applied antireflective coating composition may also depend on the speed of rotation of the eyeglass lens, the viscosity of the antireflective coating composition, the amount of composition added to the eyeglass lens, and the volatility of the solvent used to dissolve the components of the composition. As an antireflective coating composition is added to a rotating eyeglass lens, the antireflective coating is spread evenly across the surface of the eyeglass lens. The solvent used to dissolve the components of the antireflective coating composition may evaporate as the composition is applied to the eyeglass lens surface, leaving a thin film of the antireflective coating components. As additional antireflective coating material is added, the thickness of the antireflective coating layer will gradually be increased. The rate at which the thickness increases is related to the speed of rotation of the eyeglass lens, the viscosity of the antireflective coating composition, and the volatility of the solvent used to form the composition.

When the composition is applied to a surface of the lens by a human operator, the thickness of the first coating composition may vary due to the operator's inability to consistently add the composition to the lens at the same rate each time. To overcome this variability, the composition may be added to the plastic lens with an automated dispensing system. The automated dispensing system may include a syringe for holding the composition and a controller drive system for automatically moving the plunger of the syringe. Such systems are commercially available as syringe pumps. A syringe pump may be coupled to a syringe that includes the composition to be added to the lens. The syringe pump may be configured to dispense the composition at a preselected rate. In this manner the rate at which the composition is added to the surface may be accurately controlled. In another embodiment, the dispenser system may include a conveyor for drawing the syringe and syringe pump across the surface of the lens. As the composition is dispensed by the syringe, the conveyor system may draw the syringe across the surface of the lens. In this manner, the rate of application and the distribution path of the composition may be performed in a consistent manner.

Assuming a constant speed of rotation of the eyeglass and a constant dispensing rate, as the viscosity of the antireflective coating composition is increased, the rate at which the thickness of the applied antireflective coating composition increases may increase. Alternatively, the rate at which the thickness of the antireflective coating composition increases may be altered by adjusting the rotation speed of the eyeglass lens. Assuming a constant viscosity of the antireflective coating composition, as the rotational speed of the eyeglass lens is increased, less of the antireflective coating composition will remain on the eyeglass lens as the composition is applied. By slowing down the rotational speed of the eyeglass lens, the thickness of the antireflective coating layer may be increased.

Alternatively, the viscosity of the first composition may be changed by altering the amount of metal alkoxide and other components present in the first composition. For example, a first composition that includes a metal alkoxide at a concentration of about 5% by weight, will have a greater viscosity than a composition that has a metal alkoxide concentration of about 2.5%. The more viscous composition will leave a thicker film on the surface of the lens than the less viscous composition. When the composition is cured, a thicker first coating layer may be obtained. The viscosity may also be altered by changing the organic solvent that the metal alkoxide is dissolved or suspended in. Each solvent may have an inherent viscosity that may effect the overall viscosity of the first composition. By changing the solvent this inherent viscosity may be altered, thus altering the viscosity of the overall composition.

As an antireflective coating composition is added to a rotating eyeglass lens, the antireflective coating is spread evenly across the surface of the eyeglass lens. If a solvent used to dissolve the components of the antireflective coating composition has a relatively low boiling point (e.g., below about 80° C.), the solvent will evaporate and allow the more viscous components of the antireflective coating composition (e.g., the silane, organic monomers, metal alkoxide, etc.) to form a coating on the lens. As more composition is added to the eyeglass lens, the thickness of the antireflective coating may increase. By changing solvent used in the antireflective coating composition to a more volatile solvent, the rate at which the thickness of the antireflective coating grows may increase. Generally, a low boiling point solvent will give a thicker coating layer than a higher boiling point solvent.

In general, the ability to control the thickness of the applied first composition may be important for achieving antireflective properties. In some embodiments, a low viscosity and/or low concentration composition may be used to form the first coating layer. Such compositions may form relatively thin films on the surface of the plastic lens. In some embodiments, the thickness of the formed film may be too thin for the desired application. In an alternate procedure, the first coating layer may be formed by repeatedly applying the first composition to the plastic lens and curing the deposited composition. Each iteration of this process will create a thicker first coating layer. When the first coating layer reaches a preselected thickness the procedure may be stopped and the second coating layer may be formed.

After applying the first composition to the plastic lens, the first composition may be cured to form the first coating layer. Curing of the first composition may be accomplished by a variety of methods. In one embodiment, the first composition may be cured by spinning the lens until the composition forms a gel. Alternatively, the composition may be allowed to sit at room temperature for a time sufficient to allow the composition to gel. The gelled composition has a higher index of refraction than the underlying plastic lens, and may therefore serve as the first coating layer. Additionally, at least a portion of the gelled composition may be sufficiently adhered to the plastic lens such that a portion of the gelled composition may remain on the lens during the application of the second composition, thus providing antireflective properties to the lens subsequent to formation of the second coating layer.

Alternatively, the first composition may be cured by the application of heat to the composition. After the first composition is deposited on the lens and spin dried, the first composition may be in a gelled state. The gelled composition may be heated for a period of about 1–10 minutes at a temperature in the range from about 40° C. to about 120° C., preferably about 100° C. Heating of the gelled composition in this matter may cause the composition to be converted from a gelled state to a hardened state. The heat cured first coating layer may exhibit good adhesion to the underlying lens. In some cases, however, the flow characteristics of the second composition when applied to a heat cured first composition may exhibit a non-uniform distribution across the surface of the cured first composition. Furthermore, the first coating layer may have an index of refraction that is greater than the index of refraction of the plastic lens.

In another embodiment, the first composition may be cured by the application of ultraviolet light. As described above, the first composition is applied to the lens and dried to form a gelled composition. The gelled composition may be treated with ultraviolet light for a time sufficient to convert the gelled composition to a hardened state. In some embodiments, the gelled composition is treated with ultraviolet light for a time of about 60 seconds or less. In one embodiment, the ultraviolet light source may be a germicidal lamp, as described above in the spin coating unit (See FIGS. 2 and 3). It should be noted that germicidal lamps produce no significant heat energy. Thus, it is believed that the accelerated curing of the first composition is due to the presence of the ultraviolet light, rather than from any heat produced by the lamps. Advantageously, it has been found that the use of ultraviolet light to cure the first composition may provide a surface that allows a uniform distribution of a subsequently applied composition. In comparison, the use of heating to cure the first composition may provide a surface that causes a subsequently applied composition to be unevenly dispersed. Thus, the use of ultraviolet light may offer an advantage over heat curing with regard to forming multilayer antireflective coatings.

It is believed that the ultraviolet light accelerates the condensation reaction of the metal alkoxide. The ultraviolet light may interact with the metal alkoxide and excite the electrons of the metal alkoxide, which in turn may accelerate the polymerization of the metal alkoxide. It is believed that most metal alkoxides have a strong absorbance in the ultraviolet region, specifically at wavelengths below about 300 nm. For example, titanium isopropoxide has a maximum absorbance at 254 nm. In some embodiments, the application of ultraviolet light to the metal alkoxide may be directed toward the coated surface rather than through the substrate. Many visible light transmitting media e.g., borosilicate glasses and plastics, may not allow sufficient amounts of light to pass through to the coating composition at the appropriate wavelength.

After the first coating layer has been applied and cured, a second coating layer may be formed upon the first coating layer. The second coating layer may be formed by applying a second composition to the exposed surface of the first coating layer. In some embodiments, the second coating layer, after curing, is composed of a material that has an index of refraction that is substantially less than the first coating layer.

The second composition, in an embodiment, may be composed of an initiator and an ethylenically substituted monomer. The ethylenically substituted monomers that may be used have been described previously. The initiator may be a photoinitiator, such as was described earlier. Alternatively, the initiator may be a metal alkoxide. It is believed that both photoinitiators and metal alkoxides interact with ultraviolet light and this interaction causes the initiation of polymerization of the ethylenically substituted monomer. The second composition may be applied to the first coating layer in a manner similar to those described earlier. The second composition may include other monomers such as silane monomers, colloidal silica, coinitiators, and fluorinated ethylenically substituted monomer.

The combination of a second low index of refraction coating layer formed upon a first high index of refraction coating material may provide improved light transmission through the underlying substrate. The use of metal alkoxides in one or both layers tends to improve the adhesion of the coating material to the underlying substrate.

Antireflective coatings are thin films that are formed upon the surface of the eyeglass lens. Such films have an optical thickness that is herein defined as the index of refraction of the film times the mechanical thickness of the film. The most effective films typically have an optical thickness that is a fraction of a wavelength of incident light. Typically, the optical thickness is one-quarter to one-half the wavelength. Thus for visible light (having a wavelength approximately between 400 nm and 700 nm) an ideal antireflective coating layer should have a thickness between about 100 and 200 nm. Thicknesses that are less than 100 nm or greater than 200 nm may also be used, although such thickness may not provide an optimal transmittance. In the embodiments cited herein, the combined optical thickness of the coating material may be up to about 1000 nm, more particularly up to about 500 nm.

The ideal thickness of an antireflective coating should be about one-quarter the wavelength of the incident light. For light entering the film at normal incidence, the wave reflected from the second surface of the film will be exactly one-half wavelength out of phase with the light reflected from the first surface, resulting in destructive interference. If the amount of light reflected from each surface is the same, a complete cancellation will occur and no light will be reflected. This is the basis of the "quarter-wave" low-reflectance coatings which are used to increase transmission of optical components. Such coatings also tend to eliminate ghost images as well as the stray reflected light.

Because visible light includes a range of wavelengths from about 400 nm to about 700 nm, a quarter-wave coating will only be optimized for one wavelength of light. For the other wavelengths of light, the antireflective coating may be either too thick or too thin. Thus, more of the light having these wavelengths may be reflected. For example, an antireflective coating that is designed for interior lights (e.g., yellow light) will have a minimum reflectance for yellow light, while the reflectance for blue or red light will be significantly higher. This is believed to be the cause of the characteristic purple color of single layer low-reflectance coatings for many camera and video lenses. In one embodiment, the thickness of the antireflective coating layers of an eyeglass lens may be varied or the indices of refraction may be altered to produce lenses which have different visible light reflective characteristics. Both of these variations will alter the optical thickness of the coating layers and change the optimal effective wavelength of light that is transmitted. As the optical thickness of the coating layers is altered, the reflected color of the lens will also be altered. In an iterative manner, the optimal reflected color of the eyeglass lens may be controlled by the manufacturer.

While two layer antireflective coatings have been described, it should be understood that multi-layer systems that include more than two layers may also be used. In a two-layer system, a substrate is coated with a high index of refraction layer. The high index of refraction layer is then coated with a low index of refraction layer. In an embodiment, a third high index of refraction (e.g., at least higher than the underlying second coating layer) may be formed on the second coating layer. A fourth low index of refraction layer (e.g., at least lower than the index of refraction of the third coating layer) may also be formed. The four layer stack may exhibit antireflective properties. The four layer stack may have an optical thickness of less than about 1000 nm, and more particularly less than about 500 nm. Additional layers may be formed upon the stack in a similar manner with the layers alternating between high and low index of refraction materials.

In another embodiment, the second coating layer may be formed as a combination of two chemically distinct compositions. The second coating layer may be formed by forming a silicon layer upon the first coating layer. The silicon layer may be formed from colloidal silica or a silane monomer. The silicon layer is applied to the first coating layer and at least partially cured. The silicon layer may be cured by drying, heating, or the application of ultraviolet light.

To complete formation of the second coating layer, a second composition is deposited onto the silicon layer. The second composition may include an ethylenically substituted monomer and an initiator. The ethylenically substituted monomers that may be used have been described previously. The initiator may be a photoinitiator, such as was described earlier. Alternatively, the initiator may be a metal alkoxide. The second composition may be applied to the silicon layer in a manner similar to those described earlier. The second composition may include other monomers such as silane monomers, colloidal silica, coinitiators, and fluorinated ethylenically substituted monomers. The second composition may be cured by the application of ultraviolet light.

The silicon layer, when partially cured or fully cured, tends to exhibit a porous structure. It is believed that the addition of the second composition to a substantially porous silicon layer may allow better chemical interaction between the second composition and the silicon layer. In general, good antireflective properties are seen when a silicon layer is placed upon a first coating layer, when the first coating layer includes a metal alkoxide. The silicon layer, however, may exhibit poor adhesion to a metal alkoxide containing underlying layer. The adhesion of the silicon layer may be improved by the addition of a metal alkoxide to the composition used to form the silicon layer. Silicon containing compositions, such as compositions that include colloidal silica or silane monomers, tend to be unstable in the presence of a metal alkoxide. Generally, it was observed that the mixture of silicon containing compounds with metal alkoxides produces a cloudy composition, and in some cases gelation, prior to the application of the composition to the first coating layer. Such gelation tends to increase the haze observed in the coated lens. The reactivity of metal alkoxides with silicon containing compositions tends to reduce the shelf life of such compositions, making it difficult to store the composition for extended periods of time.

By separating the metal alkoxide from the silicon containing compositions and applying the compositions in a sequential manner, many of the above-described problems may be reduced. It is believed that the addition of a metal alkoxide containing composition to an at least partially cured silicon layer, causes the second composition to interact with the underlying silicon composition such that a composite layer is formed. This composite layer may exhibit properties that are similar to the properties found for single layers formed from compositions that include silicon compounds and metal alkoxides. Since the silicon containing composition and metal alkoxide containing compounds are applied at different times, the compositions may be stored separately, effectively overcoming the shelf life problems.

In one embodiment, a hardcoat composition may be applied to the plastic lens prior to the application of the antireflective coating stack. Curing of the hardcoat composition may create a protective layer on the outer surface of the plastic lens. Typically, hardcoat compositions are formed from acrylate polymers that, when cured, may be resistant to abrasive forces and also may provide additional adhesion for the antireflective coating material to the plastic lens.

In another embodiment, a hydrophobic coating may be placed onto the antireflective coating. Hydrophobic coatings may include fluorinated ethylenically substituted monomers. Curing of the hydrophobic coating may create a water protective layer on the outer surface of the antireflective coating. The hydrophobic layer may help prevent degradation of the lens due to the interaction of atmospheric water with the lens.

In the above described procedures, the antireflective coating may be formed onto a preformed lens. Such a method may be referred to as an out-of-mold process. An alternative to this out-of-mold process is an in-mold process for forming antireflective coatings. The "in-mold" process involves forming an antireflective coating over an eyeglass lens by placing a liquid lens forming composition in a coated mold and subsequently curing the lens forming composition. The in-mold method is advantageous to "out-of-mold" methods since the in-mold method exhibits less occurrences of coating defects manifested as irregularities on the anterior surface of the coating. Using the in-mold method produces an antireflective coating that replicates the topography and smoothness of the mold casting face.

The application of an antireflective coating to a plastic lens requires that the first and second coating layers (or more if a multi layer stack is used) be formed onto the mold. In particular, the second coating layer is placed onto the mold prior to forming the first coating layer. In this manner, the stack is built backwards. The top of the stack on the casting surface of the mold may be the first coating layer which is to contact the underlying lens in the in-mold process.

In an embodiment, a second coating layer may be formed by applying a second composition upon a casting surface of a mold and curing the second composition. The second composition, in an embodiment, includes a photoinitiator and an ethylenically substituted monomer. The ethylenically substituted monomers that may be used have been described previously. The initiator may be a photoinitiator, such as was described earlier. The second composition may include other additives such as coinitiators and fluorinated ethylenically substituted monomer. The second composition may, in some embodiments, be substantially free of metal alkoxides. It is believed that metal alkoxides disposed within a composition may interact with the glass and inhibit the removal of the lens from the molds. The second monomers and other additives of the second composition may be dissolved or suspended in an organic solvent. The organic solvent may be used to aid in the application of the monomer to the mold surface.

To apply the second composition to the mold member, the mold member may be spun so that the second composition becomes distributed over the casting face. The mold member is preferably rotated about a substantially vertical axis at a speed up to about 2000 revolutions per minute, preferably at about 850 revolutions per minute. Further, a dispensing device may be used to direct the composition onto the casting face while the mold member is spinning. The dispensing device may move from the center of the mold member to an edge of the mold member.

After applying the second composition to the mold member, ultraviolet light may be directed at the mold member to cure at least a portion of the second composition. The ultraviolet light may be directed toward either surface (i.e., the casting or non-casting faces) of the mold to cure the second composition.

After the second composition is at least partially cured, a first coating layer may be formed on the second composition by applying a first composition to the second composition. The first composition may include a metal alkoxide. The first composition may also include other additives such as photoinitiators, coinitiators, silane monomers, colloidal silica, ethylenically substituted monomers, and fluorinated ethylenically substituted monomers. The metal alkoxide and other additives may be dissolved in an organic solvent. All of these compounds have been described previously.

The first composition may be cured by a variety of methods. In one embodiment, the first composition may be cured by spinning the mold member until the composition forms a gel. Alternatively, the composition may be allowed to sit at room temperature for a time sufficient to allow the composition to gel. In another embodiment, the first composition may be cured by the application of heat to the composition. After the first composition is deposited on the mold member and spin dried, the first composition may be in a gelled state. The gelled composition may be heated for a period of about 1–10 minutes at a temperature in the range from about 40° C. to about 120° C. Heating of the gelled composition in this matter may cause the composition to be converted from a gelled state to a hardened state. In another embodiment, the first composition may be cured by the application of ultraviolet light. As described above, the first composition is applied to the mold member and dried to form a gelled composition. The gelled composition may be treated with ultraviolet light for a time sufficient to convert the gelled composition to a hardened state. In some embodiments, the gelled composition is treated with ultraviolet light for a time of about 60 seconds or less. In one embodiment, the ultraviolet light source may be a germicidal lamp.

After the formation of the first and second coating layers on the casting surface of the mold member, the mold member may be assembled with a second mold member by positioning a gasket between the members to seal them. The second mold member may also include an antireflective coating on the second molds casting surface. The antireflective coating on the second mold may have an identical composition as the antireflective coating on the first mold. Alternatively, the antireflective coatings may have different compositions. The combination of the two molds and gasket form a mold assembly having a cavity defined by the two mold members. The casting surfaces, and therefore the antireflective coatings, may be disposed on the surface of the formed mold cavity.

After the mold assembly has been constructed, a lens forming composition may be disposed within the mold assembly. An edge of the gasket may be displaced to insert the lens forming composition into the mold cavity. Alternatively, the gasket may include a fill port that will allow the introduction of the lens forming composition without having to displace the gasket. This lens forming composition includes a photoinitiator and a monomer that may be cured using ultraviolet light. Examples of lens forming compositions that may be used include, but are not limited to, OMB-99 and PhasesII monomers, as described above. When disposed within the mold cavity, the lens forming composition, in some embodiments, is in contact with the antireflective coating formed on the casting surfaces of the molds.

In some embodiments, an adhesion coating layer may be formed on the partially cured first composition. The coating adhesion layer may be formed from an adhesion composition that is applied to the first coating layer and cured. The adhesion composition may include an ethylenically substituted monomer and a photoinitiator. It is believed that curing of the first composition may reduce the adhesion of the first coating layer to a subsequently formed plastic lens. The adhesion coating layer may therefore improve the adhesion between the first coating composition and the subsequently formed lens. The adhesion layer composition, in some embodiments, includes monomers similar to the monomers included in the lens forming composition. This may improve the adhesion between the adhesion layer and a lens formed from the lens forming composition. The adhesion layer may have an index of refraction that is similar, or less than, the index of refraction of the formed lens. Thus, the adhesion layer may have little, if any, affect on the antireflective properties of the first and second coating layers.

While two layer antireflective coatings have been described for an in-mold process, it should be understood that multi-layer systems that include more than two layers may also be used. In a two layer system, a mold is coated with a low index of refraction layer. The low index of refraction layer is then coated with a high index of refraction layer. In an embodiment, a third low index of refraction layer (e.g., at least lower than the underlying first coating layer) may be formed on the first coating layer. A fourth high index of refraction layer (e.g., at least higher than the index of refraction of the third coating layer) may also be formed. The four layer stack may exhibit antireflective properties. The four layer stack may have an optical thickness of less than about 1000 nm, and more particularly less than about 500 nm. Additional layers may be formed upon the stack in a similar manner with the layers alternating between high and low index of refraction materials.

In another embodiment, the second coating layer may be formed as a combination of two chemically distinct compositions. The second coating layer may be formed by forming an organic containing layer upon the casting surface of the mold. The organic containing layer includes an ethylenically substituted monomer and an initiator. The ethylenically substituted monomers that may be used have been described previously. The initiator may be a photoinitiator, such as was described earlier. Alternatively, the initiator may be a metal alkoxide. The organic containing layer may be applied to the casting surface in a manner similar to those described earlier. The organic containing layer may include other monomers such as silane monomers, colloidal silica, coinitiators, and fluorinated ethylenically substituted monomers. The organic containing layer may be cured by the application of ultraviolet light.

The second coating layer may be completed by applying a silicon layer upon the organic containing layer. The silicon layer may be formed from colloidal silica or a silane monomer. The silicon layer is applied to the organic containing layer and at least partially cured. The silicon layer may be cured by drying, heating, or the application of ultraviolet light.

Additional coating materials may be placed onto the antireflective coating. In one embodiment, a hardcoat composition may be applied to the antireflective coating formed on the casting surface of a mold. Curing of the hardcoat composition may create a protective layer on the outer surface of a subsequently formed plastic eyeglass lens. Typically hardcoat compositions are formed from acrylate polymers that, when cured, are resistant to abrasive forces. The subsequently formed hardcoat layer may help to prevent abrasions to the plastic lens. Other coatings that may be formed include hydrophobic coatings and tinted coatings. Such coatings may be formed on the casting surface of the mold, prior to the formation of the antireflective coatings. These coatings, in some embodiments, may allow the formed lens to be removed more easily from the mold assembly. As discussed above, the antireflective coatings may adhere to the molds, making removal of the lens from the mold assembly difficult. The use of hydrophobic coatings may reduce the adhesion between the mold assemblies and the antireflective coating layer.

EXAMPLES

A plastic eyeglass lens was made according to the process described above from the OMB-99 monomer solution. The lens was then coated with two antireflective coating compositions. In all of the examples, the following abbreviations are used:

"AC" is acetone, commercially available from Aldrich;

"AA" is an acrylic amine commercially available as CN384 from Sartomer;

"Al" is aluminum tri-sec-butoxide (98%) commercially available from Avocado;

"AS" is 3-aminopropyltrimethoxysilane (97%) commercially available from Aldrich;

"BDK", "BDM", and "BDMK" are Photomer 51 and 2,2-dimethoxy-2-phenylacetophenone commercially available from Henkel;

"BYK300" is a solution of polyether modified dimethylpolysiloxane copolymer commercially available from BYK Chemie;

"CD1012" is diaryl iodonium hexafluoroantimonate commercially available from Sartomer;

"CD540" is ethoxylated bisphenol A dimethacrylate commercially available from Sartomer;

"CN124" is epoxy acrylate commercially available from Sartomer;

"Cynox 1790" is tris(4-t-butyl-3-hydroxy-2,6-dimethylbenzyl)-s-triazine-2,4,6-(1H,3H,5H)-trione commercially available from Sartomer;

"D1173" is 2-hydroxy-2-methyl-1-phenyl-propan-1-one (HMPP) commercially available from Ciba;

"DC193" is a surfactant commercially available from Dow Corning;

"ECHMCHC" is 3,4-epoxycyclohexylmethyl-3,4-epoxycyclohexane carboxylate;

"Eosin" is the dye Eosin Y commercially available from Aldrich;

"EtOH" is ethanol, commercially available from Fisher;

"FC40" and "FC430" are surfactants commercially available from 3M;

"FC-171" is a fluorochemical surfactant commercially available from 3M;

"FC-725" also known as FLUORAD, a fluorochemical surfactant commercially available from 3M;

"GPTMS" is 3-glycidoxypropyltrimethoxysilane commercially available from Aldrich;

"HC-8" is a hard coat forming composition commercially available from Fastcast Co. and includes a mixture of SR399, SR601, Irg184, and MP;

"HC8558" is commercially available from GE;

"HC-900" is commercially available from Coburn Optical Industries;

"HEMA" is hydroxyethyl methacrylate commercially available from Coburn Optical Industries;

"HR-200" is a hydrophobic coating commercially available from Group Couget;

"IPA" is isopropyl alcohol commercially available from Fisher;

"Irg 184" is Irgacure 184 or 1-Hydroxycyclohexyl phenyl ketone commercially available from Ciba;

"Irg 261" is Irgacure 261 or iron (.eta.5-2,4-cyclopentadien-1-yl)[1,2,3,4,5,6-.eta.)-(1-methylethyl)benzene]-hexafluorophosphate) commercially available from Ciba;

"Irg 819" is Irgacure 819 or Phosphine oxide, phenylbis (2,4,6-trimethyl benzoyl) commercially available from Ciba;

"MP" is 1-methoxy-2-propanol commercially available from Arcos;

"Nalco Si2326" is a colloidal silica commercially available from Nalco Chemical Company;

"NNDMEA" is N,N-dimethylethanolamine commercially available from Aldrich;

"PerenolS-5" is a modified polysiloxane commercially available from Henkel;

"PFOA" is 1H, 1H-perfluorooctyl acrylate commercially available from Lancaster;

"PFOFCS" is 1H,1H,2H.2H-perfluorooctyltrichlorosilane commercially available from Lancaster;

"PFOMA" is perfluorooctyl methacrylate commercially available from Lancaster;

"Q4DC" is an organic functional silicone fluid commercially available from Dow Corning;

"Si" is MA—ST—S (30% colloidal silica in 70% methanol) commercially available from Nissan Chemical;

"SR123" is an acrylate monomer commercially available from Sartomer;

"SR306" is tripropylene glycol diacrylate commercially available from Sartomer;

"SR313" is lauryl methacrylate commercially available from Sartomer;

"SR368" is tris(2-hydroxy ethyl) isocyanurate triacrylate commercially available from Sartomer;

"SR399" is dipentaerythritol tetraacrylate commercially available from Sartomer;

"SR423" is isobornyl methacrylate commercially available from Sartomer;

"SR444" is Pentaerythritol triacrylate commercially available from Sartomer;

"SR640" is tetrabromo bisphenol A diacrylate commercially available from Sartomer;

"SR9003" is propoxylated neopentyl glycol diacrylate commercially available from Sartomer;

"T770" is bis(2,2,6,6-tetramethyl-4-piperidinyl sebacate commercially available from Ciba;

"TEA" is triethylamine commercially available from Aldrich;

"TFEMA" is trifluoroethyl methacrylate commercially available from Cornelius Chemical;

"Ti" is titanium (IV) isoproxide commercially available from Aldrich;

"Ti—Bu" is titanium (IV) butoxide commercially available from Aldrich;

"TMSPMA" is 3-(trimethoxysilyl)propyl methacrylate commercially available from Aldrich;

"TPB" is thermoplast blue 684;

"TPR" is thermoplast red 454;

"TX-100" is a surfactant commercially available from Aldrich;

"ZelecUN" is a lubricant commercially available from Stepan; and

"Zr" is zirconium (IV) propoxide commercially available from Aldrich.

In Table 11, Layer 1 refers to the first antireflective coating layer, Layer 2 refers to the second antireflective coating layer. Solutions of each of the components were prepared and used to form the antireflective coatings. For all of the compositions listed in Table 11, the remainder of the composition is made up of 1-methoxy-2-propanol. For example, a listing of 5% Ti, should be understood to mean 5% by weight of Ti and 95% by weight of 1-methoxy-2-propanol.

The plastic eyeglass lens was coated using two different coating compositions. The "Layer 1" composition was added to a surface of the eyeglass lens and the eyeglass lens was rotated on a lens spin-coating apparatus. After the L1 composition was spread onto the eyeglass lens surface, the solvent was allowed to substantially evaporate and the remaining composition was subjected to ultraviolet light from the germicidal lamp from the previously described coating unit for about 60 seconds. In some instances, more or less UV light was applied. Alternate times are noted in parenthesis. The "Layer 2" composition was added to the eyeglass lens after the Layer 1 composition was cured. The eyeglass lens was spun on a lens spin-coating apparatus until the solvent was substantially evaporated. Layer 2 was then cured by the application of ultraviolet light from the germicidal lamp from the previously described coating unit. Curing time of the second layer is 60 seconds, unless otherwise noted. The % transmittance refers to the amount of light transmitted through the lens after the Layer 2 composition was cured. The transmittance was measured in a BYK Gardner Haze Guard Plus Meter, available from BYK Gardner, Silver Springs, Md. Transmission readings were taken of an uncoated lens to use as a control standard. The visible light transmittance of an uncoated lens measured with the convex face of the lens positioned against the haze port of the BYK Gardner Haze Guard Plus Meter is about 92%. Color refers to the color of the light reflected from the coated lens.

TABLE 11

| Ex. # | Layer 1 | Layer 2 | Visible Light Transmittance % | Color |
|---|---|---|---|---|
| 1 | 5% Ti | 5.1% Si<br>1.04% Ti<br>1.04% GPTMS<br>0.144% HC-900<br>(Heat 20 Min.) | 99.0% | RED |
| 2 | 5% Ti | 4.25% Si<br>0.87% GPTMS<br>0.17 HC-900<br>(Heat 20 Min.) | 99.0% | |
| 3 | 5% Ti | 4.5% Si<br>1.8% Ti<br>1.8% GPTMS<br>0.17% HC-900<br>(Heat 20 Min.) | 96.0% | PURPLE |
| 4 | 5% Ti | 4.25% Si<br>1.04% Ti<br>0.87% GPTMS<br>0.17% HC-900<br>(Heat 20 Min.) | 99.0% | |
| 5 | 5% Ti | 4.5% Si<br>1.8% Ti<br>1.8% GPTMS<br>0.17% HC-900 | 97.4% | BLUE |
| 6 | 3% Ti | 4.5% Si<br>1.8% Ti<br>1.8% GPTMS<br>0.17% HC-900 | 97.0% | PURPLE |
| 7 | 3% Ti | 3% Si<br>1.2% Ti<br>1.2% GPTMS<br>0.11% HC-900 | 93.0% | |
| 8 | 3% Ti | 5.4% Si<br>1.17% Ti<br>1.17% GPTMS<br>0.107% HC-900 | 97.7% | RED |
| 9 | 5% Ti | 5.4% Si<br>1.17% Ti<br>1.17% GPTMS<br>0.107% HC-900 | 99.0% | PURPLE |
| 10 | 5.2% Ti<br>1.33% Si<br>1.33% GPTMS | 5.4% Si<br>1.17% Ti<br>1.17% GPTMS<br>0.107% HC-900 | 96.0% | |
| 11 | 4.13% Ti<br>0.66% Si<br>0.66% GPTMS | 5.4% Si<br>1.17% Ti<br>1.17% GPTMS<br>0.107% HC-900<br>(Heat 5 Min.) | >97% | |

TABLE 11-continued

| Ex. # | Layer 1 | Layer 2 | Visible Light Transmittance % | Color |
|---|---|---|---|---|
| 12 | 5.4% Ti 0.32% Si 0.32% GPTMS 0.053% HC-900 (UV 90 s) | 5.4% Si 1.17% Ti 1.17% GPTMS 0.107% HC-900 | 98.0% | |
| 13 | 3% Ti | 0.45% Al 0.445% Ti 3.5% GPTMS 3.5% TMSPMA | 97.0% | |
| 14 | 3% Ti | 0.3% Al 0.36% Ti 2% GPTMS 2% TMSPMA 0.01% TBPO 0.08% FC-430 | 97.7% | |
| 15 | 3% Ti | 0.62% Al 0.17% Ti 1.2% GPTMS 1.2% TMSPMA 3.87% HC-8 | >97% | |
| 16 | 2.8% Ti 0.49% Al 2.79% HC-8 | 0.62% Al 0.17% Ti 1.2% GPTMS 1.2% TMSPMA 3.87% HC-8 | >96% | |
| 17 | 3% Ti | 0.54% Al 0.5% Ti 0.82% GPTMS 0.9% TMSPMA 1.27% HC-8 | 94.4% | |
| 18 | 3% Ti | 0.9% Al 0.46% Ti 0.75% GPTMS 0.83% TMSPMA 3.43% HC-8 | 97.3% | |
| 19 | 3% Ti | 0.8% Al 0.1% Ti 0.42% GPTMS 0.42% TMSPMA 6% HC-8 | 97.0% | |
| 20 | 3% Ti | 0.62% Al 0.17% Ti 1.2% GPTMS 1.2% TMSPMA 3.9% HC-8 | 97.0% | |
| 21 | 10% Ti 0.05% AA 22.7% MP 67.25% IPA | 0.19% Ti 0.19% GPTMS 0.19% TMSPMA 1.9% HC-8 3.9% Si | >97% | |
| 22 | 10% Ti 0.05% AA 22.7% MP 67.25% IPA | 0.46% Ti 0.9% Al 0.8% GPTMS .75% TMSPMA 3.4% HC-8 | 96.2% | |
| 23 | 2% Ti 100 ppm AA 25.2% MP 72.8% IPA (UV 60 s) | 0.3% Al 18.5% HC-8 (UV 60 s) | 92.5% | |
| 24 | 2% Ti 100 ppm AA 25.2% MP 72.8% IPA (UV 60 s) | 0.11% Al 3.35% SR368 (UV 200 s) | 92.8% | |
| 25 | 1.54% Ti 77 ppm AA 42.3% MP 56.2% IPA (UV 86 s) | 0.24% Ti 0.048% Al 1.94% SR368 1.47% TMSPMA 96.3% MP (UV 180 s) | 96.3% | |
| 26 | 1.54% Ti 77 ppm AA 42.3% MP 56.2% IPA (UV 40 s) | 0.186% Ti 0.036% Al 1.48% SR368 1.13% TMSPMA 0.02% DC193 97.17% MP (UV 180 s) | 97.2% | |
| 27 | 1.54% Ti 77 ppm AA 42.3% MP 56.2% IPA (UV 40 s) | 0.36% Ti 0.033% Al 1.39% SR368 1.06% TMSPMA 0.0187% DC193 97.16% MP (UV 10 s) | 96.8% | |
| 28 | 2.8% Ti 2.8% Irg184 (UV 20 s) | 2% SR399 | 96.8% | |
| 29 | 2.99% Ti 0.294% Irg184 (UV 20 s) | 1.86% SR399 0.31% Ti (UV 30 s) | 95.7% | |
| 30 | 2.99% Ti 0.28% Irg184 (UV 40 s) | 2% SR399 0.349% Ti (UV 30 s) | 95.7% | GOLD |
| 31 | 2.99% Ti 0.28% Irg184 | 0.34 Ti 0.5% SR306 2% SR399 (UV 120 s) | 95.7% | DEEP BLUE |
| 32 | 2.99% Ti 0.28% Irg184 (UV 40 s) | 2% SR399 0.5% SR306 0.349% Ti (UV 100 s) | 95.8% | |
| 33 | 2% Ti 0.2 Irg184 (UV 30 s) | 2% SR399 0.4% Ti 0.04% Irg184 (UV 30 s) | 95.2% | GOLD |
| 34 | 2% Ti 0.2% Irg184 (X3) (UV 20s each) | 2% SR399 0.4% Ti 0.04% Irg184 (UV 60 s) | 97.1% | |
| 35 | 2% Ti 0.2 Irg184 (UV 30 s) | 2% SR399 0.4% Ti 0.04% Irg184 0.1% BYK300 (UV 30 s) | 95.6% | |
| 36 | 3.25% Ti 0.1% Irg184 (UV 30 s) | 2% SR399 0.4% Ti 0.04% Irg184 0.1% BYK300 (UV 30 s) | 97.2% | GOLD |
| 37 | 3.25% Ti 0.1% Irg184 (350 rpm) | 2% SR399 0.4% Ti 0.04% Irg184 0.1% BYK300 (UV 30 s) | 97.9% | |
| 38 | 3.25% Ti 0.1% Irg184 (UV 60 s) | 2% SR399 0.4% Ti 0.04% Irg184 0.1% BYK300 (UV 60 s) | 97.5% | GOLD |
| 39 | 2% Ti 0.2% Irg184 (UV 60 s) | 2% SR399 0.4% Ti 0.04% Irg184 0.12% Zelecun (UV 60 s) | 96.0% | |
| 40 | 2% Ti 0.2% Irg184 (UV 60 s) | 2% SR399 0.4% Ti 0.04% Irg184 0.1% Q4DC (UV 60 s) | 96.0% | |
| 41 | 3.25% Ti 0.1% Irg184 (UV 70 s) | 2% SR399 0.4% Ti 0.04% Irg184 0.1% Q4DC (UV 70 s) | 97.4% | |
| 42 | 3.25% Ti 0.1% Irg819 (UV 60 s) | 2% SR399 0.4% Ti 0.04% Irg184 0.1% Q4DC (UV 70 s) | 97.4% | |

TABLE 11-continued

| Ex. # | Layer 1 | Layer 2 | Visible Light Transmittance % | Color |
|---|---|---|---|---|
| 43 | 3.03% Ti 0.4% Irg819 (UV 60 s) | 2% SR399 0.4% Ti 0.04% Irg184 0.1% Q4DC (UV 70 s) | 96.9% | |
| 44 | 2.5% Ti 0.16% Irg184 (UV 60 s) | 2% SR399 0.4% Ti 0.04% Irg184 0.13% FC430 (UV 60 s) | 96.5% | |
| 45 | 3.5% Ti 0.08% Irg184 (UV 60 s) | 2% SR399 0.4% Ti 0.04% Irg184 (UV 60 s) | 97.5% | |
| 46 | 3.5% Ti 0.08% Irg184 (UV 60 s) | 2% SR399 0.4% Ti 0.04% Irg184 0.1% FC430 0.1% BYK300 (UV 60 s) | 98.1% | |
| 47 | 3.5% Ti 0.08% Irg184 (UV 20 s) | 2% SR399 0.4% Ti 0.04% Irg184 0.13% FC430 0.1% BYK300 (UV 60 s) | 98.3% | |
| 48 | 2.5% Ti 0.2% Irg184 44.8% AC 52.5% MP | 0.2% Ti 0.2% SR239 0.8% SR399 | 95.2% | |
| 49 | 2.46% Ti 0.197 Irg184 0.157% SR313 44.3% AC (UV 60 s) | 0.5% Ti 0.1% Irg184 0.55% SR313 1.75% SR399 | 97.5% | |
| 50 | 3.47% Ti 0.294% Irg184 (UV 30 s) | 0.5% Ti 0.1% Irg184 0.55% SR313 1.75% SR399 | 96.9% | |
| 51 | 2.5% Ti 0.2% Irg184 45% AC 52.3% MP (UV 60 s) | 0.5% Ti 0.1% Irg184 0.55% SR313 1.75% SR399 | 97.5% | |
| 52 | 2.47% Ti 0.197% Irg184 0.12% SR313 44.47% AC (UV 60 s) | 0.53% Ti 0.1% Irg184 0.85% SR313 1.38% SR399 (UV 60 s) | 97.0% | |
| 53 | 2.47% Ti 0.197% Irg184 0.12% SR313 44.47% AC (UV 60 s) | 0.57% Ti 0.087% Irg184 1.74% CN124 (UV 60 s) | 95.0% | |
| 54 | 2.47% Ti 0.197% Irg184 0.12% SR313 44.47% AC | 0.5% Ti 0.19% Irg184 0.6% CN124 0.4% SR313 1.07% SR399 (UV 60 s) | 96.8% | |
| 55 | 2.47% Ti 0.197% Irg184 0.12% SR313 44.47% AC | 0.167% Ti 0.083% Irg184 0.167% Al 1.555% SR399 | 96.7% | |
| 56 | 2.47% Ti 0.197% Irg184 0.12% SR313 44.47% AC | 0.35% Ti 0.076% Irg184 0.15% Al 1.43% SR399 0.414% SR313 | 97.1% | |
| 57 | 5% Ti | 2% CD540 0.5% Ti 3.4 ppm TPB 0.2 ppm TPR 12 ppm Cynox-1790 | 97.6% | |
| 58 | 5% Ti | 0.21% Irg184 1.93% CD540 0.48% Ti 3.3 ppm TPB 0.19 ppm TPR 11.6 ppm Cynox-1790 | 97.4% | |
| 59 | 5% Ti | 0.084% Irg184 0.77% CD540 0.192% Ti 1.3 ppm TPB 0.075 ppm TPR 4.6 ppm-Cynox-1790 | 98.5% | |
| 60 | 5% Ti (UV 60 s) | 2% ECHMCHC 0.5% Ti | 97.6% | |
| 61 | 5% Ti (UV 40 s) | 0.12% CD1012 1.88% ECHMCHC 0.47% Ti (UV 90 s) | 98.1% | |
| 62 | 5% Ti (UV 30 s) | 0.22% CD1012 2% ECHMCHC 0.43% Ti (UV 90 s) | 95.0% | |
| 63 | 5% Ti (UV 60 s) | 0.22% CD1012 2% ECHMCHC 0.43% Ti (UV 90 s) | 94.0% | |
| 64 | 5% Ti | 0.356 Ti 0.073 CD1012 0.67% ECHMCHC 1.33% SR399 | 98.4% | |
| 65 | 5% Ti (UV 50 s) | 0.14% Irg184 0.348% Ti 0.07% CD1012 0.65% ECHMCHC 1.3% SR399 (Heat) | 98.3% | |
| 66 | 5% Ti (UV 45 s) | 0.133% Irg184 0.33% Ti 0.066% CD1012 0.62% ECHMCHC 1.24% SR399 0.1% PerenolS-5 (Heat) | 96.4% | |
| 67 | 3% Ti (UV 60 s) | 2.6% SR399 0.3% Ti (UV 60 s) | 96.7% | |
| 68 | 5% Ti (UV 60 s) | 2.6% SR399 0.3% Ti (UV 60 s) | 94.4% | |
| 69 | 3% Ti (UV 60 s) | 2.6% SR399 0.3% Ti (UV 60 s) | 96.2% | |
| 70 | 3% Ti (UV 60 s) | 2.0% SR399 0.3% Ti (UV 60 s) | 97.2% | |
| 71 | 2.5% Ti 2.5% HEMA | 2% SR399 0.06% Irg184 | 96.2% | |
| 72 | 1.5% Ti 1.5% HEMA | 2% SR399 0.06% Irg184 | 95.3% | |
| 73 | 1.5% Ti 1.5% HEMA 9.3 ppm AA 13.3% IPA | 2% SR399 0.06% Irg184 | 97.0% | |
| 74 | 3% Ti (UV 60 s) | 0.0525% PFOFCS 0.144% CD1012 1.955% ECHMCHC (UV 60 s) | 95.6% | |

TABLE 11-continued

| Ex. # | Layer 1 | Layer 2 | Visible Light Transmittance % | Color |
|---|---|---|---|---|
| 75 | 3% Ti (UV 60 s) | 0.0256% PFOFCS 0.145% CD1012 1.978% ECHMCHC (UV 60 s) | 97.0% | |
| 76 | 3% Ti (UV 60 s) | 0.0232% PFOFCS 0.476% Ti 0.131% CD1012 1.79% ECHMCHC (UV 60 s) | 96.8% | |
| 77 | 3% Ti (UV 60 s) | 0.051% PFOFCS 0.139% CD1012 1.89% ECHMCHC 0.49% HEMA (UV 60 s) | 97.3% | |
| 78 | 3% Ti (UV 60 s) | 0.0477% PFOFCS 0.13% CD1012 1.767% ECHMCHC 0.78% HEMA 0.32% Ti (UV 60 s) | 96.9% | |
| 79 | 3% Ti (UV 60 s) | 0.0457% PFOFCS 0.124% CD1012 0.26% Irg184 1.685% ECHMCHC 0.746% HEMA 0.306% Ti (UV 60 s) | 97.5% | |
| 80 | 3% Ti (UV 60 s) | 0.11% Irg184 0.44% Ti 2% SR399 (UV 60 s) | 97.1% | |
| 81 | 5% Si (UV 60 s) | 0.05% Irg184 5% Ti 0.19% SR399 (UV 60 s) | 93.8% | |
| 82 | 5% Si | 0.08% Irg184 0.32% Ti 1.44% SR399 0.005% PFOTCS (UV 60 s) | 92.6% | |
| 83 | 3.1% Ti—Bu 1.1% HEMA 13.3% IPA | 2% SR399 0.08% Irg184 | 96.3% | |
| 84 | 3.1% Ti—Bu 1.1% HEMA 13.3% IPA | 2% SR399 0.08% Irg184 | 96.3% | |
| 85 | 4% Ti | 2% SR399 0.08% Irg184 0.32% Ti—Bu | 97.7% | |

In Table 12, Layer 1 refers to the first antireflective coating layer, Layer 2 refers to the second antireflective coating layer. HR-200 refers to a hydrophobic coating layer formed upon Layer 2. Solutions of each of the components were prepared and used to form the antireflective coatings. For all of the compositions listed in Table 12, the remainder of the composition is made up of 1-methoxy-2-propanol. For example, a listing of 5% Ti, should be understood to mean 5% by weight of Ti and 95% by weight of 1-methoxy-2-propanol.

The application of the compositions to the lenses, and the measurement of the transmittance was performed in substantially the same manner as recited above for Table 11. Curing times are 60 seconds, unless otherwise noted.

TABLE 12

| Ex. # | Layer 1 | Layer 2 | Layer 3 | Visible Light Transmittance % | Color |
|---|---|---|---|---|---|
| 86 | 3% Ti | 4.65% Si 0.7% Ti 0.05% HC-900 | HR-200 | >98% | |
| 87 | 1.5% Ti 454 ppm AA 300 ppm AS 92.8% MP 5.6% IPA (UV 40 s) | 0.46% Ti 0.75% GPTMS 0.83% TMSPMA 3.4% HC-8 0.9% Al | HR-200 | 97.3% | |
| 88 | 0.75% Ti 38 ppm AA 14.2% MP 85% IPA | 0.46% Ti 0.75% GPTMS 0.83% TMSPMA 3.4% HC-8 0.9% Al | HR-200 | 96.0% | |
| 89 | 2% Ti 100 ppm AA 25.2% MP 72.8% IPA (UV 60 s) | 0.24% Al 9.8% HC-8 (UV 60 s) | HR-200 | 94.7% | |
| 90 | 2% Ti 100 ppm AA 25.2% MP 72.8% IPA (UV 60 s) | 0.09% Al 2.8% SR368 0.32% Ti 16 ppm AA 11.7% IPA (UV 90 s) | HR-200 | 93.5% | |
| 91 | 2% Ti 100 ppm AA 25.2% MP 72.8% IPA | 0.41% Ti 0.045% Al 1.4% SR368 0.88% SR123 0.78% TFEMA 8 ppm AA 5.8% IPA (UV 90 s) | HR-200 | 94.6% | |
| 92 | 1% Ti 50 ppm AA 12.6% MP 86.4% IPA (UV 30 s) | 0.13% Ti 0.031% Al 1.52% SR368 0.467% SR123 0.417% TFEMA (UV 60s) | HR-200 | 94.8% | |
| 93 | 1% Ti 50 ppm AA 12.6% MP 86.4% IPA (UV 40 s) | 0.21% Ti 0.35% Al 2.4% SR368 0.74% SR123 0.66% TFEMA (UV 60 s) | HR-200 | 96.7% | |
| 94 | 1.54% Ti 77 ppm AA 42.3% MP 56.2% IPA (UV 30 s) | 0.19% Ti 0.037% Al 1.5% SR368 1.14% TMSPMA 97.16% MP (UV 180 s) | HR-200 | 96.9% | |

In Table 13, multiple coating layers are formed on the plastic lens. For all of the compositions listed in Table 13, the remainder of the composition is made up of 1-methoxy-2-propanol. For example, a listing of 5% Ti, should be understood to mean 5% by weight of Ti and 95% by weight of 1-methoxy-2-propanol.

The application of the compositions to the lenses, and the measurement of the transmittance was performed in substantially the same manner as recited above for Table 11. Curing times are 60 seconds, unless otherwise noted.

TABLE 13

| Ex. # | Layer 1 | Layer 2 | Layer 3 | Layer 4 | Layer 5 | Layer 6 | Layer 7 | Visible Light Transmittance % | Color |
|---|---|---|---|---|---|---|---|---|---|
| 95 | 2.5% Ti<br>2.5% Si | 10% Ti | 0.7% Ti<br>4.6% Si<br>0.05% HC900 | HR200 | | | | 96.8% | BLUE |
| 96 | 2% Ti<br>57 ppm NNDMEA<br>(UV 30 s) | 0.368% Al<br>(UV 40 s) | 26.8% HC-8<br>73.2% IPA | HR200 | | | | 96.0% | |
| 97 | 3% Ti<br>(UV 70 s) | 0.055% Irg184<br>0.22% Ti<br>1% SR399<br>0.0125% PFOMA<br>(UV 20 s) | 3% Si<br>(UV 20 s) | 0.055% Irg184<br>0.22% Ti<br>1% SR399<br>0.0125% PFOMA<br>(UV 70 s) | | | | 97.2% | |
| 98 | 3% Ti (UV 70 s) | 0.055% Irg184<br>0.22% Ti<br>1% SR399<br>0.0125% PFOMA<br>(UV 20 s) | 3.7% Natco Si<br>(UV 20 s) | 0.055% Irg184<br>0.22% Ti<br>1% SR399<br>0.0125% PFOMA | | | | 97.9% | |
| 99 | 3% Ti (UV 60 s) | 0.54% SR399<br>0.12% Ti<br>0.03% Irg184<br>0.07% PFOMA<br>45.4% AC<br>(UV 20 s) | 0.54% SR399<br>0.12% Ti<br>0.03% Irg184<br>0.07% PFOMA<br>45.4% AC<br>(UV 20 s) | 0.54% SR399<br>0.12% Ti<br>0.03% Irg184<br>0.07% PFOMA<br>45.4% AC<br>(UV 20 s) | | | | 97.5% | |
| 100 | 3% Ti | 0.527% SR399<br>0.235% Ti<br>0.029% Irg184<br>0.066% PFOMA<br>44.3% AC | 0.527% SR399<br>0.235% Ti<br>0.029% Irg184<br>0.066% PFOMA<br>44.3% AC<br>(UV 60 s) | 0.54% SR399<br>0.12% Ti<br>0.03% Irg184<br>0.07% PFOMA<br>45.4% AC<br>(UV 60 s) | | | | 96.1% | |
| 101 | 1.5% Ti | 0.525% SR399<br>0.235% Ti<br>0.029% Irg184<br>0.066% PFOMA | 3% Si | 0.527% SR399<br>0.23% Ti<br>0.024% Irg184<br>0.066% PFOMA | | | | 97.0% | |
| 102 | 3.5% Ti—Bu | 0.033% BDKK<br>0.095% Ti—Bu<br>0.375% SR399<br>2.5% Si | 0.086% BDKK<br>0.173% Ti—Bu<br>1% SR399 | 0.026% BDKK<br>0.3% SR399<br>0.0037% PFOTCS<br>0.0037% FC430<br>0.0037% BYK300 | | | | 97.5% | |
| 103 | 5% Ti—Bu<br>(UV 60 s) | 0.086% BDKK<br>0.17% Ti—Bu<br>1% SR399<br>(UV 40 s) | 0.086% BDKK<br>0.17% Ti—Bu<br>1% SR399<br>(UV 50 s) | 0.026% BDKK<br>0.3% SR399<br>0.0037% PFOTCS<br>0.0037% FC430<br>0.0037% BYK300<br>(UV 60 s) | | | | 98.1% | |

TABLE 13-continued

| Ex. # | Layer 1 | Layer 2 | Layer 3 | Layer 4 | Layer 5 | Layer 6 | Layer 7 | Visible Light Transmittance % | Color |
|---|---|---|---|---|---|---|---|---|---|
| 104 | 5% Ti—Bu (UV 60 s) | 0.033% BDKK 0.095% Ti—Bu 0.375% SR399 2.5% Si (UV 40 s) | 0.086% BDKK 0.17% Ti—Bu 1% SR399 (UV 50 s) | 0.026% BDKK 0.3% SR399 0.0037% PFOTCS 0.0037% FC430 0.0037% BYK300 (UV 60 s) | | | | 97.9% | |
| 105 | 5% Ti—Bu (UV 60 s) | 0.033% BDKK 0.095% Ti—Bu 0.375% SR399 2.5% Si (UV 40 s) | 0.033% BDKK 0.095% Ti—Bu 0.375% SR399 2.5% Si (UV 50 s) | 0.026% BDKK 0.3% SR399 0.0037% PFOTCS 0.0037% FC430 0.0037% BYK300 (UV 60 s) | | | | 98.2% | |
| 106 | 5% Ti—Bu (UV 60 s) | 0.086% BDKK 0.17% Ti—Bu 1% SR399 (UV 50 s) | 0.033% BDKK 0.095% Ti—Bu 0.375% SR399 2.5% Si (UV 60 s) | 0.026% BDKK 0.3% SR399 0.0037% PFOTCS 0.0037% FC430 0.0037% BYK300 (UV 60 s) | | | | 97.9% | |
| 107 | 2% Ti (UV 50 s) | 5% Si 0.4% SR399 0.067% Ti | 5% Ti | 5% Si 0.4% Ti 0.06% Irg184 0.0346% Ti 0.2% SR399 0.0346% Ti 0.0085% Irg184 | 1% SR399 0.17% Ti 0.0416% Irg184 0.2% SR399 | | | 97.5% | |
| 108 | 2% Ti (UV 50 s) | 5% Si 0.4% SR399 0.067% Ti | 5% Ti | 2% Si 0.0346% SR399 0.0346% Ti | | | | 97.7% | |
| 109 | 2% Ti (UV 50 s) | 1% SR399 0.17% Ti 0.0416% Irg184 (UV 50 s) | 2% Ti (UV 30 s) | 2% Ti (UV 40 s) | 0.1% SR399 | | | 96.8% | |
| 110 | 1.5% Ti (UV 60 s) | 2% SR399 0.5% Si 0.1% Irg184 0.3% Ti (UV 60 s) | 2.75% Ti | 1% SR399 1% Si 0.05% Irg184 0.3% Ti | 1.4% SR399 0.062% Irg184 0.3% Ti (UV 60 s) | | | 96.4% | |
| 111 | 1.5% Ti (UV 60 s) | 1% SR399 1% Si 0.05% Irg184 0.3% Ti | 2.75% Ti | 1% SR399 1% Si 0.05% Irg184 0.3% Ti | 1% SR399 0.05% Irg184 0.21% Ti (UV 60 s) | | | 95.1% | |
| 112 | 1.5% Ti (UV 60 s) | 2% SR399 0.5% Si 0.1% Irg184 0.3% Ti (UV 60 s) | 2.75% Ti | 1% SR399 1% Si 0.05% Irg184 0.3% Ti | 1% SR399 0.05% Irg184 0.21% Ti | 0.4% SR399 0.017% Irg184 0.085% Ti | | 96.1% | |

TABLE 13-continued

| Ex. # | Layer 1 | Layer 2 | Layer 3 | Layer 4 | Layer 5 | Layer 6 | Layer 7 | Visible Light Transmittance % | Color |
|---|---|---|---|---|---|---|---|---|---|
| 113 | 1.5% Ti (UV 60 s) | 0.33% SR399 3% Si 0.017% Irg184 0.3% Ti | 2.75% Ti | 1% SR399 1% Si 0.05% Irg184 0.3% Ti | 1% SR399 0.05% Irg184 0.21% Ti | 0.4% SR399 0.017% Irg184 0.085% Ti | | 94.7% | |
| 114 | 1.5% Ti | 0.33% SR399 3% Si 0.017% Irg184 0.3% Ti | 2.75% Ti | 1% SR399 1% Si 0.05% Irg184 0.3% Ti | 0.8% SR399 0.035% Irg184 0.17% Ti | | | 97.5% | |
| 115 | 1.5% Ti | 0.33% SR399 3% Si 0.017% Irg184 0.3% Ti | 2.75% Ti | 0.33% SR399 3% Si 0.017% Irg184 0.3% Ti | 0.8% SR399 0.035% Irg184 0.17% Ti | | | 97.5% | |
| 116 | 2.75% Ti (UV 50 s) | 0.596% SR399 0.03% Irg184 0.3% Ti 2.2% Si (UV 50 s) | 2.75% Ti (UV 50 s) | 2.75% Ti | 0.596% SR399 0.03% Irg184 0.3% Ti 2.2% Si | 1.3% SR399 0.065% Irg184 0.245% Ti 0.58% Si | | 95.6% | |
| 117 | 2.75% Ti (UV 50 s) | 1.3% SR399 0.065% Irg184 0.245% Ti 0.58% Si (UV 50 s) | 2.75% Ti (UV 50 s) | 2.75% Ti | 0.596% SR399 0.03% Irg184 0.3% Ti 2.2% Si | 1.3% SR399 0.065% Irg184 0.245% Ti 0.58% Si | | 95.4% | |
| 118 | 1.5% Ti | 0.596% SR399 0.03% Irg184 0.3% Ti 2.2% Si | 2.75% Ti | 1.5% Ti | 1.3% SR399 0.065% Irg184 0.245% Ti 0.58% Si | 0.596% SR399 0.03% Irg184 0.3% Ti 2.2% Si | | 96.7% | |
| 119 | 1.5% Ti | 0.596% SR399 0.03% Irg184 0.3% Ti 2.2% Si | 2.75% Ti | 1.5% Ti | 1.4% SR399 0.062% Irg184 0.3% Ti | 0.596% SR399 0.03% Irg184 0.3% Ti 2.2% Si | | 97.2% | |
| 120 | 1.5% Ti (UV 50 s) | 0.8% SR399 0.035% Irg184 0.17% Ti | 4% Ti (UV 50 s) | 0.596% SR399 0.03% Irg184 0.3% Ti 2.2% Si | 1.4% SR399 0.062% Irg184 0.3% Ti (UV 50 s) | | | 97.6% | |
| 121 | 1.5% Ti (UV 50 s) | 1% SR399 0.05% Irg184 0.21% Ti (UV 50 s) | 4% Ti (UV 50 s) | 0.596% SR399 0.03% Irg184 0.3% Ti 2.2% Si | 1.4% SR399 0.062% Irg184 0.3% Ti (UV 50 s) | | | 97.2% | |
| 122 | 1.5% Ti | 1.4% SR399 0.062% Irg184 0.3% Ti | 4% Ti | 0.596% SR399 0.03% Irg184 0.3% Ti 2.2% Si | 1.4% SR399 0.062% Irg184 0.3% Ti (UV 70 s) | 0.4% SR399 0.017% Irg184 0.085% Ti | | 96.9% | |
| 123 | 1.5% Ti | 0.4% SR399 0.017% Irg184 0.085% Ti | 4% Ti | 0.596% SR399 0.03% Irg184 0.3% Ti 2.2% Si | 1.4% SR399 0.062% Irg184 0.3% Ti (UV 70 s) | | | 98.2% | |
| 124 | 2% Ti (UV 60 s) | 1.4% SR399 0.062% Irg184 0.3% Ti | 4% Ti | 0.596% SR399 0.03% Irg184 0.3% Ti | 0.596% SR399 0.03% Irg184 0.3% Ti | 1.4% SR399 0.062% Irg184 0.3% Ti | | 96.4% | |

TABLE 13-continued

| Ex. # | Layer 1 | Layer 2 | Layer 3 | Layer 4 | Layer 5 | Layer 6 | Layer 7 | Visible Light Transmittance % | Color |
|---|---|---|---|---|---|---|---|---|---|
| 125 | 2% Ti (UV 60 s) | (UV 60 s) 1% SR399 0.05% Irg184 0.21% Ti (UV 80 s) | 4% Ti | 2.2% Si 0.596% SR399 0.03% Irg184 0.3% Ti 2.2% Si | 2.2% SI 0.596% SR399 0.03% Irg184 0.3% Ti 2.2% Si | 1.4% SR399 0.062% Irg184 0.3% Ti | | 96.5% | |
| 126 | 2% Ti | 0.596% SR399 0.03% Irg184 0.3% Ti 2.2% Si | 4% Ti | 0.596% SR399 0.03% Irg184 0.3% Ti 2.2% Si | 0.596% SR399 0.03% Irg184 0.3% Ti 2.2% Si | 1.4% SR399 0.062% Irg184 0.3% Ti (UV 60 s) | | 95.3% | |
| 127 | 2% Ti | 0.596% SR399 0.03% Irg184 0.3% Ti 2.2% Si | 4% Ti | 0.596% SR399 0.03% Irg184 0.3% Ti 2.2% Si | 0.596% SR399 0.03% Irg184 0.3% Ti 2.2% Si (UV 60 s) | 0.4% SR399 0.017% Irg184 0.085% Ti (UV 60 s) | | 96.1% | |
| 128 | 2.75% Ti | 0.6% SR399 0.03% Irg184 0.3% Ti 4.4% Si | 4% Ti | 0.6% SR399 0.03% Irg184 0.3% Ti 4.4% Si | 1.3% SR399 0.065% Irg184 0.245% Ti 0.58% Si | 1% SR399 0.05% Irg184 0.21% Ti | 0.1% Ti 0.1% PFOTCS EtOH (UV 60 s) | 97.0% | RED |
| 129 | 2.75% Ti | 1.4% SR399 0.062% Irg184 0.31% Ti | 5% Ti | 0.4% SR399 0.017% Irg184 0.085% Ti | 0.6% SR399 0.03% Irg184 0.3% Ti 4.4% Si | 1.4% SR399 0.062% Irg184 0.31% Ti | 0.1% Ti 0.1% PFOTCS EtOH | 96.9% | BLUE |
| 130 | 1.75% Ti (UV 60 s) | 0.9% SR399 0.042% Irg184 0.19% Ti (UV 60 s) | 4% Ti (UV 80 s) | 0.6% SR399 0.03% Irg184 0.3% Ti 3.3% Si (UV 60 s) | 0.9% SR399 0.042% Irg184 0.19% Ti (UV 60 s) | 0.4% SR399 0.017% Irg184 0.085% Ti | | 96.6% | BLUE |
| 131 | 1.75% Ti (UV 60 s) | 0.6% SR399 0.03% Irg184 0.3% Ti 3.3% Si (UV 60 s) | 4% Ti (UV 60 s) | 0.6% SR399 0.03% Irg184 0.3% Ti 3.3% Si (UV 60 s) | 0.9% SR399 0.042% Irg184 0.19% Ti (UV 60 s) | 0.01% PFOA 0.01% PFOMA 0.005% PFOTCS 0.1% Ti 0.007% TBPO 4% MP 95.9% IPA (UV 50 s) | | 96.9% | YELLOW-RED |
| 132 | 1.75% Ti | 0.9% SR399 0.042% Irg184 0.19% Ti | 1.75% Ti (UV 60 s) | 1.75% Ti (UV 60 s) | 0.6% SR399 0.03% Irg184 0.3% Ti 3.3% Si (UV 30 s) | 0.9% SR399 0.042% Irg184 0.19% Ti (UV 60 s) | | 96.1% | |

TABLE 13-continued

| Ex. # | Layer 1 | Layer 2 | Layer 3 | Layer 4 | Layer 5 | Layer 6 | Layer 7 | Visible Light Transmittance % | Color |
|---|---|---|---|---|---|---|---|---|---|
| 133 | 1.75% Ti | 0.9% SR399<br>0.042% Irg184<br>0.19% Ti | 1.75% Ti<br>(UV 60 s) | 1.75% Ti<br>(UV 60 s) | 0.6% SR399<br>0.03% Irg184<br>0.3% Ti<br>3.3% Si<br>(UV 30 s) | 0.9% SR399<br>0.042% Irg184<br>0.19% Ti<br>(UV 60 s) | | 96.5% | |
| 134 | 1.75% Ti | 1.4% SR399<br>0.3% Ti | 5% Ti | 0.6% SR399<br>0.03% Irg184<br>0.3% Ti<br>3.3% Si | 1.4% SR399<br>0.3% Ti<br>(UV 60 s) | | | 97.6% | |
| 135 | 1.75% Ti | 1.4% SR399<br>0.3% Ti | 5% Ti | 0.6% SR399<br>0.03% Irg184<br>0.3% Ti<br>3.3% Si | 0.9% SR399<br>0.042% Irg184<br>0.19% Ti<br>(UV 60 s) | | | 96.8% | |
| 136 | 1.15% Ti—Bu<br>0.84% Ti<br>0.55% SR399<br>0.068% Irg184<br>18.5 ppm BYK300<br>18.5 ppm PFOMA | 1.15% Ti—Bu<br>0.84% Ti<br>0.55% SR399<br>0.068% Irg184<br>18.5 ppm BYK300<br>18.5 ppm PFOMA | 3.85% Ti—Bu<br>0.25% SR399<br>0.017% Irg184<br>8 ppm BYK300<br>8 ppm PFOMA | 1.5% SR399<br>0.1% Irg184<br>50 ppm BYK300<br>50 ppm PFOMA | | | | 95.4% | |
| 137 | 1.15% Ti—Bu<br>0.84% Ti<br>0.55% SR399<br>0.068% Irg184<br>18.5 ppm BYK300<br>18.5 ppm PFOMA | 2.5% Si<br>(UV 60 s) | 1.15% Ti—Bu<br>0.84% Ti<br>0.55% SR399<br>0.068% Irg184<br>18.5 ppm BYK300<br>18.5 ppm PFOMA | 3.85% Ti—Bu<br>0.25% SR399<br>0.017% Irg184<br>8 ppm BYK300<br>8 ppm PFOMA | 1.5% SR399<br>0.1% Irg184<br>50 ppm BYK300<br>50 ppm PFOMA | 0.085% Ti—Bu<br>0.4% SR399<br>0.017% Irg184 | | 96.4% | RED-GREEN |

In Table 14, three coating layers are formed on the plastic lens. For all of the compositions listed in Table 14, the remainder of the composition is made up of 1-methoxy-2-propanol. For example, a listing of 5% Ti, should be understood to mean 5% by weight of Ti and 95% by weight of 1-methoxy-2-propanol.

The application of the compositions to the plastic lens, and the measurement of the transmittance was performed in substantially the same manner as recited above for Table 11. Curing times are 60 seconds, unless otherwise noted

TABLE 14

| Ex. # | Layer 1 | Layer 2 | Layer 3 | Visible Light Transmittance % | Color |
|---|---|---|---|---|---|
| 138 | 2% Ti<br>0.02% NNDMEA<br>(UV 30 s) | 0.186% Al<br>(UV 40 s) | 26.8% HC-8<br>73.2% IPA | 94.0% | |
| 139 | 1.54% Ti<br>77 ppm AA<br>42.3% MP<br>56.2% IPA | 0.24% Ti<br>0.048% Al<br>1.94% SR368<br>1.47% TMSPMA<br>96.3% MP<br>(UV 180 s) | 0.3% Al<br>(UV 50 s) | 93.0% | |
| 140 | 2.99% Ti<br>0.28% Irg184<br>(UV 20 s) | 2.99% Ti<br>0.28% Irg184<br>(UV 20 s) | 2% SR399<br>0.349% Ti<br>(UV 30 s) | 97.3% | |
| 141 | 0.3% Al<br>(UV 20 s) | 2.99% Ti<br>0.28% Irg184<br>(UV 40 s) | 2% SR399<br>0.5% SR306<br>0.349% Ti<br>(UV 100 s) | 95.5% | |
| 142 | 2.97% Ti<br>0.29% Irg184<br>1% SR368<br>(UV 30 s) | 2.99% Ti<br>0.28% Irg184 | 2% SR399<br>0.5% SR306<br>0.349% Ti | 93.6% | |
| 143 | 1.69% Ti<br>0.168% Irg184<br>0.58% SR368 | 2.99% Ti<br>0.28% Irg184 | 2% SR399<br>0.5% SR306<br>0.349% Ti | 94.5% | |
| 144 | 3.25% Ti<br>0.1% Irg184<br>(UV 30 s, 350 rpm) | 3.25% Ti<br>0.1% Irg184<br>(UV 30 + 60 s) | 2% SR399<br>0.4% Ti<br>0.04% Irg184<br>0.1% BYK300<br>(UV 60 s) | 93.0% | GREENISH BLUE |
| 145 | 0.5% Ti<br>0.25% Irg184 0.5% Al<br>4.67% SR399 | 2.46% Ti<br>0.197% Irg184<br>0.157% SR313<br>44.3% AC | 0.53% Ti<br>0.1% Irg184<br>0.85% SR313<br>1.38% SR399 | 97.3% | |
| 146 | 3% Ti<br>(UV 60 s) | 3% HEMA<br>0.25% Ti<br>0.33% TEA<br>0.02% Eiosin<br>(UV 60 s) | 0.06% Irg184<br>0.32% Ti<br>2% SR399<br>(UV 60 s) | 97.4% | |
| 147 | 3% HEMA 0.25% Ti<br>0.33% TEA<br>0.02% Eiosin<br>(UV 60 s) | 3% Ti<br>(UV 60 s) | 0.06% Irg184<br>0.32% Ti<br>2% SR399<br>(UV 60 s) | 97.5% | |
| 148 | 3% Ti<br>(UV 60 s) | 2.5% HEMA<br>0.25% T770<br>0.5% Ti<br>(UV 60 s) | 0.06% Irg184<br>0.32% Ti<br>2% SR399<br>(UV 60 s) | 97.4% | |
| 149 | 3% Ti<br>(UV 60 s) | 2.5% HEMA<br>0.25% T770<br>0.5% Ti<br>(UV 60 s) | 0.06% Irg184<br>0.32% Ti<br>2% SR399 | 97.8% | |
| 150 | 3% Ti | 0.037% PFOFCS<br>0.1% CD1012<br>0.21% Irg184<br>1.35% ECHMCHC<br>0.6% HEMA<br>0.246% Ti<br>1% SR399 | 2% SR399<br>0.32% Ti<br>0.06% Irg184<br>(UV 60 s) | 94.4% | |
| 151 | 1.3% HEMA<br>0.96% SR640<br>3.576% Ti—Bu | 0.05% BDKK<br>0.57% SR399<br>0.43% HEMA<br>5.66% Si | 0.164% HEMA<br>0.05% PFOTCS<br>97.86% IPA<br>1.93% MP | 98.5% | |

TABLE 14-continued

| Ex. # | Layer 1 | Layer 2 | Layer 3 | Visible Light Transmittance % | Color |
|---|---|---|---|---|---|
| 152 | 3.5% Ti—Bu | 0.087% BDKK<br>0.095% Ti—Bu<br>1% SR399<br>2.9% Si | 0.035% BDKK<br>0.4% SR399<br>0.005% PFOTCS<br>0.005% FC430<br>0.005% BYK300 | 97.0% | |
| 153 | 3.5% Ti—Bu | 0.043% BDKK<br>0.047% Ti—Bu<br>0.5% SR399<br>1.45% Si | 0.174% BDKK<br>0.173% Ti—Bu<br>2% SR399 | 94.0% | BLUE |
| 154 | 5% Ti—Bu/5% Ti—Bu | 0.033% BDKK<br>0.095% Ti—Bu<br>0.375% SR399<br>2.5% Si | 0.026% BDKK<br>0.3% SR399<br>0.0037% PFOTCS<br>0.0037% FC430<br>0.0037% BYK300 | 97.2% | |
| 155 | 1.15% Ti—Bu<br>0.84% Ti<br>0.55% SR399<br>0.068% Irg184<br>18.5 ppm BYK300<br>18.5 ppm PFOMA | 1.15% Ti—Bu<br>0.84% Ti<br>0.55% SR399<br>0.068% Irg184<br>18.5 ppm BYK300<br>18.5 ppm PFOMA | 1.5% SR399<br>0.1% Irg184<br>50 ppm BYK300<br>50 ppm PFOMA | 95.7% | YELLOW |

In Table 15, Layer 1 refers to the first antireflective coating layer, Layer 2 refers to an intermediate silicon layer, and Layer 3 refers to the second antireflective coating layer. Solutions of each of the components were prepared and used to form the antireflective coatings. For all of the compositions listed in Table 15, the remainder of the composition is made up of 1-methoxy-2-propanol. For example, a listing of 5% Ti, should be understood to mean 5% by weight of Ti and 95% by weight of 1-methoxy-2-propanol.

The plastic eyeglass lens was coated using different coating compositions. The "Layer 1" composition was added to a surface of the eyeglass lens and the eyeglass lens was rotated on a lens spin-coating apparatus. After the Layer 1 composition was spread onto the eyeglass lens surface the solvent was allowed to substantially evaporate and the remaining composition was subjected to ultraviolet light from the germicidal lamp from the previously described coating unit for about 60 seconds, unless otherwise noted.

Layer 2 (the silicon layer) was added to the eyeglass lens after the Layer 1 composition was cured. Curing time of the second layer is 60 seconds, unless otherwise noted. The Layer 2 composition was spread onto the eyeglass lens surface and the eyeglass lens was spun until the solvent was substantially evaporated. The Layer 3 composition was added to the eyeglass lens after the Layer 2 composition was dried. The eyeglass lens was spun on a lens spin-coating apparatus until the solvent was substantially evaporated. Layer 3 was then cured by the application of ultraviolet light from the germicidal lamp from the previously described coating unit. Curing time for the third layer is 60 seconds, unless otherwise noted. From one to four additional layers were added to the top of the antireflective stack. The % transmittance refers to the amount of light transmitted through the lens after the final layer was cured. The transmittance was measured as described above.

TABLE 15

| Ex. # | Layer 1 | Layer 2 | Layer 3 | Layer 4 | Layer 5 | Layer 6 | Layer 7 | Visible Light Transmittance % | Color |
|---|---|---|---|---|---|---|---|---|---|
| 156 | 1.5% Ti<br>454 ppm AA<br>300 ppm AS<br>92.8% MP<br>5.6% IPA<br>(UV 40 s) | 1.5% Si<br>98.5% IPA<br>(UV 40 s) | 0.257% Ti<br>0.257% GPTMS<br>2.85% HC-8<br>0.5% Al<br>0.26% TMSPMA<br>(UV 120 s) | HR200 | | | | 96.0% | BROWN GOLD |
| 157 | 1.5% Ti<br>76 ppm AA<br>28.4% MP<br>70.1% IPA<br>(UV 60 s) | 1.5% Si<br>98.5% IPA<br>(UV 40 s) | 0.46% Ti<br>0.75% GPTMS<br>0.83% TMSPMA<br>3.4% HC-8<br>0.9% Al<br>(UV 120 s) | HR200 | | | | 94.4% | |
| 158 | 3% Ti<br>(UV 70 s) | 1.5% Si | 0.055% Irg184<br>0.22% Ti<br>1% SR399<br>0.0125% PFOMA<br>(UV 70 s) | 0.055% Irg184<br>0.22% Ti<br>1% SR399<br>0.0125% PFOMA<br>(UV 60 s) | | | | 97.4% | |
| 159 | 3% Ti<br>(UV 60 s) | 1.5% Si<br>(UV 20 s) | 0.025% Irg184<br>0.14% Ti<br>0.96% SR399<br>(UV 20 s) | 1.5% Si | 0.025% Irg184<br>0.14% Ti<br>0.96% SR399<br>(UV 60 s) | | | 94.5% | YELLOW |

TABLE 15-continued

| Ex. # | Layer 1 | Layer 2 | Layer 3 | Layer 4 | Layer 5 | Layer 6 | Layer 7 | Visible Light Transmittance % | Color |
|---|---|---|---|---|---|---|---|---|---|
| 160 | 3% Ti (UV 60 s) | 1.5% Si | 1.5% Si | 0.08% Irg184<br>0.32% Ti<br>1.44% SR399<br>0.005% PFOTCS<br>(UV 60 s) | | | | 97.4 | RED |
| 161 | 3% Ti (UV 60 s) | 1.5% Si | 1.5% Si (UV 60 s) | 0.08% Irg184<br>0.32% Ti<br>1.44% SR399<br>0.005% PFOTCS<br>(UV 60 s) | | | | 97.3 | |
| 162 | 3% Ti (UV 60 s) | 1.5% Si | 1.5% Si (UV 60 s) | 0.11% Irg184<br>0.44% Ti<br>2% SR399<br>0.005% PFOTCS<br>(UV 60 s) | | | | 93 | |
| 163 | 3% Ti | 1.5% Si | 1.5% Si | 0.055% Irg184<br>0.22% Ti<br>1% SR399<br>0.0125% PFOTCS | | | | 95.3% | |
| 164 | 3% Ti | 1.5% Si | 1.5% Si | 0.055% Irg184<br>0.22% Ti<br>1% SR399<br>0.0125% PFOTCS | 0.055% Irg184<br>0.22% Ti<br>1% SR399<br>0.0125% PFOTCS | | | 94.6% | |
| 165 | 3% Ti<br>0.53% SR640<br>70 ppm FC430<br>(UV 60 s) | 2.4% Si<br>0.97% SR640<br>70 ppm FC430 | 2.4% Si<br>0.97% SR640<br>70 ppm FC430 | 0.08% Irg164<br>0.32% Ti<br>1.44% SR399<br>0.005% PFOTCS | | | | 97.6% | |
| 166 | 3% Ti | 5% Si | 0.33% SR399<br>0.07% Ti<br>0.018% Irg184<br>0.07% PFOMA | 0.527% SR399<br>0.23% Ti<br>0.029% Irg184<br>0.066% PFOMA | | | | 97.3% | |
| 167 | 3.85% Ti—Bu<br>0.25% SR399<br>0.017% Irg184<br>8 ppm BYK300<br>8 ppm PFOMA | 1% SR399<br>2.4% Si | 1% SR399<br>2.4% Si | 1.15% Ti—Bu<br>0.84% Ti<br>0.55% SR399<br>0.068% Irg184<br>18.5 ppm BYK 1300<br>18.5 ppm PFOMA<br>(UV 60 s) | 1.739% SR399<br>0.12% Irg184<br>60 ppm BYK300<br>60 ppm PFOMA | | | 96.7% | |

In Table 16, Layer 1 refers to the first antireflective coating layer, Layer 2 refers to an intermediate silicon layer, and Layer 3 refers to the second antireflective coating layer. Solutions of each of the components were prepared and used to form the antireflective coatings. For all of the compositions listed in Table 16, the remainder of the composition is made up of 1-methoxy-2-propanol. For example, a listing of 5% Ti, should be understood to mean 5% by weight of Ti and 95% by weight of 1-methoxy-2-propanol.

The plastic eyeglass lens was coated using different coating compositions. The "Layer 1" composition was added to a surface of the eyeglass lens and the eyeglass lens was rotated on a lens spin-coating apparatus. The first coating layer was formed by a two step procedure. In the first step, a solution of Ti was added to the plastic lens and allowed to dry. In the second step, an additional solution of Ti was added to the plastic lens and allowed to dry. The % of Ti used for the first and second steps are respectively listed in the "Layer 1" column. The Layer 1 composition was allowed to substantially evaporate and the remaining composition was subjected to ultraviolet light from the germicidal lamp from the previously described coating unit for about 60 seconds, unless otherwise noted. Layer 2 (the silicon layer) was added to the eyeglass lens after the Layer 1 composition was cured. The Layer 2 composition was spread onto the eyeglass lens surface and the eyeglass lens was spun until the solvent was substantially evaporated. The Layer 3 composition was added to the eyeglass lens after the Layer 2 composition was dried. The eyeglass lens was spun on a lens spin-coating apparatus until the solvent was substantially evaporated. Layer 3 was then cured by the application of ultraviolet light from the germicidal lamp from the previously described coating unit. Curing time was 60 seconds, unless otherwise noted. From one to four additional layers were added to the top of the antireflective stack. The % transmittance refers to the amount of light transmitted through the lens after the final layer was cured. The transmittance was measured as described above.

TABLE 16

| Ex. # | Layer 1 | Layer 2 | Layer 3 | Visible Light Transmittance % | Color |
|---|---|---|---|---|---|
| 168 | 1.5% Ti/3% Ti (UV 40 s/40 s) | 3% Si | 0.08% Irg184<br>0.32% Ti<br>1.45% SR399<br>(UV 60 s) | 97.6% | BLUE |
| 169 | 3% Ti/1.5% Ti (UV 40 s/40 s) | 3% Si | 0.08% Irg184<br>0.32% Ti<br>1.45% SR399<br>(UV 60 s) | 98.3% | PURPLE |
| 170 | 5% Ti/3% Ti (UV 40 s/40 s) | 3% Si | 0.08% Irg184<br>0.32% Ti<br>1.45% SR399<br>(UV 90 s) | 92.2% | |

TABLE 16-continued

| Ex. # | Layer 1 | Layer 2 | Layer 3 | Visible Light Transmittance % | Color |
|---|---|---|---|---|---|
| 171 | 3% Ti/5% Ti (UV 40 s/40 s) | 3% Si | 0.08% Irg184 0.32% Ti 1.45% SR399 (UV 90 s) | 94.1% | |
| 172 | 1.5% Ti/ 1.5% Ti (UV 60 s/60 s) | 3% Si | 0.08% Irg184 0.32% Ti 1.45% SR399 | 97.6% | |
| 173 | 3% Ti/3% Ti (UV 60 s/60 s) | 3% Si (UV 30 s) | 0.08% Irg184 0.32% Ti 1.45% SR399 | 97.6% | |

In Table 17, Layer 1 refers to the first antireflective coating layer, Layer 2 refers to an intermediate silicon layer, and Layer 3 refers to the second antireflective coating layer. Solutions of each of the components were prepared and used to form the antireflective coatings. For all of the compositions listed in Table 17, the remainder of the composition is made up of 1-methoxy-2-propanol. For example, a listing of 5% Ti, should be understood to mean 5% by weight of Ti and 95% by weight of 1-methoxy-2-propanol.

The application of the compositions to the plastic lens, and the measurement of the transmittance was performed in substantially the same manner as recited above for Table 11. Curing time was 60 seconds, unless otherwise noted.

TABLE 17

| Ex. # | Layer 1 | Layer 2 | Layer 3 | Visible Light Transmittance % | Color |
|---|---|---|---|---|---|
| 174 | 3% Ti | 6% Si | 0.8% Ti 0.8% GPTMS 0.8% TMSPMA | 96.0% | |
| 175 | 5.2% Ti 0.97% HC8558 | 5% Si | 0.75% Ti 0.75% HC8558 | 96.6% | |
| 176 | 3.75% Ti 0.019% AA 71% MP 25.25% IPA | 3% Si 97% IPA | 0.257% Ti 0.257% GPTMS 2.85% HC-8 0.5% Al | 98.3% | RED |
| 177 | 3.75% Ti 0.019% AA 71% MP 25.25% IPA | 1.5% Si 98.5% IPA | 0.257% Ti 0.257% GPTMS 2.85% HC-8 0.5% Al | 95.6% | RED |
| 178 | 7.5% Ti 0.038 AA 45.3% MP 47.2% IPA | 1.5% Si 98.5% IPA | 0.257% Ti 0.257% GPTMS 2.85% HC-8 0.5% Al | 96.0% | RED |
| 179 | 3% Ti | 5% Si | 0.16% Ti 1% SR399 50 ppm PFOFCS | 98.1% | |
| 180 | 3% Ti | 6.94% Nalco Si | 0.16% Ti 1% SR399 50 ppm PFOFCS | 95.7% | |
| 181 | 3% Ti | 6.94% Nalco Si | 0.317% Ti 2% SR399 0.08% Irg184 0.06% PFOFCS | 93.0% | |
| 182 | 3% Ti | 3% Si | 0.11% Irg184 0.44% Ti 2% SR399 | 93.0% | BLUE |
| 183 | 3% Ti | 3% Si | 0.05% Irg184 0.02% Ti 0.9% SR399 | 94.3% | GOLD |
| 184 | 3% Ti | 4% Si | 0.05% Irg184 0.2% Ti 0.9% SR399 | 96.4% | |
| 185 | 3% Ti | 5% Si | 0.05% Irg184 0.2% Ti 0.9% SR399 | 97.9% | |
| 186 | 3% Ti | 4% Si | 0.079% Irg184 0.322% Ti 1.45% SR399 | 97.0% | |
| 187 | 3% Ti | 4% Si | 0.079% Irg184 0.322% Ti 1.45% SR399 | 96.8% | |

TABLE 17-continued

| Ex. # | Layer 1 | Layer 2 | Layer 3 | Visible Light Transmittance % | Color |
|---|---|---|---|---|---|
| 188 | 3% Ti | 3% Si | 0.079% Irg184<br>0.322% Ti<br>1.45% SR399 | 97.3% | |
| 189 | 3% Ti | 3% Si | 0.08% Irg184<br>0.32% Ti<br>1.44% SR399<br>0.005% PFOA | 97.7% | |
| 190 | 3% Ti | 3% Si | 0.08% Irg184<br>0.32% Ti<br>1.44% SR399<br>0.047% PFOMA | 97.6% | |
| 191 | 3% Ti | 3% Si | 0.08% Irg184<br>0.32% Ti<br>1.44% SR399<br>0.005% PFOTCS | 97.8% | |
| 192 | 3% Ti | 5% Si | 0.08% Irg184<br>0.32% Ti<br>1.44% SR399<br>0.005% PFOTCS | 95.7% | |
| 193 | 1.5% Ti | 5% Si | 0.08% Irg184<br>0.32% Ti<br>1.45% SR399 | 94.6% | |
| 194 | 1.5% Ti | 3% Si | 0.08% Irg184<br>0.32% Ti<br>1.45% SR399 | 95.1% | |
| 195 | 2% Ti | 3% Si | 0.08% Irg184<br>0.32% Ti<br>1.45% SR399 | 95.6% | |
| 196 | 2% Ti<br>0.03% BYK300 | 3% Si | 0.08% Irg184<br>0.32% Ti<br>1.45% SR399 | 96.0% | |
| 197 | 3% Ti | 1.5% Si | 0.11% Irg184<br>0.44% Ti<br>2% SR399<br>0.005% PFOMA | 97.2% | |
| 198 | 3% Ti | 1.5% Si | 0.08% Irg184<br>0.32% Ti<br>1.44% SR399<br>0.005% PFOMA | 95.0% | |
| 199 | 3% Ti | 1.5% Si | 0.11% Irg184<br>0.44% Ti<br>2% SR399<br>0.005% PFOMA | 96.7% | |
| 200 | 3% Ti<br>0.53% SR640 | 3% Si | 0.08% Irg184<br>0.32% Ti<br>1.44% SR399<br>0.005% PFOTCS | 97.5% | |
| 201 | 3% Ti | 3% Si | 0.08% Irg184<br>0.32% Ti<br>1.44% SR399<br>0.005% PFOTCS | 97.1% | |
| 202 | 3% Ti | 3% Si<br>0.5% SR640 | 0.08% Irg184<br>0.32% Ti<br>1.44% SR399<br>0.005% PFOTCS | 97.8% | |
| 203 | 3% Ti<br>0.53% SR640<br>70 ppm FC430 | 3% Si<br>0.53% SR640<br>70 ppm FC430 | 0.08% Irg184<br>0.32% Ti<br>1.44% SR399<br>0.005% PFOTCS | 97.8% | |
| 204 | 3% Ti | 5% Si | 1.44% SR399<br>0.32% Ti<br>0.08% Irg184<br>0.005% PFOTCS | 97.4% | |
| 205 | 3.85% Ti—Bu<br>0.25% SR399<br>0.017% Irg184<br>8 ppm BYK300<br>8 ppm PFOMA | 5% Si | 1.56% Ti—Bu<br>0.5% SR399<br>0.033% Irg184<br>16 ppm BYK300<br>16 ppm PFOMA | 95.8% | YELLOW |

Table 18 refers to a series of experiments using an in-mold curing process. In the in-mold process, the layers are built in the opposite manner than they are built upon the plastic lens. Layer 1, thus, refers to the second antireflective coating layer, Layer 2 refers to the first antireflective coating layer, and Layer 3 refers to an adhesion layer. Solutions of each of the components were prepared and used to form the antireflective coatings. For all of the compositions listed in Table 18, the remainder of the composition is made up of 1-methoxy-2-propanol. For example, a listing of 5% Ti, should be understood to mean 5% by weight of Ti and 95% by weight of 1-methoxy-2-propanol.

A casting face of a mold was coated using the different coating compositions. The "Layer 1" composition was added to a surface of the mold and the mold was rotated on a lens spin-coating apparatus. The Layer 1 composition was allowed to substantially evaporate and the remaining composition was subjected to ultraviolet light from the germicidal lamp from the previously described coating unit for about 60 seconds, unless otherwise noted. Layer 2 was added to the mold after the Layer 1 composition was cured. The Layer 2 composition was spread onto the mold surface and the mold was spun until the solvent was substantially evaporated. Layer 2 was then cured by the application of ultraviolet light from the germicidal lamp from the previously described coating unit. Curing time was 60 seconds, unless otherwise noted. Layer 3 was then added to the antireflective stack. Layer 3 was added to the mold, spun dried and cured. Curing time was 60 seconds, unless otherwise noted. A pair of coated molds was then used to in a mold assembly to form a plastic lens. After the lens was formed, the lens was removed from mold assembly and the % transmittance of the plastic lens measured. The transmittance was measured as described above.

TABLE 18

| Ex. # | Layer 1 | Layer 2 | Layer 3 | Visible Light Transmittance % | Color |
|---|---|---|---|---|---|
| 206 | 1% SR399<br>0.059% Irg184<br>0.007% PFOMA | | | 92.5% | |
| 207 | 1% SR399<br>0.059% Irg184<br>0.007% PFOMA<br>0.0062% Q4DC | | | 92.5% | |
| 208 | 1% SR399<br>0.059% Irg184<br>0.007% PFOMA<br>0.0062% Q4DC | 1.44% SR399<br>0.08% Irg184<br>0.32% Ti<br>0.005% PFOTCS | 3% Ti | 97.0% | GOLD |
| 209 | 2.58% SR399<br>0.147% Irg184<br>0.32% Ti—Bu<br>(UV 60 s) | 4% Ti—Bu<br>1.2% HEMA<br>14% IPA<br>(UV 60 s) | 2.58% SR399<br>0.147% Irg184<br>0.32% Ti—Bu<br>(UV 60 s) | 94.5% | |
| 210 | 2.2% SR399<br>0.126% Irg184<br>0.003% PFOMA | 2.2% SR399<br>0.126% Irg184<br>0.003% PFOMA | 2.2% SR399<br>0.126% Irg184<br>0.003% PFOMA | 97.7% | BLUISH RED |
| 211 | 2.2% SR399<br>0.126% Irg184<br>0.0031% PFOMA | 4% Ti—Bu<br>1.2% HEMA<br>14% IPA | | 97.7% | |
| 212 | 2.2% SR399<br>0.14% D1173 | 4% Ti—Bu<br>1.2% HEMA<br>14% IPA | | 97.1% | |
| 213 | 2.2% SR399<br>0.14% D1173<br>(UV 70 s) | 2.022% Ti—Bu<br>2.026% HEMA<br>(UV 70 s) | 1% Si<br>2.2% SR399<br>0.165% Ti—Bu<br>0.14% D1173<br>(UV 70 s) | >95.5 | |
| 214 | 2.06% SR399<br>0.136% D1173<br>0.95% HEMA<br>(UV 90 s) | 3.62% Ti—Bu<br>1.5% HEMA<br>(UV 90 s) | 2.06% SR399<br>0.136% D1173<br>0.95% HEMA<br>(UV 90 s) | 97.0% | RED GOLD |
| 215 | 2% SR399<br>0.145% D1173<br>(UV 90 s) | 3.62% Ti—Bu<br>1.5% HEMA<br>(UV 90 s) | 2.12% SR399<br>0.14% D1173<br>0.5% HEMA<br>(UV 90 s) | 97.0% | |
| 216 | 2.2% SR399<br>0.117% BDK | 3.6% Ti—Bu<br>1.5% HEMA | 2.2% SR399<br>0.117% BDK<br>(UV 90 s) | 94.7% | |
| 217 | 2.66% SR399<br>0.114% BDK | 3.6% Ti—Bu<br>1.5% HEMA | 2.66% SR399<br>0.114% BDK<br>(UV 90 s) | 95.0% | |
| 218 | 2.886% SR399<br>0.124% BDK | 3.6% Ti—Bu<br>1.5% HEMA | 2.886% SR399<br>0.124% BDK | 94.5% | |
| 219 | 2.2% SR399<br>0.19% BDK<br>(UV 60 s) | 3.46% Ti—Bu<br>(UV 60s) | 2.2% SR399<br>0.19% BDK<br>(UV 60 s) | 97.7% | |
| 220 | 2.2% SR399<br>0.19% BDK<br>(UV 60 s) | 3.7% Ti—Bu<br>0.005% PFOMA<br>0.003% BDK<br>(UV 60 s) | 2.2% SR399<br>0.19% BDK | 97.6% | |
| 221 | 2.2% SR399<br>0.19% BDK | 3.7% Ti—Bu<br>0.0247% BDK<br>0.028% PFOTCS<br>0.091% HEMA | 2.2% SR399<br>0.19% BDK | 98.0% | |
| 222 | 2.2% SR399<br>0.19% BDK<br>(UV 60 s) | 3.7% Ti—Bu<br>0.0123% BDK<br>0.014% PFOTCS<br>0.045% HEMA | 2.2% SR399<br>0.19% BDK | 98.2% | |

TABLE 18-continued

| Ex. # | Layer 1 | Layer 2 | Layer 3 | Visible Light Transmittance % | Color |
|---|---|---|---|---|---|
| 223 | 0.028% BDK<br>0.32% SR399<br>0.24% HEMA<br>3.2% Si | 1.3% HEMA<br>0.96% SR640<br>3.576% Ti—Bu | 0.19% BDK<br>2.2% SR399<br>0.01% HEMA<br>0.03% PFOTCS<br>5.9% IPA<br>91.7% MP | 95.2% | |
| 224 | 1.5% SR399<br>0.1% Irg184<br>0.005% BYK300<br>0.005% PFOMA | 3.849% Ti<br>0.25% SR399<br>0.0016% Irg184<br>8 ppm BYK300<br>8 ppm PFOMA | 1.04% Ti<br>0.5% SR399<br>0.033% Irg184<br>16 ppm BYK300<br>16 ppm PFOMA | 94.7% | |

In Table 19, multiple coating layers are formed on the casting surface of the molds prior to use. For all of the compositions listed in Table 19, the remainder of the composition is made up of 1-methoxy-2-propanol. For example, a listing of 5% Ti, should be understood to mean 5% by weight of Ti and 95% by weight of 1-methoxy-2-propanol.

The application of the compositions to the lenses, and the measurement of the transmittance was performed in substantially the same manner as recited above for Table 18. Curing times were 60 seconds, unless otherwise noted.

TABLE 19

| Ex. # | Layer 1 | Layer 2 | Layer 3 | Layer 4 | Layer 5 | Layer 6 | Layer 7 | Visible Light Transmittance % | Color |
|---|---|---|---|---|---|---|---|---|---|
| 225 | 0.5% SR399<br>0.02% Irg184<br>0.02% PFOMA | 1.44% SR399<br>0.32% Ti<br>0.08% Irg184<br>0.005% PFOTCS | 3% Ti | HC-8 | | | | 96.7% | |
| 226 | 0.05% BDKK<br>0.57% SR399<br>0.43% HEMA<br>5.66% Si | 1.3% HEMA<br>0.96% SR640<br>3.576% Ti—Bu | 0.19% BDKK<br>2.2% SR399<br>0.01% HEMA<br>0.03% PFOTCS<br>5.9% IPA<br>91.7% MP | 0.164% HEMA<br>0.05% PFOTCS<br>97.86% IPA<br>1.93% MP | | | | 94.7% | |
| 227 | 0.01% FC725<br>40% IPA<br>0.015% FC171<br>50% AC | 0.0134% Irg184<br>0.033% D1173<br>0.527% SR399<br>0.178% SR423<br>0.088% SR9003<br>0.008% CD540<br>0.06% ppm TPB<br>(UV 60 s) | 0.6% SR399<br>0.03% Irg184<br>0.3% Ti<br>3.3% Si | 0.9% SR399<br>0.04% Irg184<br>0.19% Ti<br>(UV 60 s) | 4% Ti | 0.01% FC725<br>40% IPA<br>0.015% F0171<br>50% AC | | 97.7% | |
| 228 | 0.01% FC725<br>0.015% FC171<br>50% IPA<br>50% AC | 0.0134% Irg184<br>0.033% D1173<br>0.527% SR399<br>0.178% SR423<br>0.088% SR9003<br>0.008% CD540<br>0.06% ppm TPB | 1.4% SR399<br>0.1% Irg184<br>0.3% Ti | 4% Ti<br>0.04% TX-100 | 0.6% SR399<br>0.03% Irg184<br>0.3% Ti<br>3.3% Si | 0.0134% Irg184<br>0.033% D1173<br>0.527% SR399<br>0.178% SR423<br>0.088% SR9003<br>0.008% CD540<br>0.06% ppm TPB | | 97.5% | |
| 229 | 0.01% FC725<br>50% IPA<br>0.015% FC171<br>50% AC | 1% SR399<br>0.5% SR368<br>0.01% Irg184<br>0.05% TPB | 0.9% SR399<br>0.042% Irg184<br>0.19% Ti | 4% Ti<br>0.04% TX-100 | 0.9% SR399<br>0.042% Irg184<br>0.19% Ti | 1% SR399<br>0.5% SR368<br>0.01% Irg184<br>0.05% TPB | | 98.0% | |
| 230 | 1.5% SR399<br>0.1% Irg184<br>0.005% BYK300<br>0.005% PFOMA | 1.04% Ti<br>0.5% SR399<br>0.033% Irg184<br>16 ppm BYK300<br>16 ppm PFOMA | 3.849% Ti<br>0.25% SR399<br>0.0016% Irg184<br>8 ppm BYK300<br>8 ppm PFOMA | 1.5% SR399<br>0.1% Irg184<br>0.005% BYK300<br>0.005% PFOMA | | | | 97.5% | |
| 231 | 1.5% SR399<br>0.1% Irg184<br>0.005% BYK300<br>0.005% PFOMA | 2.5% Si/2.5% Si | 1.04% Ti<br>0.5% SR399<br>0.033% Irg184<br>16 ppm BYK300<br>16 ppm PFOMA | 1.04% Ti<br>0.5% SR399<br>0.033% Irg184<br>16 ppm BYK300<br>16 ppm PFOMA | 3.849% Ti<br>0.25% SR399<br>0.0016% Irg184<br>8 ppm BYK300<br>8 ppm PFOMA | 1.04% Ti<br>0.5% SR399<br>0.033% Irg184<br>16 ppm BYK300<br>16 ppm PFOMA | | 95.5% | |
| 232 | 1.5% SR399<br>0.1% Irg184<br>0.005% BYK300<br>0.005% PFOMA | 1.04% Ti<br>0.5% SR399<br>0.033% Irg184<br>16 ppm BYK300<br>16 ppm PFOMA | 3.849% Ti<br>0.25% SR399<br>0.0016% Irg184<br>8 ppm BYK300<br>8 ppm PFOMA | 0.3% Ti<br>1.4% SR399<br>0.06% Irg184 | 2.5% Si | 1.04% Ti<br>0.5% SR399<br>0.033% Irg184<br>16 ppm BYK300<br>16 ppm PFOMA | | 97.0% | |

Additional Improvement

Systems and methods for preparing optical lenses using radiation curing techniques and coatings applied to eyeglass lens molds are described in U.S. Pat. No. 3,494,326 to Upton, U.S. Pat. No. 4,544,572 to Sandvig et al., U.S. Pat. No. 4,728,469 to Lipscomb et al., U.S. Pat. No. 4,758,448 to Sandvig et al., U.S. Pat. No. 4,879,318 to Lipscomb et al., U.S. Pat. No. 4,895,102 to Kachel et al., U.S. Pat. No. 5,364,256 to Lipscomb et al., U.S. Pat. No. 5,415,816 to Buazza et al., U.S. Pat. No. 5,514,214 to Joel et al., U.S. Pat. No. 5,516,468 to Lipscomb, et al., U.S. Pat. No. 5,529,728 to Buazza et al., U.S. Pat. No. 5,689,324 to Lossman et al., U.S. Pat. No. 5,928,575 to Buazza, U.S. Pat. No. 5,976,423 to Buazza, U.S. Pat. No. 5,989,462 to Buazza et al., U.S. Pat. No. 6,022,498 to Buazza et al., U.S. Pat. No. 6,086,799 to Buazza et al., U.S. Pat. No. 6,105,925 to Lossman et al., U.S. Pat. No. 6,201,037 to Lipscomb et al., U.S. Pat. No. 6,206,673 to Lipscomb et al., U.S. Pat. No. 6,228,289 to Powers et al., U.S. Pat. No. 6,280,171 to Buazza, U.S. Pat. No. 6,284,159 to Lossman et al., U.S. Pat. No. 6,331,058 to Lipscomb et al., U.S. Pat. No. 6,328,445 to Buazza, U.S. Pat. No. 6,494,702 to Buazza et al., U.S. Pat. No. 6,730,244 to Lipscomb et al., U.S. Pat. No. 6,416,307 to Buazza et al., U.S. Pat. No. 6,451,226 to Buazza, U.S. Pat. No. 6,478,990 to Powers et al., U.S. Pat. No. 6,368,523 to Buazza et al., U.S. Pat. No. 6,712,596 to Buazza et al., U.S. Pat. No. 6,367,928 to Buazza et al., U.S. Pat. No. 6,576,167 to Buazza et al., U.S. Pat. No. 6,673,278 to Buazza et al., U.S. Pat. No. 6,464,484 to Powers et al., U.S. Pat. No. 6,723,260 to Powers et al., U.S. Pat. No. 6,716,375 to Powers et al., U.S. Pat. No. 6,528,955 to Powers et al., U.S. Pat. No. 6,698,708 to Powers et al., U.S. Pat. No. 6,632,535 to Buazza et al., U.S. Pat. No. 6,729,866 to Buazza et al., U.S. Pat. No. 6,557,734 to Buazza et al., U.S. Pat. No. 6,634,879 to Buazza et al., U.S. Pat. No. 6,712,331 to Foreman et al., U.S. Pat. No. 6,702,564 to Foreman et al., U.S. Pat. No. 6,709,257 to Foreman et al., U.S. Pat. No. 6,676,398 to Foreman, U.S. Pat. No. 6,790,024 to Foreman, U.S. Pat. No. 6,752,613 to Foreman, U.S. Pat. No. 6,726,463 to Foreman, U.S. Pat. No. 6,790,022 to Foreman, U.S. Pat. No. 6,676,399 to Foreman, U.S. Pat. No. 6,840,752 to Foreman et al., U.S. Pat. No. 6,808,381 to Foreman et al., U.S. Pat. No. 6,612,828 to Powers et al., U.S. Pat. No. 6,655,946 to Foreman et al., U.S. Pat. No. 6,758,663 to Foreman et al., U.S. Pat. No. 6,863,518 to Powers, and U.S. Pat. No. 6,579,478 to Lossman et al.; U.S. Design Patent No. D467948 to Powers et al. and D460468 to Powers et al.; U.S. patent application Ser. No. 08/904,289 filed Jul. 31, 1997 now abandoned, Ser. No. 09/232,261 filed Jan. 19, 1999 now abandoned, Ser. No. 09/272,815 filed Mar. 19, 1999 now abandoned, Ser. No. 09/397,489 filed Sep. 16, 1999 now abandoned, Ser. No. 09/496,567 filed Feb. 2, 2000 now abandoned, Ser. No. 09/539,211 filed Mar. 30, 2000; Ser. No. 09/789,303 filed Feb. 20, 2001, and Ser. No. 09/789,122 filed Feb. 20, 2001; and U.S. Patent Application Publication Nos. U.S. 2001/0038890 to Buzza et al., U.S. 2001/0047217 to Buazza et al., U.S. 2002/0166944 to Foreman et al., U.S. 2002/0168439 to Foreman et al., U.S. 2003/0194462 to Foreman et al., U.S. 2002/0167098 to Foreman et al., U.S. 2002/0167097 to Foreman et al., U.S. 2003/0049343 to Foreman et al., U.S. 2002/0168440 to Foreman, U.S. 2003/0042635 to Foreman, U.S. 2002/0167099 to Foreman, et al., U.S. 2003/0111748 to Foreman, U.S. 2003/0042633 to Foreman et al., U.S. 2002/0158354 to Foreman et al., U.S. 20020185761 to Lattis et al., and U.S. 2003/0003176 to Foreman et al., all of which are hereby specifically incorporated by reference. In addition, systems and methods for generating and reading data codes are described in U.S. Pat. No. 4,939,354 to Priddy et al., U.S. Pat. No. 5,053,609 to Priddy et al., and U.S. Pat. No. 5,124,536 to Priddy et al., all of which are hereby specifically incorporated by reference.

A controller as discussed below, may be coupled to one or more computer systems via a network. In such a case, the controller and one or more computers on the network may exchange data and/or instruction to implement various methods disclosed herein. In such a case, for ease of reference herein, the controller and/or one or more computer in communication with the controller via the network may be collectively referred to as a "controller."

As used herein, eyeglass lens information related to a set of eyeglass lenses prescribed to a particular patient may be referred to as a "job." In an embodiment, certain eyeglass lens information may be associated with a job identifier. For example, a job may be assigned a unique identifier, generally referred to herein as a "job number." As used herein, a "job ticket" may refer to a label or other hardcopy printout containing information identifying a particular job. For example, in some embodiments, a job ticket may include a job number. In such embodiments, the job number may be a human readable alphanumeric sequence or a machine-readable encoded sequence (e.g., a bar code).

In an embodiment, an operator preparing one or more lens according to a job may interact with a computer system as described above. For example, upon initiating work on a job and/or at another point in a lens forming process, the operator may provide input to the controller identifying the job. For example, the operator may scan a job ticket or manually enter a job number. The operator may couple a job ticket to a mold assembly holder to relate a job with the mold assembly holder and its contents. The operator may also select one or more mold members appropriate to form at least one lens substantially conforming to the eyeglass lens information.

In an embodiment, a system and method for the location, storage, and identification of eyeglass mold members may be used in the production of eyeglass lenses. As used herein, an "eyeglass mold member storage system" refers to a device or group of devices configured to store eyeglass lens mold members in an organized fashion. In certain embodiments, an eyeglass mold member storage system may include both hardware and software. For example, hardware included in an eyeglass mold member storage system may include but is not limited to: a series of mold member storage locations, a controller and various input and/or output devices. In an embodiment, a mold member storage system may be arranged as a multi-dimensional array of mold member storage locations. For example, a mold member storage system may be roughly cubical in shape with mold members arranged in three dimensions. The mold members may be organized within the storage array in a manner convenient to the operator. For example, mold members may be arrange so that mold members with similar properties are proximate one another. In another example, mold members may be arranged to allow easy access to frequently used mold members. A controller may be coupled to the mold member storage array. Additionally, one or more indicators may be coupled to the mold member storage array to assist an operator in locating a desired mold member. One or more indicators may also be coupled to the mold member storage array to assist an operator in locating a mold member storage location designated for storage of a particular mold.

As used herein, a "mold member storage location" refers to a portion of an eyeglass mold member storage system configured to retain one or more mold members in an organized fashion. In some embodiments, the mold members may include lens molds. In such embodiments, it may be desirable for a mold member storage location to retain one or more lens molds in a manner that inhibits damaging the molds. For example, lens molds may be damaged by contact with one another. A mold member storage location may therefore include one or more mechanisms configured to inhibit molds from touching one another. As used herein, such mechanisms may be generally referred to as "separating devices." Lens molds may also be damaged by contact with various portions of an eyeglass mold member storage system. For example, the lens molds may be scratched or chipped by contact with hard portions of the eyeglass mold member storage system. Thus, an eyeglass mold member storage system may be formed primarily of relatively soft materials (e.g., wood, plastic, etc.) in areas that may come into contact with lens molds. In an embodiment, a mold member storage location may include a means for urging one or more mold members disposed within the mold member storage location toward a dispensing end of the mold member storage location. For example, mold members may be moved toward the dispensing end by a conveyor, by one or more elastic members and/or by gravity.

As used herein, an "indicator" is intended to include, without limit, any device configured to draw the attention of a user or operator to a particular area. For example, an indicator may draw attention by turning on a light, generating a sound and/or moving a mechanical or electromechanical member. As used herein, an action by an indicator intended to draw the attention of a user or operator to a particular area may generally be referred to as a "user detectable signal." As used herein with reference to an indicator, a "light" may refer to any suitable light source such as but not limited to: a fiber optic light system, a light bulb, a fluorescent light source or a light emitting diode. In various embodiments, an electromechanical indicator may include a device that changes its appearance upon receipt of an electrical activation signal. Examples may include but are not limited to a resettable pop-out button, or a partially obscured multicolor disk that may be rotated to expose a different color to view.

Figure 54:
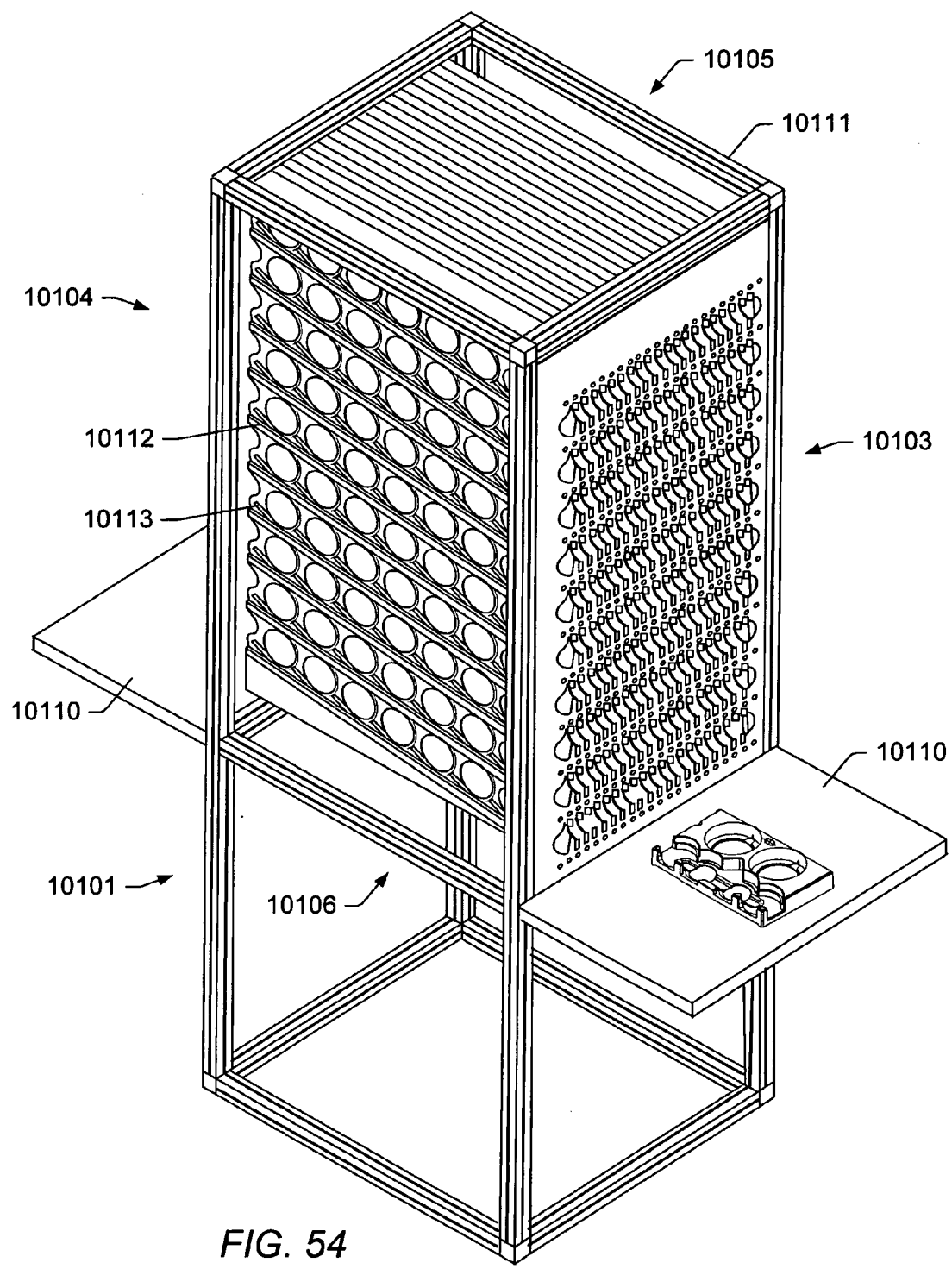
FIG. 54 depicts a perspective side view of an embodiment of a mold member storage array.

FIG. 54 depicts an embodiment of an eyeglass mold member storage array 10101. Storage array 10101 may facilitate the storage of a large number of mold members 10102. Storage array 10101 may include a body 10111 housing a plurality of mold member storage locations. Mold member storage array 10101 may be configured vertically (e.g., such that molds within the array are vertical), horizontally or at an angle. In an embodiment, mold members may be arranged on a plurality of shelves 10112. In an embodiment, shelves 10112 may be tilted toward the front of array 10103. For example, various embodiments may include shelves having any angle between and including horizontal and vertical. In such embodiments, mold member retaining devices and separating devices (as discussed below) may be appropriately configured to interact with mold members at the angle of the shelves. For example, an embodiment may include a shelf having an angle between about 5 degrees to about 15 degrees (e.g., 7 degrees). The angle of the shelf may be selected to enable mold members in the mold member storage location to advance under the influence of gravity. For example, physical dimensions of the separating devices (e.g., height, weight, stiffness, etc) may be selected to interact with mold members at the angle of the shelf. In an embodiment, mold member storage array 10101 may also include one or more work surfaces 10110. For example, a work surface may include a job tray staging area and/or a mold assembly area for assembling one or more selected mold members to form a lens. A work surface may also include a mold indexing area for aligning the axes of two or more selected molds appropriately to form a desired lens.

When the mold members stored are lens molds, as shown in FIG. 54, individual molds 10102 may be damaged if they are allowed to contact one another. To inhibit molds 10102 from contacting each other, separating devices 10113 may be coupled to the mold member storage array. Separating device 10113 (more clearly illustrated in FIG. 55) may include a variety of cams or other separating devices. Many different types and arrangements of separating devices may be used. FIGS. 55, 41A, 41B, 41C, and 41D depict several embodiments of separating devices, which may be suitable for use. Reference numerals 10202, 10203, 1861, and 1862 indicate rocking type cams. In general, a lens mold may roll over a rocking type cam as it advances toward the front of the mold member storage location. The back end of the cam 10209 may be heavier than front end 10208. Therefore, back end 10209 may normally be down. However, as a mold member approaches front end 10208 of the rocking type cam, the weight of the lens mold may push the front end of the cam down, pushing the back end up. Back end 10209 may block the next lens mold from advancing. A pivot member 10210 for a rocking type cam may be coupled to or formed on a shelf portion of a mold member storage location. Hinged cams (e.g., 1863 in FIG. 41C) and reciprocating cams (e.g., 1864 in FIG. 41D) may be linked to activating means. For example, a linking member under shelf 10112 may link the cams on a particular shelf together so that when one cam moves they all move. Thus, when a first cam is pushed down to allow the first lens mold on a shelf to be dispensed, all of the cams on that shelf may move out of the way to allow the lens molds to advance. As a mold member in a first mold member storage location advances across or over one or more separating devices, the position of the mold member relative to a second mold member storage location over the first mold member storage location may vary. To inhibit an advancing mold member from contacting the bottom surface 10211 of the second mold member storage location, bottom surface 10211 may be contoured. Contoured bottom surface 10211 may provide adequate clearance between the advancing mold member and the bottom surface of a mold member storage location above the mold member.

Figure 55:
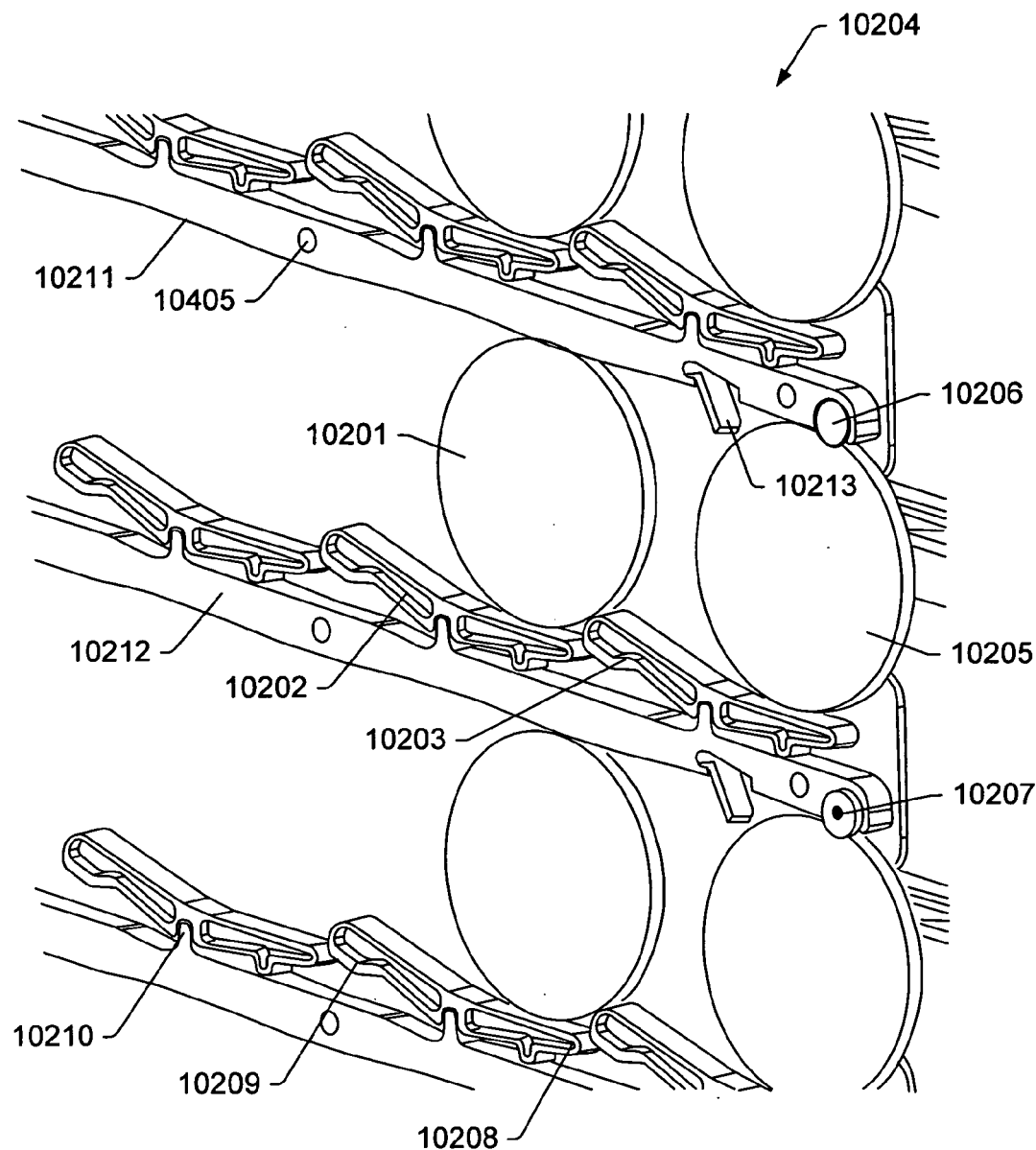
FIG. 55 depicts a detailed view of the dispensing end of the mold member storage panel depicted in FIG. 56 according to one embodiment.

FIG. 55 also depicts interaction of cams 10202 and 10203 with mold members 10201 and 10205. Within the mold member storage location, cam 10203 may prevent mold members 10201 and 10205 from contacting one another. At dispensing end 10204, a retaining device 10206 may retain mold member 10205 within the storage location. In some embodiments, retaining device 10206 may be coupled to cam 10203. For example, cam 10203 may have a design that includes a flexible upturned end, which may act to retain mold member 10205. In various embodiments, retaining device 10206 may include a resilient member that may be bent, flexed and/or compressed to allow mold member 10205 to be dispensed. Retaining device 10206 may be located such that the height or width of the dispensing end of the mold member storage location is reduced sufficiently to retain mold member 10205. In an embodiment, retaining device 10206 may include a sensor 10207. Sensor 10207 may detect dispensing of a mold member from the mold member storage location. If mold 10205 is removed for use, the separating devices 10203 may move to dispense the mold member 10205 and mold member 10201 may advance to the position previously occupied by mold member 10205. Similarly, subsequent mold members may advance until all of the mold members in the storage location are adjacent to one another. In an embodiment, the mold members advance under the influence of gravity. For example, the mold member storage location may be at an angle, as depicted in FIG. 54. However, it will be obvious to one of skill in the art that other urging means may also be used. For example, a spring mechanics may push the molds toward front end 10103, or a series of roller mechanisms may urge the molds toward front end 10103.

In an embodiment, a mold member storage location may include a roll back inhibitor 10213. Roll back inhibitor 10213 may inhibit the first mold member in a mold member storage location from moving backward into the storage system. For example, if the mold member is bumped while an operator is selecting an adjacent mold member, there may be a tendency for the mold member to be pushed backward. If the mold member were allowed to move backward into the storage system, it might contact another mold member causing damage to one of the mold members. Roll back inhibitor 10213 may restrict such backward motion. In an embodiment, roll back inhibitor 10213 may include a hinged member. The hinged member may be configured to move to allow an advancing mold member to move forward, but to inhibit the mold member from moving backward. In another embodiment, roll back inhibitor 10213 may include a resilient member. The resilient member may be configured to deform to allow an advancing mold member to move forward, but to inhibit the mold member from moving backward.

Once a mold member has been used and cleaned, it may be ready for storage. A mold member may be returned to storage by placing the mold member in a designated loading area. The loading area may be the same as the dispensing area, or it may be different. In an embodiment where the mold member is a lens mold, mold member storage array 10101 may be configured to allow the user to remove a desired mold from a first point. The array may further be configured to allow the user to restock the array at a second point. The second point may be on the opposite side of the array from the first point, or it may be on a side adjacent to the side of first point. For example, the first point may coincide with front end 10103 of the array (as shown in FIG. 54). The second point may coincide with back end 10104 of the array. However, in certain embodiments, rather than being restocked from back end 10104 of the array, the array may be configured to allow restocking from top end 10105 of the array. For example, the mold member storage system may include a plurality of chutes that make up the mold member storage locations. The chutes may be oriented such that the mold members are dispensed from bottom end 10106 of the array and restocked at top end 10105 of the array. In each of these embodiments, separating devices 10113 may separate and secure returned molds in place automatically.

Figure 56:
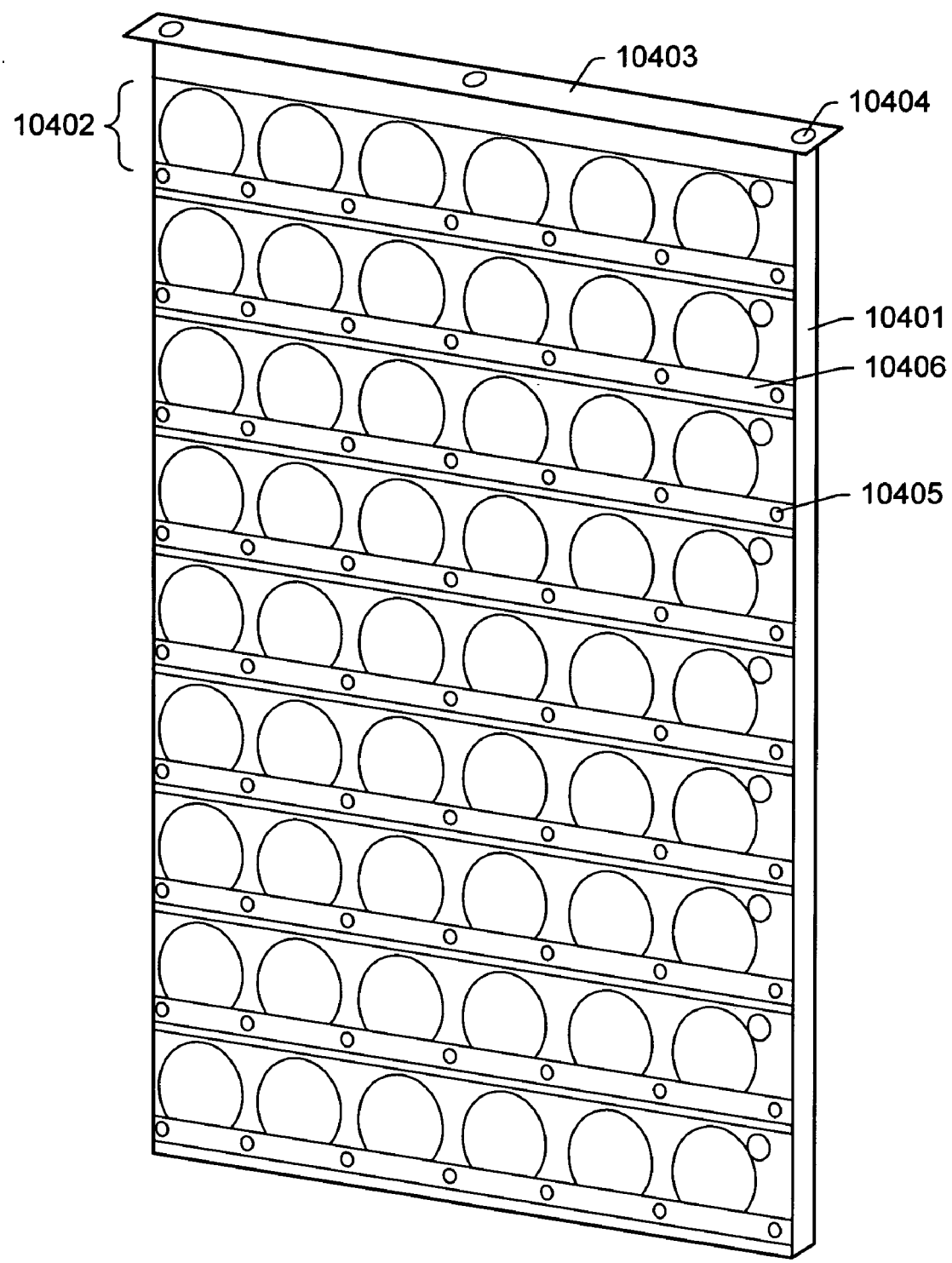
FIG. 56 depicts a perspective side view of an embodiment of a panel of a mold member storage array.

FIG. 56 depicts an exemplary embodiment of a plurality of mold member storage locations 10402 arranged on a panel 10401 of a mold member storage system. Mold member storage location 10402 may include a side wall 10406 opposite panel 10401. Side wall 10406 may retain mold members on the side of the mold member storage location opposite panel 10401. A plurality of panels 10401 may be housed in a mold member storage system body to form the array of mold member storage locations. An advantage of coupling mold member storage locations to panels may be that panels may be easily assembled in manufacturing and/or replaced for maintenance. Panel 10401 may be mounted in the body of a mold member storage system on one or more rails 10403. Panel 10401 may be attached to rail 10403 by fasteners, inter-engaging members and/or adhesives. Rails 10403 may include one or more support members 10404. Support members 10404 may be configured to engage portions of the body of the mold member storage system. For example, in an embodiment, support members 10404 may engage a slot or groove of the mold member storage system body. In an embodiment, support members 10404 may include rollers, bearing, or other sliding devices (e.g., polyethylene glides or TEFLON® (E. I. Du Pont De Nemours and Co., Wilimington, Del., U.S.A.) glides). In such an embodiment, slots may be arranged across the top of the body of the mold member storage system. Support members 10404 may have a T-shaped cross-section configured to engage the slots. For example, support member 10404 may include a fastener (e.g., a screw, a nail, a brad, a pin, a bolt, etc.) having a head portion wider than a shaft portion and having sufficient strength to safely support the panel when the mold member storage locations are full. In other embodiments, panels 10401 may be coupled to the body of the mold member storage system by other methods. For example, the panels may be directly fastened to the body, the rails may be directly fastened to the body, the panels may be support by hangers coupled to the body, or the panels may rest on supporting members coupled to the body.

In certain embodiments, mold member storage locations may be coupled to panel 10401 using one or more fasteners 10405. Fasteners 10405 may include threaded members (e.g., screws, bolts, etc.), inter-engaging members (e.g., nails, pins, clips, snaps, tenons, projections, etc.), deformable members (e.g., rivets, cotter pins, etc.) chemical or physical bonds (e.g., welds, adhesives, etc.), or combinations thereof. In an embodiment, one or more of fasteners 10405 may be formed of a material selected to minimize damage to mold members if a mold member should happen to contact a fastener. For example, one or more fasteners may be formed of a plastic material. Likewise, other mold member storage system components may be formed of materials selected to minimize damage to mold members due to unintended contact.

Figure 57:
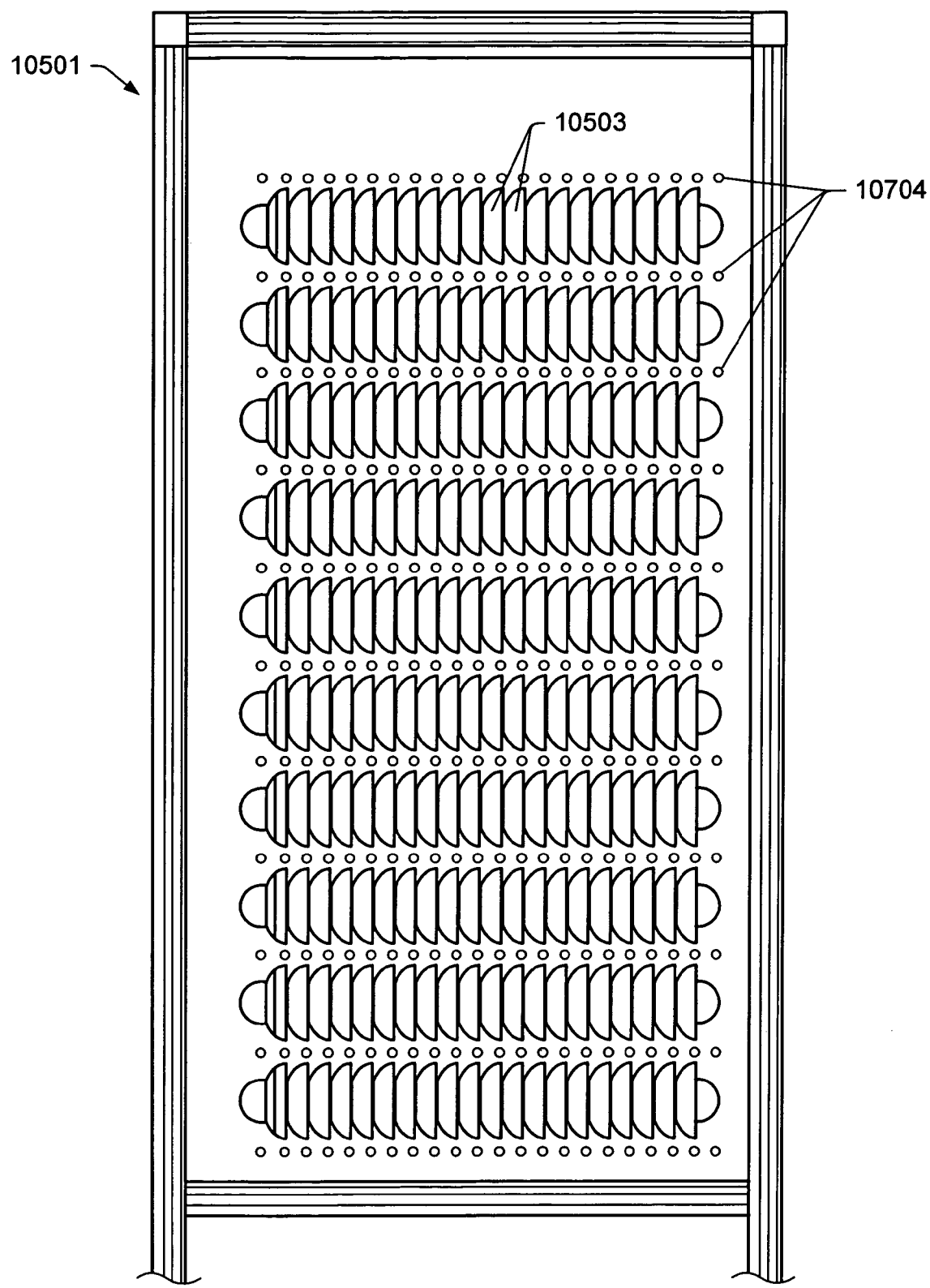
FIG. 57 depicts a front view of an embodiment of an end panel of a mold member storage array.
Figure 58:
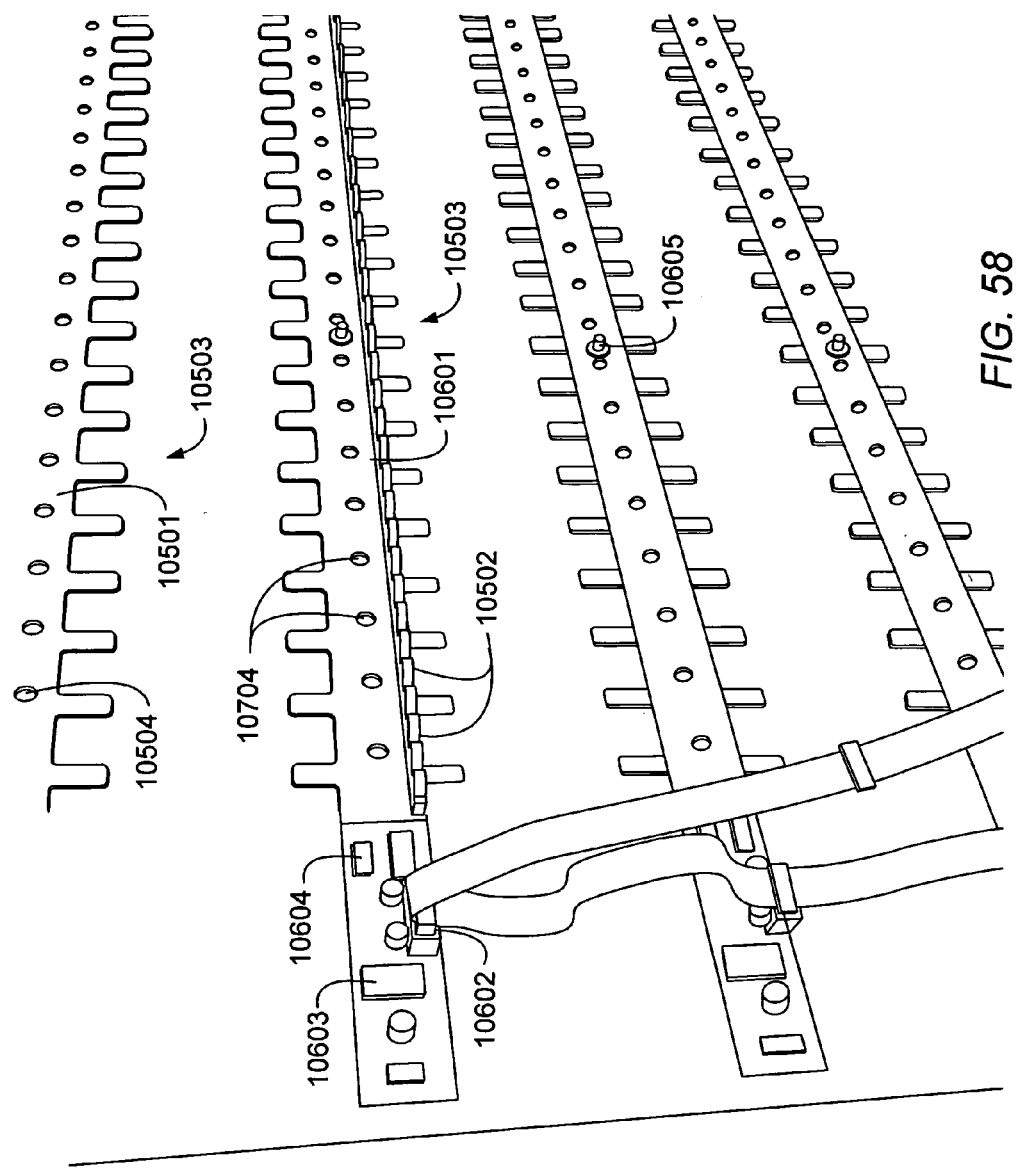
FIG. 58 depicts a perspective view of the back of an embodiment of an end panel of a mold member storage array.

In an embodiment, a mold member storage system may include one or more end panels 10501 as depicted in FIG. 57. End panel 10501 may include openings 10503 to provide access to one or more mold member storage locations. Additionally, in some embodiments, indicators 10704 may be coupled to end panel 10501. In such embodiments, indicators 10704 may face toward the outside of the mold member storage system. For example, openings 10504 (as shown in FIG. 58) may be provided in end panel 10501 to receive indicators 10704. Alternately, one or more indicators 10704 may be directed inwardly (e.g., to illuminate a portion of the interior of an adjacent mold member storage location). One or more spacers 10502 may be coupled to end panel 10501 to align openings 10503 and/or indicators 10704 with mold member storage locations. Spacers 10502 may also maintain desired spacing between mold member storage locations and/or panels coupled thereto. In alternate embodiments, other methods of aligning mold member storage locations with end panels and/or maintaining spacing between panels or mold member storage locations may be used. For example, elongated members extending from panels and/or mold member storage locations may engage portions of an end panel, or visa versa. In an embodiment, end panel 10501 may be coupled to the body of a mold member storage array using coupling devices 10605. In other embodiments, other coupling means may be used. For example, threaded members, inter-engaging members, deformable members, chemical or physical bonds, or combinations thereof, may be used.

In an embodiment, indicators 10704 may be coupled to one or more circuit boards 10601, as depicted in FIG. 58. Circuit board 10601 may include at least one electrical and/or communications connection 10602 for coupling circuit board 10601 to a controller and/or power supply. In an embodiment, circuit board 10601 may include a microprocessor 10603 and/or addressing switches 10604. Microprocessor 10603 and addressing switches 10604 may be used to associate each indicator on circuit board 10601 with a particular mold member type. For example, each circuit board of a mold member storage system may be assigned a unique address using addressing switches 10604. Individual indicators 10704 may be assigned addresses on the circuit board. Microprocessor 10603 may receive an activation signal from a controller. Microprocessor 10603 may determine based on the position of the addressing switches whether the activation signal is addressed to the microprocessor's circuit board. If it is, microprocessor 10603 may determine which indicator or indicators 10704 to activate. Additionally, microprocessor 10603 may determine based on the activation signal how to activate one or more indicators 10704. For example, in an embodiment where indicators 10704 include lights, an indicator may be activated to produce a steady light, a flashing light and/or a light of two or more different colors.

Figure 59:
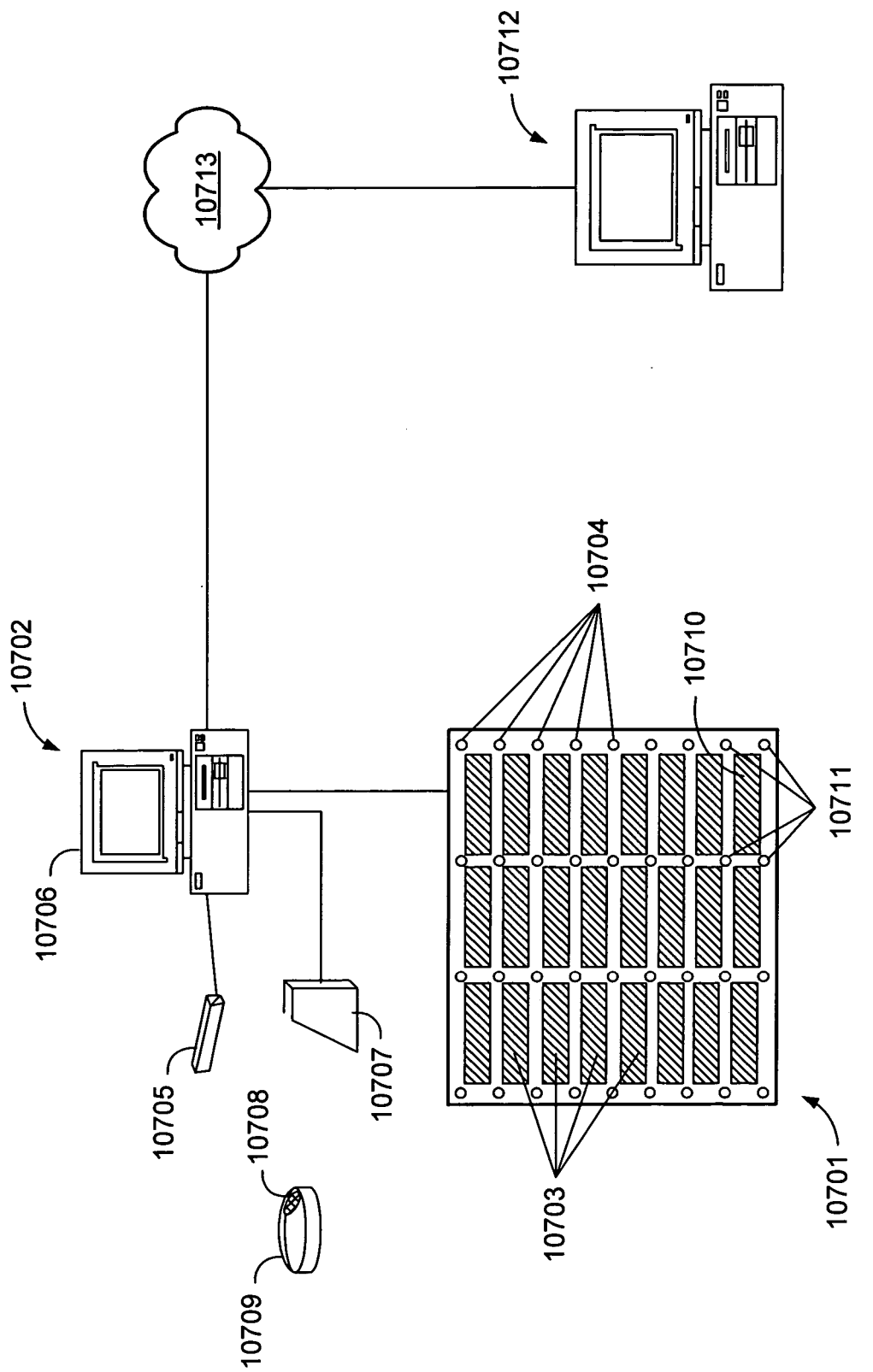
FIG. 59 depicts a schematic view of an embodiment of an eyeglass mold member storage system coupled to another computer via a network.

FIG. 59 depicts an embodiment of an eyeglass mold member storage system including a mold member storage array 10701 coupled to controller 10702. In an embodiment, controller 10702 may include a computer and/or and application specific integrated circuit. Controller 10702 may be coupled to mold member storage array 10701 via an interface connection (e.g., a serial interface, etc.) Mold member storage array 10701 may include a plurality of mold member storage locations 10703. Indicators 10704 may be arranged proximate each mold member storage location 10703. For example, in the embodiment depicted in FIG. 59, four indicators 10704 surround each mold member storage location 10703 with adjacent storage locations sharing the indicators between them. Controller 10702 may be configured to produce an activation signal to activate one or more indicators 10704. For example, in the embodiment depicted in FIG. 59, to direct a user to select a mold member in mold member storage location 10710, controller 10702 may activate indicators 10711.

Controller 10702, may be configured to interact with an operator. The controller may include at least one input device 10705 and at least one output device 10706. Input device 10705 may include a keyboard (e.g., a full computer keyboard or a modified keyboard), a light sensitive pad, a mouse, a touch sensitive pad, a light based code reader (e.g., a bar code scanner), a microphone, or another appropriate input device. Output device 10706 or devices may include a display screen, a voice synthesizer, or another suitable output device. In an embodiment, input device 10705 and output device 10706 may be combined in a single device. For example, a touch-sensitive screen (also called a "touch screen") may act as both input device 10705 and output device 10706. An operator may interact with controller 10702 to determine a mold member storage location associated with a desired mold member or a mold member to be stored. For example, in an embodiment, a bar code scanner coupled to controller 10702 may be used by the operator to scan a job ticket on a mold assembly holder. Controller 10702 or a computer 10712 coupled to the controller via a network 10713 may be configured to determine one or more mold members appropriate for use in forming one or more lenses associated with the job ticket. Controller 10702 may also be configured to determine a mold member storage location designated for storage of a determined mold member. Likewise, when a mold member 10709 is ready to be placed in storage, the operator may scan the mold member with a mold reader 10707. Controller 10702 may be configured to determine a mold member storage location designated for storage of the mold member.

A controller may be configured to search a database of eyeglass lens information using job ticket information as described above (e.g., job number, bar code, etc.). For example, the controller may search a first database with a job number to determine information representative of an eyeglass lens order associated with the job. In addition, the controller may use the determined information representative of an eyeglass order to search a second database. Results of searching the database may include any of the information representative of an eyeglass lens order as described above. For example, results of searching the database may include a job number, a patient name, a mold assembly holder number, a priority, a bin location, a lens location (i.e., left lens or right lens), a lens type, a monomer type and/or tint, a spherical power, a cylindrical power, axis, an add power, curing conditions. In addition, the controller may be configured to at least temporarily store the information in a memory coupled to the controller.

Controller 10702 may be configured to send a determined front mold member identity and a determined back mold member identity to mold member storage array 10701. Additionally, the location of front and back mold members may be determined by the controller. The mold member storage system may also be configured to display an indication of the location of a mold member to a user. The indication may be a visual and/or audible signal suitable for detection by a user. The mold member storage system may be configured to generate and/or display multiple indications sequentially (e.g., one mold at a time). As such, an indicator may direct a user to an appropriate mold member. The user may remove the appropriate mold member from the mold member storage system and may assemble an eyeglass lens mold in a mold assembly holder. Assembly of the eyeglass lens mold may also include filling a space between two mold members with a lens forming composition.

As used herein, a "light based code reader" refers to a device configured to detect light patterns, particularly light patterns formed by illumination of a data code. A light based code reader may include a light detection device and a light source. As used herein, a "data code" generally refers to a machine-readable mark or pattern. In various embodiments, a data code may include but is not limited to: a bar code, a matrix data code and/or human readable text. As used herein, a "bar code" refers to a data code formed by a series of lines. Data in a bar code may be represented by bars alternating with blank spaces. The bars and blank spaces may have various widths and/or frequencies to encode the data. As used herein, a "matrix data code" refers to a data code formed by a series of data elements arranged in a matrix. For example, a matrix data code may refer to a two-dimension matrix code. A matrix data code may include one or more data elements arranged in a substantially blank field to encode the data. Data may be encoded in the data elements based on the size, shape and/or arrangement of the data elements.

A mold reader 10707 may be coupled to controller 10702 to ease inputting data pertaining to mold member 10709. In an embodiment, mold members may be marked for identification as described in further detail below. Identifying mark 10708 may include, but is not limited to: a symbol, a data code, a human readable code, or text. Mold reader 10707 may be configured to read an identifying mark 10708 of mold member 10709.

Figure 60A:
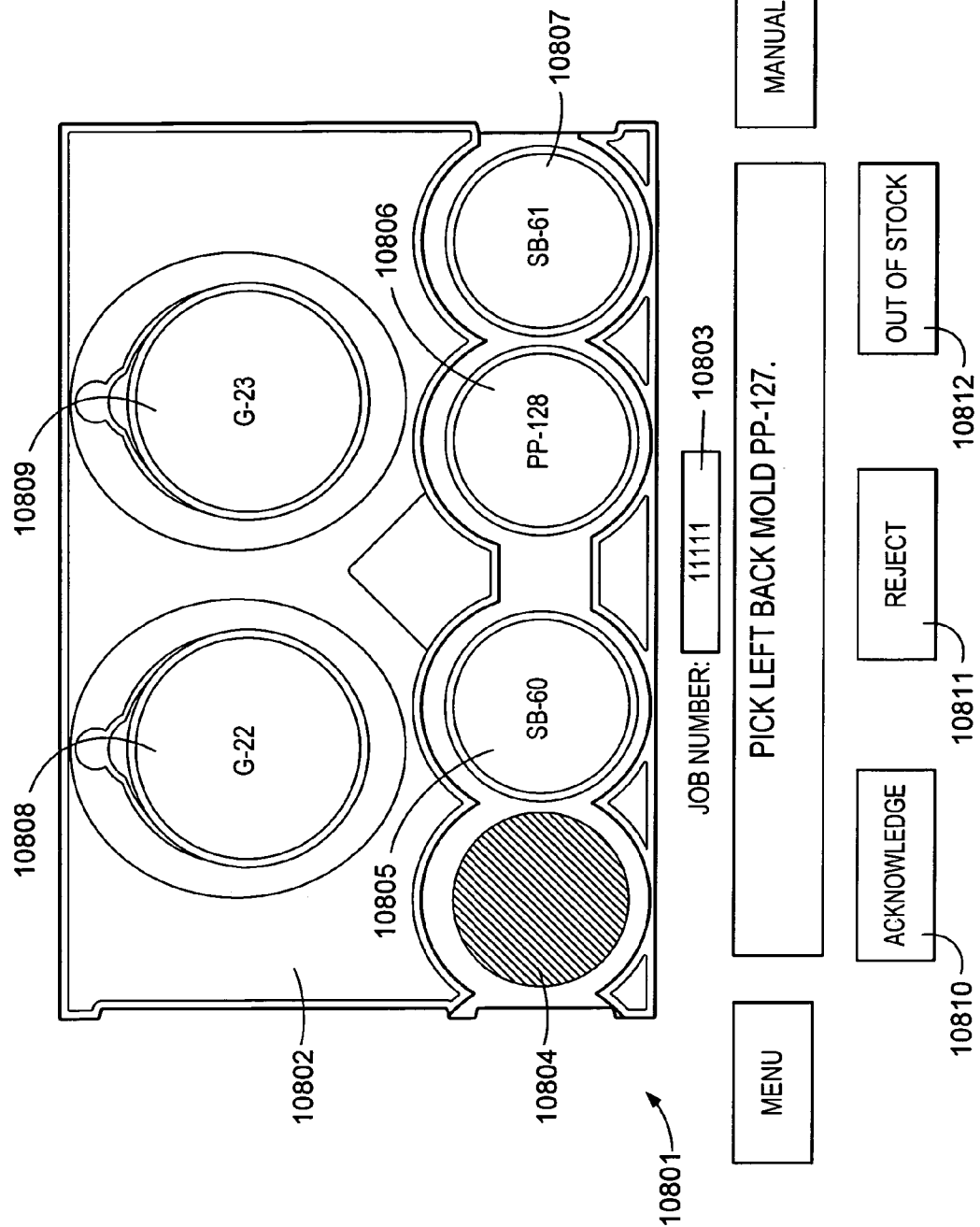
FIG. 60A depicts an embodiment of a mold member selection graphical display during a selection process.
Figure 60B:
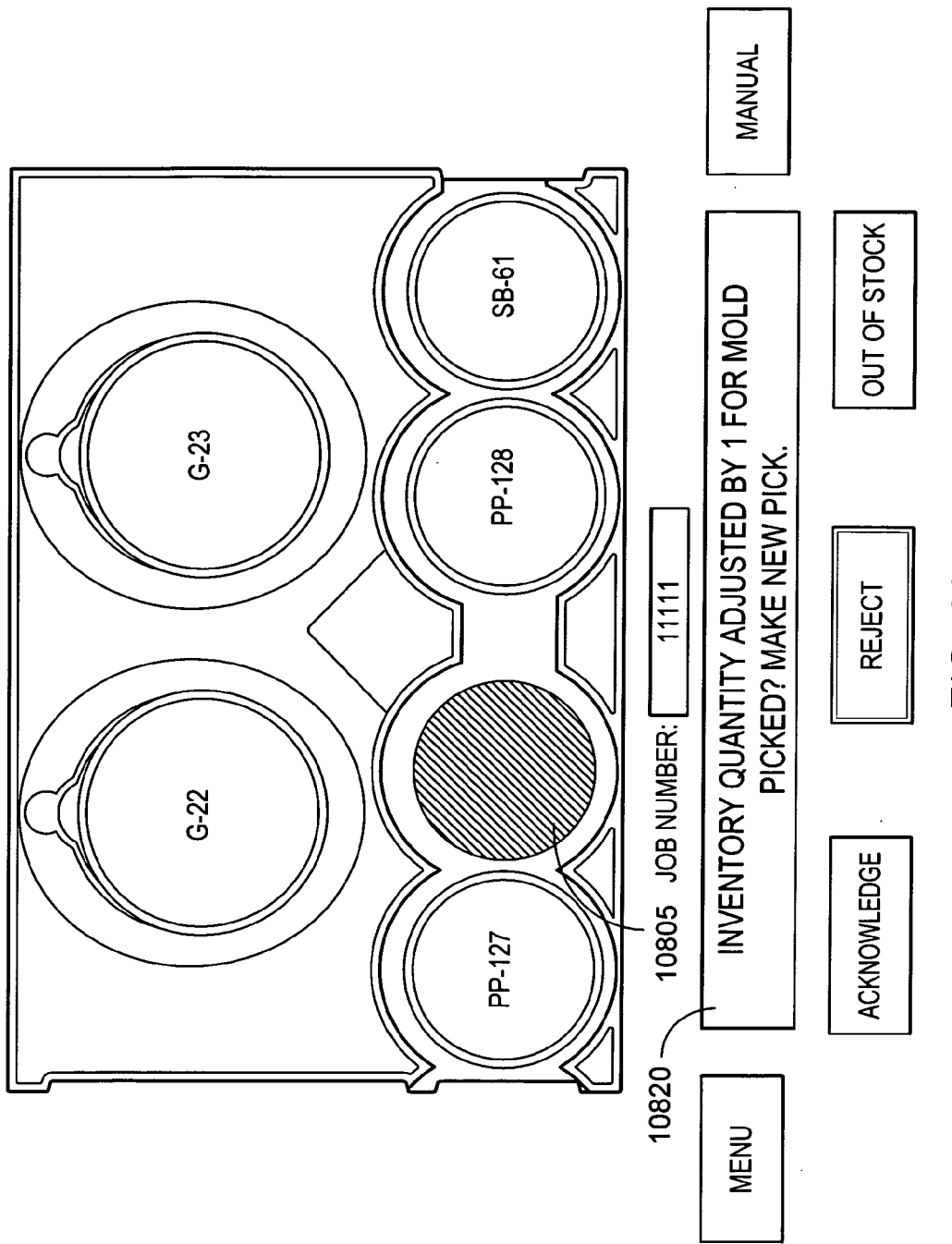
FIG. 60B depicts an embodiment of a mold member selection display after a mold member has been rejected.
Figure 60C:
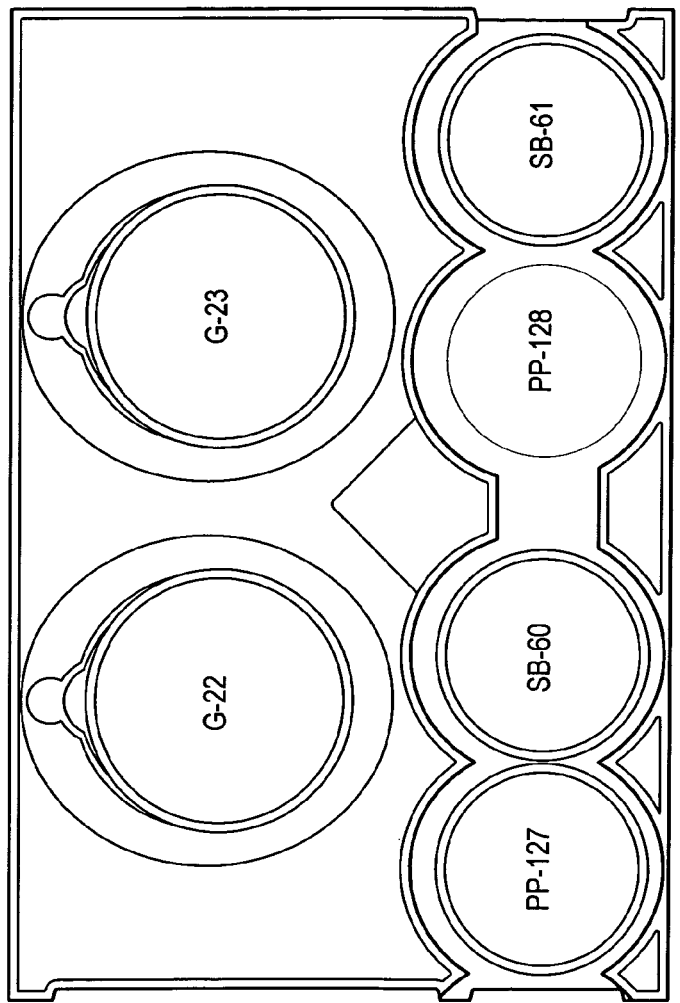
FIG. 60C depicts an embodiment of a mold member selection display when a desired mold member is not available.
Figure 60D:
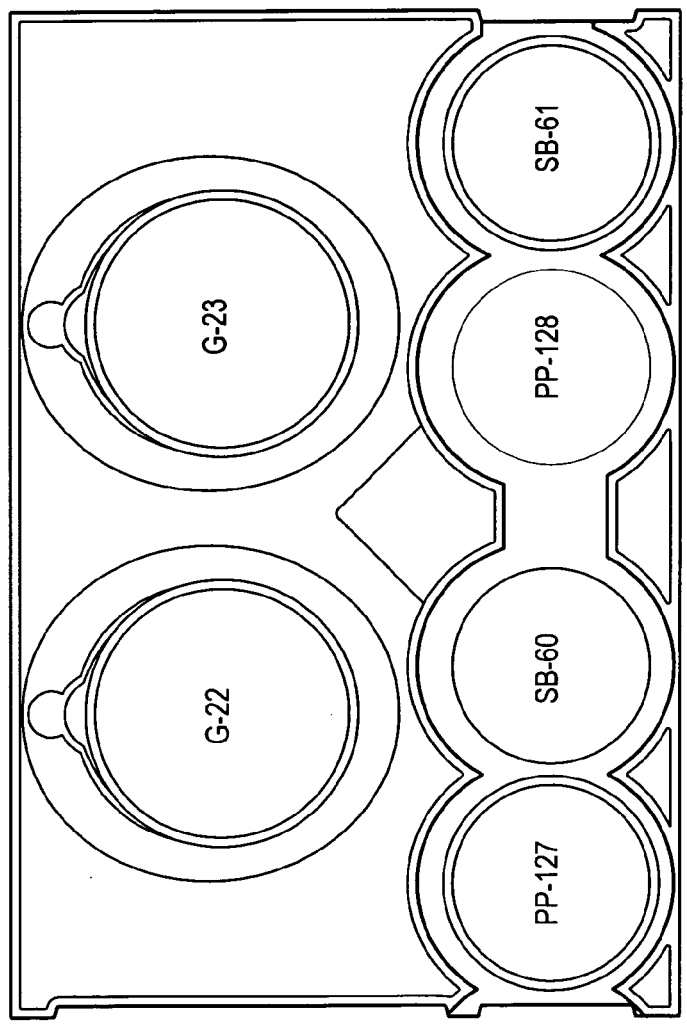
FIG. 60D depicts an embodiment of a mold member selection display indicating that mold members needed for an on-hold job are available.
Figure 60E:
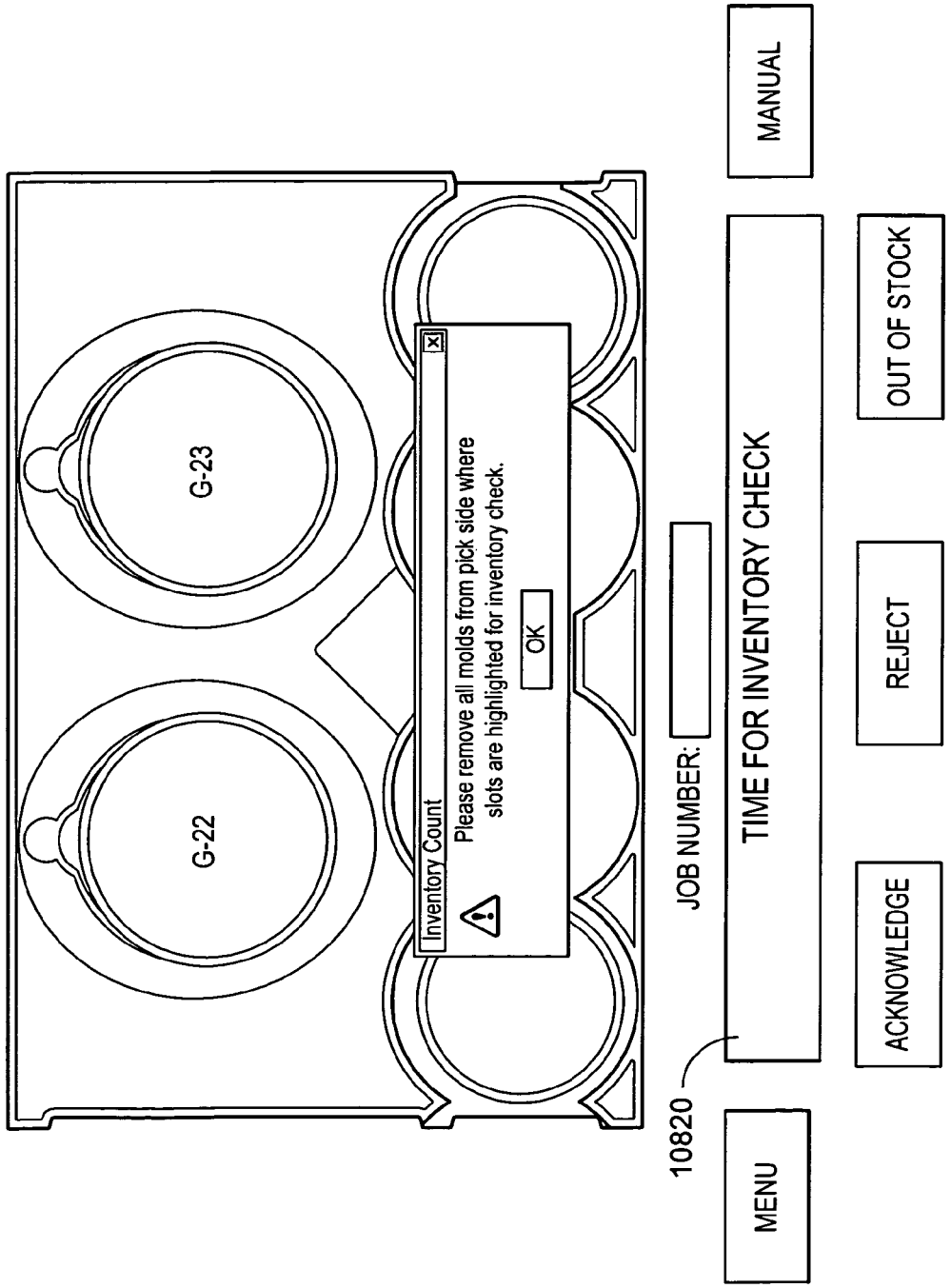
FIG. 60E depicts an embodiment of a mold member selection display initiating a re-inventory process.

In an embodiment, an eyeglass mold member storage system controller may be configured to interact with an operator identifying, selecting, inventorying and/or storing mold members in a mold member storage system. FIG. 60A depicts an exemplary embodiment of a mold member selection graphical display 10801. Display 10801 may be provided to an operator by a controller as part of a mold member selection process. In an embodiment, an operator may identify a job, for example, by scanning a job ticket or entering a job number. The controller may determine one or more mold members appropriate to form one or more lenses associated with the identified job. Display 10801 may include a graphical representation of a mold assembly tray 10802. Mold assembly tray representation 10802 may include fields and/or graphical representations of mold members determined to be appropriate to form one or more lenses associated with a job. For example, as depicted in FIG. 60A, for hypothetical job number 1111 (10803) a left lens may be formed using a back mold (10804) of type "PP-127," a front mold (10805) of type "SB-60" and a gasket (10808) of type "G-22." Likewise, a right lens may be formed using a back mold (10806) of type "PP-128," a front mold (10807) of type "SB-61" and a gasket (10809) of type "G-23." Display 10801 may also include mechanisms to allow the operator to indicate a status of one or more mold members during the selection process. A current mold member to be selected may be highlighted in the display (e.g., mold 10804 in FIG. 60A). The operator may search for a mold member of the current mold member type. If a mold of the current mold member type is available, the operator may select and inspect the mold to determine if the mold is usable. If the mold is usable, the operator may acknowledge the selection of the mold by using "Acknowledge" button 10810. If the selected mold is unusable, the operator may indicate this status using "Reject" button 10811. If no mold of the current mold member type is available, the operator may indicate this status using "Out of Stock" button 10812. If a mold member selection is acknowledged, display 10801 may be altered to reflect a new current mold member to be selected. For example, as depicted in FIG. 60B, left front mold 10805 may be the new current mold member. If a selected mold member is rejected, a message may be displayed to the operator in message display area 10820 indicating that the operator should select another mold member of the same type. If no molds of the desired type are available, display area 10820 of display 10801 may direct the operator to place the job on hold, as depicted in FIG. 60C. If sometime after a job has been placed on hold it is determined that all of the mold members needed to complete a job are now available, display area 10820 of display 10801 may indicate the operator that the molds are available and request that the operator process the job, as depicted in FIG. 60D. Display 10801 may also be used to indicate to the operator when a manual inventory of one or more mold member types should be completed, as depicted in display area 10820 of FIG. 60E. For example, the manual inventory may be part of a re-inventory process as discussed further below.

Figure 61:
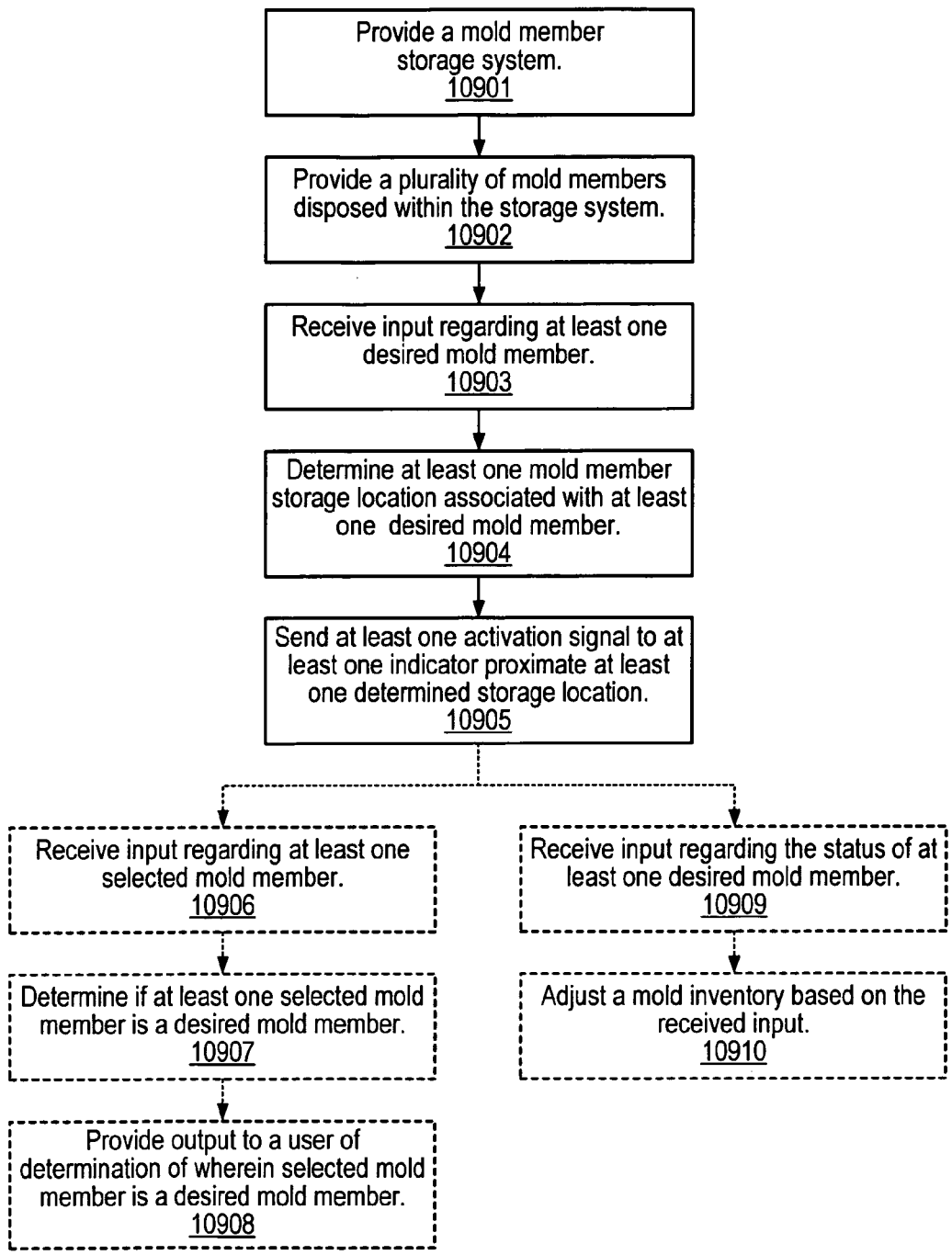
FIG. 61 depicts a flowchart of a method of identifying a mold member according to one embodiment.

FIG. 61 depicts a flowchart of an exemplary embodiment of a computer-implemented method of identifying a mold member. A mold member storage system and plurality of mold members may be provided as indicated by boxes 10901 and 10902, respectively. Input may be received regarding at least one desired mold member at box 10903. For example, the input received may include a mold member identification, a job number, a data code of a job ticket and/or an eyeglass lens prescription. In an embodiment, the input received may include an identification of a job. The identified job may be associated with eyeglass lens information. In such an embodiment, a desired mold member may include a mold member appropriate to form at least one lens substantially conforming to the eyeglass lens information. At least one mold member storage location associated with a desired mold member may be determined, as indicated at box 10904. At least one activation signal may be sent to at least one indicator proximate at least one determined storage location at 10905. For example, in an embodiment, an activation signal may be sent from a controller to the eyeglass mold member storage system to activate a plurality of indicators around a mold member storage location associated with a desired mold member. In an embodiment, the activation signal sent may determine how one or more indicators are activated. For example, if the indicators are lights, the activation signal sent may determine whether the activated indicators produce a steady light or a flashing light. Alternately, the indicators may include lights configured to produce a plurality of different colors of light. In such a case, the activation signal sent may determine the color of light produced by one or more indicators. An advantage of providing different activation signals may be that indicators activated in different ways may mean different things to an operator. For example, a red light produced by an indicator may mean that the mold indicated is for use in forming the right lens. In another example, a flashing indicator may indicate a back mold. The operator may select a mold member from a mold member storage location proximate an activated indicator.

Optionally, in an embodiment, the method may also include a mold selection confirmation process. For example, in an embodiment, the method may include receiving input from the operator after sending the activation signal. In an embodiment, the method may include receiving input from the operator regarding a selected mold member, as shown at box 10906. For example, the operator may provide information identifying the selected mold member (e.g., a data code). The mold selection confirmation process may include determining if the selected mold member corresponds to a desired mold member at box 10907. The mold selection confirmation process may provide output to the operator confirming or rejecting the selected mold member at box 10908 based on the determination of box 10907.

In an embodiment, the method may optionally include a mold member inventory process. A mold member inventory process may include receiving input from the operator regarding the status of at least one desired mold member at box 10909. For example, as previously discussed, the operator may acknowledge selection of a desired mold member, reject a selected desired mold member, or indicate that a desired mold member is not in stock. At box 10910, the mold member inventory process may adjust a mold member inventory based on the input received. Mold member inventory processes are discussed further below. After selection of one or more mold members, one or more lens may be formed using the selected mold members.

Figure 62:
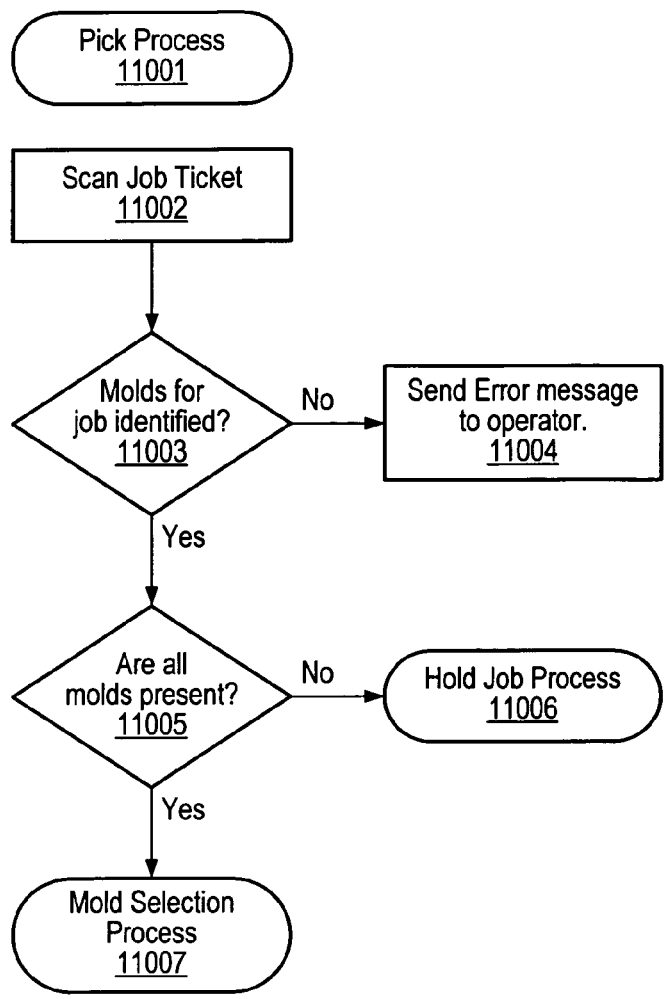
FIG. 62 depicts a flowchart of a pick process of a mold member inventory method according to one embodiment.

FIG. 62 depicts an embodiment of a flow chart of a mold inventory method. As used herein, the method depicted in FIG. 62 may be referred to as a "pick process" as shown in box 11001. Pick process 11001 may include receiving input regarding one or more desired mold members. For example, as depicted in box 11002, a job ticket associated with a job may be scanned. The pick process may include determining if mold members appropriate to form all of the lenses associated with the job are identified, as depicted in box 11003. Mold members may not be identified because they do not exist in the mold library in use. They may also not be identified because of a data error. For example, the data related to one or more desired mold members might have been incorrectly entered. If the mold members are not identified, an error message may be sent to the operator, at box 11004. For example, a mold member selection graphical display, as previously discussed, may provide the error message to the operator. If all of the mold members are identified, the pick process may determine if all of the mold members are available, at box 11005. For example, an expected number of mold members in the eyeglass mold member storage system may be checked to see if at least one mold of each desired mold member type is expected to be available. The expected number of mold members may be based on a physical inventory. If at least one mold member of at least one desired mold member type is not available, the pick process may initiate a hold job process, as depicted in box 11006. If at least one mold member of each mold member type is determined to be available, the pick process may initiate a mold selection process, as depicted in box 11007.

Figure 63:
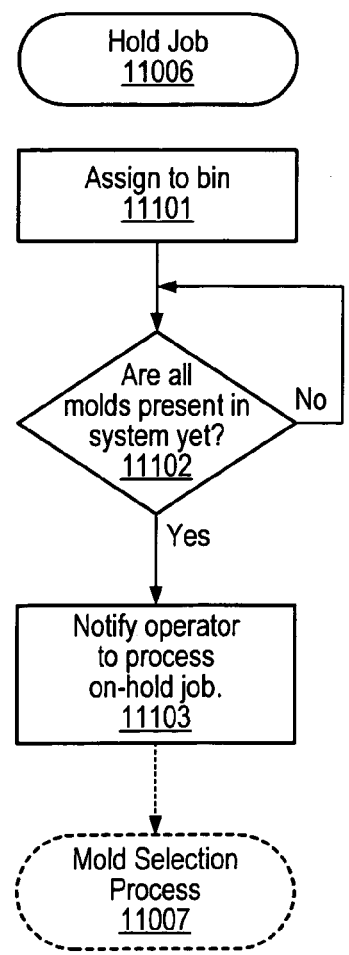
FIG. 63 depicts a flowchart of a hold job process of a mold member inventory method according to one embodiment.

FIG. 63 depicts an embodiment of a flow chart of a mold inventory method. As used herein, the method depicted in FIG. 63 may be referred to as a "hold job process," as shown in box 11006. In an embodiment, a hold job process may be initiated if one or more mold members needed to complete a job are not available in a mold member storage system. By placing the hold job process before the physical selection of mold members, it is believed that problems such as mold member stock out may be avoided.

As used herein, mold member "stock out" refers to a condition in which one or more molds needed to complete a job are not available in a mold member storage system because the needed mold(s) are in a job holding area. Stock out conditions may be particularly troublesome in high volume lens manufacturing environments. For example, mold member stock out may occur when an operator begins selecting mold members to complete a first job without determining beforehand if all needed mold members are available. The operator may, for example, select first, second, and third mold members and place them in a mold assembly tray for processing. The operator may then determine that a fourth mold member needed to complete the first job is out of stock. The operator may place the mold assembly tray into a holding area until it is determined that the fourth mold member is available. Due to the high volume nature of the operation, the operator may not take time to restock the first, second and third mold members, which have already been selected since they will have to be selected again to complete the first job. Later, the operator may begin selecting mold members for a second job. The second job may require fifth, sixth, first and seventh mold members. After selecting the fifth and sixth mold members, the operator may determine that the first mold member is out of stock in the mold member storage system. In fact, at least one first mold member is available for use, but is in the holding area in the mold assembly tray for the first job. The second job may therefore be placed on hold pending availability of all of the required mold members. Similarly, the operator may select mold members for other jobs only to discover that one or more mold members are not in stock in the mold member storage system. At least a portion of these "out of stock" mold members may actually be associated with on hold jobs. Thus, as more jobs are placed on hold due to unavailability of one or more mold members, more mold members may be taken out of stock and put into the holding area. This causes even more molds to be out of stock. Eventually, a point may be reached where every job the operator tries to fill requires one or more out of stock mold members, leading to complete gridlock, or stock out.

Another advantage of a mold member inventory method may be prioritizing jobs. For example, when work is initiated on a job, a mold member inventory may be checked to determine if any mold member desired to complete the job is a high-usage mold member. Determining if a mold member is a high-usage mold member may include checking historical usage information, checking a user defined setting associated with the mold member type, and/or checking a listing of outstanding jobs. For example, if historical usage data indicates that a mold member of a desired mold member type has been used in more than a determined percentage of jobs, the mold member type may be considered high-usage. In another example, if a determined number of jobs on the outstanding job list require use of the desired mold member, it may be considered a high-usage mold member type. If one or more of the desired mold members is a high-usage mold member, the mold member inventory may be checked to see if a quantity of the desired mold members is available. For example, the current mold member inventory may be checked against the list of outstanding jobs. If the number of available mold members is determined to be insufficient to process the outstanding jobs in a timely fashion, the current job may be expedited.

In the embodiment depicted in FIG. 63, the hold process includes assigning an on-hold job to a holding bin, as shown in box 11101. The operator may place a mold assembly tray for the on-hold job in the appropriate holding bin. The method may include periodically determining whether all of the mold members for an on-hold job are available 11102. For example, the method may include determining whether all of the mold members needed to complete an on-hold job are available after each change in the expected number of mold members. In an embodiment, determination of the availability of mold members for two or more on-hold jobs may be conducted according in order of a priority assigned to the job. That is, on-hold jobs having a higher priority may be checked first for availability of mold members. In an alternate embodiment, determination of the availability of mold members for two or more on-hold jobs may be conducted according to a first-in-first-out order. Thus, jobs that have been on-hold longer may be checked first for availability of mold members. If it is determined that all of the mold members needed to complete an on-hold job are present in the mold member storage system, the method may include notifying the operator to process the on-hold job, as depicted in box 11103. Optionally, processing the on-hold job may include referring the job to a mold selection process, as depicted in box 11007.

Figure 64:
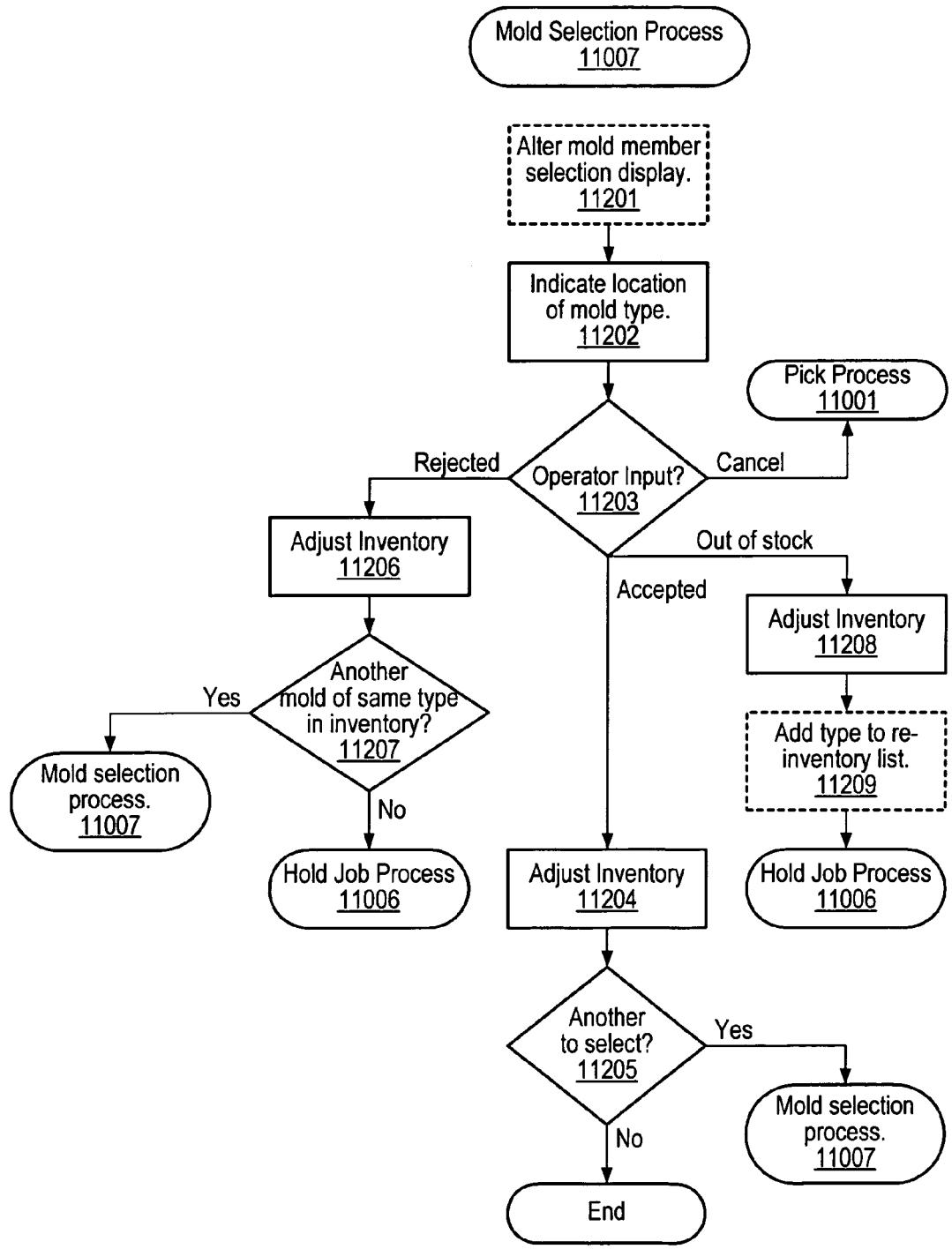
FIG. 64 depicts a flowchart of a mold member selection process of a mold member inventory method according to one embodiment.

FIG. 64 depicts an embodiment of a flow chart of a mold inventory method. As used herein, the method depicted in FIG. 64 may be referred to as a "mold selection process," as shown in box 11007. Optionally, a mold selection process may alter a mold member selection display to indicate to an operator which desired mold member is being selected, as shown in box 11201. For example, the mold member selection display may be a display as discussed with reference to FIGS. 60A, 60B, 60C, and 60D. The method may include indicating a mold member storage location associated with a desired mold member type, as depicted in box 11202. For example, one or more indicators proximate a mold member storage location associated with mold members of the desired mold member type may be activated. The method may receive input from an operator indicating the status of a desired mold member, as shown in box 11203. The operator may indicate that a desired mold member has be selected and accepted, that a desired mold member has been selected and rejected, or that no desired mold member is available. The operator may also elect to cancel the mold selection process. If the operator cancels the mold selection process, the method may return to a pick process as previously described.

To indicate that a desired mold member has been selected and accepted the operator may acknowledge the selection at box 11203. If the operator acknowledges the selection of a desired mold member, the method may include adjusting the mold member inventory, as shown in box 11204. For example, an expected number of molds of the desired mold member type may be reduced by one to account for the desired mold member removed from the mold member storage system. The method may also determine if another mold member should be selected to complete the current job, at box 11205. If no other mold members are needed, the process may end. If one or more other mold members are still needed in order to finish the job, the method may return to the start of the mold selection process 11007, to select the next mold member.

In some instances, a desired mold member may be removed from the mold member storage system then rejected. For example, after the mold member is removed from the mold member storage system, it may be inspected. Upon inspection, the operator may determine that the selected mold member is not fit for use. For example, the operator may determine that the selected mold member is damaged or dirty. In another example, the operator may determine that the selected mold member is not a mold member of the desired mold member type. If a desired mold member is rejected at box 11203, the method may include adjusting the mold member inventory, as shown in box 11206. For example, an expected number of available mold members may be reduced by one to account for the rejected mold member. The method may determine if another mold member of the desired mold member type is available, as shown in box 11207. If another mold member of the desired mold member type is available, the method may return to the beginning of the mold selection process to select the desired mold member. If no other mold member of the desired mold member type is available, the job may be placed on hold.

In some instances, an expected number of available mold members may indicate that at least one mold member of the desired mold member type is available. However, when the operator goes to remove one of the desired mold members from the mold member storage system, the operator may find that the desired mold member type is out of stock. Such an instance may occur if an expected number of mold members in the mold member storage system does not match an actual number of mold members available in the mold member storage system. For example, an operator placing molds into the mold member storage system may have incorrectly identified or incorrectly stored a mold member in the storage system. Another instance in which an out of stock situation might occur is if an operator placing mold members in the mold member storage system indicated that a mold was being placed into the mold member storage system then failed to place the mold member in the storage system. For example, the operator may have indicated that the mold member was being placed in the storage system and then dropped or otherwise damaged the mold member before placing the mold member in the storage system. If the operator selecting a mold members of the desired mold member types determines that no mold of the desired mold member type is available, the operator may indicate an "out of stock" situation at box 11203. The process may adjust the inventory of the desired mold member type at box 11208. In an embodiment, the expected number of mold members of the desired mold member type may be set to zero. In some embodiments, the method may also include adding the out of stock mold member type to a re-inventory list, at box 11209. The re-inventory list may be used as described in further detail below. The method may further include placing the job on hold.

Figure 65:
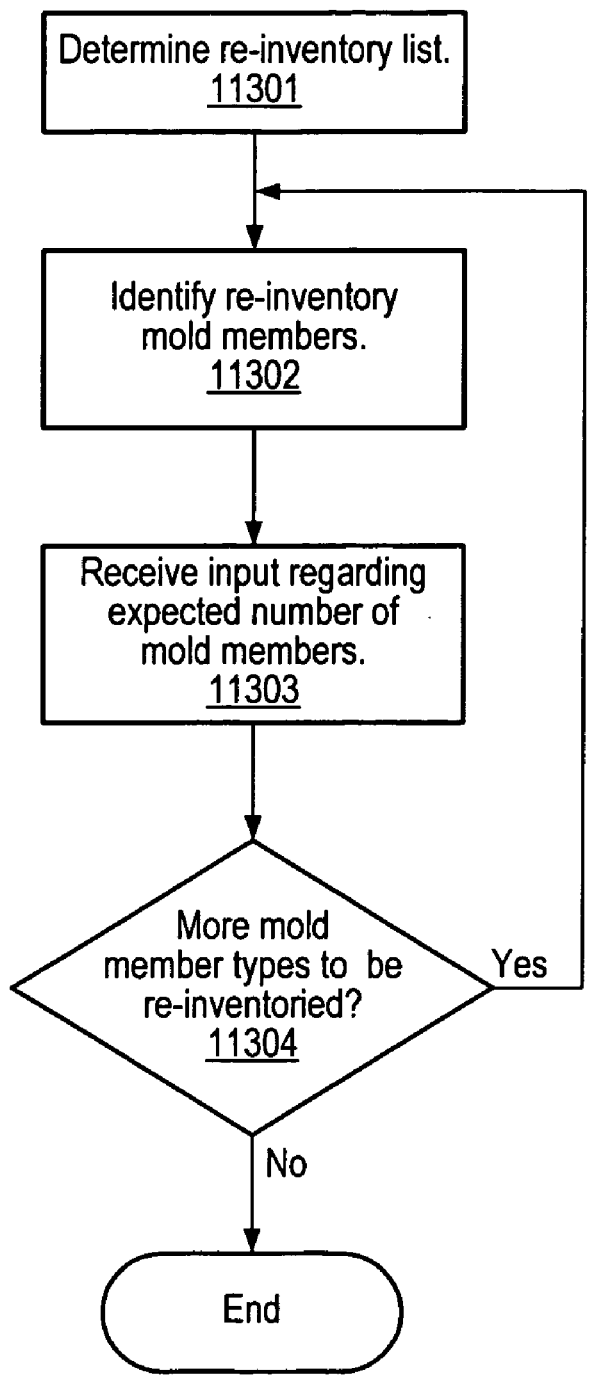
FIG. 65 depicts a flowchart of a method of updating a mold member inventory according to one embodiment.

A mold member inventory may be initiated by setting an expected number of mold members of each mold member type in the mold member storage system equal to the actual number of mold members of the mold member type in the mold member storage system. For example, a hand count of each mold member type may be used to establish the expected number of mold members. Once a mold member inventory has been initiated, it may be updated periodically by mold member inventory methods as described above. The mold member inventory may also be periodically checked. FIG. 65 depicts an exemplary embodiment of a method of updating a mold member inventory. The method may include determining a re-inventory list, box 11301. In an embodiment, a re-inventory list may be determined on a periodic basis. For example, a re-inventory list may be determined at the start of each work shift. The re-inventory list may identify one or more mold member types to be counted to verify or reset the expected number of mold members in the mold member inventory. In an embodiment, a re-inventory list may be determined such that all of the mold member types in the mold member storage system are recounted on a periodic basis. Additionally, in some embodiments, mold member types that have had an out of stock status during a mold member selection process may be put on the re-inventory list. The method may also include identifying one or more mold member types to be counted, as shown in box 11302. One more mold members types to be counted may be identified in a number of ways. For example, in an embodiment, all or part of the re-inventory list may be provided to an operator. The operator may then find mold member storage locations associated with the identified mold member types. In another embodiment, one or more indicators proximate one or more storage locations associated with a mold member type on the re-inventory list may be activated. The method may also include receiving input from the operator regarding the actual number of mold members of a mold member type, as shown in box 11303. In an embodiment, the operator may count all of the mold members of a mold member type on the re-inventory list and enter the total number of mold members present. In another embodiment, the operator may remove all of the mold members from one or more mold member storage locations associated with a mold member type on the re-inventory list. When all of the mold members have been removed, the expected number of mold members may be set to zero. The operator may then go through a method of storing a mold member in an eyeglass mold member storage system as discussed below to place the mold members back in the eyeglass mold member storage system. The restocking process may include updating the expected number of mold members 11303. The method may further include determining if there are more mold member types to be inventoried, at box 11304.

Several embodiments of a lens mold coating apparatus are shown and described with reference to FIGS. 66A, 66B, 66C, 67A, 67B, and 68. In general, a lens mold coating apparatus be configured to apply one or more mold coating compositions to a lens mold. As used herein, a "mold coating composition" refers to a polymerizable composition used to form a coating layer on a lens mold. A lens mold coating apparatus may include a plurality of process units and at least one transport device. Operation of the process units and at least one transport device may be controlled by a controller. The plurality of process units may include at least one coating process unit and at least one curing process unit. In addition, the process units may include one or more cleaning process units. A transport device may include a rotation device. The rotation device may be configured to rotate a mold holder coupled thereto.

Figure 66A:
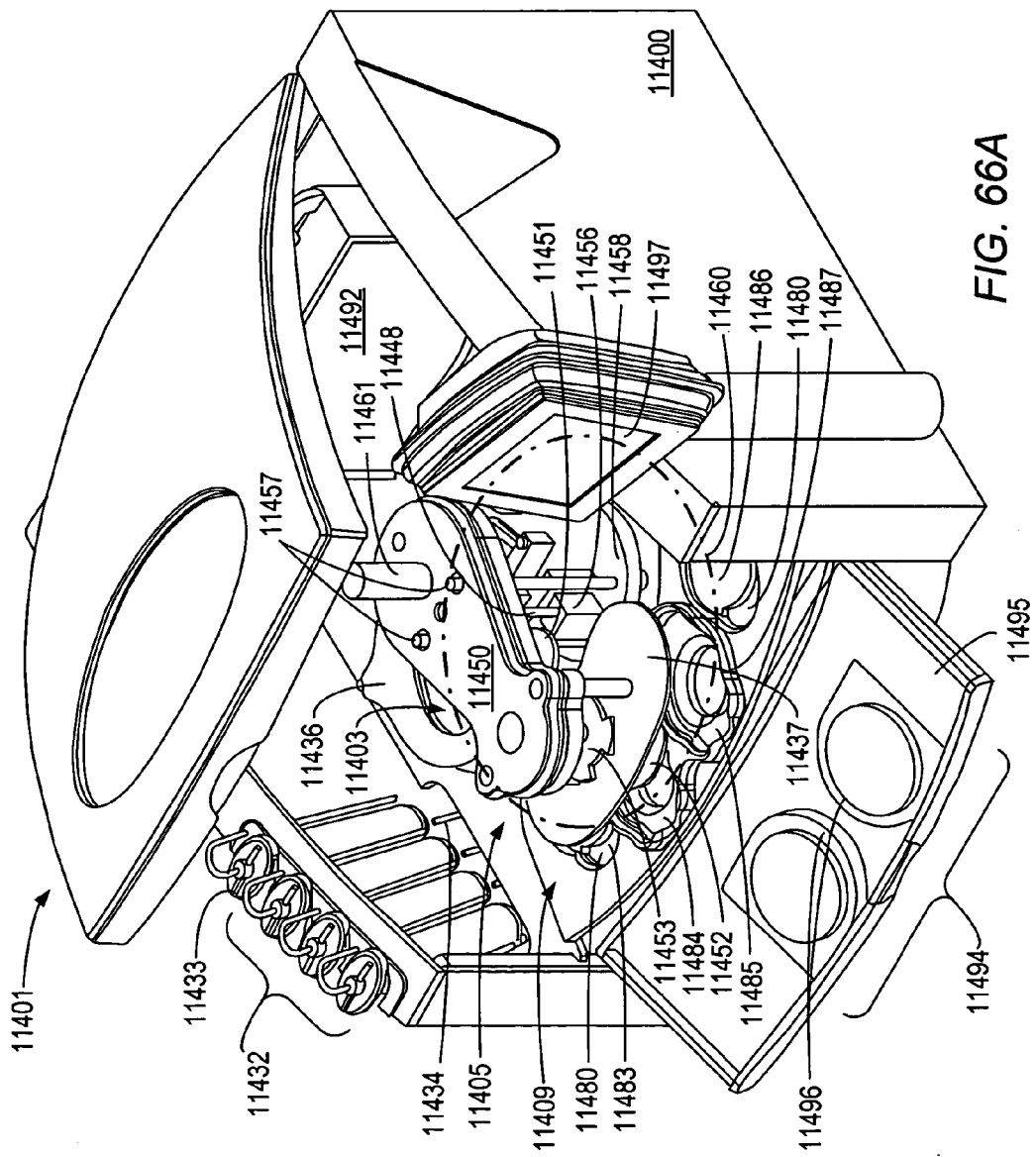
FIG. 66A depicts a perspective side view of a first embodiment of a lens mold coating apparatus.

Turning to FIG. 66A, a perspective side view of an embodiment of a mold coating apparatus is depicted, and generally referenced by numeral 11401. Mold coating apparatus 11401 includes a transport device 11405, a coating process unit 11403, and a curing process unit 11404 (see FIG. 66C). Additionally, mold coating apparatus 11401 may include a cleaning process unit 11402 (see FIG. 66C).

Transport device 11405 may include a body 11450 and at least one rotation device 11451 coupled to the body. Body 11450 may include one or more internal wire chases for routing wiring and/or air lines to rotation device 11451 and/or mold holder 11452. Additionally, external wire chase 11461 may provide access to the one or more internal wire chases. Mold holder 11452 may be directly, or indirectly, coupled to rotation device 11451. For example, mold holder 11452 may be directly coupled to a spindle or rotor of rotation device 11451. Alternately, mold holder 11452 may be indirectly coupled to rotation device 11451 through a system of gears or through a system of pulleys coupled by at least one flexible loop member (e.g., a belt, chain, wire, cable, rope, etc.). In an embodiment, mold holder 11452 may be configured to adhere to a non-casting face of a lens mold and to retain the lens mold during processing. For example, the lens mold holder may include a suction cup or a vacuum chuck. In an embodiment where lens mold holder 11452 includes a vacuum chuck, mold coating apparatus 11401 may include a vacuum pump (not shown).

Rotation device 11451 may be configured to rotate a lens mold disposed in mold holder 11452 during processing. In an embodiment, rotation device 11451 may include an electric motor. A sensor system associated with the rotation device may provide feedback information to a controller coupled to the mold coating apparatus. For example, the sensor system may include an encoder wheel 11453 and an encoder wheel sensor 11454 (shown in FIG. 66B). Encoder wheel sensor 11454 may be configured to sense the rotation rate of mold holder 11452.

Figure 66B:
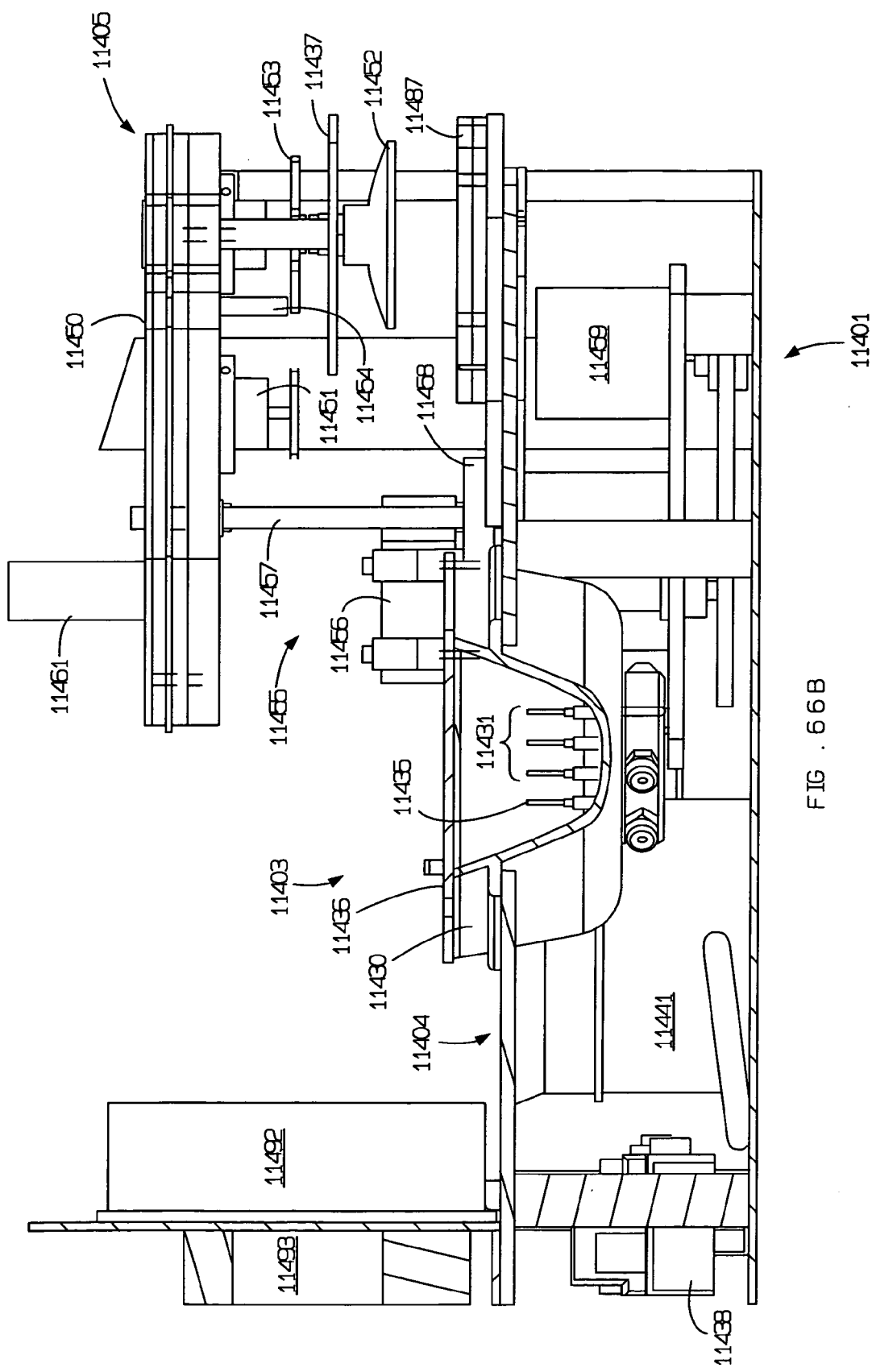
FIG. 66B depicts a cutaway side view of the lens mold coating apparatus of FIG. 66A

Referring now to FIG. 66B, transport device 11405 may also include a lifting device 11455. Lifting device 11455 may include a motor 11456 coupled to a threaded member 11448 (shown in FIG. 66A). For example, threaded member 11448 may include a ball screw. Rotation of threaded member 11448 by motor 11456 may change the elevation of transport device 11405 with respect to the process units. A number of guides 11457 may interact with body 11450 of the transport device to assist lifting device 11455 in generating substantially linear upward motion. For example, guides 11457 may move along linear bearings disposed within body 11450 of transport device 11405, thereby constraining motion generated by lifting device 11455. Lifting device 11455 may be coupled to a rotary platform 11458. Rotary platform 11458 may be directly or indirectly coupled to a motive apparatus 11459. For example, rotary platform 11458 may be directly coupled to a spindle or rotor of motive device 11459. Alternately, rotary platform 11458 may be coupled to motive apparatus 11459 via a system of gears or a system of pulleys coupled by at least one flexible loop member (e.g., a belt, chain, wire, cable, rope, etc.). Rotary platform 11458 and motive apparatus 11459 may together provide motion of transport device 11405. Transport device 11405 may be configured to move such that mold holder 11452 follows a substantially circular travel path 11460 (shown in broken lines on FIG. 66C).

Figure 66C:
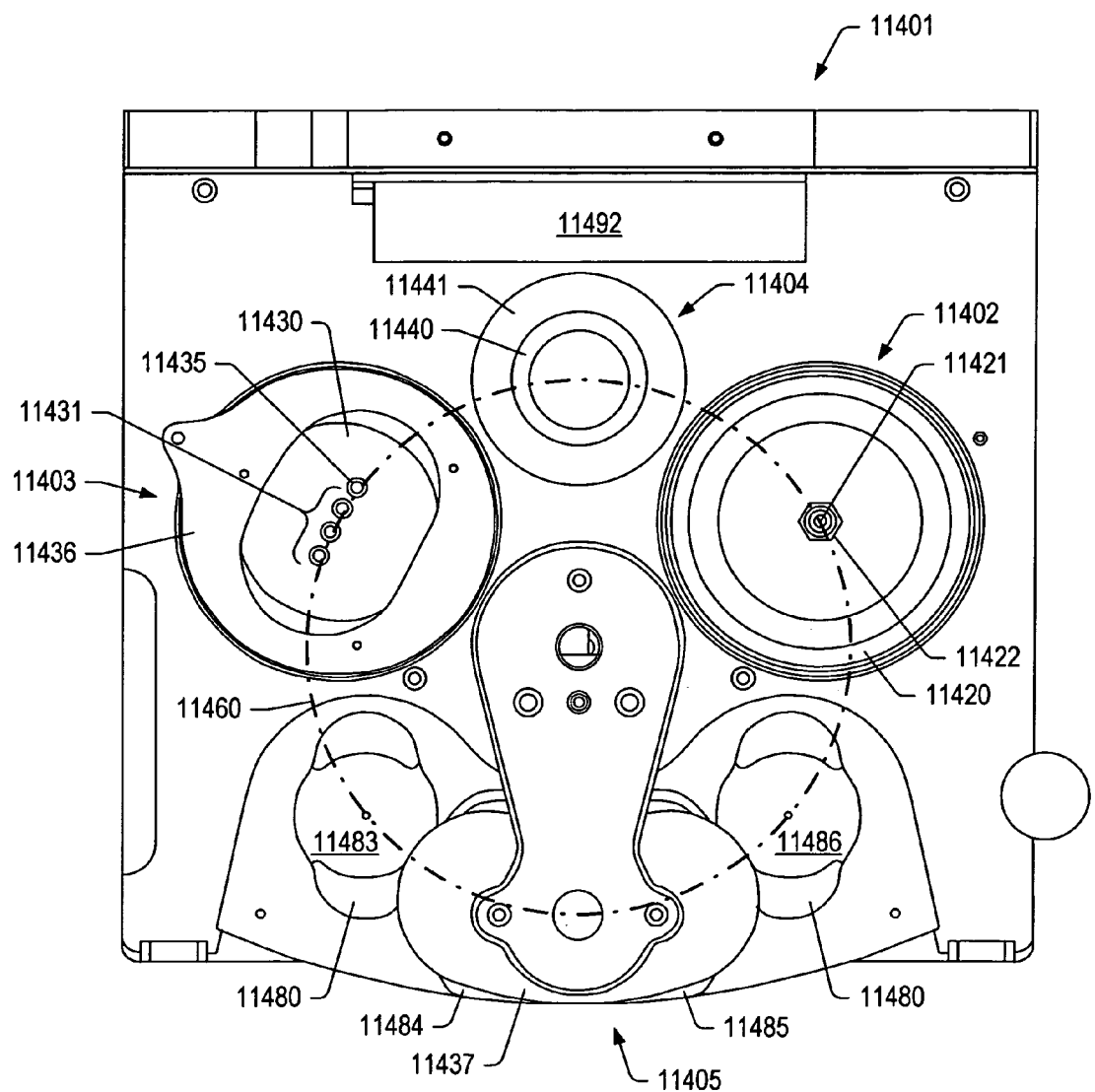
FIG. 66C depicts a top view of a processing area of the lens mold coating apparatus of FIG. 66A.

Referring now to FIG. 66C, in various embodiments, transport device 11405 may be configured to acquire a lens mold at a lens mold staging area 11483, 11484, 11485, or 11486, transport the lens mold to a plurality of process units, and deposit the lens mold at the lens mold staging area. In addition, the transport device may be configured to rotate the lens mold during processing. In an embodiment, transport device 11405 may be configured to move a lens mold along circular travel path 11460 during one or more process steps. Moving the mold along travel path 11460 during processing may ensure that a coating and/or cleaning process is conducted uniformly and includes the center of the lens mold. That is, moving the mold may allow a fluid dispensed from a coating or cleaning applicator to sweep over the surface of the mold. An advantage of such a configuration may be that the apparatus may require fewer moving parts than systems in which one or more applicators are moved to ensure even uniform dispensing.

FIG. 66C depicts a top view of the process area of mold coating apparatus 11401. In an embodiment, a cleaning process unit 11402 of lens mold coating apparatus 11401 may include at least one basin 11420. Basin 11420 may include at least one cleaning fluid applicator 11421 coupled to a clean fluid source. The cleaning fluid source may include a water source, for example, a de-ionized water source. Additionally, the cleaning fluid source may include a surfactant or other cleaning agent. Basin 11420 may also include a drain 11422 for removing used cleaning fluid from the basin. Drain 11422 may be coupled to a waste collection system or waste collection reservoir. Cleaning process unit 11402 may be configured to apply a drying agent to a cleaned lens mold. In various embodiments, the drying agent may include a chemical drying agent and/or a physical drying agent. As used herein, a "chemical drying agent" refers to a drying agent that is selected to increase the evaporation rate of a process fluid by chemical interaction with the process fluid. Examples of chemical drying agents may include certain alcohols, for example, isopropyl alcohol. In embodiments where a chemical drying agent is used, the cleaning process unit basin may include a drying agent applicator (not shown). As used herein a "physical drying agent" refers to a drying agent that increases the evaporation rate of the cleaning fluid through physical processes such as convection or heating. Examples of physical drying may include blowing dry air over the lens mold and/or heating the lens mold. In an embodiment, transport device 11405 may be configured to rotate the lens mold in cleaning process unit 11402 during application of the cleaning fluid. In additional embodiments, transport device 11405 may be configured to rotate the lens mold after application of the cleaning fluid.

For example, the mold may be rotated to facilitate drying and/or during application of a drying agent. Transport device 11405 may also be configured to move the mold in relation to a stationary cleaning applicator or drying agent applicator during application of a cleaning fluid or drying agent. For example, the mold may be along travel path 11460 within the cleaning process unit during application of a cleaning fluid and/or drying agent. In another example, the mold may be in a direction other than along travel path 11460 within the cleaning process unit during application of a cleaning fluid and/or drying agent. Such motion may ensure that the clean fluid and/or drying agent stream crosses the center of the mold. The motion may also facilitate even application of the cleaning fluid and/or drying agent over the surface of the lens mold. Additionally, transport device 11405 may be configured to move the mold in an oscillatory manner in relation to a stationary cleaning applicator or drying agent applicator. Such oscillatory motion may provide for more thorough cleaning and/or drying of the mold.

A coating process unit 11403 of lens mold coating apparatus 11401 may include at least one coating process basin 11430. Coating process basin 11430 may include at least one coating fluid applicator 11431 coupled to a mold coating composition supply 11432 (shown in FIG. 66A). Additionally, in some embodiments, coating process basin 11430 may include a drying agent applicator 11435 as previously described. Drying agent applicator 11435 may be coupled to a drying agent supply 11433 (shown in FIG. 66A). In an embodiment, coating process basin 11430 may also include a drain (not shown) for removing a coating composition and/or drying agent from the basin. The drain may be coupled to a waste collection system or waste collection reservoir. In some embodiments, coating process basin 11430 may include a liner. The liner may be absorbent and removable. A removable, absorbent liner may ease removing dried mold coating composition from the coating process basin. Coating process unit 11403 may also include a splash guard 11436. Splash guard 11436 may inhibit process fluids dispensed in coating unit 11403 from splashing outside basin 11430. In some embodiments, a shield 11437 on transport device 11405 may also inhibit splashing of process fluids out of basins 11430 and 11420. In such embodiments, shield 11437 may also limit the amount of activating light that shines outside curing unit enclosure 11441.

Transport device 11405 may be configured to rotate the lens mold in the coating process unit during application of a mold coating composition. Additionally, in some embodiments, transport device 11405 may be configured to rotate the lens mold after application of the mold coating composition. Rotating the lens mold after applying a mold coating composition may facilitate drying of the mold coating composition. In an embodiment, a drying agent may be applied to a mold coating composition to facilitate drying of the mold coating composition. Drying the mold coating composition before curing the composition may be desirable for certain coating compositions. For example, after applying certain antireflective coatings, as discussed in previously referenced patent applications, it may be desirable to dry the coating compositions before initiating curing of the compositions. Transport device 11405 may also be configured to move the mold in relation to a stationary coating applicator or drying agent applicator during application of a coating composition or drying agent. For example, the mold may be along travel path 11460 within the coating process unit during application of a mold coating composition and/or drying agent. In another example, the mold may be in a direction other than along travel path 11460 within the coating process unit during application of a mold coating composition and/or drying agent. Such motion may ensure that the mold coating composition and/or drying agent stream crosses the center of the mold. The motion may also facilitate even application of the mold coating composition and/or drying agent over the surface of the lens mold.

Coating process unit 11403 may include at least one coating applicator 11431. Coating applicators 11431 may be coupled to a fluid delivery system. The fluid delivery system may include piping or tubing 11434 (shown in FIG. 66A) to transport a process fluid (e.g., a mold coating composition or drying agent). A fluid delivery system may also include a process fluid pump. The fluid delivery system may be coupled to a process fluid supply. In an embodiment, a process fluid supply may include a replaceable fluid canister, bag, bottle, tube, syringe or other fluid container. Such embodiments may allow a process fluid supply to be refreshed by an operator with minimal process interruption. In an embodiment, as depicted in FIG. 66A, the process fluid supplies and process fluid pumps may be combined in syringe pumps 11432 and 11433. In some embodiments, each coating applicator 11431 may be coupled to a different process fluid supply. Such embodiments may allow more than one mold coating composition to be applied to a lens mold in the same coating process unit. A plurality of pneumatic control valves 11438 (as shown in FIG. 66B) may regulate dispensing of process fluids from syringe pumps 11432 and 11433.

In an embodiment, as depicted in FIG. 66C, a curing process unit 11404 of lens mold coating apparatus 11401 may include at least one activating light source 11440. Activating light source 11440 may be a light source as described in previously referenced patents and pending patent applications. Such activating light sources may include but are not limited to: germicidal lamps, mercury vapor lamps, halide lamps and/or strobe lamps. In an embodiment, activating light source 11440 may include a strobe light source. Advantages of a strobe light source may include reduced power consumption and reduced environmental heat generation as compared to conventional lamps (e.g., mercury vapor lamps). Strobe lamps may also provide for an instant on and instant off capability. This feature may allow a strobe lamp to produce less heat between process runs. An additional advantage of including a strobe lamp in activation light source 11440 may be that activating light dosage may be controlled by controlling the intensity of light applied, the frequency of activating light flashes, the duration of activating light flashes and/or the number of activating light flashes. Suitable strobe lamps and equipment are available from Speedotron Corporation of Chicago, Ill. In an embodiment, a curing process unit may also include an enclosure 11441. In an embodiment, enclosure 11441 may be configured to shield at least a portion of the activating light from coating process unit 11403. Additionally, enclosure 11441 may shield at least a portion of the activating light from an operator using mold coating apparatus 11401. In some embodiments, transport device 11405 may be configured to rotate a lens mold disposed in the curing process unit while it is exposed to activating light. Rotating the mold during curing may help to ensure even exposure of the mold to the activating light. In an embodiment, where a strobic light source or flashing lights source is used to provide activating light, transport device 11405 may be configured to rotate the lens mold between flashes of activating light. For example, the lens mold may be rotated up to 180 degrees between activating light flashes to ensure even exposure of the mold coating composition. In an embodiment, an activating light source of a curing unit may be electrically coupled to a remote power source. Such a remote power source may include capacity to provide power to more than one activating light source. A suitable remote power supply is available from Speedotron Corporation of Chicago, Ill. For example, in an embodiment, a Speedotron MW9Q flash lamp might be used with a Black Line 103 lamp holder coupled to a Black Line 1205cx and/or 2403cx power supply.

Referring back to FIG. 66A, lens mold coating apparatus 11401 may include an enclosure 11400 (as shown in FIG. 66A) providing at least a partially controlled process environment. Enclosure 11400 may inhibit ambient contaminants from entering a processing area 11409 of mold coating apparatus 11401. An air filtration system may provide purified air to the process units within the enclosure. The air filtration system may include a high efficiency particulate arresting (HEPA) filter 11492 and at least one blower 11493 (shown in FIG. 66B). In an embodiment, enclosure 11400 may include a mold assembly area 11494. For example, mold assembly area 11494 may be disposed on the inside of a door 11495. Mold assembly area 11494 may include one or more mold indexing guides 11496 to assist an operator with properly aligning lens molds during assembly.

In an embodiment, mold coating apparatus 11401 may include one or more mold staging areas 11483, 11484, 11485 and 11486. A mold staging area may include an area configured to retain at least one lens mold. Mold staging areas 11483, 11484, 11485, and 11486 may be arranged in a manner similar to a mold assembly tray. That is, mold staging areas 11483 and 11486 may be configured to retain front molds, and mold staging areas 11484 and 11485 may be configured to retain back molds. Additionally, mold staging areas 11483 and 11484 may be designated for right lens mold members, and mold staging areas 11485 and 11486 may be designated for left lens mold members. In an embodiment, one or more front mold staging areas 11483 and 11486 may be recessed into a surface in the processing area 11409. In such embodiments, the front mold staging areas may include one or more recesses 11480. Recesses 11480 may aid an operator in removing a coated lens mold from a front mold staging area. In an embodiment, one or more back mold staging areas 11484 and 11485 may include a raised member 11487. Raised member 11487 may inhibit scratching or other damage to the casting face of a back mold disposed in a back mold staging area.

In an embodiment, mold coating apparatus 11401 may be coupled to a controller, as previously described. One or more input devices may be coupled to the controller. For example, touch-screen user interface 11497 may be coupled to the controller. Touch-screen user interface 11497 may be configured to both receive input from an operator to the controller, and to provide output from the controller to the operator. The controller may be configured to independently control each process unit 11402, 11403, and 11404 and transport device 11405. In addition, the controller may control operation of one or more other devices, such as one or more doors providing access to the process units and/or an air filtration system. In an embodiment, the controller may receive eyeglass lens information, as previously discussed, from an operator and/or a computer coupled to the controller via a network. In another embodiment, the controller may receive information specific to mold coating processes from an operator and/or a computer coupled to the controller via a network. Mold coating process information may include cleaning, coating, curing and/or transport information specific to the configuration of the mold coating apparatus and/or one or more specific molds to be coated. For example, mold coating process information may include process feedback (e.g., process alarms, process status notifications, process warnings, etc.). Mold coating process information may also include mold coating apparatus configuration information, such as what process fluid is coupled to a process fluid applicator, scheduled maintenance notifications, etc. The mold coating process information may also include process specific data. For example, mold coating process information related to a fluid application process (e.g., cleaning, drying or curing) may include, but is not limited to: fluid to apply, fluid application time, fluid application rate, mold rotation rate and time before fluid application, mold rotation rate and time during fluid application, and/or mold rotation rate and time after fluid application. In another example, mold coating process information related to a curing process, may include, but is not limited to: whether continuous or flashing activating light is applied, intensity of the activating light, flash frequency and duration of activating light, and/or mold rotation rate and time during application of activating light. The mold coating process information may also include information related to a specific job. For example, mold coating process information related to a specific job may include, but is not limited to: one or more coating compositions to be applied to one or more lens molds, and/or one or more processes to modify or skip for one or more lens molds.

Figure 67A:
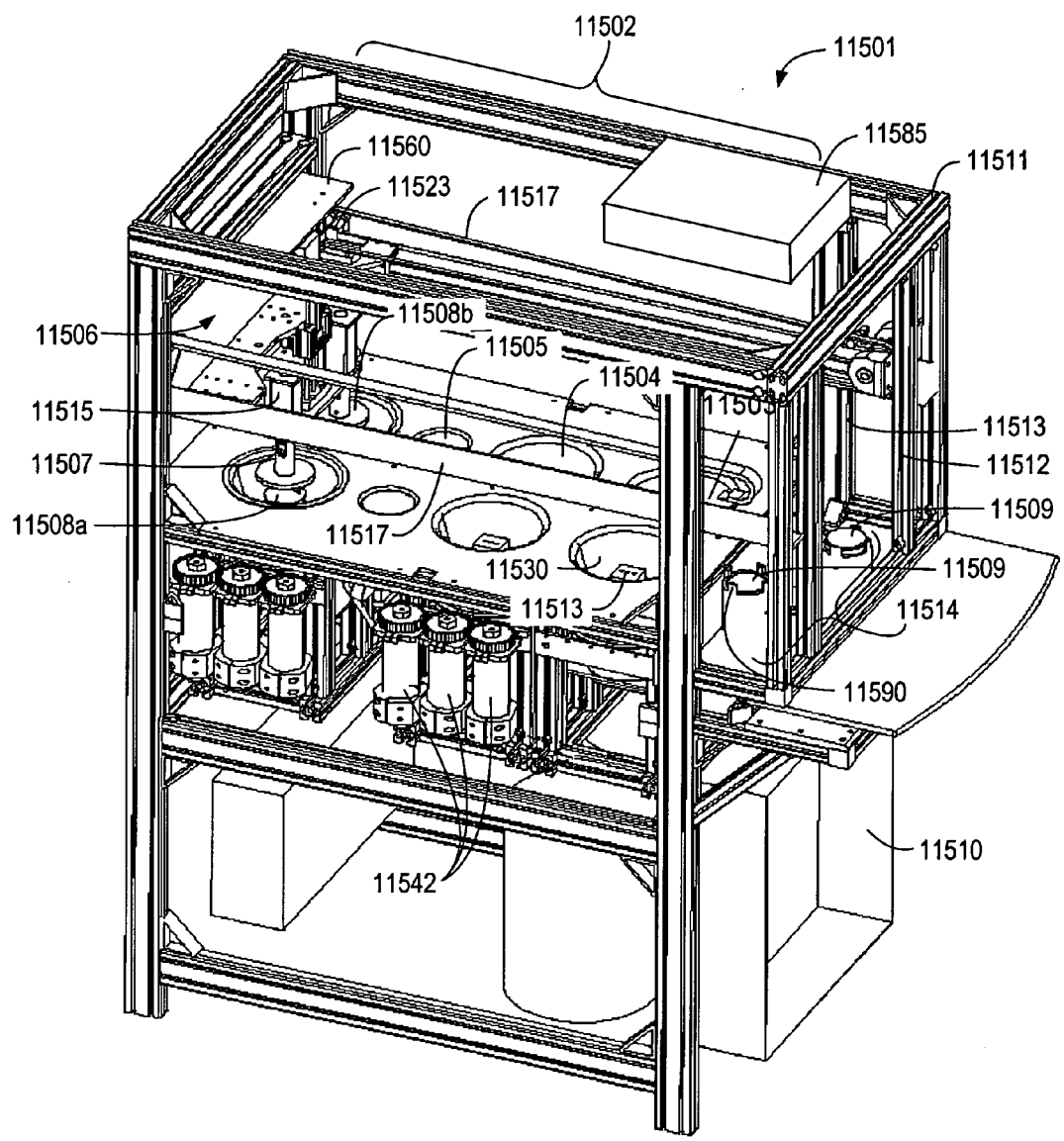
FIG. 67A depicts a perspective side view of a second embodiment of a lens mold coating apparatus.
Figure 67B:
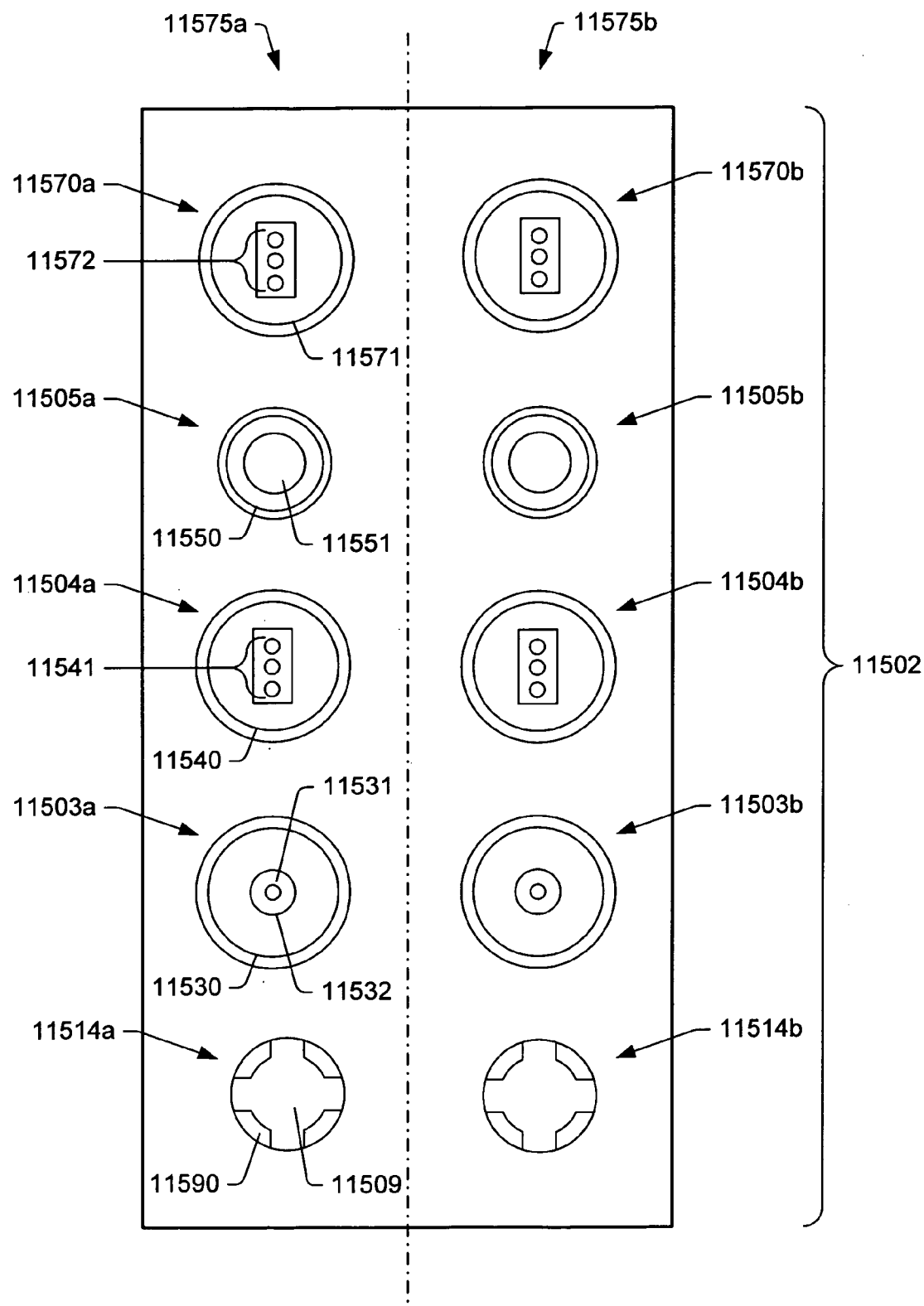
FIG. 67B depicts a schematic top view of a processing area of the lens mold coating apparatus of FIG. 68A.

FIGS. 67A and 67B depict another embodiment of a mold coating apparatus, generally referenced by numeral 11501. Referring to FIG. 67A, mold coating apparatus 11501 may include a process area 11502 including a plurality of process units 11503, 11504 and 11505. Process area 11502 may be housed within a framework 11511. Framework 11511 may be at least partially covered to form an enclosure around process area 11502. An air filtration system 11585 may provide air flow to process area 11502. A load lock system, including first door 11512 and second door 11513 may provide access from outside the apparatus into process area 11502. A loading/unloading area 11514 may be present between first door 11512 and second door 11513. Loading/unloading area 11514 may include a plurality of mold staging areas 11509. Mold staging areas 11509 may retain molds awaiting application of one or more coatings and/or molds that have completed processing in the mold coating apparatus. First door 11512 and second door 11513 may be controlled so that both doors are not open at the same time.

Process area 11502 may include a cleaning process unit 11503, a coating process unit 11504, a curing process unit 11505, and a transport device 11506, as previously described. The transport device includes at least one rotation device 11507 and at least one mold holder 11508. In addition, at least one lifting device 11515 may be coupled to transport device 11506. Process units 11503, 11504, and 11505 may be disposed substantially along the travel path of transport device 11506. Additionally, applicators of cleaning process unit 11503 and coating process unit 11504 may also be disposed substantially along the travel path of transport device 11506.

In some embodiments, a plurality of mold holders 11508 may be coupled to transport device 11506. In such embodiments, the process units may include equipment for processing a mold disposed in each mold holder substantially independently and simultaneously. For example, referring to FIG. 67B, parallel coating basins 11540*a* and 11540*b* may be provided for mold holders 11508*a* and 11508*b*. Likewise, a cleaning and/or curing process unit may include equipment for processing the molds substantially simultaneously and independently. For ease of reference herein, parallel components (e.g., process units, mold holders, lifting devices, rotation devices, etc.) may be referenced individual by including lower case letters indicating which processing line is being referenced. Alternately, parallel components may be referenced collectively by omitting the lower case letter. For example, mold holder 11508*a* refers to the mold holder indicated in FIG. 67A, which is associated with process line 11575*a* (shown in FIG. 67B) that includes cleaning unit 11503*a*, coating unit 11504*a*, curing unit 11505*a*, and coating unit 11570*a*. Likewise, mold holder 11508*b* refers to the mold holder indicated in FIG. 67A, which is associated with process line 11575*b* (shown in FIG. 67B) that includes cleaning unit 11503*b*, coating unit 11504*b*, curing unit 11505*b*, and coating unit 11570*b*. Mold holders 11508*a* and 11508*b* may be collectively referred to as mold holders 11508. Such embodiments may be configured to process two or more lens molds in parallel.

Referring to FIG. 67A, transport device 11506 includes a body 11560 coupled to a motive apparatus. Body 11560 may interact with one or more guides 11517. In an embodiment, the motive apparatus may be directly coupled to body 11560 of transport device 11506. For example, the motive apparatus may include a pneumatic or hydraulic cylinder. In another example, the motive apparatus may include a motor coupled to body 11560 of transport device 11506. In such an embodiment, the motor may push or pull body 11560 along one or more guides 11517. In another embodiment, the motive apparatus may be indirectly coupled to body 11560 of transport device 11506. For example, a motor 11523 may be coupled to framework 11511. Motor 11523 may be couple to body 11560 by a system of gears or a system of pulleys coupled by at least one flexible loop member (e.g., a belt, chain, wire, cable, rope, etc.).

Figure 67C:
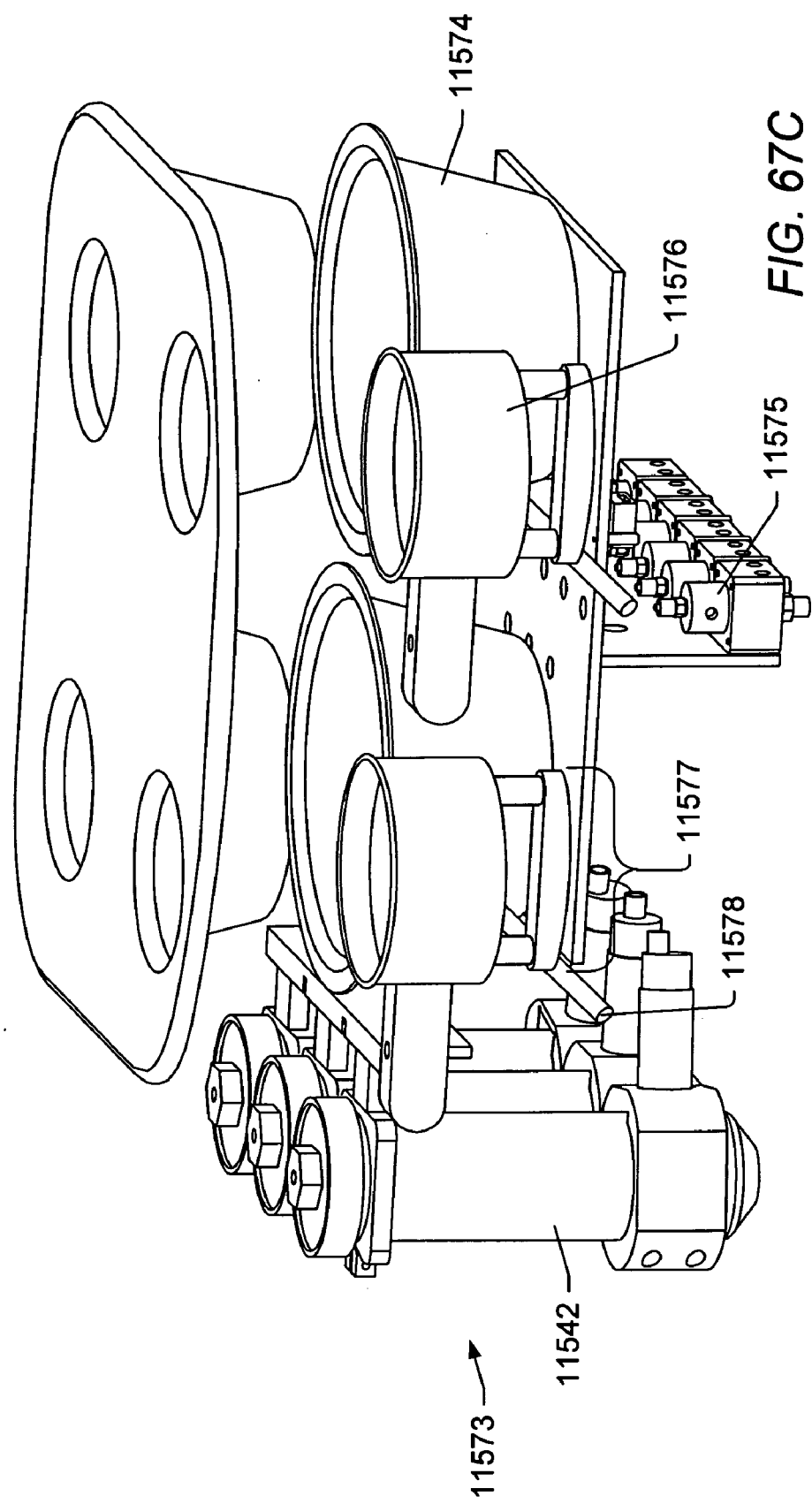
FIG. 67C depicts a perspective front view of an embodiment of several process unit modules.
Figure 67D:
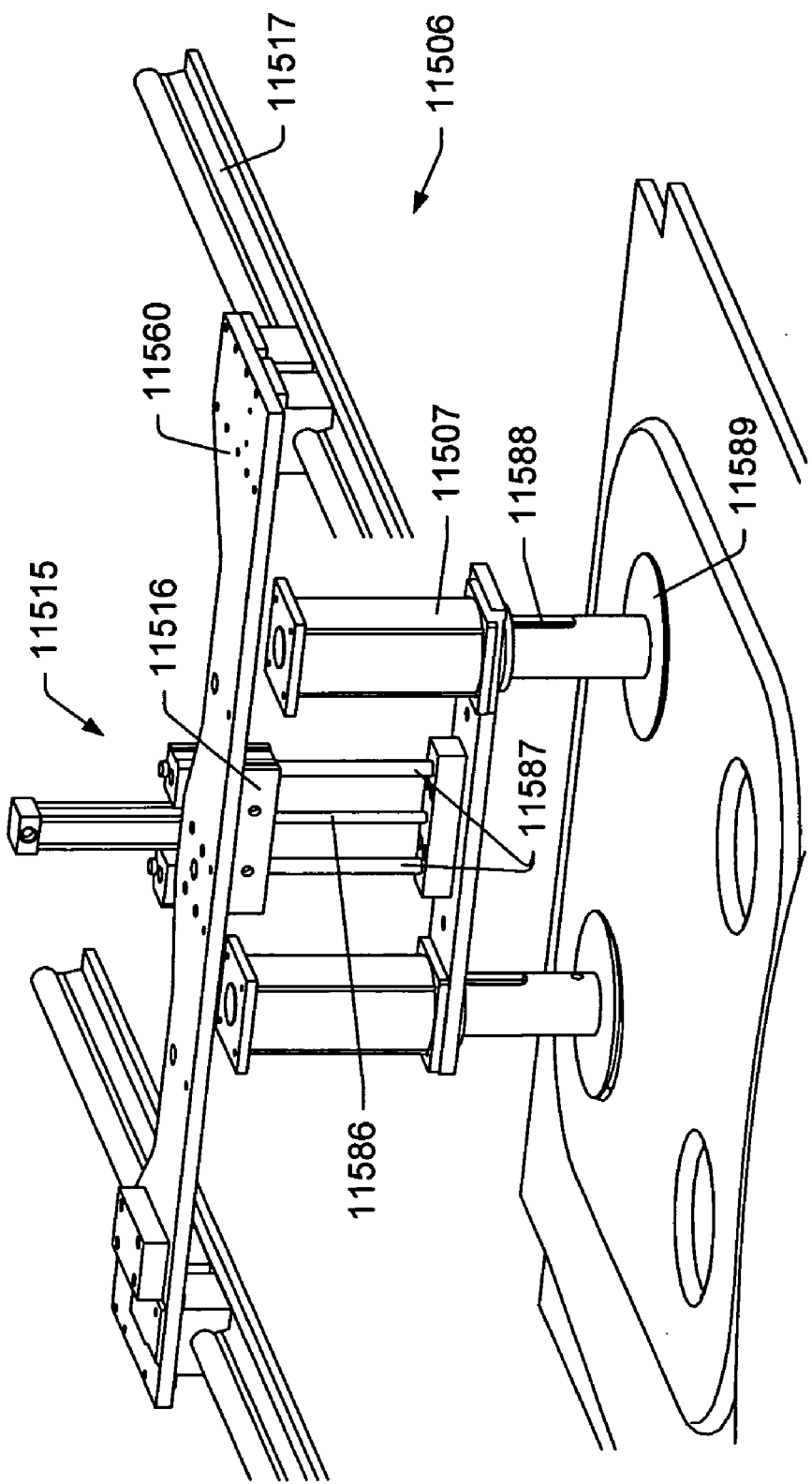
FIG. 67D depicts a perspective view of an embodiment of a transport device.

Turning to FIG. 67D, in an embodiment, at least one rotation device 11507 may be coupled to the body 11560. Additionally, a mold holder (shown in FIG. 67A) may be coupled to each rotation device 11507. Rotation device 11507 may be coupled to body 11560 via lifting device 11515. Lifting device 11515 may be configured to change the height of a lens mold disposed in the mold holder relative to one or more process units. In an embodiment, lifting device 11515 may include a motor 11516 coupled to a threaded member 11586. For example, threaded member 11586 may include a ball screw. Rotation of threaded member 11586 by motor 11516 may change the elevation of a mold holder with respect to the process units. A number of guides 11587 may interact with body 11560 of the transport device to assist lifting device 11515 in generating substantially linear upward motion. For example, guides 11587 may move along linear bearings, thereby constraining motion generated by lifting device 11515.

In an embodiment, rotation device 11507 may include or be coupled to a rotor 11588. Rotor 11588 may transfer rotary motion from rotation device 11507 to a mold holder coupled thereto. In an embodiment, a shield 11589 may be coupled to the transport device. Shield 11589 may inhibit splashing of a process fluid out of a process unit. Shield 11589 may also limit the amount of activating light that shines outside of a curing unit enclosure.

In an embodiment, a lens mold holder may be configured to adhere to a non-casting face of a lens mold and to retain the lens mold during processing. In an alternate embodiment, a lens mold holder may include a gripping mechanism configured to grasp the edges of the lens mold. In an embodiment, the lens mold holder may include a suction cup or vacuum chuck. As described with regard to the embodiment depicted in FIG. 66A, a rotation device may be configured to rotate a lens mold disposed in the mold holder during processing.

In an embodiment, transport device 11506 may include a plurality of mold holders 11508*a* and 11508*b*. In such an embodiment, controller 11510 may be configured to independently control mold holders 11508*a* and 11508*b*, associated rotating devices 11507*a* and 11507*b*, and associated lifting devices 11515*a* and 11515*b*. Controller 11510 may also be configured to independently control each process unit. Such embodiments may allow two or more molds to be coated simultaneously, even if the coatings to be applied to the molds are different. For example, in some instances, it may be desirable for different coatings to be applied to two or more molds disposed in the mold holders. Independently controlling the process units and transport device 11506 may allow the molds to be processed simultaneously. In an embodiment, transport device 11506 may include four mold holders. In such embodiments, each mold holder, rotation device, and lifting device may be independently controlled by controller 11510. Such an embodiment may allow four molds to be coated simultaneously.

In some embodiments, two or more loading/unloading areas 11514 may be provided. For example, a first loading/unloading area may be provided primarily for loading molds to be coated, and a second loading/unloading area may be provided primarily for unloading coated molds. The first and second loading/unloading area may be remote from one another. For example, the loading area may be on a first end of mold coating apparatus 11501, and the unloading area may be on the opposite end of the mold coating apparatus. Such an embodiment may allow molds to be simultaneously loaded and unloaded, thereby potentially increasing throughput of the apparatus. Additionally, in such an embodiment, transport device 11506 or an additional transport device may be configured to transport a mold assembly tray associated with one or more lens molds from the loading area to the unloading area.

In an embodiments, transport device 11506 may be configured to acquire a lens mold at a lens mold staging area, transport the lens mold to a plurality of process units, and deposit the lens mold at a lens mold staging area. In addition, the transport device may be configured to rotate the lens mold during processing. As used herein, "lateral" motion may refer to motion along a primary travel path of transport device 11506. For example, the movement of a lens mold from a first process unit to a second process unit may be described as lateral motion. As used herein, "vertical" motion may refer to motion induced by a lifting device 11515. As used herein, "rotational" motion may refer to motion induced by a rotation device 11507. In some embodiments, transport device 11506 may be configured to move a lens mold laterally during one or more process steps. Moving the mold laterally may ensure that a coating and/or cleaning process is conducted uniformly and includes the center of the lens mold.

In an embodiment, lens mold coating apparatus 11501 may include an enclosure (not visible) providing at least a partially controlled process environment. The enclosure may inhibit ambient contaminants from entering processing area 11502 of the mold coating apparatus. An air filtration system 11585 may provide purified air to the process units within the enclosure. In an embodiment, air filtration system 11585 may provide a substantially downward airflow in process area 11502. A mold may be retained in a mold holder with a casting face of the lens mold facing downward. Thus, it is believed that a substantially downward airflow may inhibit deposition of air borne contaminants on the casting face of the lens mold. To facilitate the substantially downward flow of air, a surface of the process area 11502 may include a plurality of openings. The plurality of openings may allow air to flow through the surface, so that substantially downward airflow may be maintained. In various embodiments, a lens mold coating apparatus enclosure may include one or more access controls to inhibit operator contact with transport device 11506 and to maintain the controlled process environment.

Referring to FIG. 67B, cleaning process unit 11503 may include at least one basin 11530. Basin 11530 may include at least one cleaning fluid applicator 11531 coupled to a clean fluid source. The cleaning fluid source may include a water source, for example, a de-ionized water source. Additionally, the cleaning fluid source may include a surfactant or other cleaning agent. Basin 11530 may also include a drain 11532, for removing used cleaning fluid from the basin. The drain may be coupled to a waste collection system or waste collection reservoir. Cleaning process unit 11503 may be configured to apply a drying agent, as previously described, to a cleaned lens mold. In an embodiment, transport device 11506 may be configured to rotate a lens mold in cleaning process unit 11503 during application of the cleaning fluid. In additional embodiments, transport device 11506 may be configured to rotate the lens mold after application of the cleaning fluid. For example, the mold may be rotated to facilitate drying and/or during application of a drying agent. Transport device 11506 may also be configured to move the mold laterally within cleaning process unit 11503 during application of a cleaning fluid and/or drying agent. Such lateral motion may ensure that the clean fluid and/or drying agent stream crosses the center of the mold. The lateral motion may also facilitate even application of the cleaning fluid and/or drying agent over the surface of the lens mold.

Coating process unit 11504 may include at least one coating process basin 11540. Coating process basin 11540 may include at least one coating fluid applicator 11541 coupled to a mold coating composition source. Additionally, in some embodiments, coating process basin 11540 may include a drying agent applicator as previously described. Coating process basin 11540 may also include a drain (not shown) for removing a coating composition and/or drying agent from the basin. The drain may be coupled to a waste collection system or waste collection reservoir. In some embodiments, the coating process basin may include a liner. The liner may be absorbent and removable. A removable, absorbent liner may ease removing dried mold coating composition from the coating process basin. In certain embodiments, transport device 11506 may be configured to rotate the lens mold in coating process unit 11504 during application of a mold coating composition. Additionally, in some embodiments, transport device 11506 may be configured to rotate the lens mold after application of the mold coating composition. Rotating the lens mold after applying a mold coating composition may facilitate drying of the mold coating composition. Drying the mold coating composition before curing the composition may be desirable for certain coating compositions. For example, after applying certain antireflective coatings, as discussed in previously referenced patent applications, it may be desirable to dry the coating compositions before initiating curing of the compositions. Transport device 11506 may be configured to move the mold laterally within coating process unit 11504 during application of a mold coating composition and/or drying agent. Such lateral motion may ensure that the mold coating composition and/or drying agent stream crosses the center of the mold. The lateral motion may also facilitate even application of the mold coating composition and/or drying agent over the surface of the lens mold.

At least one coating applicator 11541 may be coupled to a fluid delivery system. A fluid delivery system may include piping or tubing to transport a process fluid (e.g., a mold coating composition or drying agent). A fluid delivery system may also include a process fluid pump 11575 (depicted in FIG. 67C). The fluid delivery system may be coupled to a process fluid supply. In an embodiment, a process fluid supply may include a replaceable fluid canister 11542, bag, bottle, tube, or other fluid container. Such embodiments may allow a process fluid supply to be refreshed by an operator with minimal process interruption. In some embodiments, coating process unit 11504 may include a plurality of coating applicators 11541. Each coating applicator may be coupled to a different process fluid supply. Such embodiments may allow more than one mold coating composition to be applied to a lens mold in the same coating process unit.

Curing process unit 11505 may include at least one activating light source 11551 and an enclosure 11550, as previously described with reference to the embodiment of FIG. 66A.

In an embodiment, mold coating apparatus 11501 may include one or more mold staging areas 11509. Mold staging area 11509 may be configured to retain at least one lens mold. Mold staging area 11509 may also include one or more centering guides 11590. Centering guides 11590 may assist an operator and/or transport device in placing a lens mold precisely within mold staging area 11509. Precise placement of molds within the mold staging area may assist transport device 11506 in picking up the mold with the center of the mold substantially aligned with the axis of rotation of mold holder 11508.

Referring back to FIG. 67A, in an embodiment, mold coating apparatus 11501 may be coupled to a controller 11510. One or more input devices may be coupled to controller 11510. For example, a touch screen user interface, as previously described, may be coupled to the controller. Controller 11510 may be configured to independently control each process unit and the one or more transport devices. In addition, the controller may control operation of one or more other devices, such as doors 11512 and 11513, and/or air filtration system 11585. In an embodiment, controller 11510 may receive eyeglass lens information, as previously discussed, from an operator and/or a computer coupled to the controller via a network. In another embodiment, controller 11510 may receive information specific to mold coating processes (as previously described) from an operator and/or a computer coupled to the controller via a network.

In certain embodiments, one or more process units of mold coating apparatus 11501 may be modular. As used herein, a "modular" process unit may refer to a process unit that is configured to allow quick removal and replacement of the entire process unit. In an embodiment, modular configuration may include slides coupled to framework 11511 upon which the process unit may rest. In an alternate embodiment, modular configuration may include easily removable connectors coupling a process unit to framework 11511. For example, easily removable connectors may be operated by hand, without the need of tools. Modular configuration may also include one or more self-aligning connectors for coupling a modular process unit with mold coating apparatus 11501. For example, self-aligning connectors may couple the process unit to a power supply, controller 11510 and/or fluid reservoirs 11542. In an embodiment, a process unit module may include all equipment needed to make the process unit functional when it is connected to power and provided with appropriate control signals. For example, a cleaning or coating process unit module 11573 as depicted in FIG. 67C, may include at least one basin 11574, one or more process fluid applicators coupled to process fluid delivery lines, and one or more process fluid delivery pumps 11575. Additionally, cleaning or coating process unit 11573 module may include one or more fluid reservoirs 11542. Fluid reservoirs 11542 may include process fluid reservoirs and/or waste fluid reservoirs. In another example, a modular curing process unit 11577 may include an activating light source and an enclosure 11576. Modular curing process unit 11577 may also include one or more electrical connections 11578. For example, module curing unit 11577 may include a remote power supply electrically coupled to each of the activating light sources of the modular curing unit.

Figure 68:
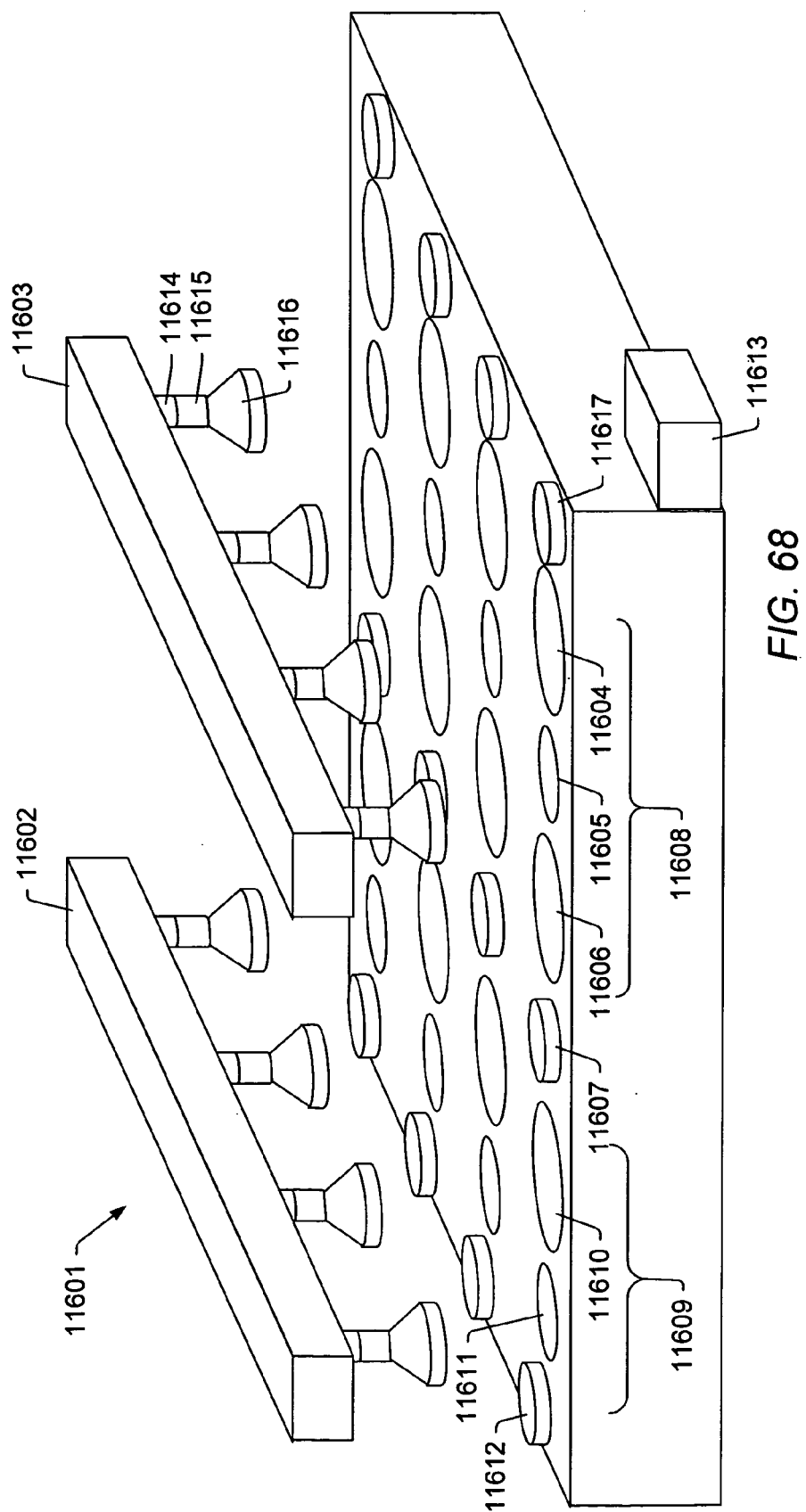
FIG. 68 depicts a perspective side view of a third embodiment of a lens mold coating apparatus.

Embodiments of a mold coating apparatus as depicted in FIG. 67A may generally provide higher throughput capacity than embodiments as depicted in FIGS. 66A, 66B, and 66C. In some circumstances, even higher throughput capacity may be provided by multiplying the number of process units in a mold coating apparatus. For example, FIG. 68 depicts a schematic perspective side view of an embodiment of a mold coating apparatus 11601. Mold coating apparatus 11601 may be particularly useful in circumstances were a plurality of different of lens coating layers are expected to be applied to a single mold. For example, if multiple hard coat layers are desired on a lens mold or if an antireflective coating stack is to be applied to a lens mold.

Mold coating apparatus 11601 includes a plurality of transport devices 11602 and 11603. Each transport device may serve a plurality of process units. For example, first transport device 11603 may serve a cleaning process unit 11604, a coating process unit 11605 and a curing process unit 11606. Additionally, first transport device 11603 may be configured to access a first mold staging area 11617 and a second mold staging area 11607. First mold staging area 11617 may be configured to receive one or more molds into mold coating apparatus 11601. Second mold staging area 11607 may be configured to receive a mold having a first coating layer applied by first set of process units 11608. Second transport device 11602 may be configured to access second mold staging area 11607 to acquire a mold having a first coating layer applied by first set of process units 11608, and to transport the mold through one or more other sets of process units. For example, second transport device 11602 may move the mold to a second coating process unit 11610 and a second curing process unit 11611. After a second coating layer is applied by second set of process units 11609, the mold may be deposited at a third mold staging area 11612. In an embodiment, mold coating apparatus 11601 may include one set of process units for each coating layer desired to be applied to a lens mold. For example, if mold coating apparatus 11601 is configured to apply a seven layer antireflective coating stack and a hard coat, the apparatus may be extended to include eight sets of process units. Additionally, in some embodiments, a transport device may serve each set of process units. Thus, in the previous example, eight transport devices may serve the eight sets of process units. In such embodiments, mold staging areas may be present between sets of process units to enable the transition from one transport device to the next transport device.

In an embodiment, each transport device and each process unit may be independently controlled by controller 11613. In some embodiments, controller 11613 may also independently control each mold holder 11616, rotation device 11615 and/or lifting device 11614. Independent control of components of a transport device may allow different coatings to be applied to two or more molds coupled to different mold holders of a single transport device simultaneously. For example, in an embodiment, each transport device of a mold coating apparatus may include four mold holders. During use, one lens mold may be coupled to each mold holder. In such an embodiment, the four lens molds selected to form two lenses of a pair of eyeglasses may be processed simultaneously. In such a case, a first coating may be desired on the front of the formed lenses. The first coating may not be desired on the back of the formed lenses. During application of mold coating compositions to form the first coating, the front molds may be coated, while the back molds are not coated. Likewise, activating light may be applied to the front molds to cure mold coating composition applied, while activating light may not be applied to the back molds. Similarly, in this embodiment or other embodiments, situations may arise where only one lens mold requires a certain process step or where two lens molds couple to the same transport device require processing under different process conditions.

Figure 69:
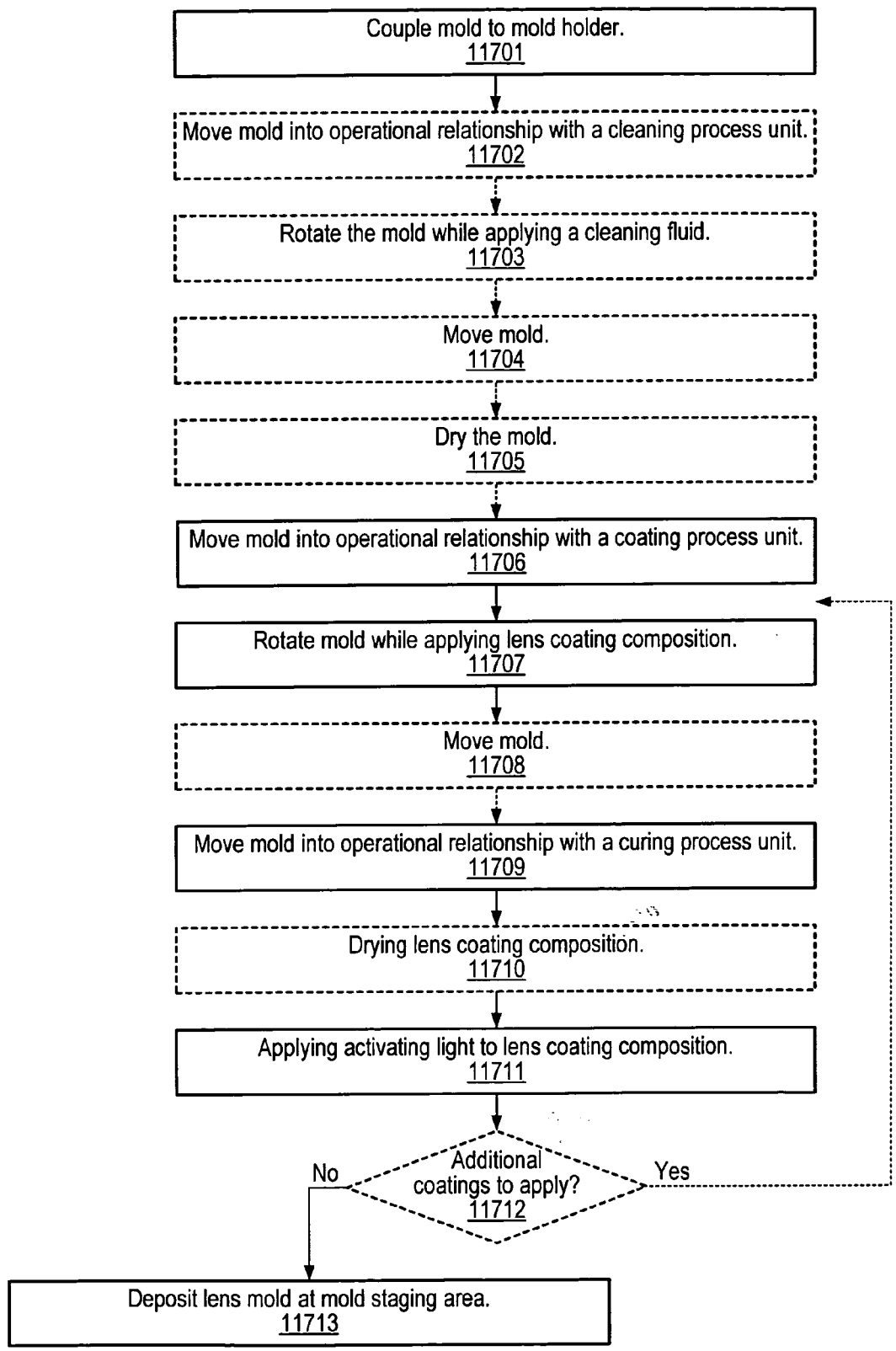
FIG. 69 depicts a flowchart of a method of coating a lens mold according to one embodiment.

FIG. 69 depicts a flowchart of an exemplary embodiment of a method of coating a lens mold. The method may include coupling a lens mold to a mold holder 11701. In an embodiment, an operator may place a lens mold in a lens mold staging area. A transport device of a lens coating apparatus may move to the lens mold by executing one or more preprogrammed movements. The mold holder of the transport device may contact the lens mold so that the lens mold is coupled to the mold holder. The lens mold staging area and/or the transport device may be configured such that a lens mold disposed within the staging area may be coupled to the transport device with the center of the lens mold substantially aligned with an axis of rotation of the mold holder. For example, the mold staging area may include one or more centering guides. A controller coupled to the transport device may be configured to direct a mold holder of the transport device to a determined position to acquire the lens mold. In some embodiments, one or more mold centering guides may be couple to the transport device. The mold centering guides may interact with the lens mold in the staging area such that the lens mold and/or mold holder are moved into the desired relationship (e.g., aligned mold center and axis of rotation).

After a lens mold is coupled to the mold holder, the mold may be moved to one or more process units. In an embodiment, the mold may be move into an operational relationship with a cleaning process unit 11702. As used herein, an "operational relationship" refers to a spatial orientation appropriate for processing within a process unit. For example, the lens mold may be positioned such that the cleaning fluid applicator of the cleaning process unit is directed toward the casting face of the lens mold. The lens mold and/or a shield coupled to the transport device or cleaning process unit may inhibit the cleaning fluid from spraying out of the cleaning process unit. The desired operational relationship between the lens mold and the cleaning process unit may include positioning the lens mold in relation to a cleaning fluid applicator such that cleaning fluid dispensed from the applicator strikes at or near the center of the lens mold. The lens mold may be rotated as cleaning fluid is applied to the lens mold 11703. Additionally, in some embodiments, the lens mold may be moved along a travel path of the transport device as the cleaning fluid is being applied to the lens mold 11704. Moving the lens along the travel path while the cleaning fluid is being applied may help to ensure that the entire casting surface of the lens mold is cleaned. After cleaning, the lens mold may be dried 11705. Drying the lens mold may include rotating the lens mold. Additionally, drying the lens mold may include applying a drying agent as previously described.

In various embodiments, a clean lens mold may be moved into an operational relationship with a coating process unit 11706. The lens mold may have been cleaned in a cleaning process unit of a mold coating apparatus, as previously described, or external to the mold coating apparatus. While in operational relationship with the coating process unit the mold may be rotated 11707. A mold coating composition may be applied to the rotating lens mold. In an embodiment, the lens mold may be moved along a travel path of the transport device as the mold coating composition is applied 11708. Moving the lens along the travel path while the mold coating composition is being applied may help to ensure that the entire casting surface of the lens mold is coated evenly. In some embodiments, it may be desirable to dry a mold coating composition applied to a lens mold before initiating curing of the composition 11710. Drying the lens forming composition may include inducing evaporation of one or more solvents in the lens coating composition. After the mold coating composition is applied to the lens mold, the mold may be moved into operation relationship with a curing process unit 11709. In the curing process unit, activating light may be applied to the mold coating composition to initiate curing of the composition 11711.

In an embodiment, more than one coating layer may be formed on the lens mold. For example, two or more layers of may be needed to be form an antireflective coating stack. Therefore, the method may include determining whether additional coatings are to be applied 11712. If additional coatings are to be applied, the lens mold may be moved into operation relationship with a coating process unit 11706. The coating process unit may be the same coating process unit that applied the previous coating layer, or a different coating process unit. If no additional coating layers are to be applied, the lens mold may be deposited at a mold staging area 11713.

Figure 70:
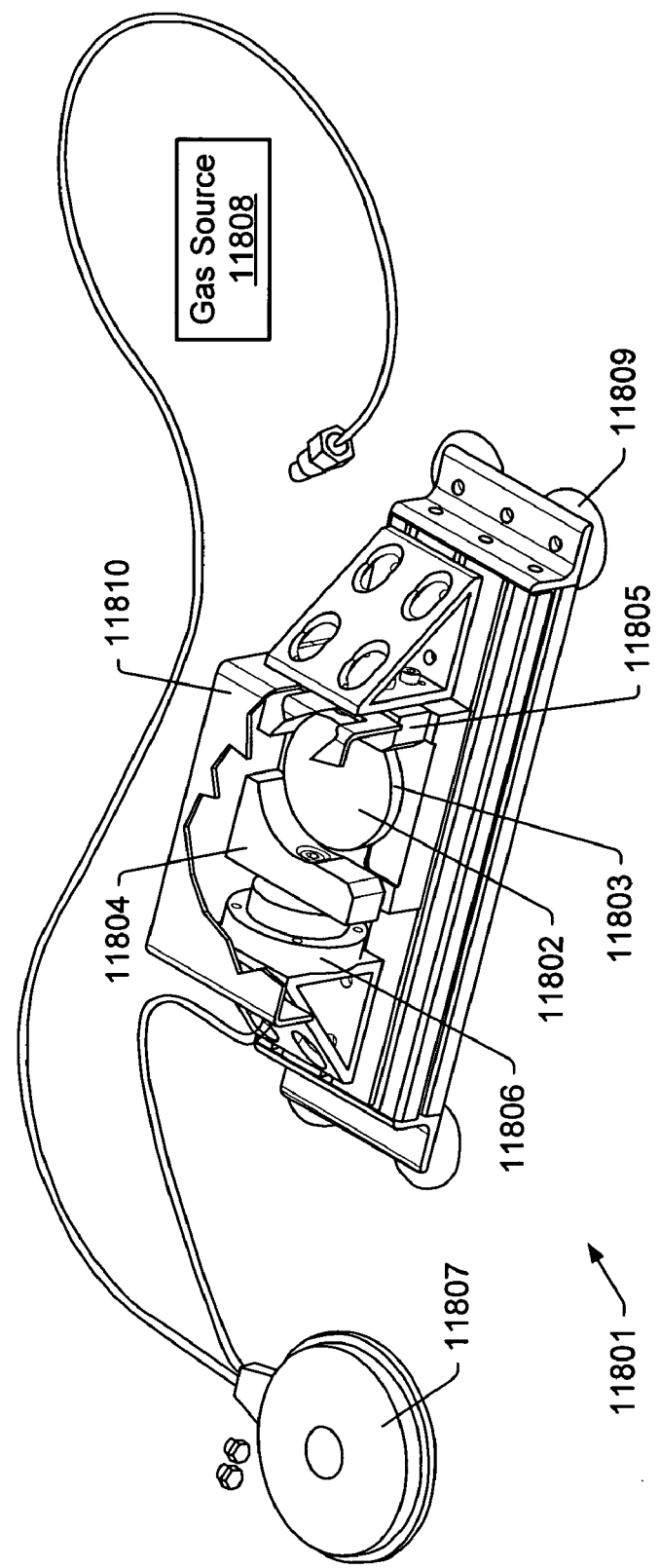
FIG. 70 depicts a partial cut-away perspective side view of an embodiment of a demolding apparatus.

An embodiment of a demolding device is depicted in FIG. 70 and generally referenced by numeral 11801. Demolding device 11801 may be useful for separating a lens 11802 from a lens mold 11803 after casting the lens.

In an embodiment, demolding device 11801 may include two or more clamping members 11804 and 11805, and an urging means 11806 for urging clamping members 11804 and 11805 toward one another. In an embodiment, the clamping members may include a fixed clamping member 11805 and a movable clamping member 11804. Urging means 11806 may include an elastic member, a lever, a compressed gas, one or more vise screws, etc.

After curing, certain lens forming compositions may adhere strongly to a casting face of one or more molds. Similarly, certain mold coating compositions may form coating layers on a mold that adhere strongly to the mold and a cast lens. This adhesion to a casting face may make separation of a cast lens from a lens mold very difficult. Demolding device 11801 may be used to assist in separating a cast lens from a lens mold.

A lens 11802 and mold 11803 may be disposed between clamping members 11804 and 11805. Urging means 11806 may be initiated or applied to urge the clamping members toward one another. As movable clamping member 11804 moves toward fixed clamping member 11805, a clamping surface of each may contact an edge of lens mold 11803. By careful sizing of clamping members 11804 and 11805, they may be formed such that their clamping surfaces contact lens mold 11803, but do not contact lens 11802. Force may be applied via clamping members 11804 and 11805 substantially along a diameter of lens mold 11803. By applying force substantially along a diameter of the lens mold, little or no lateral component of force may be generated. Force applied via clamping members 11804 and 11805 may be sufficient to cause elastic deformation of the lens mold. That is, the lens mold may bend slightly, without breaking. The force may be carefully regulated to reduce the likelihood of breaking the lens mold. Thus, a pressure regulation device may be used to limit the force applied. For example, a mechanical stop, or breakaway device may prevent applying excess pressure. In an embodiment where urging means 11806 includes a pressurized gas, a compressed gas pressure regulator may limit the force applied. The amount of force that a lens mold can withstand without exceeding the elastic limit (or breaking point) of the mold may vary depending on the material of the mold, the shape of the mold, the age of the mold, etc. For example, the force may be limited to less than about 500 pounds of force. In another embodiment, the force may be limited to less than about 300 pounds of force.

The elastic deformation of lens mold 11803 may reduce the contact area between lens 11802 and the mold. Reducing the contact area may reduce the force required to separate the lens from the lens mold. Additionally, elastically deforming the lens mold may allow a prying instrument to be inserted between the lens and the lens mold along the edge of the lens and lens mold interface. The prying instrument may be used to assist in separating the lens from the lens mold. Other means of separating the lens from the lens mold may also be used. For example, a suction device may be applied to a face of the lens opposite the lens mold, and a peeling or pulling force may be applied via the suction device.

After a lens casting process, the lens and lens molds may be quite warm to the touch due to the exothermic nature of the polymerization process of the lens forming composition and/or process conditions. The heating may increase cross-linking in the cured lens forming composition. After processing the lens and one or more lens molds may be cooled. For example, in an embodiment, after casting the lens mold assembly may be placed into a fluid bath having a temperature between processing temperature and ambient temperature. At least one mold (e.g., the front mold), may be readily removed after cooling in the bath. A second mold (e.g., the back mold) may then be removed using demolding device 11801. After such processing, a cast lens may have a diameter slightly smaller than the diameter of an associated lens mold. For example, in an embodiment, a gasket as described in U.S. Pat. No. 6,228,289 to Powers, et al., which is specifically incorporated herein by reference, is used in a lens casting process, the cast lens diameter may be only slightly smaller than or equal to the diameter of the lens mold after casting. It is believed that both increasing cross-linking, and cooling the lens may tend to cause some shrinkage of the cured lens forming composition. The smaller diameter of the cured lens relative to the lens mold enables clamping members 11804 and 11805 to have a height greater than that of the edge of lens mold 11803 without contacting lens 11802 during use.

In an embodiment, demolding device 11801 may be activated by a switch 11807. For example, switch 11807 may be a pressure switch. Activating switch 11807 may initiate urging means 11806. For example, a pressurized gas from a gas source (not shown) may be allowed into a pneumatic cylinder of urging means 11806.

In an embodiment, demolding device 11801 may be coupled to a work surface to inhibit the demolding device from moving during operation. Coupling members 11809 may be used to couple demolding device 11801 to the work surface. In various embodiments, coupling members 11809 may include threaded members (e.g., screws, bolts, etc.), inter-engaging members (e.g., nails, pins, clips, snaps, tenons, projections, etc.), deformable members (e.g., rivets, cotter pins, etc.) and/or chemical or physical bonds (e.g., suction cups, welds, adhesives, etc.), or combinations thereof. Additionally, a cover 11810 may shield portions of demolding device 11801. Cover 11810 may reduce the risk of an operator being pinched in the device. Additionally, cover 11810 may reduce the risk of the operator being struck by fragments if a lens or lens mold is accidentally broken.

To cast a wide variety of lenses, a large number of different types of lens molds may be needed. Additionally, if high production volumes of lenses are to be manufactured, it may be desirable to have multiple lens molds of certain mold types. With such large numbers of lens molds in a mold library, it may be desirable to be able to quickly and accurately identify a particular lens mold. However, visual identification of a lens mold may be difficult or impossible. Thus, it may be desirable to mark or otherwise associate a lens mold with a lens mold identification. Each of the lens molds of a particular type may have substantially identical lens forming properties, assuming none of the molds are defective. Thus, a single identification may be used to describe all molds of a particular mold type. In some embodiments, a unique identifier may be used in addition to, or in place of a mold type identification to describe each lens mold. Assigning a unique identifier to each lens mold may assist in tracking or identifying defective lens molds.

Figure 71:
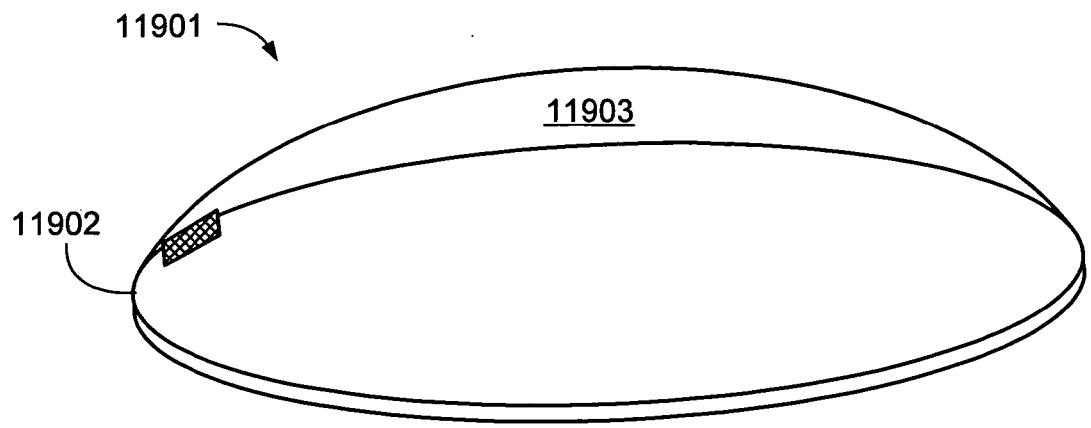
FIG. 71 depicts a perspective side view of a lens mold.

In an embodiment, an eyeglass lens mold 11901 may include a data code 11902, as depicted in the exemplary embodiment of FIG. 71. Data code 11902 may include an encoded identification of lens mold 11901. The encoded identification may include a mold type identification and/or a unique identifier of mold 11901.

Data code 11902 may include one or more machine-readable symbols. For example, data code 11902 may include a bar code, a matrix data code and/or human readable text. U.S. Pat. No. 4,939,354 to Priddy et al., U.S. Pat. No. 5,053,609 to Priddy et al., and U.S. Pat. No. 5,124,536 to Priddy et al. described systems and methods of creating and reading data codes and are hereby specifically incorporated by reference as though fully set forth herein. For casting a lens using an activating light curing process, data code 11902 may inhibit some activating light from reaching the curable lens forming composition. It may therefore be desirable for data code 11902 to be relatively small and/or located in an area where it will not have a significant detrimental impact on the lens curing process. For example, in an embodiment, a data code may be less than about 0.25 inches square (e.g., about 0.20 inches square). Additionally, it may be desirable for data code 11902 to be located on a non-casting surface of mold 11903 to prevent any surface roughness caused by the data code from causing defects in lenses cast using the mold.

In an embodiment, data code 11902 may be formed inside lens mold 11901, for example by a layering process. In another embodiment, data code 11902 may be adhered to a surface of lens mold 11901. For example, data code 11901 may be formed on a label, which may be affixed to mold 11901. In yet another embodiment, data code 11902 may be etched onto a surface of mold 11901. For example, a chemical or physical etching process may be used. In still another embodiment, data code 11902 may be applied to a surface of mold 11901 using a laser marking process.

Figure 72:
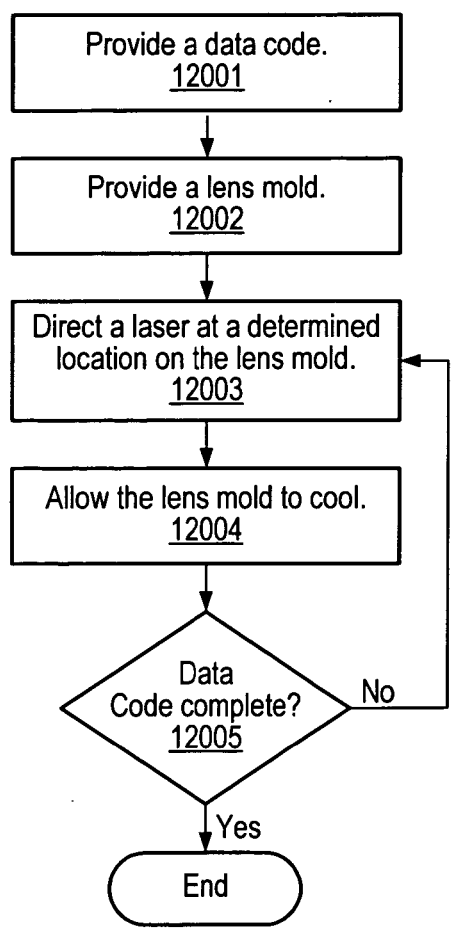
FIG. 72 depicts a flowchart of a method of applying a data code to a lens mold according to one embodiment.

FIG. 72 depicts an exemplary embodiment of a flowchart of a method of applying a data code to an eyeglass lens mold. The method may include providing a data code 12001 and a lens mold 12002. Providing a data code may include providing data for forming a data code or directions for forming the data code. For example, in a data encoding system wherein some data is encoded in spatial relationships between two or more data elements providing a data code is intended to include providing a description of the spatial relationship between two or more data elements of the data code. Thus, providing a coordinate set or vector description of the location of a plurality of data elements may be equivalent to providing a graphical depiction of the data code. A data code may also be represented by a numerical or alphanumerical sequence. For example, a data code may be represented by a numerical matrix. As used herein, a "data element" refers to a portion of a data code that conveys information due to its location, size, color, shape, etc. For example, in a bar code a data element may include a line. In a matrix data code, a data element may include a dot, or other matrix element.

In an embodiment, a data code may represent an alphanumeric sequence assigned to a lens mold. In such an embodiment, a standard software application may determine a data code representative of the alphanumeric sequence based on a translation algorithm. In such an embodiment, the alphanumeric sequence assigned to a lens mold may be based on properties of the lens molds, names assigned to the lens molds, or other distinguishing criteria as appropriate for the particular mold library.

The method may further include alternately directing a laser toward a determine location on the lens mold 12003 and allowing the lens mold to cool 12004. One or more of the determined locations on the lens mold may be determined based on a predetermined protocol. For example, a marking protocol may include placing an initial mark or terminal mark at a particular location on the lens mold. Additionally, one or more of the determined locations on the lens mold may be determined based on the provided data code. Directing the laser and allowing the lens mold to cool may continue until the data code has been formed on a surface of the lens mold 12005. It is believed that heat from the laser may cause formation of micro fractures in the surface of the lens mold. However, it is recognized that directing the laser toward the lens mold may also cause localized hazing and/or discoloration of the lens mold. By alternating applying heat via the laser and cooling the lens mold, localized overheating of the lens mold may be avoided. It is believed that localized overheating of the lens mold may cause excessive fracturing of the lens mold. In an embodiment, the lens may be cooled sufficiently by ceasing application of energy from the laser for less than about 0.1 seconds, for example, about 0.03 seconds.

In an embodiment, the laser marking process described above may be used to generate a plurality of data elements on a surface of lens mold to form a data code. Each data element may be formed by a single application of energy from the laser. Alternately, a plurality of applications of the laser may be used to form a single data element. Forming a data element using two or more applications of the laser, as opposed to a single application of the laser, may reduce the risk of localized overheating. Each data element may have a shape substantially similar to the shape of the intersection of the laser beam and the surface to which the element is applied. For example, a laser beam having a circular cross-section may be directed substantially normal to a non-casting surface of a front mold. A non-casting surface of a front mold may have a convex shape. Thus, the intersection of the circular beam and convex surface may form a regular or slightly irregular circular shape. In an embodiment, the laser beam path may not coincide with a normal of the surface. In such an embodiment, an oval or oval-like shape may form the data element. An error correction algorithm may be used in conjunction with a code reader to mitigate any problems caused by irregularly shaped data elements.

An advantage of a laser marking process may be that such a process may be used to apply a data code to a tempered glass surface. Many commercially available lens molds are shipped from their manufacture with at least one tempered glass surface. Since a laser marking process may be used to apply a data code to a tempered glass surface, no special manufacturing process may be required on the part of a lens mold manufacturer to enable application of data codes to their lens molds.

Figure 73:
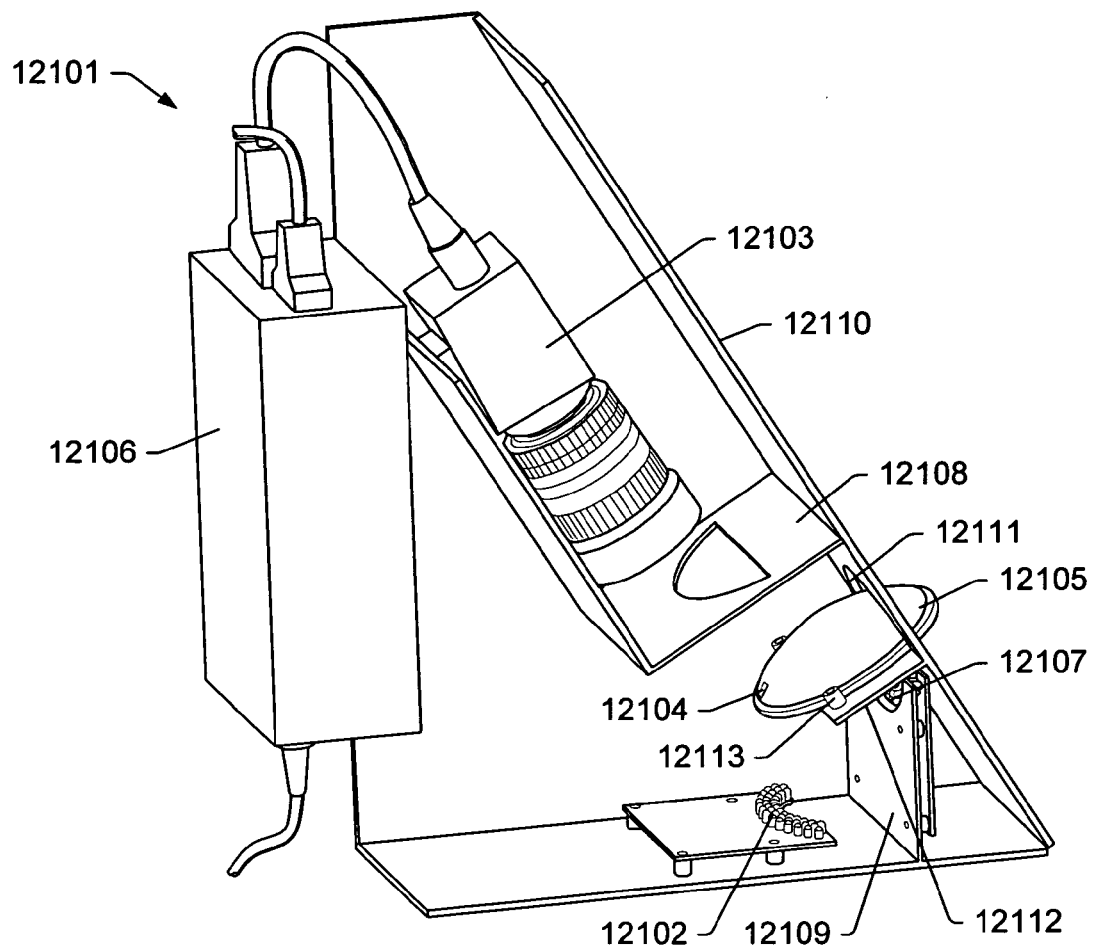
FIG. 73 depicts a cut-away perspective side view of an embodiment of a mold reader.

Referring now to FIG. 73, an embodiment of a light based code reader is depicted in a cutaway perspective side view. As used herein, a light based code reader configured to read data codes on lens molds may be referred to as a "mold reader." Mold reader 12101 may include at least one light source 12102 and at least one light detection device 12103.

Light detection device 12103 may be configured to detect light reflected from or shined through a data code 12104 disposed on lens mold 12105. A pattern may be formed in the light by data elements of the data code. Light detection device 12103 may sense the light pattern and send a signal to a controller 12106 corresponding to the light pattern. Light detection device 12103 may include an electronic photosensor array for detecting the light pattern. For example, a charge-coupled device (CCD) photo array, or a complimentary metal-oxide semiconductor (CMOS) photo array may be used to detect the light pattern. The controller may determine the content of the data code based on the light pattern signal sent by light detection device 12103. The controller may use one or more computer implemented methods to treat the light pattern signal before determining the content of the data code. For example, a filtering method may be applied to the signal to reduce the amount of data present that does not pertain to the data code. For example, light detection device 12103 may have a field of vision that is larger than a data code read by the system. Having a large field of vision may allow light detection device 12103 to have greater detection flexibility. For example, if the field of vision of light detection device 12103 is exactly the same size as a data code disposed on a lens mold, then an operator attempting to read the data code using the mold reader might have to position the data code very precisely in order to ensure an accurate reading of the data code. If the field of vision of light detection device 12103 is larger than the data code, positioning the mold may be simplified. However, it may be advantageous to eliminate or minimize information that does not correspond to the light pattern of the data code transmitted by the light detection device. Additionally, light detection device 12103 may be focused so that objects in the background of the data code are substantially out of focus. This may inhibit background objects from being detected as high contrast images, which may confuse the data code signal. Other computer-implemented methods applied to the light pattern signal may include one or more error correction algorithms and/or a translation algorithm. Machine vision software applications and hardware including filtering methods, error correction algorithms, translation algorithms, light detection devices and controllers are available from Robotic Vision Systems, Inc. of Canton, Mass.

Light source 12102 may be configured to illuminate data code 12104. As used herein, "illuminating" refers to directing light toward an object or area. In various embodiments, illuminating light may include visible light and/or non-visible light (e.g., infrared light, ultraviolet light, etc.). In an embodiment, light source 12102 may be positioned such that light reflected from mold 12105 is directed toward light detection device 12103. In such an embodiment, the reflected light may carry the light pattern detected by the light detection device. In an alternate embodiment, light source 12102 may be positioned such that light from the light source passes through at least a portion of lens mold 12105. The light may then carry the light pattern on to light detection device 12103.

Accuracy and speed of reading a data code may be improved if the code is illuminated evenly, as compared to reading accuracy and speed if the code is not illuminated evenly. Evenly illuminating data codes disposed on a variety of lens molds types may be challenging. The curvature of the casting face and/or non-casting face of molds of different mold types may be significantly different. To increase evenness of the illumination, light source 12102 may include an array of individual light sources. The individual light sources may be distributed in an area selected to provide substantially even illumination of a data code on a spherical lens mold. For example, an arrangement of the individual light sources to produce even illumination may be determined by positioning a spherical mold in the mold reader at an angle selected to minimize reflection of light toward the light detection device. Each individual light source may then be treated as a light beam. The point of incidence of each light beam may be held constant while the angle of incidence is changed until an array of evenly spaced point is created on the mold surface. The point of incidence, the mold reader dimensions, the angle of the lens mold, the optical properties of the lens mold and the determined angle of incidence may then be used to determine the arrangement of each individual light source of light source 12102. In an embodiment, light-emitting diodes (LEDs) may be used as individual light sources. To help ensure even illumination a constant current source may power the LEDs. The constant current power source may help to minimize light intensity variations due to LED to LED variability and power supply fluctuations.

In addition, minimizing light reflected from edges and surfaces within the mold reader may be desirable. For example, an edge of lens mold 12105 may reflect light toward light detection device 12103. Light reflected toward light detection device 12103 might obscure the light pattern formed by data code 12104, thereby reducing the accuracy and/or speed of the reading process. Careful selection of the angle between light source 12102, data code 12104 and light detection device 12103 may minimize problems of light reflection. Selecting this angle may be an iterative process which depends on the particular mold library with which the reader is intended to work. For example, the angle may depend on issues such as but not limited to: the size of the molds, the range of lens that can be manufactured by molds in the mold library, and the material of construction of the molds.

In mold readers having a single light source 12102, unintentional shadows may also have a detrimental effect on mold reader speed and/or accuracy. For example, edge shadows of a lens mold may disrupt the data code pattern or reduce the speed and/or accuracy of interpreting the data code pattern. To alleviate shadowing problems a secondary light source 12107 may be used. Secondary light source 12107 may be positioned to inhibit formation of unintentional shadows within the field of view of light detection device 12103. For example, secondary light source 12107 may be positioned to shine light at an angle to light shined from primary light source 12102.

In certain embodiments, light detection device 12103 may also detect patterns formed by illumination of high contrast features of the mold reader. In such embodiments, one or more light shields 12108 and 12109 may be used to reduce problems associated with detection of high contrast features of the mold reader. For example, a primary light shield 12108 may reduce the field of vision of light detection device 12103 to an area surrounding data code 12104 of a mold 12105 disposed within mold reader 12101. By limiting the field of vision in this manner, the amount of extraneous data (e.g., data not related to a light pattern formed by data code 12104) generated by light detection device 12103 may be limited. Additionally, the lens mold entrance 12111, support platform 12112 and mold guides 12113 may be restricted from the field of view. This may be desirable since lighting and contrast in these areas may be difficult to control. Additionally, light detection device 12103 and/or controller 12106 may be configured to ignore data from an area approximately equal to the area blocked by light shield 12108. By ignoring data from the area blocked by light shield 12108, the size of the data set to be analyzed by the mold reader may be reduced. Reducing the size of the data set to be analyzed may increase the speed of the mold reader. In an embodiment, primary light shield 12108 may be placed close enough to a lens of light detection device 12103 that the shield is out of focus. In such an embodiment, primary light shield 12108 may not generate any high contract images in light detection device 12103. This may reduce the likelihood of dirt or other contaminants on light shield 12108 being detected by light detection device 12103.

In an embodiment where secondary light source 12107 is present, a secondary light shield 12109 may also be employed. Secondary light shield 12109 may obstruct components of secondary light source 12107 from the field of vision of light detection device 12103. For example, in an embodiment, secondary light source 12107 may include a plurality of LEDs arranged on a circuit board. In such an embodiment, lead lines on the circuit board may reflect light in an undesirable manner. Likewise, circuit board components may generate high contrast images in light detection device 12103. Such high contrast images may disrupt identifying and/or interpreting the light pattern formed by data code 12104.

Additionally, in some embodiment, components of mold reader 12101 may be disposed within an enclosure 12110. Enclosure 12110 may inhibit external light sources from disrupting the data code detection process. Internal portions of enclosure 12110, as well as certain internal components, may be black and/or non-reflective. For example, the interior portion of enclosure 12110 may be painted with a non-reflective black paint. In some embodiments, enclosure 12110 may also include a shield or hood 12114 adjacent to the mold entrance to inhibit external light entering the mold reader.

To assist an operator in using mold reader 12101, a support platform 12112 may be located adjacent to mold entrance 12111. Support platform 12112 may support a mold disposed in the mold reader in a desired position for reading the data code. For example, support platform 12112 may be configured so that a data code of a mold resting on the platform is focused on a light sensor of light detection device 12103.

In an embodiment, mold guides 12113 may similarly assist the operator in obtaining an accurate reading of the mold data code. For example, one or more mold guides may assist an operator in positioning a data code of a mold disposed in the mold reader within a field of vision of light detection device 12103. In an embodiment, support platform 12112 and mold guides 12113 may be combined into a single feature. For example, a pair of converging rails having an L-shaped cross-section may both support a lens mold and limit how far into the mold reader the mold may be place.

Figure 74:
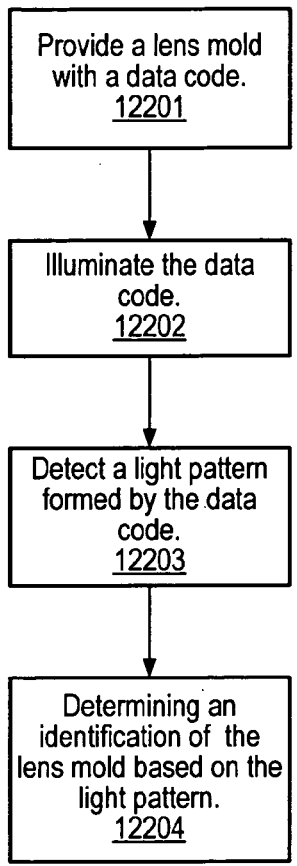
FIG. 74 depicts a flowchart of a method of determining the identification of a lens mold according to one embodiment.

A flow chart of an exemplary embodiment of a method of determining the identification of a lens mold is depicted in FIG. 74. The method may include providing a lens mold having an identification data code, as shown in box 12201. For example, a data code may be applied to the lens mold as describe with reference to FIG. 72. The data code may include but is not limited to: a bar code, a matrix data code and/or human readable text. The data code may include information sufficient to uniquely identify the individual lens mold and/or data sufficient to identify the type of the lens mold.

The method may include illuminating the data code, as shown in box 12202. The data code may be illuminated by reflecting light off the mold and/or by shining light through the mold. For example, a mold reader (such as the mold reader described with reference to FIG. 73) may be used to illuminate the data code. The mold may be placed in the mold reader with the data code positioned within the field of vision of the light detection device. The mold may be illuminated in a manner that inhibits formation of shadows within the field of vision of the light detection device. Additionally, the mold may be illuminated in a manner that inhibits reflection of light toward the light detection device off surfaces of the mold and the mold reader.

While the data code is illuminated, a light pattern formed by the illumination of the data code may be detected, as shown in box 12203. Detecting the light pattern may include using a light detection device. For example, the light detection device may generate an electrical signal based on light received at a light sensor. The light sensor may be configured to differentiate light and dark areas on the sensor formed by focusing the light pattern of the data code on the sensor. For example, in various embodiments, a CCD photo array, CMOS photo array, or another type of photovoltaic array may be used as the sensor. In an embodiment, light may strike the sensor in areas corresponding to field areas of the data code (e.g., areas containing no data elements). Likewise, darker areas may be formed on the sensor in areas corresponding to data elements of the data code. However, it is recognized that in alternate embodiments data elements may form lighter areas of the light pattern while darker areas are formed by the field.

The identification of the lens mold may be determined based on the detected light pattern, as shown in box 12204. Determining the identification of the lens mold based on the detected light pattern may include sending an electrical signal corresponding to the light pattern to a controller. The controller may determine the identity of the lens mold based on the electrical signal. For example, the electrical signal may be translated into a corresponding alphanumeric identification of the lens mold. In another example, the electrical signal may be used to search a database. The database may include a listing of lens mold identifications and associated electrical signals formed by data codes disposed on the lens molds.

Figure 75:
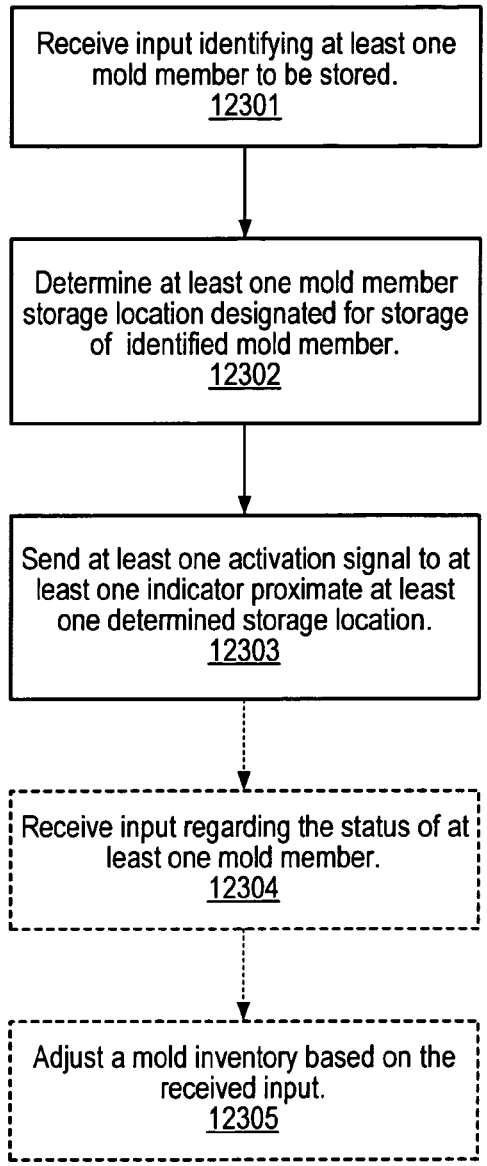
FIG. 75 depicts a flowchart of a method of storing a mold member according to one embodiment.

In an embodiment, after a mold member has been used to form a lens, the mold member may be returned to storage in a mold member storage system. FIG. 75 depicts a flowchart of an embodiment of a method of storing a mold member in a provided eyeglass mold member storage system. The method may include receiving input identifying a mold member to be stored, as shown in box 12301. For example, input identifying a mold member to be stored may be provided via a mold reader as previously described. One or more mold member storage locations designated for storage of the identified mold member may be determined based on the input at box 12302. For example, a mold member storage location associated with a mold member type of the mold member may be determined. As shown in box 12303, an activation signal may be sent to one or more indicators proximate one or more determined mold member storage locations. In some embodiments, the method may also include receiving input regarding the status of at least one mold member to be stored, as depicted in box 12304. For example, the input may include an indication that the mold member has been placed into the eyeglass mold member storage system. Alternately, the input may include an indication that the mold member has not been placed into the storage system. As shown in box 12305, the mold member inventory may be adjusted according the input received. For example, if the input indicates that a mold member was added to the eyeglass mold member storage system, the expected number of mold members of the mold member type may be increased by one.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An eyeglass mold member storage system, comprising:
a body comprising a plurality of mold member storage locations;
one or more shelves, wherein one or more of the shelves are angled between about 5 degrees and 15 degrees off of horizontal;
one or more indicators proximate one of more of the mold member storage locations, wherein at least one of the indicators is configured to produce a user detectable signal upon receipt of an activation signal; and
a plurality of mold members configured to be disposed within the plurality of mold member storage locations, wherein one or more of the mold members comprises an identifying mark.

2. The system of claim 1, further comprising a controller, wherein the controller is configured to provide the activation signal to at least one of the indicators.

3. The system of claim 1, further comprising a controller, the controller comprising an application specific integrated circuit, and wherein the controller is configured to provide the activation signal to at least one of the indicators proximate at least one of the mold member storage locations.

4. The system of claim 1, further comprising a controller, wherein the controller is configured to:
receive input from a user identifying at least one of the mold members;
determine at least one of the mold member storage locations associated with the mold member; and
send an activation signal to at least one of the indicators proximate the mold member storage location associated with the mold member.

5. The system of claim 1, further comprising a controller, the controller comprising a memory, and the controller is configured to:
receive input from a user identifying at least one of the mold members;
determine at least one of the mold member storage locations associated with the mold member; and
send an activation signal to at least one of the indicators proximate the mold member storage location associated with the mold member; and
wherein the memory comprises data usable by the controller in determining the mold member storage location associated with the mold member.

6. The system of claim 1, further comprising a controller, wherein the controller is configured to:
receive input, wherein the input comprises eyeglass lens information;
determine at least one of the mold members useable in forming an eyeglass lens based on the eyeglass lens information; and
send an activation signal to at least one of the indicators proximate at least one of the mold member storage locations associated with the determined mold member.

7. The system of claim 1, further comprising a controller, the controller comprising a computer, and wherein the controller is configured to provide the activation signal to at least one of the indicators proximate at least one of the mold member storage locations.

8. The system of claim 1, further comprising a controller, wherein the controller is configured to:
receive input from a user via a user input device, wherein the input from the user identifies one of the mold members, and wherein the user input device comprises at least one voice recognition device;
determine one of the mold member storage locations associated with the mold member; and
send an activation signal to one of the indicators proximate the mold member storage location associated with the mold member.

9. The system of claim 1, further comprising a controller, wherein the controller is configured to:
receive input from a user via a user input device, wherein the input identifies at least one of the mold members, and wherein the user input device comprises one or more light based code readers;

determine at least one of the mold member storage locations associated with the mold member; and send an activation signal to at least one of the indicators proximate the mold member storage location associated with the mold member.

10. The system of claim 9, wherein one of the light base code readers comprises a light detection device and a light source, wherein the light detection device and light source are configured such that a portion of the light from the light source is directed toward at least one of the mold members to be read and another portion of the light is directed toward the light detection device.

11. The system of claim 1, further comprising a controller, wherein the controller is configured to:

receive input from a user via a user input device, wherein the user input device comprises at least one keyboard, and wherein the input identifies at least one of the mold members;

determine at least one of the mold member storage locations associated with at the mold member; and send an activation signal to at least one of the indicators proximate the mold member storage location associated with the mold member.

12. The system of claim 1, further comprising a controller, wherein the controller is configured to:

receive input identifying at least one of the mold members;

determine at least one of the mold member storage locations associated with the mold member;

send an activation signal to at least one of the indicators proximate the mold member storage location associated with the mold member;

receive input regarding the status of other mold members associated with the mold member storage locations; and adjust inventory based on the received status.

13. The system of claim 1, wherein at least one of the mold member storage locations comprises at least one separating device configured to inhibit adjacent mold members from touching one another when mold members are stored in the eyeglass mold member storage system.

14. The system of claim 1, wherein at least one of the mold member storage locations is configured to inhibit movement of mold members when mold members are stored in the eyeglass mold member storage system.

15. The system of claim 1, wherein at least one of the mold member storage locations comprises a plurality of separating devices.

16. The system of claim 1, further comprising a sensor configured to detect the removal of at least one of the mold members from at least one of the mold member storage locations.

17. The system of claim 1, wherein at least one of the mold member storage locations comprises a dispensing end and wherein the mold member storage location is configured to move at least one of the mold members disposed within the mold member storage location toward the dispensing end.

18. The system of claim 1, wherein at least one of the indicators comprises at least one light.

19. The system of claim 1, wherein at least one of the indicators comprises at least one light, and wherein at least one light is configured to illuminate at least a portion of one of the mold member storage locations.

20. The system of claim 1, wherein at least one of the indicators comprises an electromechanical indicator.

21. The system of claim 1, wherein the body comprises a multi-dimensional array of the mold member storage locations.

22. The system of claim 1, wherein the body comprises a plurality of chutes forming the mold member storage locations.

23. The system of claim 1, wherein at least one of the mold member storage locations is designated for storage of the mold members having at least one property in common.

24. The system of claim 1, wherein the mold members are configured to be arranged within the eyeglass mold member storage system according to frequency of use.

25. The system of claim 1, wherein at least one of the mold members comprises a data code.

26. The system of claim 1, wherein a user detectable signal produced by a first indicator of the indicators is different from a user detectable signal produced by a second indicator of the indicators.

27. The system of claim 1, wherein a first indicator of the indicators is configured to produce a user detectable signal comprising a first color of light, and wherein a second indicator of the indicators is configured to produce a user detectable signal comprising a second color of light, the first color being different from the second color.

28. The system of claim 1, further comprising at least one roll-back inhibitor coupled to at least one of the mold member storage locations, wherein at least one roll-back inhibitor is configured to inhibit at least one of the mold members from moving toward a loading end of the mold member storage location.

29. The system of claim 1, further comprising a plurality of panels comprising mold member storage locations, and at least one end-panel on at least one end of the body, the end-panel comprising a plurality of openings that provide access to the mold member storage locations, and wherein at least two of the panels comprising the mold member storage locations are substantially maintained in a desired spaced relationship to one another by one or more spacers on a back side of the end-panel.

30. The system of claim 1, further comprising at least one end-panel on at least one end of the body, wherein the end-panel comprises at least one circuit board comprising at least one indicator.

31. The system of claim 1, further comprising at least one end-panel on at least one end of the body, wherein the end-panel comprises at least one circuit board comprising at least one indicator and at least one interface connector for coupling the indicator to a controller.

32. The system of claim 1, further comprising a plurality of panels, wherein at least one of the panels comprises one or more support members, and wherein the body comprises one or more engaging members for engaging one or more of the support members.

33. The system of claim 1, further comprising at least one work surface coupled to the body.

34. The system of claim 1, wherein at least one of the mold members comprising an identifying mark further comprises a machine readable data code.

35. An eyeglass mold member storage system, comprising:

a body comprising a plurality of eyeglass mold member storage locations;

wherein the eyeglass mold member storage locations are configured to hold a plurality of mold members, and wherein at least one of the mold member storage locations comprises a plurality of rocking cam members configured to use the weight of a first mold of the mold members to inhibit a second mold of the mold members from moving toward the first mold member.

36. An eyeglass mold member storage system, comprising:
- a body comprising a plurality of eyeglass mold member storage locations;
- wherein the eyeglass mold member storage locations are configured to hold a plurality of mold members, and
- wherein at least one of the mold member storage locations comprises a dispensing end, the dispensing end comprising one or more mold member retaining devices, wherein at least one of the mold member retaining devices comprises a resilient member configured to reduce an exit opening size of the mold member storage location.

37. An eyeglass mold member storage system, comprising:
- a body comprising a plurality of mold member storage locations;
- a plurality of mold members configured to be disposed within the plurality of mold member storage locations, wherein at least one of the mold members comprises an identifying mark;
- one or more indicators proximate at least one of the mold member storage locations, wherein at least one of the indicators comprises at least one light configured to produce a plurality of user detectable signals comprising different colors of light.

* * * * *